United States Patent [19]

Abelow

[11] Patent Number: 5,251,294
[45] Date of Patent: Oct. 5, 1993

[54] ACCESSING, ASSEMBLING, AND USING BODIES OF INFORMATION

[76] Inventor: Daniel H. Abelow, 71 W. Pine St., Newton, Mass. 02166

[21] Appl. No.: 476,931

[22] Filed: Feb. 7, 1990

[51] Int. Cl.$^5$ ............................................. G06F 15/62
[52] U.S. Cl. ..................................... 395/155; 395/148
[58] Field of Search ............... 364/518, 519, 521, 523; 395/144–148, 155–161

[56] References Cited

U.S. PATENT DOCUMENTS

| | | | |
|---|---|---|---|
| 4,656,603 | 4/1987 | Dunn | 364/900 |
| 4,813,013 | 3/1989 | Dunn | 364/900 |
| 4,823,303 | 4/1989 | Terasawa | 364/521 |
| 4,885,704 | 12/1989 | Takagi et al. | 364/518 X |

OTHER PUBLICATIONS

"OnLine Information", *PC Computing*, Nov. 1988, pp. 208–210.
"Dialog and the Online Industry", from Dialog Information Services, Inc., Overview '87/'88, 1988, pp. 4–5.
"Dialog on Disc", from Dialog Information Services, Inc., Overview '87/'88, 1988, pp. 12–13.
Ulrich's International Periodicals Directory 1987–1988 (1988), New York: R. R. Bowker Company, pp. 1779–1816.
Janal, Dan., "Articles at Your Fingertips", *Online Today*, Jan. 1988, pp. 10–11.
Conroy, Cathryn, "News You Can Choose", *Online Today*, Jan., 1989, pp. 16–21.
Conroy; Cathryn, "Online Lifeline", *Online Today*, May 1986, pp. 14–18.
Johnston, Stuart J., "Moore Vendors Offering Bulletin Board Support", *Info World*, Apr. 11, 1988, vol. 10, #24, p. 33.
Dickinson, John, "Lexical Electronic Filing", *PC Magazine*, vol. 4, #17, Aug. 20, 1985, pp. 137–144.
Witten, Ian H. and Bramwell, Robert, "A System for Interactive Viewing of Structured Documents", *Communications of the ACM*, Mar. 1985, vol. 28, #3, pp. 280–288.
Hiltz, Starr Roxanne and Turoff, Murray, "Structuring Computer Mediated Communication Systems to Avoid Information Overload", *Communications of the ACM*, Jul. 1985, vol. 28, #7, pp. 680–689.
Blair, David C. and Maron, M. E., "An Evaluation of Retrieval Effectiveness for a Full-Text Document Retrieval System", *Communications of the ACM*, Mar. 1985, vol. 28, #3, pp. 289–299.
Dionne, Richard J., "Science Libraries at a Crossroads", *American Scientist*, May–Jun. 1988, vol. 76, #3, pp. 268–272.
"Marketing Tools Alert", *American Demographics*, Spring 1988, pp. 1–19.

(List continued on next page.)

*Primary Examiner*—Heather R. Herndon
*Attorney, Agent, or Firm*—Fish & Richardson

[57] ABSTRACT

An interactive information environment for accessing, controlling, and using information. Using a computer, available sources of information are accessed, and components are extracted, labeled, and formed into discrete units called contexts. A user selects and rearranges context labels and their associated contents. Contexts are selected and combined into new information structures called alternates, which are combinable with contexts into preferred situations. The preferred situations in turn are combinable with the foregoing components into meta-situations. All components have labels; labels and their associated contents are interchangeably movable and copyable at the levels of these information structures, whether they are located locally or remotely, and the information structures are combinable. While a label is invoked and manipulated, its contents or description is simultaneously displayed. Each information structure can be rearranged into one or more models which can be displayed by user selection, and models can be displayed at varying levels of detail. With built-in copyright accounting, commercial control remains with information owners, while operational use is centralized in each user.

78 Claims, 225 Drawing Sheets

OTHER PUBLICATIONS

Miller, Michael J., "Sophisticated Text-Retrieval Program Offers Hotlinks, Keyword Outlining", *Info World*, Feb. 29, 1988, p. 43.

Mace, Scott, "Ask Sam, Version 4.0 Incorporates Hypertext", *Info World*, Feb. 22, 1988, vol. 10, #8, p. 23.

Johnson, L. J., "Fast Text Searches", PC Resource, Dec. 1987, pp. 21–26.

Ponting, Bob, "Opus One Database Gets New Drawings Capabilities", *Info World*, Jun. 13, 1988, p. 13.

Johnston, Stuart J., "Multimedia Database Publishing Utility Ship", *Info World*, Aug. 18, 1988, #32, p. 17.

Linklider, Tracy Robnett, "Stalking the Elusive File", BCS Update, vol. 12, #5, May 1989, pp. 14–16.

Mace, Scott and Johnston, Stuart J., "Census Bureau Offers Information on CD ROM", *Info World*, Jul. 4, 1988, vol. 10, #27, p. 18.

Ponting, Bob, "HP's CD ROM Interface Offers Search, Organization Features", *Info World*, Aug. 8, 1988, vol. 10, #32, p. 23.

Helgerson, Linda W. and Meyer, Fred P., "CD-ROM Publishing Strategies", PC Tech Journal, Oct. 1988, vol. 6, #10, pp. 53–63.

"Language Learning", Philips International, Inc., Compact Disc-Interactive, New York: McGraw Hill Company, 1988, pp. 70–73.

"CD-I Technology", Philips International, Inc., Compact Disc-Interactive, New York: McGraw Hill Company, 1988, pp. 78–83, 86–107.

"Design Process", Philips International, Inc., Disc-Interactive, New York: McGraw Hill Company, 1988, pp. 52–69.

Patton, Carole, "Ten X Unveils Two Secure Optical Discs", *Info World*, Aug. 8, 1988, vol. 10, #32, p. 5.

Lewis, Potter H., "Like Tea or a Tango, Software for Two", New York Times, Oct. 18, 1987, III, 21:1.

Hiltz, Starr Roxanne, Online Communities, Norwood, N.J.: Ablex Publishing Corporation, 1984, pp. XV–XIV.

"Power On! New Tools for Teaching and Learning", U.S. Congress Office of Technology Assessment, 1988, pp. 232–236.

Sommer, Daniel, "Authoring System Lets Trainers Create Instructional Software", *Info World*, May 23, 1988, p. 26.

Jones, Robert Snowden, "Exhibits's PCs Inform and Entertain", *Info World*, May 2, 1988, p. 43.

Lewis, Potter H., "Like Tea or a Tango, Software for Two", New York Times, Oct. 18, 1987, III, 21:1.

Hiltz, Starr Roxanne, Online Communities, Norwood, N.J.: Ablex Publishing Corporation, 1984, pp. XV–XIV.

Leonard-Barton, Sviokla, Dorothy and John J., "Putting Expert Systems to Work", Harvard Business Review, Mar.–Apr. 1988, vol. 88, #2, pp. 91–98.

Svoikia, John, "Business Implications of Knowledge--Based Systems", Data Base, Fall 1986, vol. 18, #1, pp. 5–16.

Newquist, Harvey P., "An Then There was the Wine Advisor . . . ", AI Expert, Jun. 1988, vol. 3, #6, pp. 67–69.

Glascow, Barry and Elizabeth Graham, "Rapid Prototyping Using Core Knowledge Bases", AI Expert, Apr. 1988, vol. 3, #4, pp. 26–36.

"There's A Dimension to Productivity That You've Never Been Able to Address . . . Until Now", Texas Instruments, Jun. 15, 1988.

Gantz, John, "The Apple Party Line: Hypercard is the Applications Generator of the Future", *Info World*, Oct. 5, 1987, vol. 9, #40, p. 49.

Flynn, Laurie, "Arthur Young to Challenge CD-ROM Frontier", *Info World*, Mar. 21, 1988, p. 39.

Flynn, Laurie, "Cornell Med School Uses Hypertext Net", *Info World*, Oct. 26, 1987, p. 45.

Shephard, Susan J., "AI Meet Hypertext: Knowledge and Knowledgemaker", Nov.–Dec. 1987, Reprinted Article Distributed by Knowledge Garden, Inc.

Johnston, Stuart J., "Owl Unveils Hypertext Document Manager," *Info World*, Apr. 4, 1988, p. 27.

Main, Jeremy, "At Last, Software CEO's Can Use", Fortune, Mar. 13, 1989, vol. 119, #6, pp. 77–83.

Miller, Michael J., "Agenda and Grandview: Two New Ways to Manage Personal Information", *Info World*, Apr. 11, 1988, vol. 10, #15, p. 51.

Patton, Carole, "$189 Wordbench Helps Users Develop and Organize Ideas", *Info World*, May 9, 1988, vol. 10, #19, p. 24.

Walkenbach, John, "Pop-Up Data Base Provides Instant Access to Information", *Info World*, Aug. 8, 1989, vol. 10, #32, p. 63.

(List continued on next page.)

OTHER PUBLICATIONS

Markoff, John, "Supercomputer Pictures Solve the Once Insolvable", New York Times, Oct. 30, 1988, I, 1:1.

"Get Solutions to Complex CICS Performance Problems as Easy as 1,2,3.", Computerworld, Sep. 14, 1987, pp. 50-51.

Miller, Michael J., "Software Bridge 3.0 Solves the Problem of Exchanging Word Processing Files", Info World, May 2, 1988, p. 66.

Lantz, Kenneth, "the Prototyping Methodology: Designing Right the First Time", Computerworld, Apr. 17, 1986, vol. 20, #14, pp. 69-72.

"Precision visual's Enter/Act IUMS", Precision visuals, Inc., 1987 (first introduced).

"Cambridge Trust Company Offer Convenient Automated Teller Service . . . Easy to Use . . . And Available Whenever You Need It", Cambridge Trust Company, Mar. 1988.

Stone, Paula S., "Managers Weight Costs, Benefits of Programs", Info World, Oct. 5, 1987, vol. 9, #40, p. 51.

"Get Your Work Done Before 1991", Quarterdeck, 1988.

Mace, Scott, "National Research Net to be Enhanced in July", Info World, Apr. 25, 1988, vol. 10, #17, p. 11.

Jones, Robert Snowden, "Carbon Copy Upgrade Works in Background," Info World, May 2, 1988, p. 35.

Satchell, Stephen, "The USDV.32 Modem: High-Speed Connections at a Comfortable Price", Info World, Apr. 25, 1988, vol. 10, #17, p. 73.

Applegate, Lynda M., Cash, James I., Jr., Mills, D. Quinn, "Information Technology and Tomorrow's Manager", Harvard Business Review, Nov.-Dec. 1988, vol. 88, #6, pp. 128-136.

Runyan, Linda, "Hot Technologies for 1989", Datamation, Jan. 15, 1989, vol. 35, #2, pp. 18-24.

Dreyfuss, Joel, "Catching the Computer Wave", Fortune, Sep. 26, 1988, vol. 118, #7, pp. 78-79.

Stone, Paula, "Research Report Outlines PC Managerial Models", Info World, Jul. 4, 1988, vol. 10, #27, p. 34.

Goleman, Daniel, "Why Managers Resist Machines", New York Times, Feb. 7, 1988, III, 2:1.

Porter, Michael E. and Victor E. Millar, "How Information Gives you Competitive Advantage", Harvard Business Review, Jul.-Aug., 1985, vol. 85, #4, pp. 149-178.

Marchand, Donald and Forest Horton, Jr., "Existing Information Resources Can Give You the Competitive Edge", Computerworld, May 26, 1986, vol. 29, #21, pp. 79-84.

Brooks, Harvey and Eugene B. Skolnikoff, "Science Technology and International Relations", Paper presented at the NATO Science Committee 20th Anniversary Commemoration Conference, Cambridge, Mass. Apr. 12, 1978.

"All the World's A Dish", The Economist, Aug. 27, 1988, vol. 308, #7565, pp. 7-8.

Estren, Mark J., "Escaping the Paradigm", High Technology Business, Jul. 1988, vol. 8, #7, p. 18.

Skolnikoff, Eugene B., "Science, Technology, and International Security: A Synthesis", Science, Technology, and the Issues of the 80's, AAAS, Boulder, Colo.: Westview Press, Sep. 1981, pp. 1-40.

Final Report of the Defense Science Board Task Force on Semiconductor Dependency, Washington, D.C., 1986, pp. 1-13.

Hendrickson, David C. "The Future of American Strategy", New York: Holmes and Meier, 1987, pp. 18-27.

Gansler, Jacques S., "Needed: AVS Defense Industrial Strategy", International Security, Fall, 1987, vol. 12, #2, pp. 45-62.

Pournelle, Jerry, "Low Productivity, Inadequate Education Threatens U.S. Computer Industry", Info World, Oct. 19, 1987, vol. 9, #42, p. 57.

Governing America: A Competitiveness Policy Agenda for the New Administration. A report by the Council on Competitiveness, Washington, D.C., pp. 1-43.

Zuboff, Shoshana, "New Worlds of Computer-Mediated Work", Harvard Business Review, Sep.-Oct., 1982, vol. 60, #5, pp. 142-150.

Fosnot, Catherine Twomey et al., "The Development of an Understanding of Balance and the Effect of Training Via Stop-Action Video", Journal of Applied Developmental Psychology, Jan.-Mar., 1988, vol. 9, #1, pp. 1-26.

Flavell, John H. "Cognitive Monitoring", Children's Oral Communication Skills", 1981, pp. 35-59.

Online Information, PC Computing, Nov. 1988, p. 208.

Conroy, Cathryn. "News You Can Choose", Online Today. pp. 16-19, Jan. 1989.

Conroy, Cathryn. "Online Lifeline", Online Today. pp. 14-18, May 1986.

(List continued on next page.)

OTHER PUBLICATIONS

Johnston, Stuart J. "More Vendors Offering Bulletin Board Support", Management. Apr. 11, 1988. p. 33.

Dickinson, John. "Lexical Electronic Filing", PC Magazine. Aug. 20, 1985. pp. 137-144.

Witten, I. et al. "A System for Interactive Viewing of Structured Documents" Communications of the ACM. Mar. 1985. vol. 28. No. 3. pp. 280-288.

"Structuring Computer-Mediated Communication Systems To Avoid Information Overload", Communications of the ACM. Jul. 1985. vol. 28. No. 7. pp. 680-689.

Blair, David C. and Maron M. E. "An Evaluation of Retrieval Effectiveness For a Full-Text Document Retrieval System", Communications of the ACM. Mar. 1985, pp. 289-299. vol. 28. No. 3.

Dionne, Richard, J. "Science Libraries at a Crossroads", American Scientist, vol. 76. May 1988, pp. 268-272.

American Demographics. Spring 1988, pp. 1-19.

Mace, Scott. "Ask Sam, Version 4.0 Incorporates Hypertext", PC Magazine. Feb. 22, 1988. p. 23.

Johnson, L. J. "Fast Text Searches," PC Resource. Dec. 1987. pp. 21-26.

"Stalking the Elusive File" BCS Update. May 1989.

Ponting, Bob. "HP's CD ROM Interface Offers Search, Organization Features", Info World. Aug. 8, 1988. p. 23.

Helgerson, Linda W. and Meyer, Fred P. "CD-ROM Publishing Strategies", PC Tech Journal. Oct. 1988. pp. 53-63.

Patton, "Ten X Unveils Two Secure Optical Discs, Aug. 8, 1988.

Lewis, Peter H. "Like Tea or a Tango, Software for 2". The New York Times. Oct. 18, 1987.

Hiltz, Starr, Roxanne. Online Communities. Ablex Publishing Corporation. Norwood, N.J., 1984, pp. XV-XIV.

Leonard-Barton, Dorothy, and Sviokla, John J. "Putting Expert Systems to Work". Harvard Business Review. Mar.-Apr. 1988. pp. 91-98.

Sviokla, John. "Business Implications of Knowledge-Based Systems". Data Base. Fall of 1986. pp. 5-16.

Newquist, Harvey P. III. "And Then There Was the Wine Advisor", AI Expert. Jun. 1988. pp. 67-69.

Glasgow, Barry and Graham, Elizabeth. "Rapid Prototyping Using Core Knowledge Bases", AI Expert. Apr. 1988. pp. 26-35.

Gantz, John. "The Apple Party Line: Hypercard Is the Applications Generator of the Future", Tech Street. Oct. 5, 1987, pp. 49-50.

Main, Jeremy. "At Last, Software CEOs Can Use", Fortune. Mar. 13, 1989. pp. 77-78.

Miller, Michael, "Agenda and Grandview: Two New Ways to Manage Personal Information, Apr. 11, 1988.

Patton, Carole. "$189 Wordbench Helps Users Develop and Organize Ideas", Software. May 9, 1988. p. 24.

Walkenbach, John. "Pop-Up Database Provides Instant Access to Information", Software Reviews. Aug. 8, 1988, p. 63.

Markoff, John. "Supercomputer Pictures Solve the Once Insoluble", New York. Oct. 30, 1988.

"Get Solutions to Complex CICS Performance Problems As Easy As 1,2,3.", Computerworld. Sep. 14, 1987.

Lantz, Kenneth. "The prototyping methodology: Designing right the first time", Computer World. Apr. 7, 1986. p. 69.

Stone, Paula S. "Managers Weigh Costs, Benefits of Programs", Management. Oct. 5, 1987. p. 51.

Mace, Scott. "National Research Net To Be Enhanced in July", Working. Apr. 25, 1988. p. 11.

Satchell, Stephen. "The UDS V.32 Modem: High-Speed Connections at a Comfortable Price", Hardware Spotlight. Apr. 25, 1988. p. 73.

(List continued on next page.)

OTHER PUBLICATIONS

Applegate, Lynda M. and Cash, James I. Jr. and Mills, D. Quinn. "Information Technology and Tomorrow's Manager", Harvard Business Review. Nov.-Dec. 1988. pp. 128-136.

Runyan, Linda. "Hot Technologies for 1989", Forecast. Jan. 15, 1989. pp. 18-24.

Dreyfuss, Joel. "Catching the Computer Wave", Fortune. Sep. 26, 1988., pp. 78-79.

Goleman, Daniel. "Why Managers Resist Machines", The New York Times. Feb. 7, 1988.

Marchand, Donald and Horton, Forest Jr. "Existing Information Resources Can Give You the Competitive Edge", Computerworld. May 26, 1986. pp. 79-85.

Brooks, Harvey and Skolnifoff, Eugene B. Science, Technology and International Relations. Prepared for and delivered at the NATO Science Committee 20th Anniversary Commemoration Conference. Apr. 12, 1978.

All the World's a Dish" The Economist. Sep. 2, 1988.

Estren, Mark J. "Escaping the Paradigm", High Technology Business. Jul. 1988.

Skolinkoff, Eugene B. Science, Technology, and International Security: A Synthesis. Prepared for the Five Year Outlook project of the American Association for the Advancement of Science, Sep. 1981, pp. 1-42.

Hendrickson, David C. The Future of American Strategy. Holmes & Meier. New York, 1987. pp. 18-27.

Gansler, Jacques S. "Needed: A U.S. Defense Industrial Strategy", International Security. Fall 1987. vol. 12. No. 2. pp. 45-62.

Zuboff, Shoshana. "New Worlds of Computer-Mediated Work", Harvard Business Review. Sep.-Oct. 1982. pp. 142-150.

Fosnot, Catherine Twomey, and Forman George E. and Edwards, Carolyn Pope, and Golhaber, Jeanne. "The Development of an Understanding of Balance and the Effect of Training via Stop-Action Video". 1988, pp. 1-26.

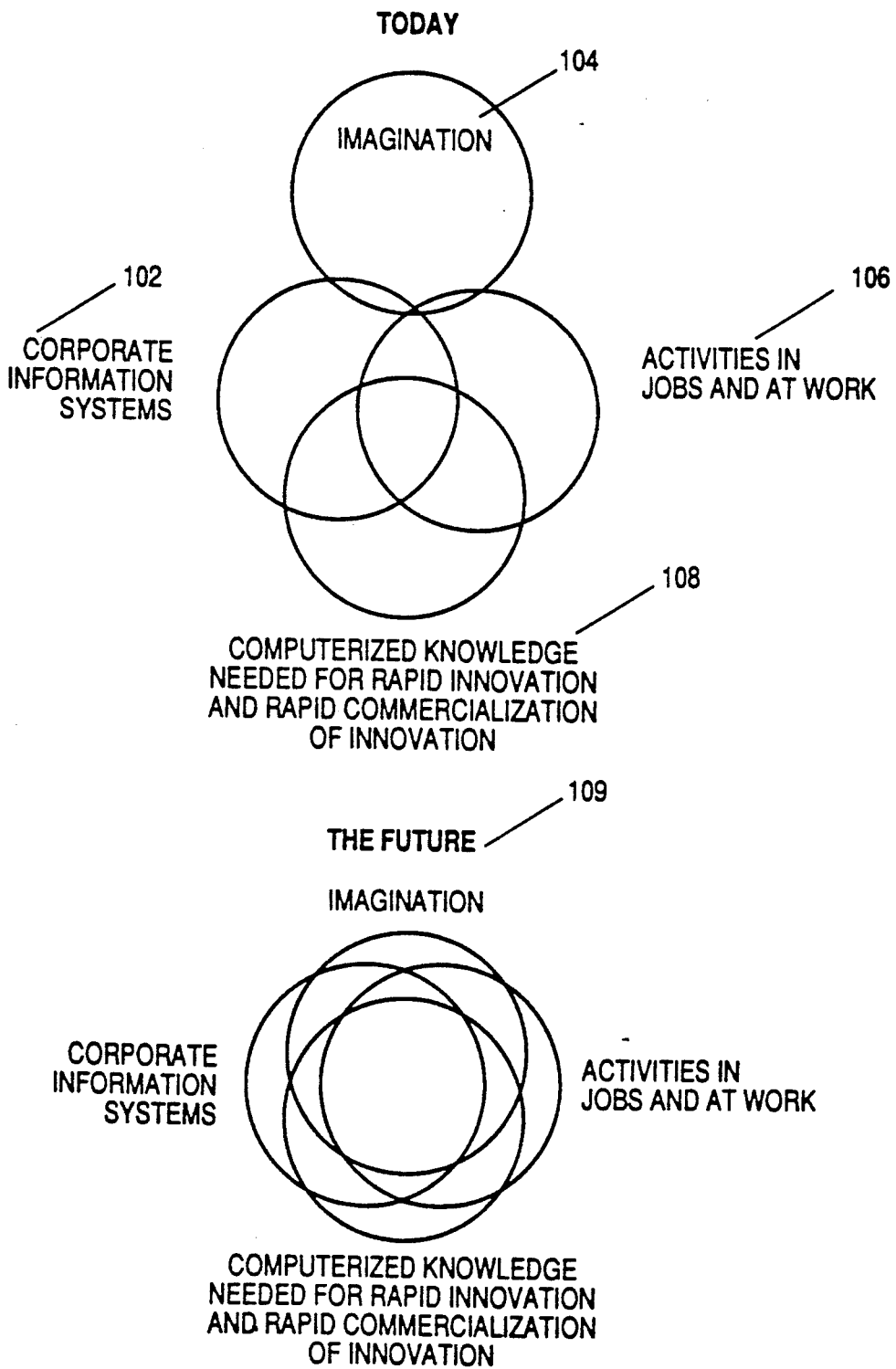

FIGURE 15B

PRODUCTIVITY

PRODUCTIVITY was selected as a context because a critical national goal is how to accomplish more, in less time, and at a lower cost.

THE OPPORTUNITY TO BE MORE PRODUCTIVE comes directly from:

- Defining contexts from the top down and from the bottom up.

- Providing software tools that are interactive and deliver the contexts each person needs when he or she needs it.

- Managing the contexts so they are focused on high impact areas like key individuals, work groups, departments, or projects.

THE ABILITY to define and manage contexts is an opportunity to guide situations and focus them on higher performance and rapid results.

CATALOG: NEW ALTERNATE          CREATE ALTERNATES

START A NEW ALTERNATE

DEVELOPER(S):
  Date:                [1/12/89]
  Developer's Name:    [Elizabeth Jones
  Developer's Dept:    [Editorial
  Est. Budget:         [              ] (op ALTERNATE & USER(S):
  Alternate's Name:    [New Editorial Assi
  Est. Start Date:     [1/12/89] (optiona
  End-User Name(s):    [Sarah Smith
  Department:          [Editorial
  Project Descrip:     [Y] Y/N (optional)

207
210

NOTES/CONCEPTS

FIGURE 20B

CHOOSE CONTEXT BASES

```
CONTEXT BASE 1:
    ENTER DRIVE:\PATH\*.EXT    [CD-ROM:\EDIT-DPT.IS            ]  — 222
         DESCRIPTION           [EDITORIAL DEPARTMENT CONTEXT BASE]  — 224

CONTEXT BASE 2:
    ENTER DRIVE:\PATH\*.EXT    [C:\INTERNAL\CONTEXTS\ED-DEPT.IS]  — 226
         DESCRIPTION           [OUR COMPANY'S INTERNAL CONTEXTS]

CONTEXT BASE 3:
    ENTER DRIVE:\PATH\*.EXT    [C:\CBT\CONTEXTS\CBT.IS        ]  — 228
         DESCRIPTION           [EXPERTISE FROM CBT FIELD      ]

CONTEXT BASE 4:
    ENTER DRIVE:\PATH\*.EXT    [                              ]
         DESCRIPTION           [                              ]
```

<1,2,3,4> for Source        <Esc> Main Menu

FIGURE 21

| CONTEXT | SOURCE | PAGE |
|---|---|---|
| EDITING THE WHOLE PUBLICATION | | |
|   DESIGN | | |
|     EXPLOITING THE THIRD DIMENSION | WHITE2 | 20 |
|   INDEXING | | |
|     BUDGET CONSCIOUS INDEXING | BOSTON | 217 |
|   PROBLEMS? | | |
|     MANAGEMENT LESSONS AND WARNINGS | BOSTON | 167 |
|     PUBLICATION MANAGEMENT LESSONS | BOSTON | 164 |
|     PUBLICATION MANAGEMENT WARNINGS | BOSTON | 167 |
|   PROOFREADING | | |
|     DO COMPLETE FINAL READINGS | PLOTNIK | 8 |
|   PROPOSALS | | |
|     PRODUCING PROPOSALS | BOSTON | 142 |
|     WRITING PROPOSALS | BOSTON | 139, 144 |
|   SCHEDULING | | |
|     HOW TO PLAN AND MANAGE A SCHEDULE | BOSTON | 204 |
|     ON BEING ON TIME | MOGEL | 36 |
|     START THE NEXT ISSUE IMMEDIATELY | PLOTNIK | 9 |
|     TOP-DOWN PLANNING IN PUBLISHING | BOSTON | 170 |
|   SPACE PLANNING | | |
|     ASSEMBLING THE ISSUE IN MINIATURE | WHITE2 | 18 |
|     FORMS FOR PLANNING AN ISSUE | WHITE 2 | 15 |
|     MAGAZINES IN THREE DIMENSIONS | WHITE 2 | 12 |
| HIRING NEW EMPLOYEES | | |
|   JOB DESCRIPTIONS | | |
|     COPY EDITOR | MOGEL | 33 |
|     EDITOR | MOGEL | 24, 32 |
|     EDITORIAL MANAGEMENT | MOGEL | 32 |
|     HOW TO HIRE A PROOFREADER | BOSTON | 180 |
|     MANAGING EDITOR | MOGEL | 32 |
|     SENIOR EDITOR | MOGEL | 33 |
|   RESUMES | | |
|     HOW EDITORS READ RESUMES | BOSTON | 183 |
|   TESTS | | |
|     EDITING TESTS FOR JOB APPLICANTS | BOSTON | 178 |
| INFORMATION RETRIEVAL | | |
|   EXTERNAL SOURCES | | |
|     INFORMATION BROKERS | PLOTNIK | 81 |
|     MODERN LIBRARIES | PLOTNIK | 78 |
|   INTERNAL SOURCES | | |
|     THE OFFICE BOOKSHELF | PLOTNIK | 82 |
| INVASION OF PRIVACY | | |
|   CONSENT | | |
|     CONSENT FOR PHOTOGRAPHS | DILL | 179, 237 |
|     CONSENT TO INTERVIEWS AND PHOTOS | DILL | 216 |

FIGURE 36B

CREATE ALTERNATES
GUIDE WINDOW — 444

CONTEXT COLLECTION

2: OUR COMPANY'S INTERNAL CONTEXTS

DEPARTMENTS:
New Products:
→New Products in IC Magazine.

EDITORIAL:
Editing Articles:
→Anatomy of a Competent Article.
→Creating Excitement in Articles.
→The Inspired Story.

Production and Design:
→Editorial/Type Specifications.
→Equivalents.
→How to Use the Transfer Program.
→Proofreading Marks.

Working with Authors:
→Fine Writing Instruments. ← 446

FINE WRITING INSTRUMENTS

I know a woman who wrote the entire 500-page manuscript of her novel in longhand, using Pilot razor point pens and lined legal pads, just for the tactile joy of it. Before Mark Twain submitted the first typewritten manuscript to a publisher (just over 100 years ago), that was the way writers always wrote -- unless (Floyd, 15 pp.)

COLLECTED CONTEXTS

New Products:
Audience:
  A Vital Reader Interest.

FIGURE 56B

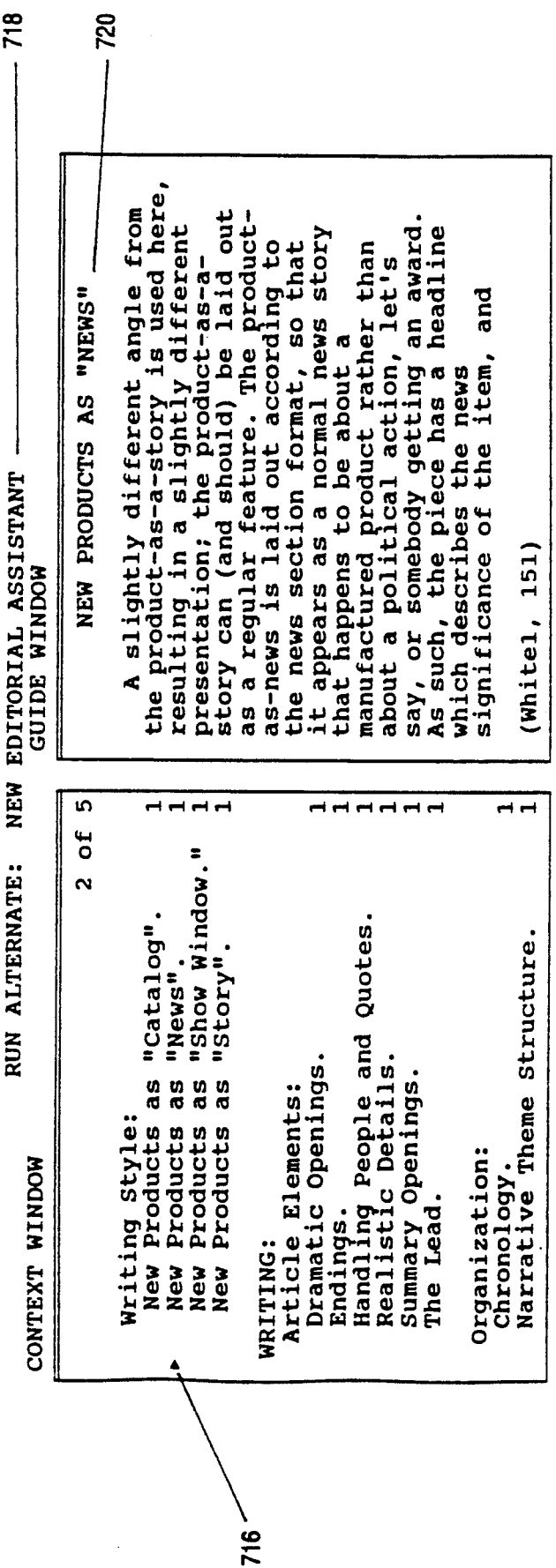

CONTEXT WINDOW        RUN ALTERNATE:     NEW EDITORIAL ASSISTANT — 718
                                         GUIDE WINDOW

```
                            2 of 5
Writing Style:
  New Products as "Catalog".          1
  New Products as "News".             1
  New Products as "Show Window."      1
  New Products as "Story".            1
WRITING:
  Article Elements:                   1
  Dramatic Openings.                  1
  Endings.                            1
  Handling People and Quotes.         1
  Realistic Details.                  1
  Summary Openings.                   1
  The Lead.                           1
Organization:
  Chronology.                         1
  Narrative Theme Structure.          1
```

NEW PRODUCTS AS "NEWS" — 720

A slightly different angle from the product-as-a-story is used here, resulting in a slightly different presentation; the product-as-a-story can (and should) be laid out as a regular feature. The product-as-news is laid out according to the news section format, so that it appears as a normal news story that happens to be about a manufactured product rather than about a political action, let's say, or somebody getting an award. As such, the piece has a headline which describes the news significance of the item, and (White1, 151)

CONTEXT WINDOW    RUN ALTERNATE:    NEW EDITORIAL ASSISTANT
GUIDE WINDOW

```
                                    4 of 5
EDITING:
  Copyediting:
    Conscientious Habits.             1
    Editing for Flow.                 1
    Editing for Content.              1

Editing Articles:
    Anatomy of a Competent Article.   2
  ▲ Creating Excitement in Articles.  2
    The Inspired Story.               2

PRODUCTION AND DESIGN:
  Editorial/Type Specifications.      2
  Equivalents.                        2
  How to Use the Transfer Process.    2
  Production Basics for Editors.      1
  Stretching Production Dollars.      1
```

```
CREATING EXCITEMENT IN ARTICLES advertisement that has the
headline "MIS Manager buys Apple,
keeps job?"

It does not require a great deal
of detail, just enough to make
the issues come alive.

2.  Use specific details.

Which of these two sentences
is more interesting?

"Generalizations are boring."

(Floyd, 1 p.)                 2 of 5
```
— 766

FIGURE 59C

CONTEXT WINDOW    RUN ALTERNATE:    NEW EDITORIAL ASSISTANT GUIDE WINDOW

```
                                4 of 5

EDITING:
  Copyediting:
    Conscientious Habits.                1
    Editing for Flow.                    1
    Editing for Content.                 1

Editing Articles:
    Anatomy of a Competent Article.      2
  ▲ Creating Excitement in Articles.     2
    The Inspired Story.                  2

PRODUCTION AND DESIGN:
  Editorial/Type Specifications.         2
  Equivalents.                           2
  How to Use the Transfer Process.       2
  Production Basics for Editors.         1
  Stretching Production Dollars.         1
```

```
        CREATING EXCITEMENT IN ARTICLES

"Last year, over a million people
 fell asleep while reading
 generalizations."

3.  Be precise in the use of words.

Use the dictionary, especially
when you feel the temptation to
make something sound important.
Witness the vendors who write
press releases about "audible
interactive learning systems"
when they mean "a casette tape
you can turn on and off."

(Floyd, 1 p.)

```
CONTEXT WINDOW         RUN ALTERNATE:   NEW EDITORIAL ASSISTANT
                                            GUIDE WINDOW 4 of 5         CREATING EXCITEMENT IN ARTICLES

EDITING:                                     and he left us some of the most
  Copyediting:                               memorable phrases in English.
    Conscientious Habits.        1           "I have nothing to offer but
    Editing for Flow.            1           blood, toil, tears, and sweat."
    Editing for Content.         1
                                             or: "This was their finest hour."
  Editing Articles:
    Anatomy of a Competent Article.  2       or: "Never in the field of human
  ▸ Creating Excitement in Articles. 2           conflict was so muched owed by so
    The Inspired Story.          2               many to so few."

PRODUCTION AND DESIGN:                       or: "The soft underbelly of the
  Editorial/Type Specifications. 2               Axis."
  Equivalents.                   2
  How to Use the Transfer Process. 2
  Production Basics for Editors. 1
  Stretching Production Dollars. 1           (Floyd,, 1 p.)                5 of 5
```

ZOOMED GUIDE WINDOW — RUN ALTERNATE: NEW EDITORIAL ASSISTANT — 786

CREATING EXCITEMENT IN ARTICLES

2. Use specific details.

Which of these two sentences is more interesting?

"Generalizations are boring."

"Last year, over a million people fell asleep while reading generalizations."

3. Be precise in the use of words.

Use the dictionary, especially when you feel the temptation to make something sound important. Witness the vendors who write press releases about "Audible interactive learning systems" when they mean "a cassette tape you can turn on and off."

(Floyd, 1 p.)

ZOOMED GUIDE WINDOW — RUN ALTERNATE: NEW EDITORIAL ASSISTANT — 788

CREATING EXCITEMENT IN ARTICLES

4.  Use the connotations of words.

Let's say you are writing a story about computer viruses and you discover these things are remarkably short as programs go. Try something like this for a description: "The program consists of five lines, hardly enough coding to fill a blasting cap."

5.  Be simple, be clear.

Go for the Anglo-Saxon word first. Winston Churchill did, and he left us some of the most memorable phrases in English. "I have nothing to offer but blood, toil, tears, and sweat."

(Floyd, 1 p.)

```
TIME-SEQUENCE WINDOW      RUN ALTERNATE:   NEW EDITORIAL ASSISTANT ─── 798

┌─────────────────────────────────────────────────────┐
│ ►PRODUCTION AND DESIGN:                             │
│     PROOFREADING:                                   │
│         EDITING:                                    │
│           Copyediting:                              │
│           Editing Articles:                         │
│                  DEPARTMENTS:                       │──── 800
│                  Design:                            │
│                  Editing:                           │
│                  New Products:                      │
│                                                     │
│ 1 of 2                                              │
└─────────────────────────────────────────────────────┘
```

GUIDE WINDOW

| USING THE ALTERNATE | SECOND PICK GUIDES: | TO USE GUIDES: |
|---|---|---|
| FIRST PICK YOUR ACCESS: | + or -   Expand or Contract list | <F2>  Next window<br><PgDn/PgUp><br>View Guide |
| / in a Choice Window:<br>Model or Time-Sequence | <Shift +> or <Shift ->  Most/Least detail in list | / "Divide" Guide<br><Shift PgUp/PgDn><br>Zoom/Unzoom window |

FIGURE 64B

```
ZOOMED GUIDE WINDOW    RUN ALTERNATE:  NEW EDITORIAL ASSISTANT

DEPARTMENTS:
      Design:
       ►Design Relationships to the Mag.        1
      Editing:
        The Editor's View.                      1
      New Products:
      Audience:
        A Vital Reader Interest.                1
      Literature:
        Literature and Book Reviews.            1
      New Products:
        New Products in IC Magazine.            2
      Writing Style:
        New Products as "Catalog".              1
        New Products as "News".                 1
        New Products as "Show Window".          1
        New Products as "Story".                1
```

ZOOMED GUIDE WINDOW     RUN ALTERNATE:   NEW EDITORIAL ASSISTANT ——— 852

DESCRIBING MACHINERY

A machine is a working object; consequently you must show the reader not only what it is, but also what it does. Give him a general statement incorporating these two points to place the device in its functional surroundings.

You may have to describe the theory or principle upon which the machine is built. In general, you can assume that the specialist will be familiar with the principles of machines that are modifications of those already in use; that the background principles of radically new machines should be extensively explained; and that for the more general reader a discussion of theory should be omitted.

Unless you are describing an extremely simple machine, do not take up details before you have given a broad, overall description. It is easy for the reader to get misconceptions (Ulman, 29-31)

FIGURE 65C

ZOOMED GUIDE WINDOW    RUN ALTERNATE:    NEW EDITORIAL ASSISTANT ——— 854

DRAMATIC OPENINGS

When nonfiction writers advise beginners to SHOW rather than TELL their stories as much as possible, they're saying: Put more drama in your nonfiction writing -- show us what's happening. We believe what we SEE; we distrust what we're TOLD. That's the secret to modern writing, whether fiction or nonfiction: We believe our eyes and ears -- our senses.

We all know that for most people the most used sense is the visual one, yet we forget to put that knowledge into action when we write. Professional writers don't forget.

When writers talk about "showing," they mean more than visualizing for the reader's inner eye. They mean that you can also "show" us something about a person by letting us "hear" him speak. You may show us one thing when we hear him speaking before the Rotary Club; you may show us something quite (Cheney, 12-15)

FIGURE 71A

MANAGE ALTERNATES

MODEL WINDOW

STARTING A NEW MAGAZINE                (* Planned)

▶ EDITORIAL:                            * 06-01-89
  PRODUCTION/DESIGN:                    * 08-01-89
  ADVERTISING SALES:                    * 09-01-89
  SUBSCRIPTION:                         * 09-02-89
  MANAGEMENT:                           * 10-01-89

CATALOG WINDOW

```
Alt/Shift's Name:  [Editorial          ]
Actual Start Date: [         ]
Developer's Name:  [Editorial Dept.    ]
Developer's Dept:  [Editorial          ]
    Est. Budget:   [         ]  Cost for One: [        ]
 Number Distrib:   [      5]    Total Cost:   [   N/A  ]
 Est. Start Date:  [06-01-89]
 End-User Name(s): [All Jobs in the Editorial Dept.   ]
 End-User Dept:    [Editorial          ]   Descrip (Y/N): [Y]
```

MANAGE ALTERNATES

| AUTHOR | CONTEXT BASE | COPYRIGHT OWNER |
|---|---|---|
| Blundell | The Art and Craft of Feature Wr | New American Librarys |
| Boston | STET! Tricks of the Trade for W | Editorial Experts, Inc. |
| Bunnin | The Writer's Legal Companion | Addison-Wesley |
| Cheney | Writing Creative Nonfiction | Writer's Digest Books |
| Chicago | The Chicago Manual of Style | The University of Chicago |
| Cook | The MLA's Line by Line; How to | Houghtin Mifflin Company |
| Craig | Production for the Graphic Desi | Watson-Guptill Publicatio |
| Dill | The Journalist's Handbook on Li | The Free Press |
| Evans | News Headlines | Holt, Rinehart and Winsto |
| Evans | Newspaper Design | Holt, Rinehart and Winsto |
| Franklin | Writing for Story: Craft Secret | New American Library |
| Gross | Editors on Editing: An Inside V | Harper & Row |
| Hurlburt | Publication Design | Van Nostrand Rinehold Com |
| Kaye | Writing Under Pressure | Oxford University Press |
| Kiefer | Making Writing Work: Effective | McGraw-Hill |
| Mogel | The Magazine | A Folio: Book |
| Olsen | Principles of Communication for | McGraw-Hill |
| Peterson | The Magazine Writer's Handbook | Dodd, Mead & Company |
| Plotnik | The Elements of Editing: A Mode | Collier Books |

FIGURE 83B

STAGE 1 OF 2: TEMPLATE        CREATE CONTEXT BASES

| EDIT SPEED KEYS | |
|---|---|
| F7<br>Next Begin | F8<br>Next End |
| SHIFT-F7<br>Previous Begin | SHIFT-F8<br>Previous End |
| ALT-F7<br>Set Begin | ALT-F8<br>Set End |

F3:  Select in order:
    Word     >
    Sentence  >
    Paragraph >
    Next Paragraph
S-F3: Unselect all F5:   Type TITLE

--- accepted. In this case you will nonetheless negotiate all the important points upon getting the assignment and make sure they are incorporated into the letter of assignment.

◆BEGIN◆QUOTING A FEE
Finances. An editor will usually quote the magazine's fee for your piece in his or her initial discussion. This fee should, more or less, correspond to the rate you have gleaned from one of the reference works. It is therefore pointless to ask for $750 a story from a magazine that lists $200 as its top rate, but -- because many magazine rates are negotiable -- it is not pointless to ask for $350, both because the listing from the (Balkin)

| CONTEXT | INFORMATION SOURCE |
|---|---|

TRADITIONAL CUSTOMER SERVICE DEPARTMENT (CSD) IMPROVEMENTS:

SELECT A NEW CSD SYSTEM:
   CURRENT TRACKING SYSTEM (TOO MUCH NUMBERS AND "GOOD NEWS?"):

| | |
|---|---|
|       INTERNAL NUMERICAL REPORTS AND GRAPHS. | INTERNAL COMPUTER FILE |
|       INTERNAL DESCRIPTIVE REPORTS. | INTERNAL COMPUTER FILE |
|       POSSIBLE NEW TRACKING SYSTEMS: | |
|          ALTERNATIVE #1. | MANAGEMENT SYSTEMS |
|          ALTERNATIVE #2. | QUANTITATIVE AND QUALITATIVE EVALUATION |
|   | |
|    DELEGATE A NEW SYSTEM TO CSD MANAGER: | |
|       SELECT NEW SYSTEM WITH CURRENT MANAGER: | |
|          CONSENSUS APPROACH (PREFERRED). | PERSONNEL MANAGEMENT |
|          NEGOTIATION APPROACH (BACKUP). | NEGOTIATION STRATEGIES |
|          CONFRONTATION APPROACH (CONTINGENCY). | NEGOTIATION STRATEGIES |
|       CSD MANAGER IMPLEMENTS NEW SYSTEM: | |
|          DESIGN CLEAR AND SIMPLE FORMS. | BUSINESS FORMS DESIGN |
|          TRAIN EMPLOYEES IN NEW SYSTEM. | TRAINING METHODS |
|          ADMINISTER/COLLECT DATA, EVALUATE, IMPROVE. | |
|   | |
|    ANALYSIS: | |
|       KEY STATISTICS AND GRAPHS. | BUSINESS STATISTICS |
|       COMPARE WITH CURRENT REPORTS. | QUANTITATIVE AND QUALITATIVE EVALUATION |
|       COMPARE WITH CUSTOMER EXPECTATIONS. | INTERNAL MARKETING DEPARTMENT |
|       COMPARE WITH OTHER CUSTOMER SERVICE: | |
|          CUSTOMER SERVICE IN THE INDUSTRY. | - TRADE MAGAZINE REPORTS |
|          CUSTOMER SERVICE IN OTHER INDUSTRIES. | TRADE MAGAZINE REPORTS |
|   | |
|    FORMING CONCLUSIONS/RECOMMENDATIONS: | |
|       DRAFT OF CONCLUSIONS/RECOMMENDATIONS. | TO BE EXPLORED |
|       REVIEW AND REACH CONSENSUS. | |
|       FINAL REPORT OR MEMO. | |

FIGURE 89

| CONTEXT | INFORMATION SOURCE |
|---|---|
| A VOICE FOR THE CUSTOMER THROUGHOUT THE COMPANY?: | |
|    RAPIDLY IMPROVING CORPORATE RESPONSIVENESS: | |
|       EXAMPLES OF JAPANESE COMPANIES: | |
|          COMPANY #1. | TRADE MAGAZINE REPORTS |
|          COMPANY #2. | MANAGEMENT SYSTEMS |
|       AN EXAMPLE AMERICAN COMPANY. | TRADE MAGAZINE REPORTS |
| | |
|    COST OF PREVENTION VS COST OF PROBLEMS: | |
|       COST OF PROBLEMS IN OUR COMPANY: | |
|          AN ANALYSIS FROM LAST YEAR. | INTERNAL COMPUTER FILE |
|       COST OF OUR CUSTOMER SERVICE DEPARTMENT. | INTERNAL COMPUTER FILE |
|       COST OF THIS PROGRAM. | TO BE EXPLORED |
|       EXTERNAL MODEL OF POTENTIAL SAVINGS. | MANAGEMENT SYSTEMS |
| | |
|    "CUSTOMER ALTERNATES" FOR COOPERATIVE REDIRECTION: | |
|       CUSTOMER INPUT IN MANUFACTURING. | TO BE EXPLORED |
|       CUSTOMER INPUT IN DISTRIBUTION. | TO BE EXPLORED |
|       CUSTOMER INPUT IN PRODUCT DESIGN. | TO BE EXPLORED |
|       MARKETING, SUPPORT AND TRAINING. | TO BE EXPLORED |
|       POSSIBLE OPERATING PROCEDURES. | MANAGEMENT SYSTEMS |
|       POSSIBLE IMPLEMENTATION PROCEDURES. | CUSTOMER INPUT ONLINE MANUAL |
| | |
|    IS A NINE-MONTH TRANSFORMATION POSSIBLE?: | |
|       AN EXAMPLE NINE-MONTH PLAN. | MANAGEMENT SYSTEMS |

FIGURE 91

| PROCESSES | A NEW TYPE OF INFORMATION ENVIRONMENT | DIFFERENCES |
|---|---|---|
| CURRENT INFORMATION SOURCES | DATA BASES, WORD PROCESSOR FILES, COMPUTERIZED TEXT, GRAPHICS, PICTURES, VIDEO, OCR READABLE BOOKS, PERIODICALS, MANUALS, OTHER ALTERNATES, ETC. | WITHOUT THE INVENTION |
| CREATE CONTEXT BASES AND ALTERNATES | CONTEXT BASES — ALTERNATES | THE CONTEXTUALIZER: IMAGINATION-DRIVEN COMPUTING |
| DISTRIBUTE CONTEXT BASES AND ALTERNATES | INTERNAL (WITHIN AN ORGANIZATION) — SALES (MARKETING AS PRODUCTS) | IMPLEMENT IMAGINATION-DRIVEN SITUATION SHIFTS |
| USE THE CONTEXTUALIZER TO CREATE ALTERNATES AND PLAN SITUATION SHIFTS IN MANY AREAS | ORGANIZATIONS, GROUPS, AND INDIVIDUALS | NEW POTENTIALS TO IMAGINE PREFERRED SITUATIONS AND USE INFORMATION SYSTEMS TO PRODUCE THEM BOTH LOCALLY AND GLOBALLY |

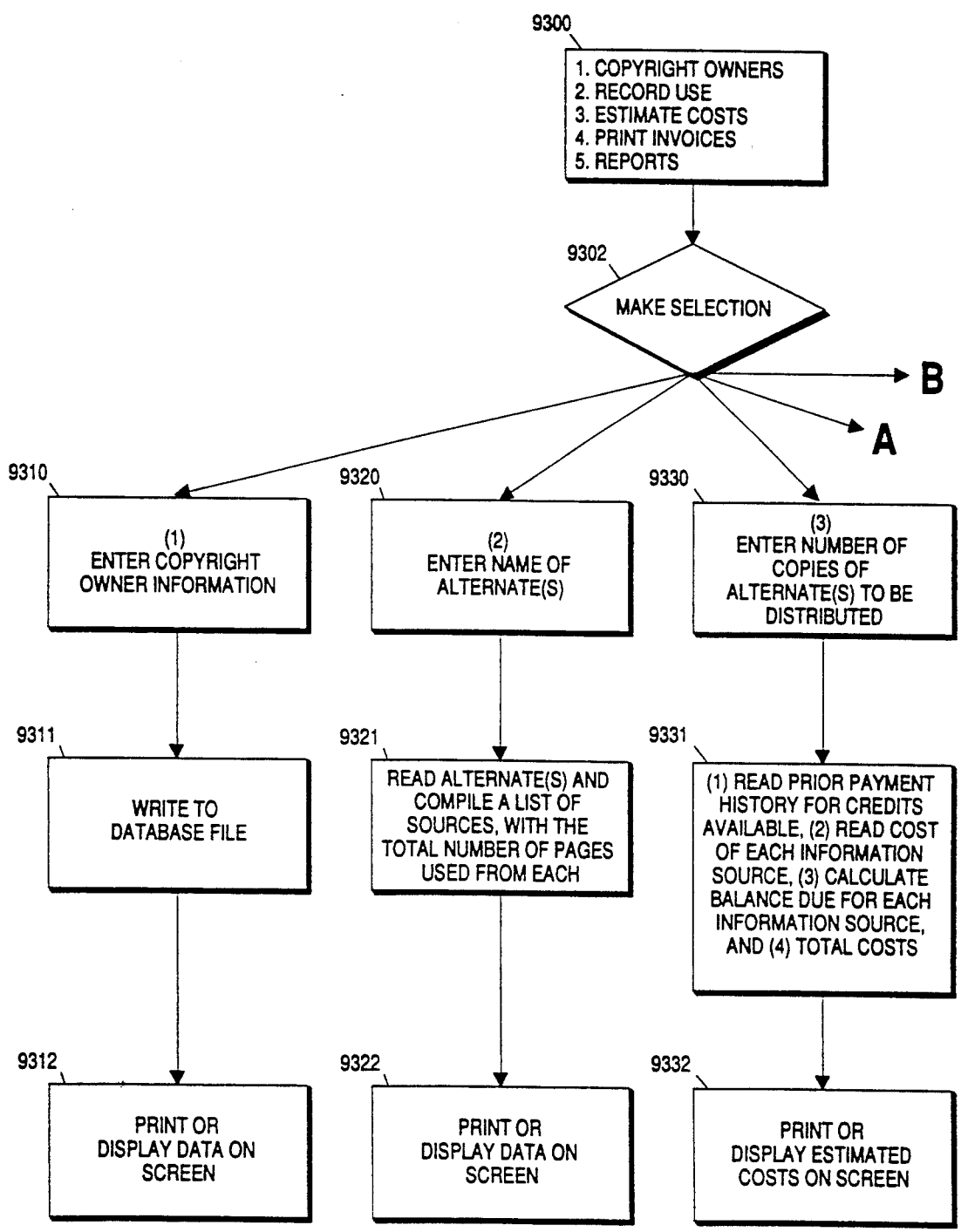

ACCESSING, ASSEMBLING, AND USING BODIES OF INFORMATION

BACKGROUND OF THE INVENTION

This invention relates to computer-based systems for assembling, organizing, and distributing information.

Conventionally, as outlined in Luconi, Malone, and Morton, (Fred L. Luconi, Thomas W. Malone, and Michael S. Scott Morton, "Expert Systems and Expert Support Systems: The Next Challenge for Management," in John F. Rockart and Christine V. Bullen, ed., The Rise of Managerial Computing: The Best of the Center for Information Systems Research, Sloan School of Management, MIT (Homewood, Ill.: Dow Jones Irwin, 1986), pp. 365–371), computers are used to solve problems using several different paradigms. In traditional data processing, the input, output, and procedure for generating the output from the input are well-defined and thus suited to conventional programming.

A second paradigm, decision support systems, uses the decision making ability of people to control the problem solving goals of the computer.

A third paradigm of computing, expert systems, is directed to even less structured problems.

The fourth, closely related, paradigm of computing, expert support systems, closely resembles expert systems. They actively process knowledge, draw conclusions, and make recommendations, thereby supporting experts rather than replacing them.

Other problems exist that do not fit into one of the four paradigms. These problems 40, shown in the upper right quarter of FIG. 4, are highly unstructured, complex, and often involve new or rapidly changing products, competitors, markets, technologies, employees, and procedures. Multiple objectives overlap and sometimes conflict, such as the market share of established products, launching next generation products, lowering costs, and profitability.

Software applications are available that permit the creation of novel projections and models, such as spreadsheets which are used to project "what if" financial models. Simulations permit computerized modeling of real phenomena where the computer simulation can be compared to a natural event such as weather (a thunderstorm) or a scientific experiment where the outcome is unknown (DNA splicing). Industrial design illustrates how imagined constructs can be simulated on computers (air flow over a new airplane wing design or the performance of an integrated chip schematic). In many situations, favorable results on the computer result in real-world implementations.

A highly structured example is project management software, which permits a series of tasks to be named in a sequence, resources and personnel allocated to them, and their implementation tracked. One of these systems is the critical path method (CPM), in which a network of activities is created that shows the sequence of operations and the interdependencies of a manufacturing process. A variation of this basic method is PERT (Project Evaluation and Review Technique) which uses multiple estimates to provide a probabilisitic output. These systems are frequently computerized and searched to find the critical item; i.e., the item that is, in effect, the latest, and which determines the final completion date. Project management software establishes a schedule of activities, assigns a time duration estimate to each activity, and establishes baseline dates for the start and completion of each activity.

Computer technologies increasingly permit the nature of work and planning to be originated in mental and abstract concepts. Software to accomplish this includes Computer Aided Design (CAD) which allows new mechanical or electronic conceptions to be constructed on the computer screen. Some CAD software is integrated with manufacturing machinery, indicating the potential for rapidly manufacturing and marketing certain types of computer-expressed ideas. CAD's approach has also been extended into areas like software design, engineering design, and architectural drafting. Imaginative ideas that have been designed on computers have been introduced and developed successfully in a variety of fields.

HyperCard is a new kind of software application that can create information linkages in which individual titles, words, pictures, and parts of pictures are each linked to a related screen of information. Each of these screens must be designed, written, and created; together they form the HyperCard "stack" that can be accessed by an individual application. The HyperCard links are individual "buttons" that are fixed on each screen and each link is individually programmed to call a specific screen in a "stack" of screens. Good examples of flexible software applications are word processing and spreadsheets, which permit users both broad scope and ease of use.

Known software applications to aid learning include on-line help, Expert Systems, Computer Aided Instruction (CAI), and Computer Based Training (CBT).

On-line help is used to teach software applications to computer users when they need guidance. Its rapidly accessed instructions help users read the steps they should take in using the software; by trying the steps they may be able to learn unfamiliar parts of the software quickly.

Expert Systems are used to capture expertise and deliver it via the computer. Expert Systems have succeeded in enabling computers to reason from knowledge within specific domains, and they have been applied to specialized areas like medicine, geology, and financial planning. The power of an Expert System depends on the quality of the decision-making rules used to construct its inferences, and the breadth of its knowledge base. Because the knowledge is stored in active, rule-based form, there is an unfortunate relationship between the quantity of knowledge, the number of rules, and the resulting search time. The greater the scope of an Expert System, the more complicated its programming and the slower the response time.

Computer Aided Instruction (CAI) and Computer Based Training (CBT) are uses of the computer for education and training. Unlike on-line help or Expert Systems, with CAI and CBT one stops work and uses the computer to learn, then returns to work. CAI and CBT are typically separated from an ongoing situation.

SUMMARY OF THE INVENTION

In general, in one aspect, the invention features assembling a body of stored information by selecting segments from a larger available group of information segments, by (a) displaying a set of tokens, each token indicating the content of a corresponding one of the segments in the available group, (b) enabling a user to point to a succession of tokens in the set using an electronic pointing technique, (c) for each token to which the user points, immediately and simultaneously displaying the corresponding segment to the user, and (d) assembling the body in response to selections made by a user.

In general, in another aspect, the invention features assembling such a body by steps (a) and (b) and (c) for each token to which the user points, displaying the corresponding segment to the user, and (d) simultaneously while displaying the segment corresponding to the token to which the user is pointing, displaying a segment corresponding to a token to which the user had previously pointed.

Preferred embodiments of the invention include the following features. Simultaneously while displaying the set and the segment to which the user is pointing, a second set is displayed comprising an accumulation of tokens to which the user has previously pointed. There are a plurality of available groups of information, and, for each group, an associated set of tokens is displayed. The second set comprises a user selected or independently developed accumulation of tokens corresponding to selections made with respect to all of the groups. The second set is organized either by the user or independently in accordance with a model, such as a hierarchy (e.g., an outline) of at least two levels. or a time sequence. In response to a user's commands, the organization of the tokens in the second set may be revised to modify the model. Also in response to commands of a user, the content of the tokens in the second set may be changed. The group of information segments may be available on-line from a remote location. Only the segments corresponding to the tokens in the second set are compiled into the body of stored information. In response to commands of a user, a token may be eliminated at a higher level of the hierarchy. The second set may be displayed by placing each token in a visual position (e.g., indented) which reflects its position in the model relative to the visual positions of other tokens. In response to commands of a user, either the set or the second set may selectively be made active to said user. The set, the second set, and the segments may be displayed in windows. The proportions of the display occupied respectively by the windows may be altered. Multiple models of the second set may be established and displayed selectively to the user. The tokens comprise textual phrases that are organized, such as into heirarchies, lists, and time sequences. Multiple bodies of stored information may be assembled, each body being assembled by selecting segments from a larger available group of information segments; a name is assigned to each body of stored information, and the names are displayed in an organized model.

In general, in another aspect, the invention features production of an annotated body of stored information by (a) specifying keys each of which may appear within the body of stored information, (b) searching the body of stored information for instances of each of the keys, (c) defining boundaries of segments of the stored information, each segment including at least one of said instances, (d) assigning to each segment a token based on a key found within the segment, (e) displaying each segment to a user, (f) in response to commands from the user, adjusting the boundaries of at least one of the segments.

Preferred embodiments of the invention include the following features. The boundaries are defined on the basis of criteria specified by the user. The keys comprise textual phrases. The stored information comprises text and other forms of data. The boundaries may be, e.g., beginnings and ends of paragraphs. In response to user commands, selected segments and corresponding tokens are compiled, each token indicating the content of the corresponding segment.

In general, in another aspect, the invention features aiding a user in accessing a body of stored information which includes segments of related information by (a) displaying a set of tokens, each token indicating the content of a corresponding one of the segments, the tokens being displayed in an organized hierarchical model reflecting relationships among the corresponding segments, (b) enabling a user to point to a succession of tokens in the model using an electronic pointing technique, and (c) for each token to which the user points, immediately and simultaneously displaying the corresponding segment to the user.

Preferred embodiments of the invention include the following features. In some embodiments,. the user may be prevented from changing the order or content of the set of tokens or the content of the segments. In other embodiments the order or content of the set or the content of the segments is altered based on user commands. One of the tokens may comprise another set of tokens which itself corresponds to other segments of stored information.

In general, in another aspect, the invention features storage containing a body of information comprising segments, the storage also containing a set of tokens, each token indicating the content of a corresponding one of the segments, the tokens being arranged in an organized model reflecting relationships among corresponding segments, and software for displaying the model and for enabling a user to access a selected segment by invoking a corresponding token in the model.

In general, in another aspect, the invention features providing assistance to a user of an application program by (a) in response to a user requesting assistance in the course of using the program, displaying a set of tokens, each token indicating the content of a corresponding segment of assistance information, the tokens being displayed in an organized model, and (b) simultaneously while displaying the set of tokens, displaying a segment of assistance information corresponding to one of the tokens selected by the user.

In general, in another aspect, the invention features aiding a user to scan a set of displayed data items while simultaneously performing another interactive task using the display, portions of the set being expressible at two levels of detail, some of the items being included at one level of detail and excluded at the other level of detail. Selective portions of the set are displayed at different levels of detail in response to user commands, while simultaneously displaying other information and responding to the user with respect to the other interactive task.

Preferred embodiments include the following features. A controllable range indicator is displayed which indicates a range within the set for which the display is at one level of detail, and the span of the indicator is adjusted in response to user commands. A marker is provided within the range which indicates a user selection of a data item in the set.

In general, in another aspect, the invention features facilitating the organization, distribution, and use of digital information of the kind that can be displayed on a computer, by (a) dividing the information into discrete segments, various segments being represented respectively by incompatible digital representational schemes, (b) providing the segments to a user in accordance with a unified digital representational scheme, (c) associating with each segment a token indicative of the content of the segment, (d) collecting a set of segments that are related by subject matter, (e) organizing the tokens associated with the segments in accordance with a model based on the content of the segments, (f) distributing the collected segments and model to a second user, (g) displaying the collected segments to the second user, and (h) altering the organization of the tokens in accordance with a revision of the model in response to the second user.

Other advantages and features will become apparent from the following description of the preferred embodiment and from the claims.

DESCRIPTION OF THE PREFERRED EMBODIMENT

We first briefly describe the drawings.

FIG. 10 illustrates the new evolution of "imagination-driven computing".

Figure 15A:
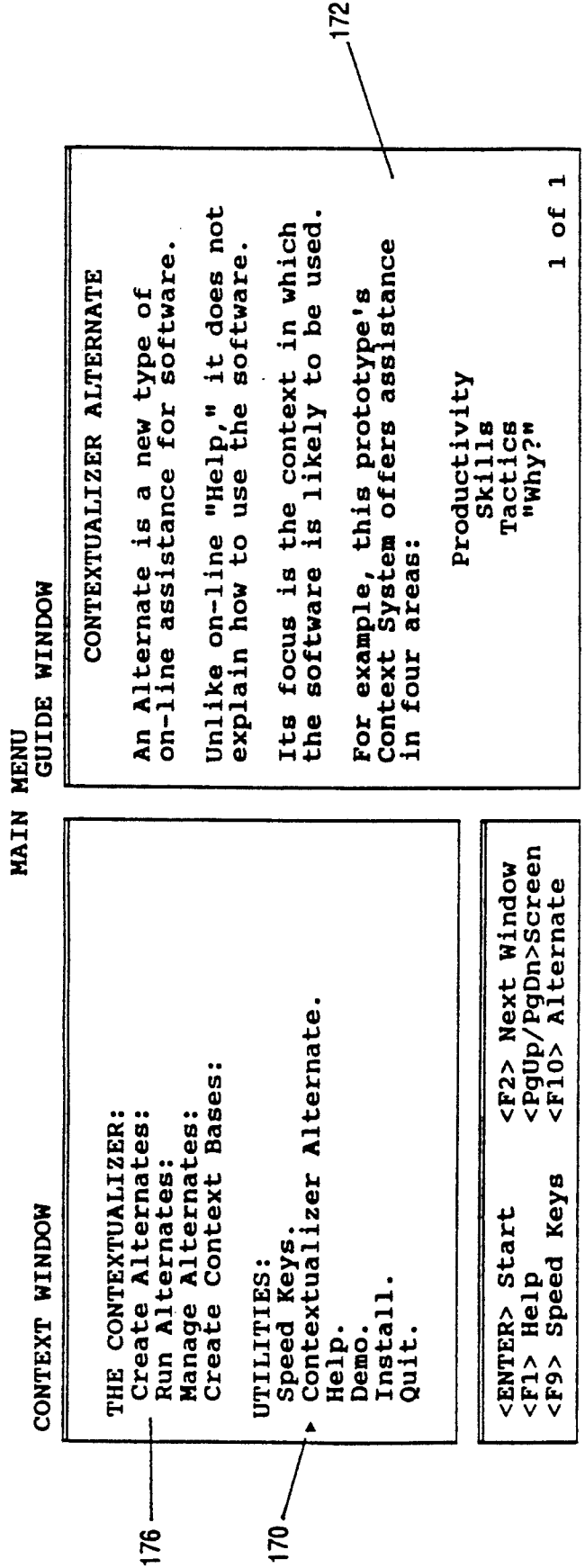

FIG. 15(A)-(B) shows the on-line Alternate.

FIGS. 16 through 38 show the operation of Context Collection.

FIGS. 39 through 52 show the operation of the Context Positioning.

FIGS. 53 through 65(C) show the operation of running an Alternate.

Figure 66A:
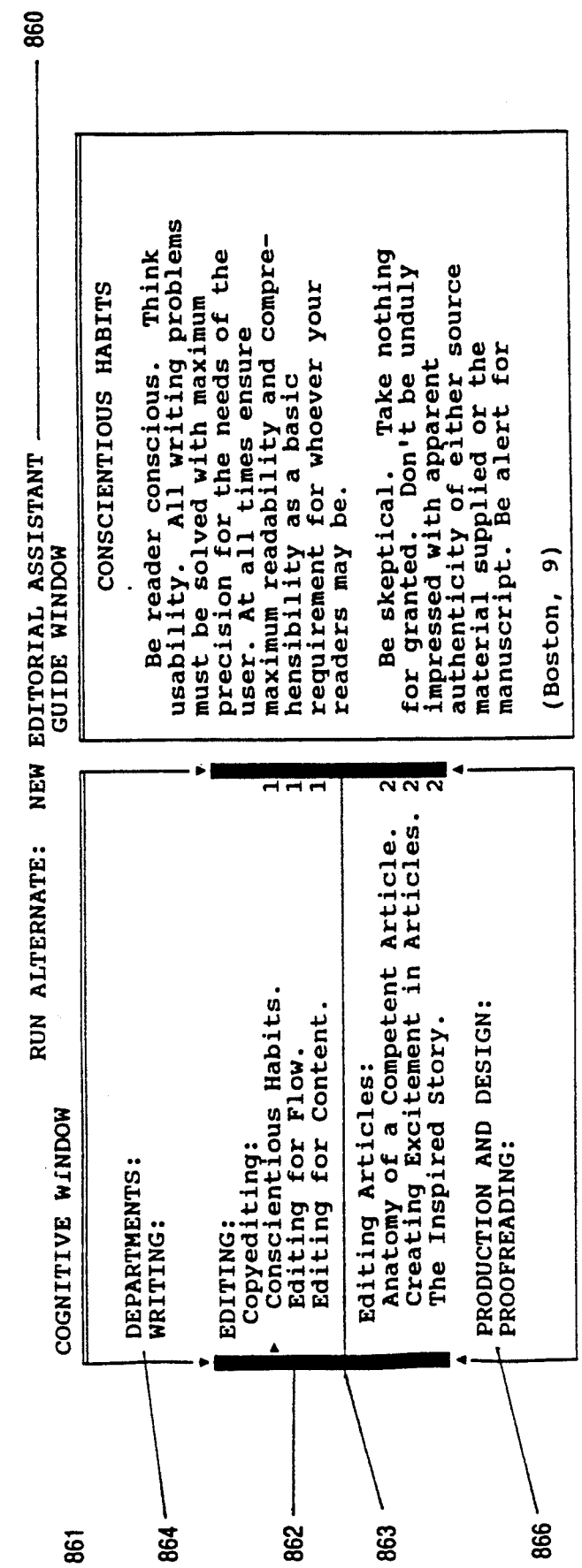
Figure 66B:
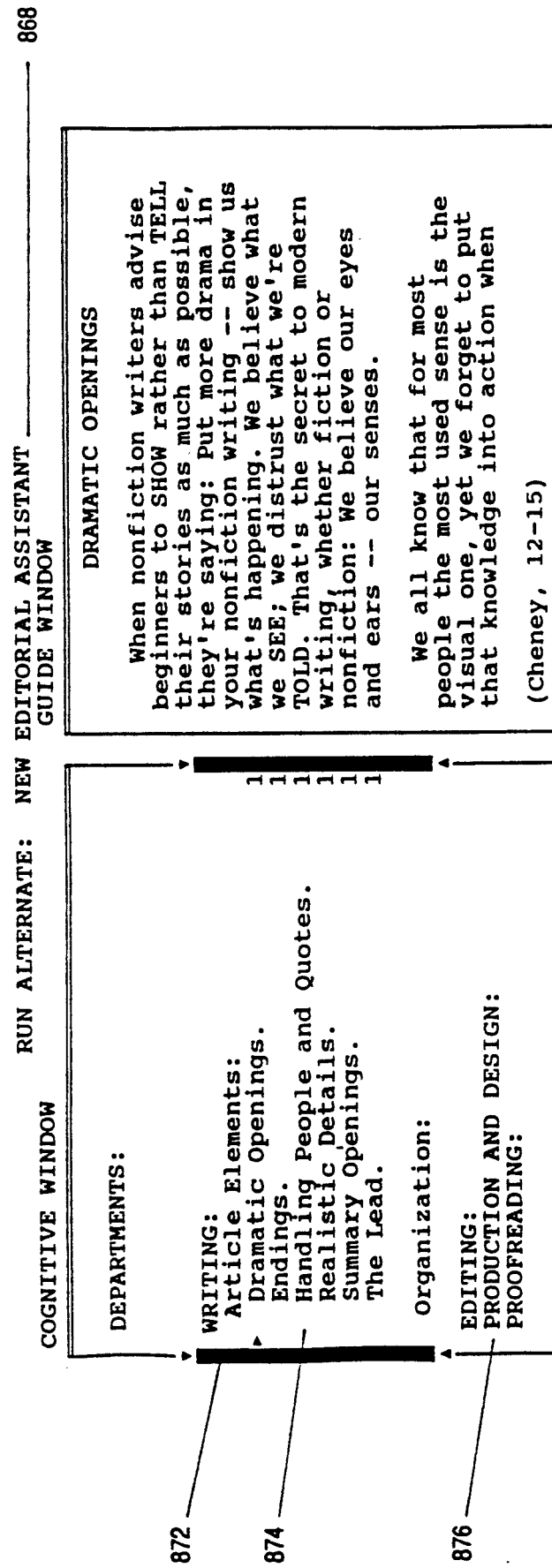
Figure 66C:
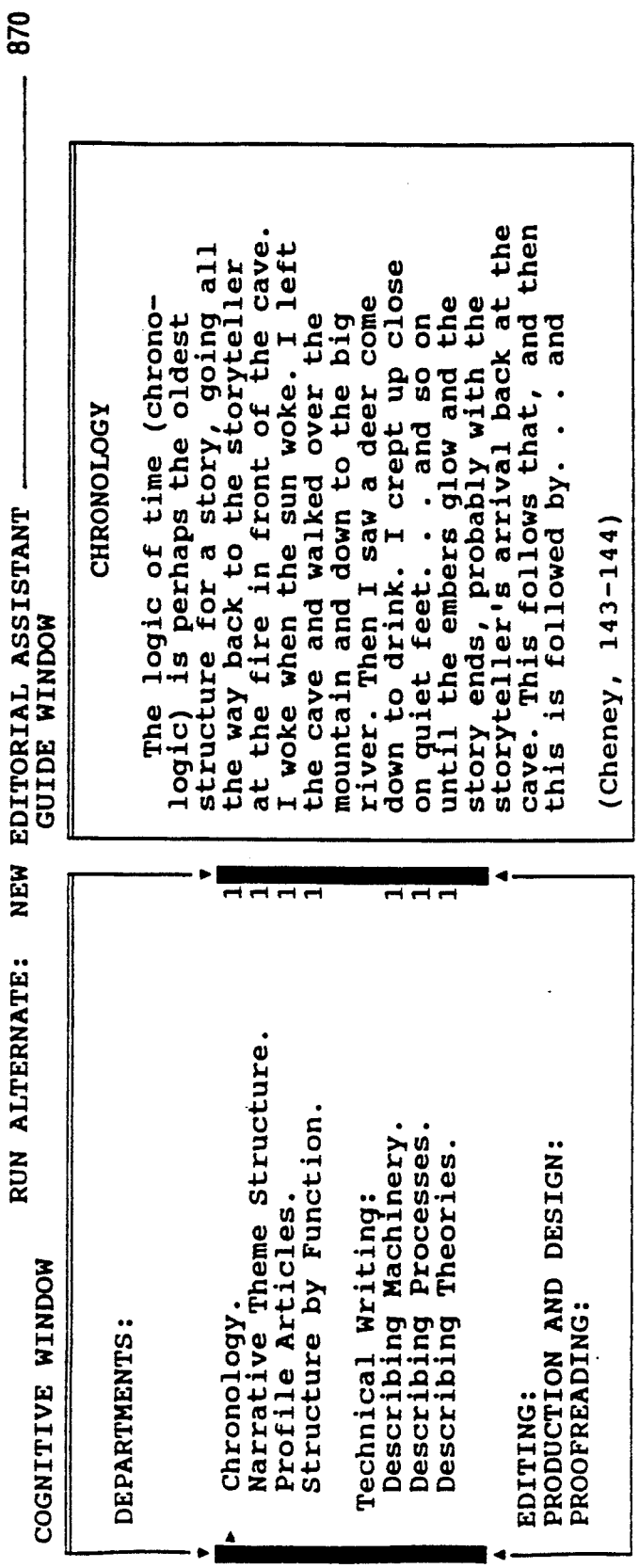
Figure 67:
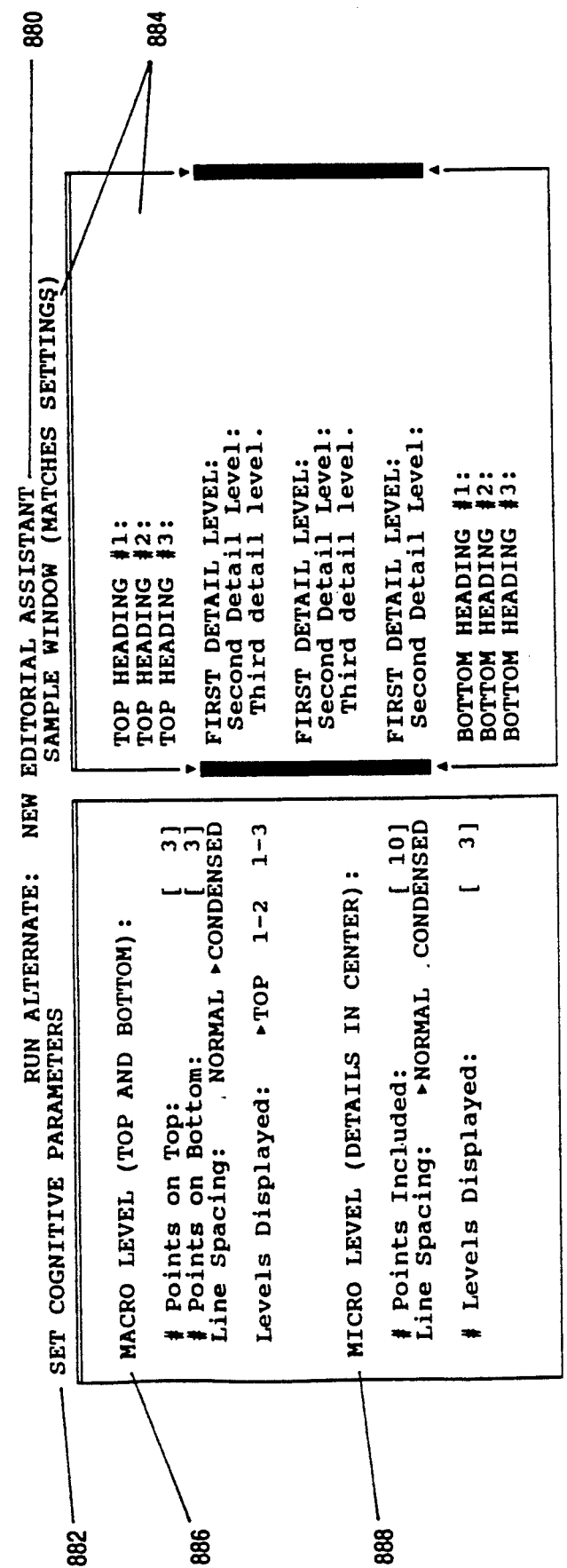

FIGS. 66(A) through 67 show the Cognitive Window.

FIGS. 68 through 75 show the operation of Management of Alternates.

FIGS. 76 through 87(C) show the operation of Create Context Bases.

FIGS. 88 and 89 show alternative models.

Figure 90:
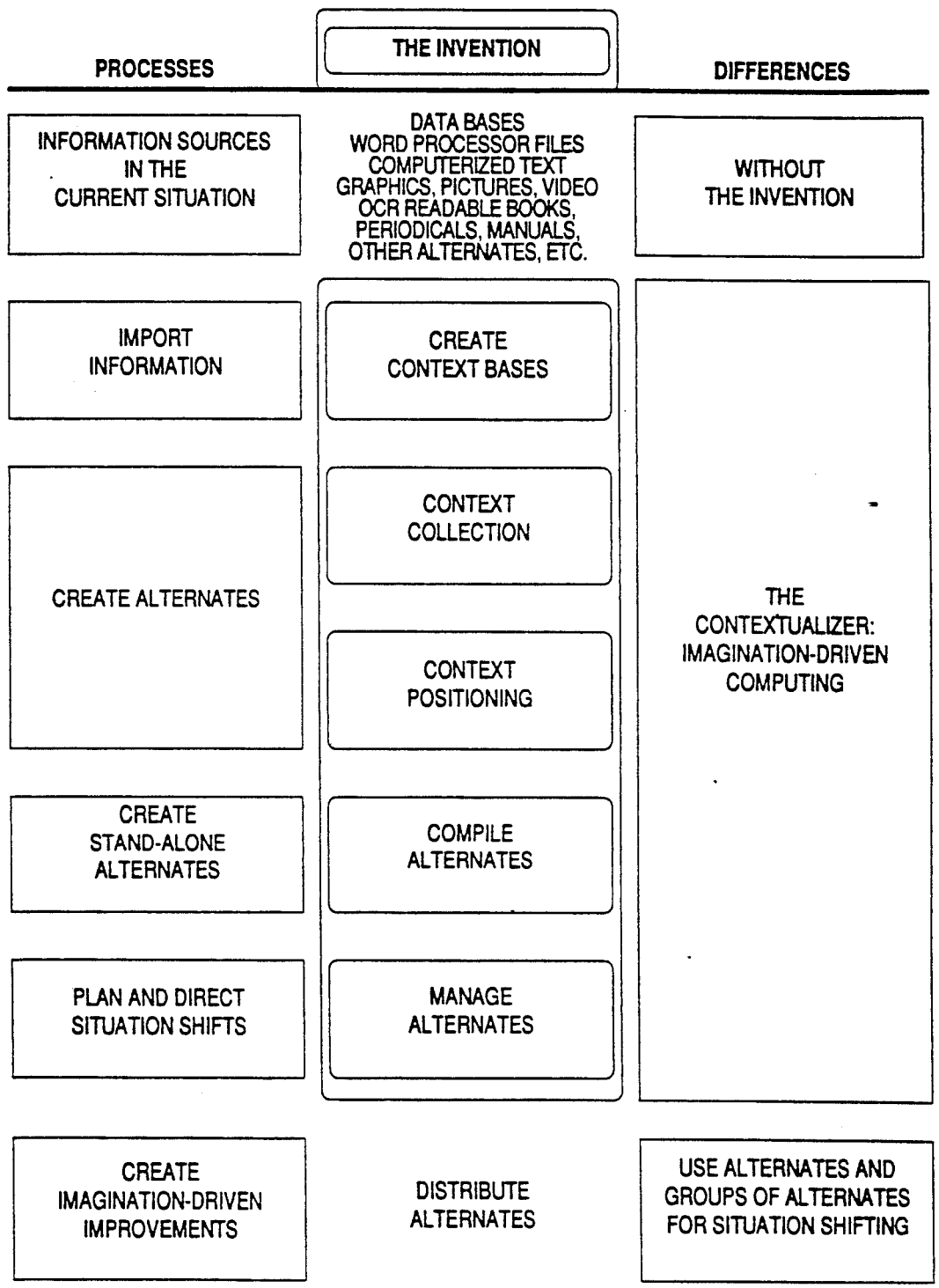

FIGS. 90 and 91 illustrate the new information environment proposed by the invention.

FIGS. 92 through 95 and 112, show menus and menu operations.

FIGS. 96 through 98, 122, and 123 show Context Collection.

FIGS. 99, 100, 102 through 106, and 124 show Context Positioning.

FIGS. 101 and 107 through 111, show Time-Sequencing.

FIGS. 113 through 121(B) show Alternates.

FIGS. 125 through 126(B) and 142 show Managing Alternates, including Outline Modeling and Time-Sequencing Situation Shifts.

FIGS. 127 through 131 show Cognitive Windows.

FIGS. 132 through 136 show the creation of Context Bases and information sources.

Figure 137:
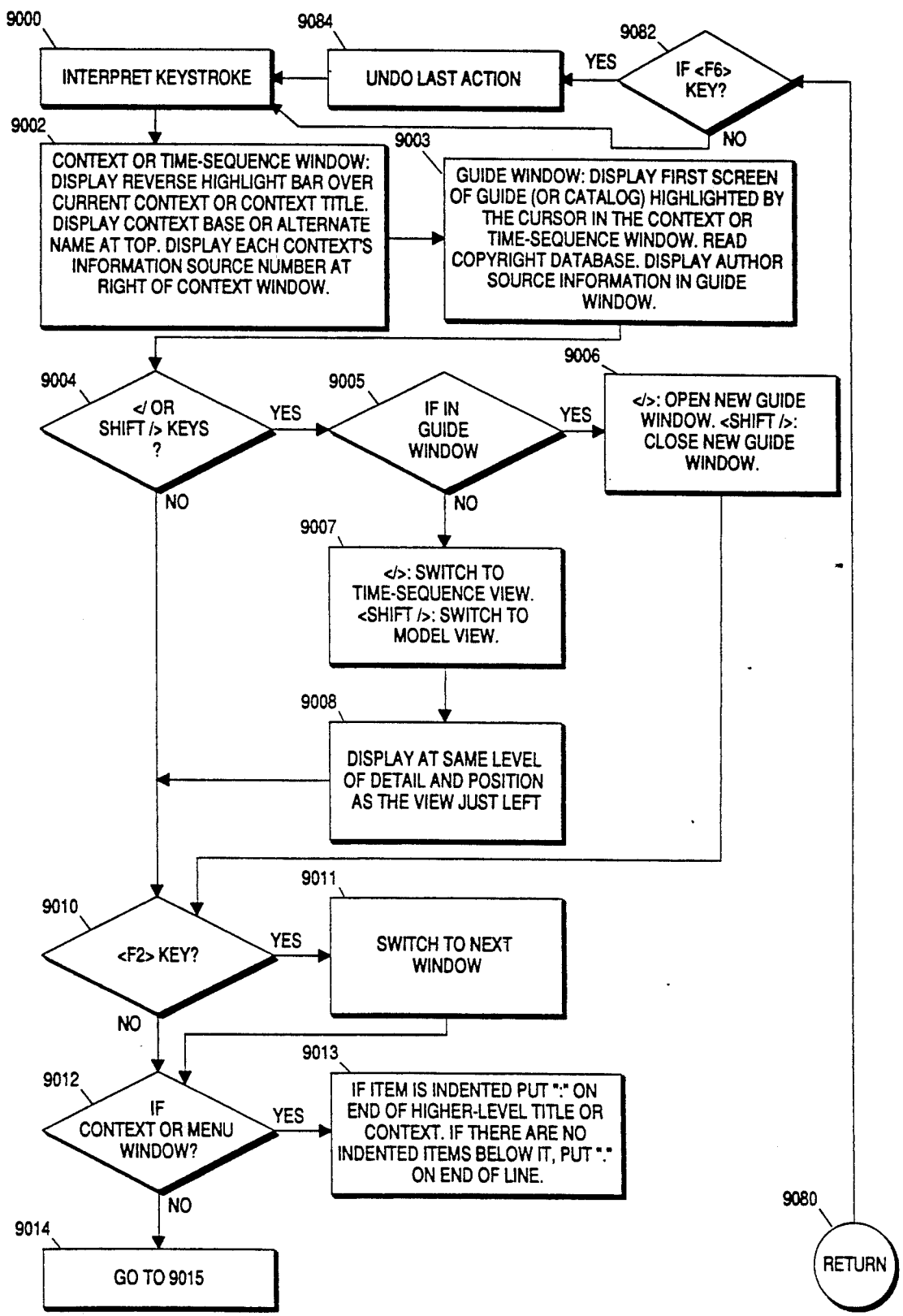
Figure 138A:
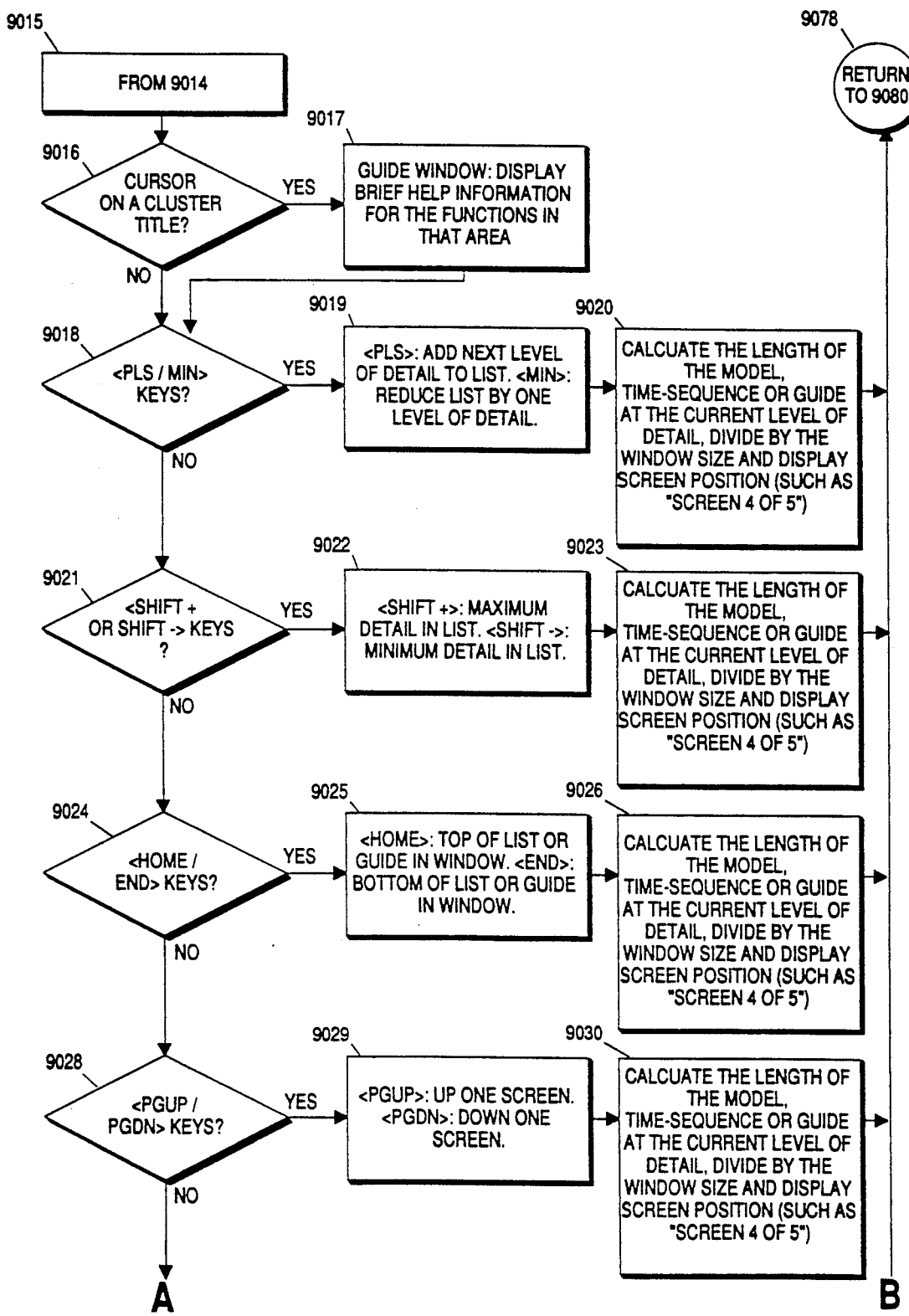
Figure 138B:
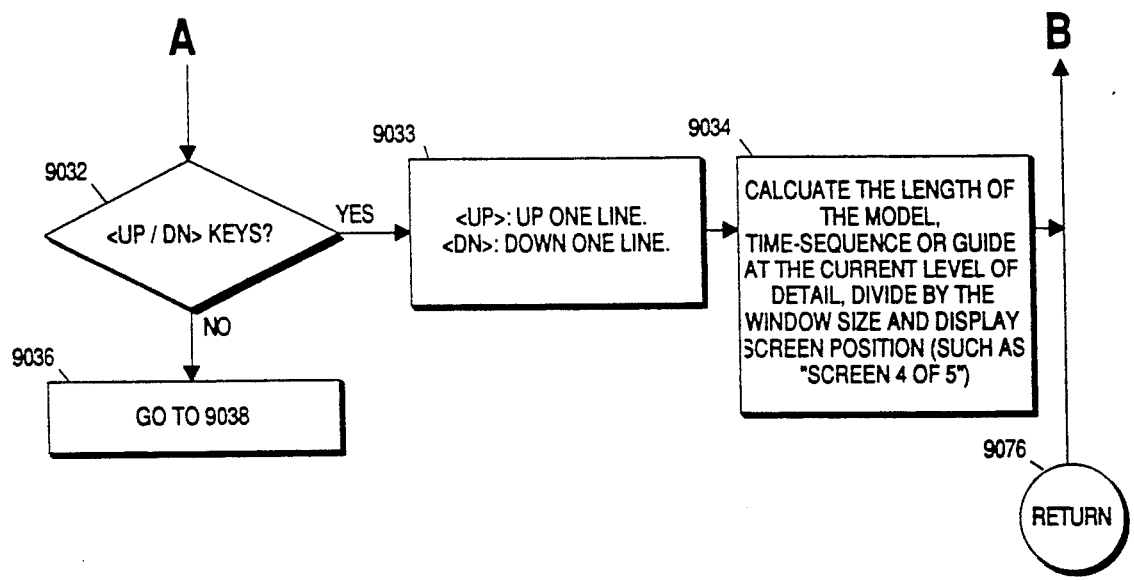
Figure 139:
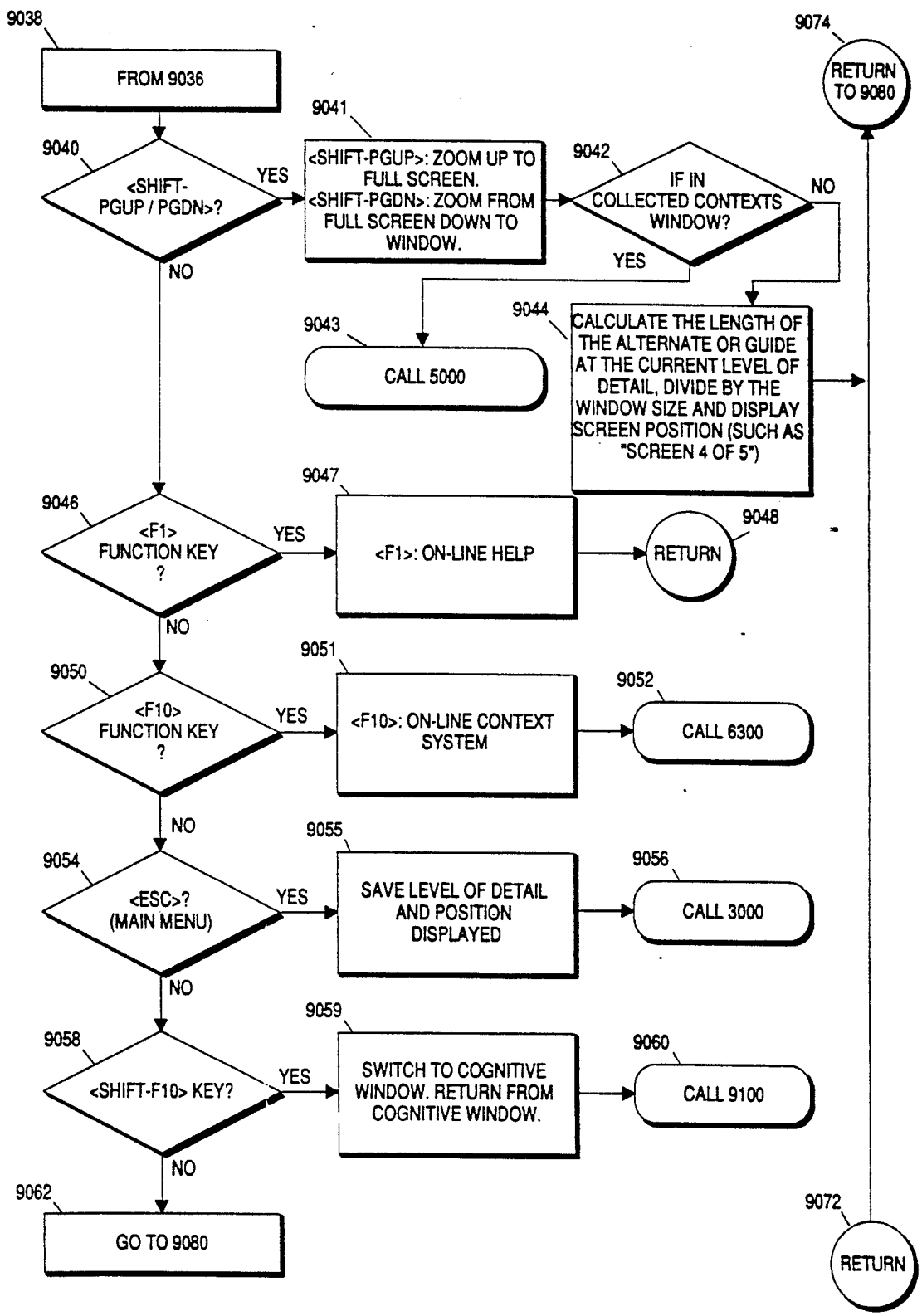

FIGS. 137 through 139 show the control of screen displays.

Figure 140B:
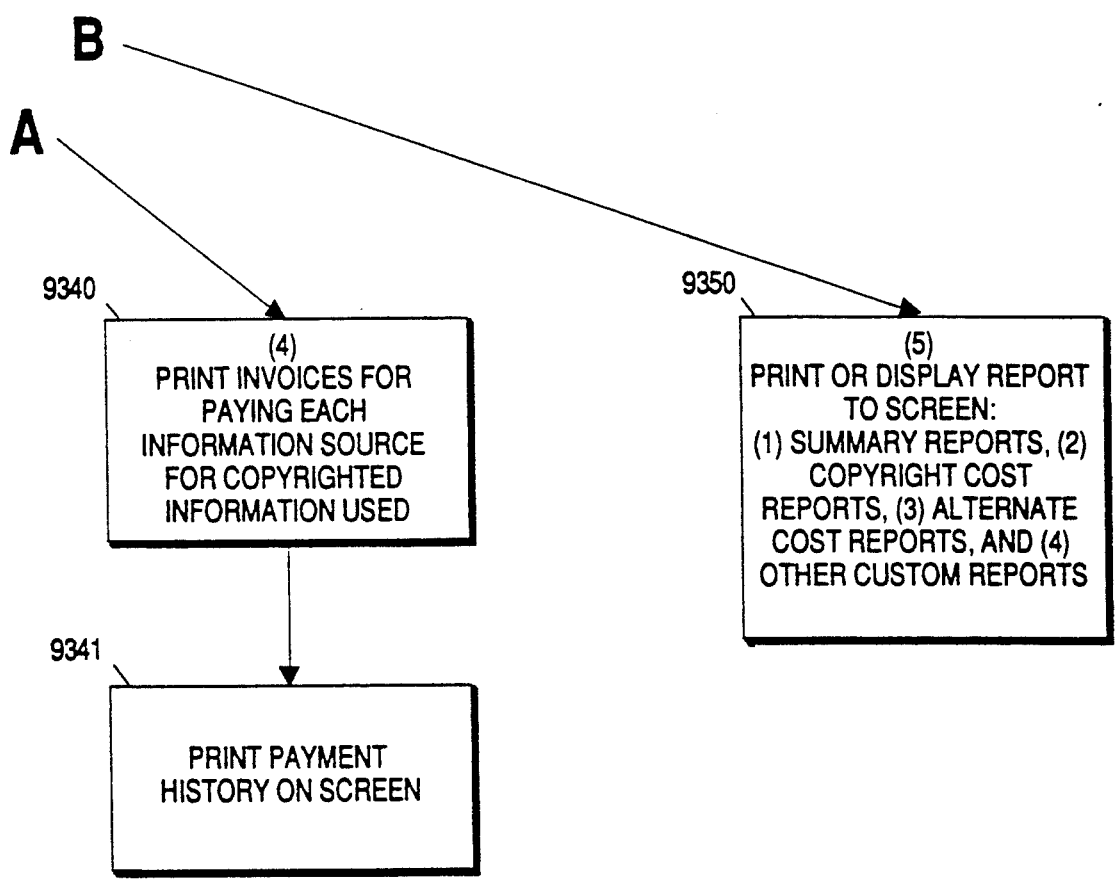

FIGS. 140(A) and 140(B) show the Copyright Payment System.

Figure 141:
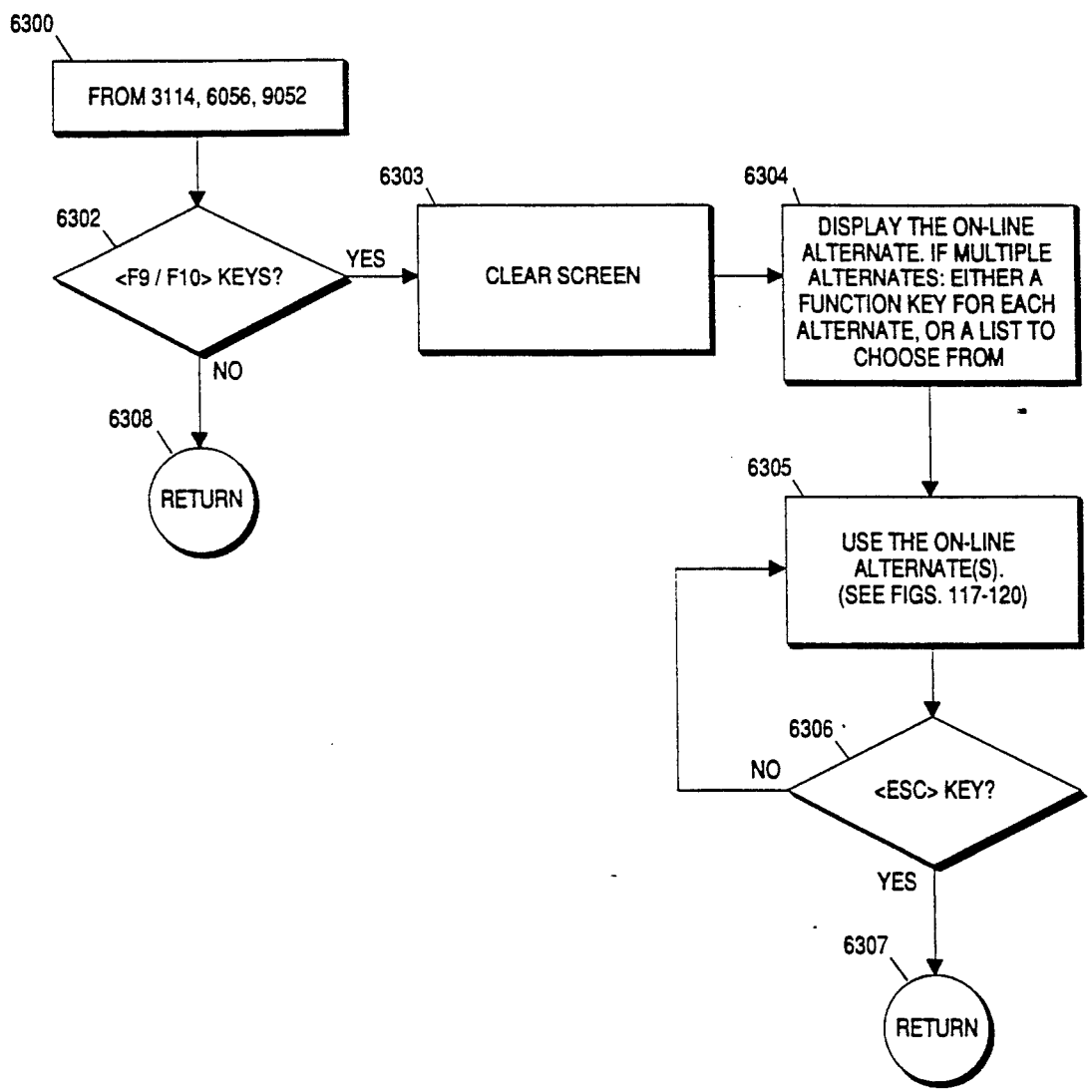
Figure 142:
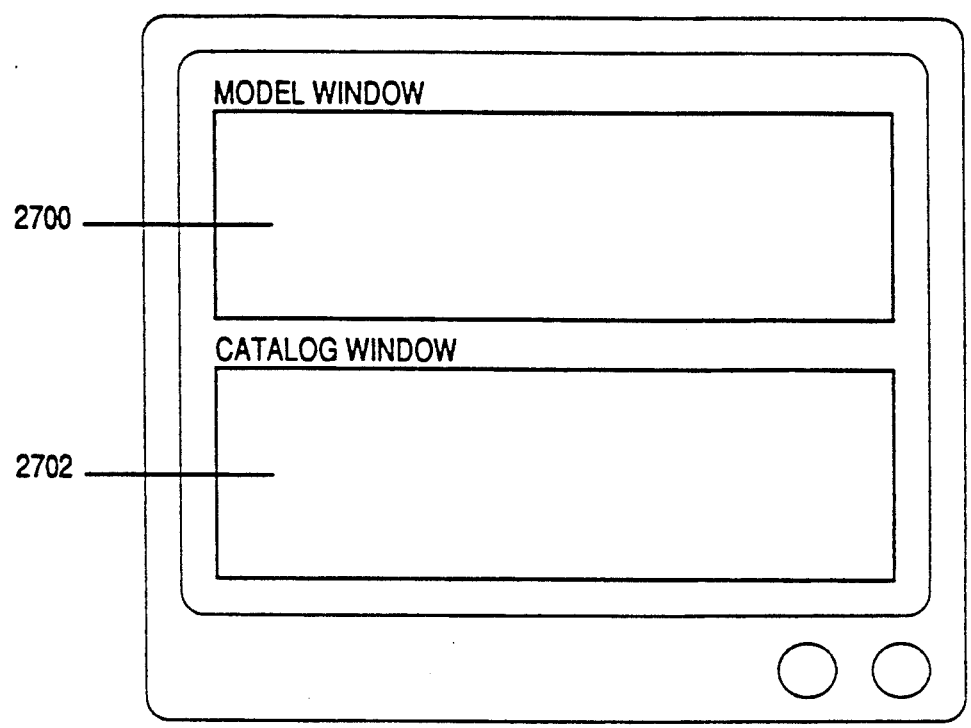

FIGS. 141 and 142 show the on-line Context System (i.e., the on-line Alternate).

PRINCIPLES OF THE CONTEXTUALIZER

The new computing paradigm of the present invention starts from a new kind of world view: A global economy is emerging with rapid flows of capital, knowledge, products, and competitive pressures. A growing number of companies and industries face new needs to leapfrog their limits and become effective competitors on a global level, transforming their performance, productivity, adaptation, and innovation capabilities. Is it possible for a single leverage point to help fill part of these needs?

Figure 6:
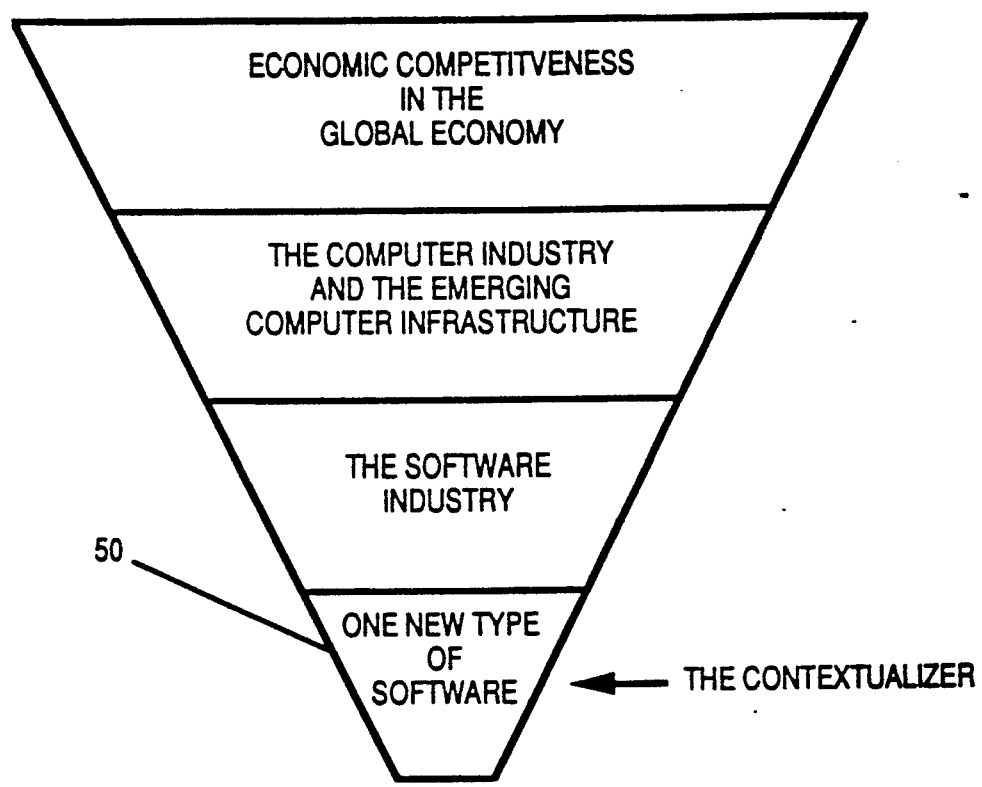
FIGS. 6 and 7 show this invention's leverage points for improving corporate and global economic performance.
Figure 7:
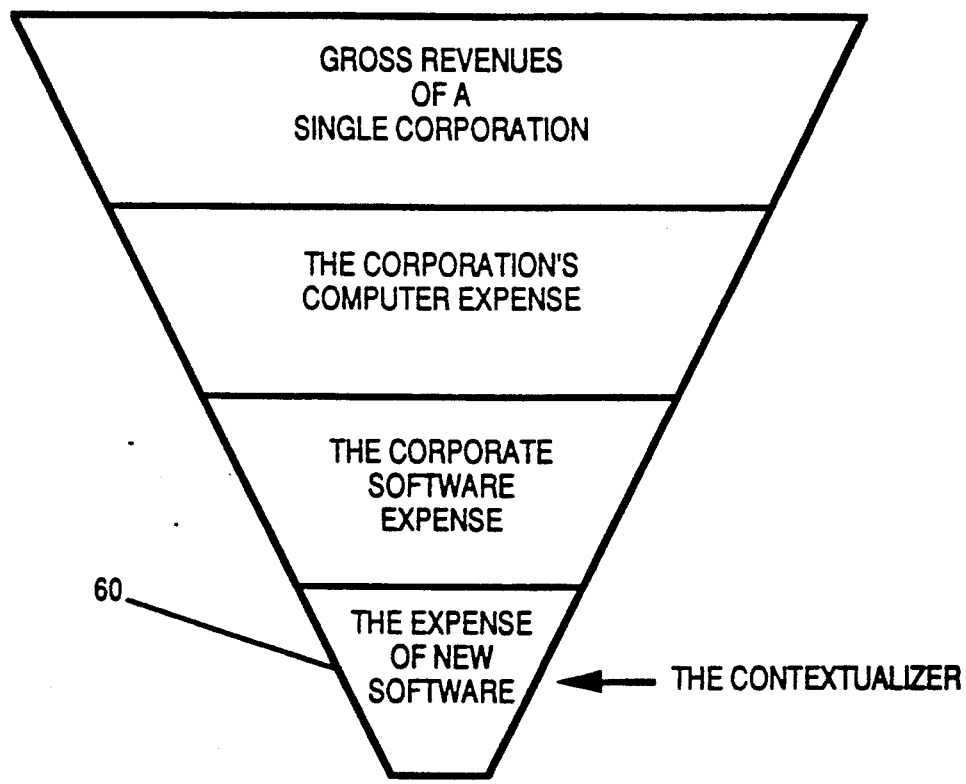

FIG. 6 illustrates the proposed leverage point 50 for the global economy, while FIG. 7 illustrates this leverage point 60 for a single corporation.

The leverage point is a so-called Contextualizer which can be embodied as a single mass-manufactured product that can be distributed through established marketing channels to those who might want to use it to transform their situation.

The Contextualizer operates in a fundamentally new way, and empowers its users to employ imagination-driven computing in the best ways to create their Preferred Situations. It assumes that modern society has developed sufficient knowledge and know-how that many desirable ends might be imagined and implemented, and it provides a tool to express desires, along with a method to reach our preferred situations. In a phrase, this software shifts the origin of reality to our imaginations.

Figure 5:
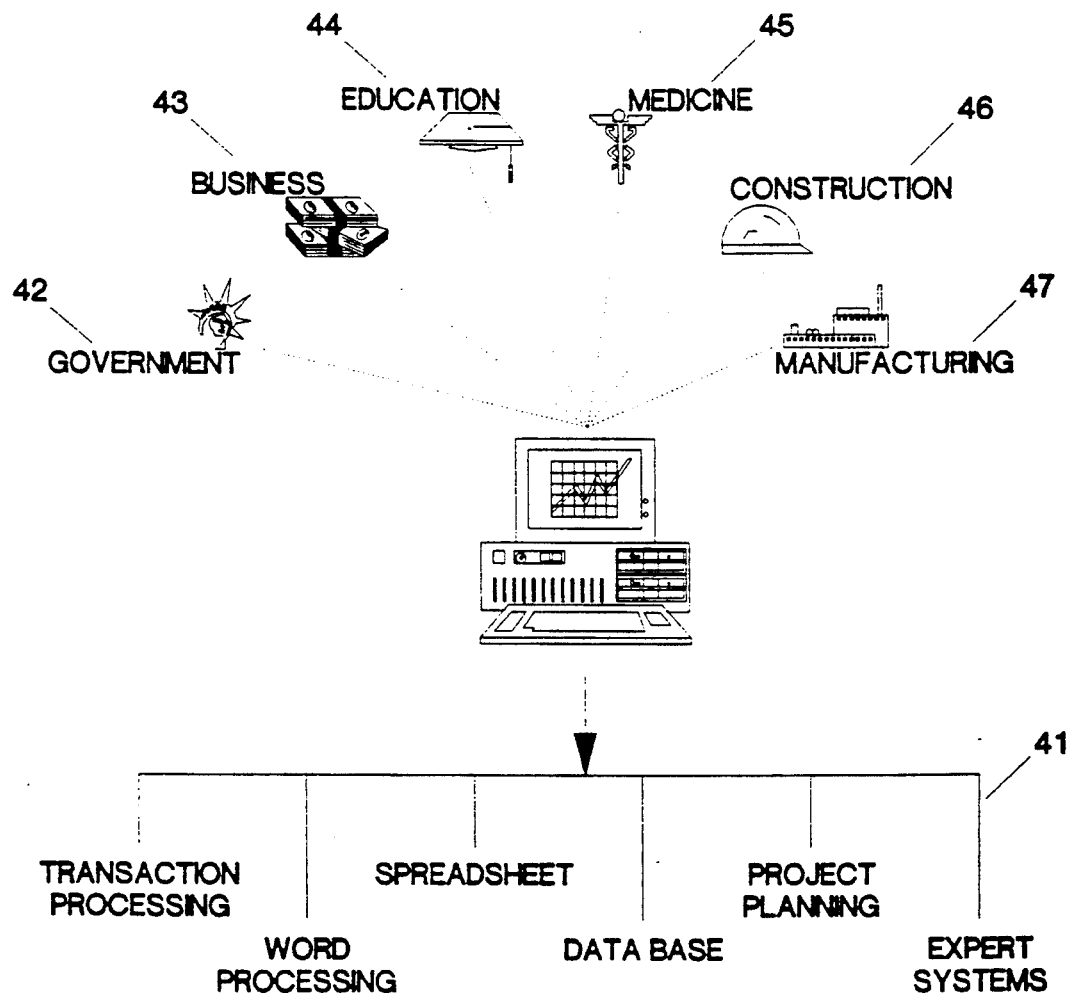
FIG. 5 shows a current computing paradigm.

Referring to FIG. 5, in the conventional computing paradigm, managers and users of computing 48 apply software technology 41 on top of existing organizations, manufacturing processes, services, office work, and situations 42, 43, 44, 45, 46, 47. In the new computing paradigm of the invention, the starting point is the active conception of new goals and combinations. The computer becomes a tool used to express and implement the transformations desired. With the Contextualizer, users create so called "Alternates" interactively and those Alternates may be used to produce material transformations in the world, in organizations, and in relationships.

Figure 8:
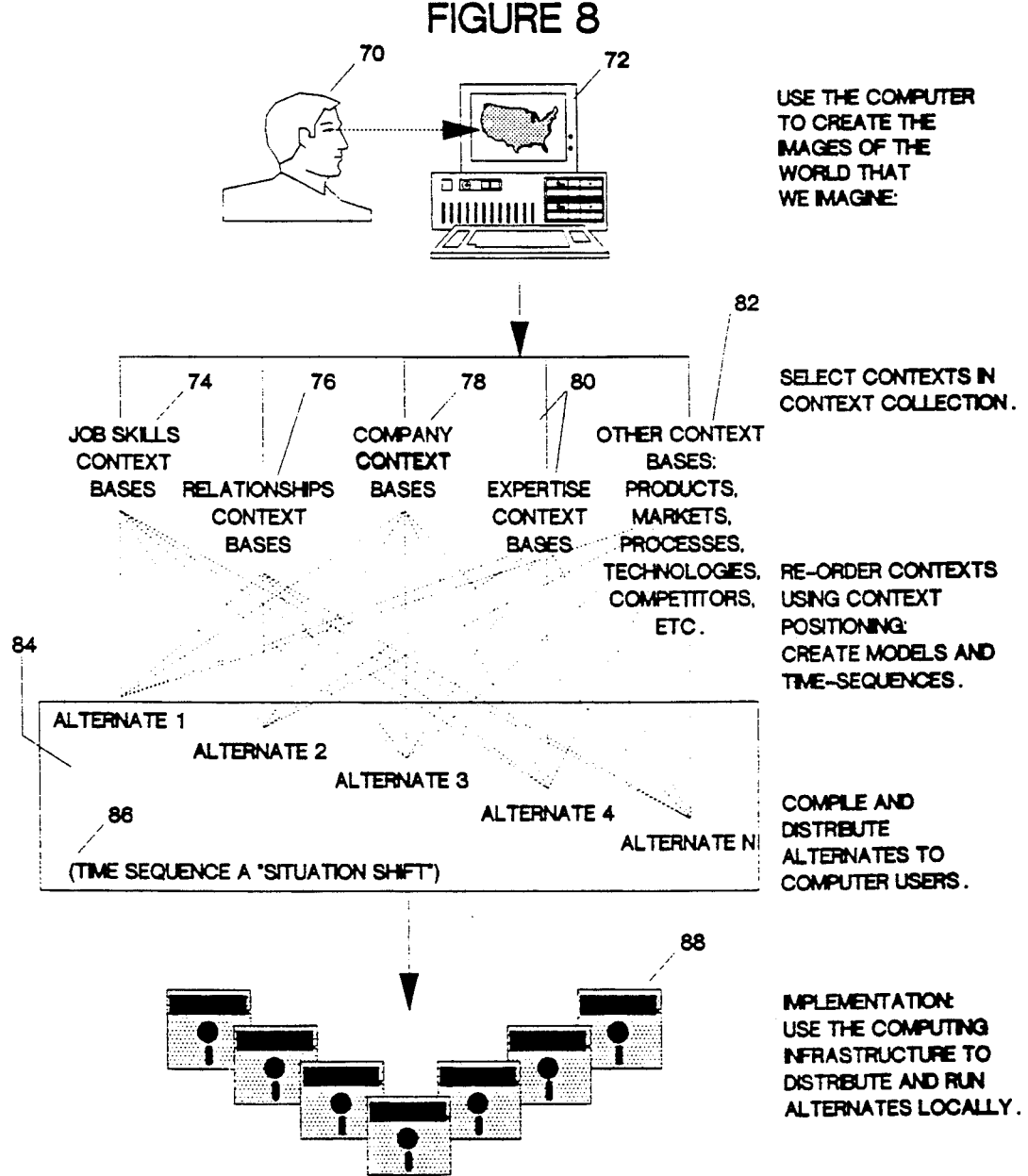
FIG. 8 illustrates a new relationship between imagination and computing.

Turning now to FIG. 8, in this new computing paradigm, computers 72 are used as a tool to express and produce shifts from current situations to preferred situations. At a computer workstation 72 running this software and offering sufficient on line Contexts, one or more users 70 might interactively formulate a transformation of the current situation. The "Contexts" are collected from so called Context Bases 74, 76, 78, 80, 82, 84 and re-arranged into imagination-driven arrangements called Alternates 84. This is a transformation in which the imagination of the user directs the re-assembly of elements and knowledge from the existing world, as well as novel creations, to create Preferred Situations.

Some of the objectives of the Alternates 84 created by this invention's imagination-driven computing might include: improve personal, group, or organizational performance; solve various types of personal, operating, or group problems; respond to rapid technological or social change; initiate advantageous changes in an organization; and create and introduce innovations in a situation. The Alternates 84 may be ordered in a sequence to create a Situation Shift 86. The Alternates 84 are distributed to the end users on disk, on-line, or by other digital media (88).

At one end of the spectrum, some of the preferred situations may resemble existing situations while introducing only small improvements. At the other end of the spectrum, users may attempt to shift the Contextual rearrangement into an entirely imagined situation. Regardless of where a transformation lies on this spectrum, the invention may be used to conceive novel combinations of Contexts, and implement specific, concrete innovations.

The invention may be useful in transforming materials (manufacturing based), products (design or R&D based), organizations (organization based or relationship based), markets (marketing based), overall situations ("Situation Shifting"), people (individual goal based), and may provide other imagination-driven opportunities.

In all these cases, the Contextualizer may provide a growing opportunity for individuals, employees, and organizations to create transformations in one or more dimensions, including: their material transformations; their structure and processes; the organization's structure and relationships; their performance and productivity; their adaptation to new situations and responsibilities; their ability to create and implement innovation; and new ways to provide imagination-driven information products and services.

This new type of software is defined by its novel purposes: the improvement or fabrication of reality based on its users' ideas and imaginations.

The following outline of terms and concepts will aid the reader's understanding. (A) The Contextualizer: An interactive development "engine" used to collect Contexts, arrange and link them appropriately, plan and schedule their implementation, compile Alternates for distribution, and modify the Alternates.

(1) Contexts: The elements of a situation (segments of a body of information) that may be stored in a digital format and used in Alternates, including skills, methods, tasks, goals, internal and external relationships, tactics, explanations, graphics, pictures, video, audio and other essential factors communicated in various types of data. Contexts may either resemble the current situation (the "current situation"), or they may express a goal (the "preferred situation"). The transition is achieved by "situation shifting". The current or preferred situation may apply to an individual, group, job category, department, business unit, corporation, or organization.

(2) Contexts Selected: The Contextualizer is used to collect Contexts.

(3) Origin of Contexts:

(a) If a Context has been computerized and imported into the Contextualizer, it can be directly selected and used to develop Alternates.

(b) If a Context has been computerized but not imported into the Contextualizer it can be imported and "templated" using the "Create Context Bases" features.

(c) If a Context has not been computerized, two options are available: First, it may be scanned or typed, thus computerizing it. Then it can be imported into the Contextualizer and "templated" using the "Create Context Bases" feature. Second, a "placeholder" and a note may be included in the Alternate instead of the Context. These may offer information such as the title of the Context and where to find its contents.

(4) Context Bases: The following sources of Contexts are available or can be developed using the "Create Context Bases" tools (discussed below):

(a) Previously created Alternates may be accessed as sources of Contexts to create or modify other Alternates. This permits rapid sharing of information, Contexts, Outline Models, or Time-Sequence Models between many different users of Alternates.

(b) Many corporations already have word processor files and data bases containing an array of internal manuals, reports, memos, and data used in many jobs.

(c) Many trade publications cover individual industries and professions in detail, and the full text of hundreds of these are available on-line, searchable to locate specific information.

(d) On-line databases offer rapid access to an enormous range of specialized information and publications.

(e) Future sources: Modern societies publish vast amounts of Contextual information including "how to" skills, analyses, data, and explanations covering a vast array of industries, jobs, personal improvements, and many other types of situations. As computer technology evolves, it may be possible for an increasing variety of books, magazines, and other publications to continue growing in on-line availability or on computer-readable media. (Most publications are already captured electronically by their creation in word processing or their production in typesetting. The question of rapid availability is answered by market demand and vendor development. The technological barriers are significant but not as great.) Related technologies are improving, such as distribution of large volumes of information via optical (CD) discs, OCR text scanning, and automated text parsing.

(5) Context Collection: This is a simplified way to search Context Bases and collect Contexts. While this was developed for the Contextualizer, it may have wider application. Here it is used to examine and collect Contexts.

(6) Context Positioning: Once appropriate Contexts have been collected, they can be rearranged into an Alternate. This is a flexible process that includes two independent parts: Rearranging and Time-Sequencing Modeling. First, the Contexts can be Rearranged into Alternates based on current or preferred situations, as imagined by the user. Second, they can be Time-Sequenced to schedule their implementation or use. While Context Positioning was developed for the Contextualizer, it may have wider application then rearranging the items found from searches of large Context Bases. Here it is used to rearrange Contexts to create Alternates.

(B) (An) Alternate: An Alternate is a free-standing computer program that includes collected contexts and may include a software "engine" for accessing the Contexts collected and organized within the Alternate. The Alternate's goal may be to improve one part of a current situation, several parts of a situation, or transform the situation. An Alternate may have up to three components which together define its structure, access, content, and implementation:

(1) (The) Model: The Model is the structure and layout of an Alternate that has been interactively created or modified by a user. The Model is also the access pattern to its Context Clusters and single Contexts. A Model may be an Outline Model, arranged hierarchically, a Time-Sequence Model, or another kind of Model.

(2) (The) Guide: The guide is the text and graphics (graphics, pictures, video, etc.) in each Context.

(3) (The) Time-Sequence Model: The Time-Sequence Model is the implementation plan for shifting from the current situation to the preferred situation. Time Sequence Models are interactively created or modified by a user.

(C) Situation Shifting: The process of using the Contextualizer and Alternates to transform the Current Situation into a Preferred Situation.

Figure 9:
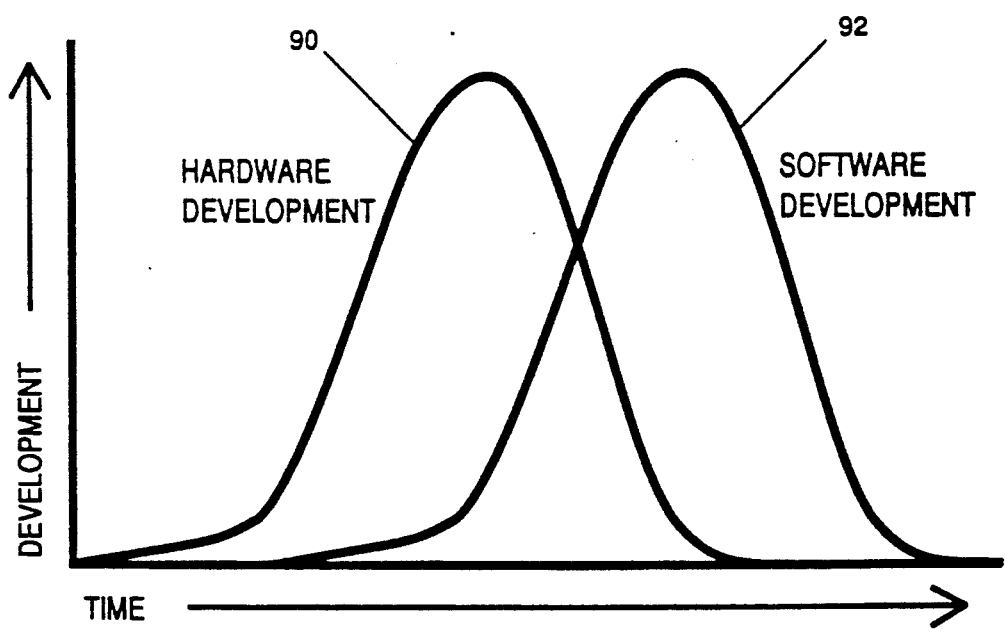
FIG. 9 shows the traditional lag between hardware and software development.

(1) Computing Infrastructure and Distribution System: Contextualizer software is intended to run on current and faster computer systems, including the next generation of microcomputers. Software development generally lags behind hardware development in each generation of computer technology (see FIG. 9); this invention may leapfrog that cycle and create a potentially productive new type of computing that takes advantage of faster CPU speeds and the increased capacity from optical disc storage and other types of massive data storage and retrieval systems.

Alternates may be (a) run on the same computers that run the Contextualizer, (b) distributed on-line, or (c) distributed or sold on floppy disks to run on older generation computers, including widely installed business microcomputers. This harnesses the majority of the rapidly growing computer infrastructure as a distribution system for the potential improvement of situations according to the imagination and desires of people who utilize this type of computing.

(D) Create Context Bases: At this time, computer readable sources of Contexts are significant but limited. This is a separate component of the Contextualizer developed to overcome this limitation. Its specific domain is semi-automating the templating of Contexts into Context Bases to make them suitable for the Contextualizer.

(E) Copyright Tracking: This was created so users may take advantage of many valuable copyrighted Context Bases. This tracks the use, amounts due, and payments for copyrighted information. Including it in the software protects intellectual property and it may also stimulate some publishers to make some Context Bases available for developing Alternates.

The present invention is specifically a system for users to rapidly collect and rearrange a wide variety of specific Contexts into flexible, imagination driven patterns and then to access them rapidly for guidance when needed to improve performance or to transform situations. The present invention both captures new ideas in "how-to" arrangements and provides access to this know-how. This invention seeks to give a wide variety of casual users the capacity to interactively capture learning and apply it to improve their performance or transform their situation. It permits these unique constructs to, in turn, be used as sources if Contexts, Outline Models, or Time-Sequence Models to be used in creating or modifying other imaginative constructions. This permits the rapid sharing of imagination patterns of information, time-sequence implementation plans, how-to guidance, etc. on a large scale.

One example of a user of the invention may be an executive or a staff specialist in the headquarters of a corporation or another type of organization. That person might use the invention from the "top down" to develop Alternates centrally, then distribute them to users who run them locally to improve or change their situations. In this "top down" pattern, central management implements specific sequences of Alternates to achieve the Situation Shifts they desire. Where economies of scale are important, similar or related Alternates can be deployed across departments. This approach mirrors the conventional top-down management of some managers. It supports their centralized control despite the decentralizing influence of information systems.

A second example user creates Alternates locally, where external conditions (such as market proximity or the rate of technological innovation) are crucial, i.e., where decentralized or "bottom up" use is preferred. In local situations, the Contextualizer may be used by individuals and work groups to make themselves more effective leaders, competitors, and innovators. "Decentralized" individuals know the local bottlenecks in products, services, customer response, or ineffective links between divisions of a company. They might construct and share Alternates and implementation sequences that include local "how to" skills, methods, analyses, and other types of targeted procedures that transform performance, products, or the situation. With the Contextualizer, on-the-spot individuals or groups might use their local knowledge more effectively to imagine and plan small or large breakthroughs, while shifting their situation step-by-step.

With software that more closely connects imagination with reality, it may be possible to increase the creative potentials of key people and groups in many organizations. Today, the ability to remain in the lead economically means creating innovations and reshaping organizations to commercialize them successfully. In our age of innovation, the value of the creative imagination and on-the-spot adaptation may be growing. This invention may help people master new situations and leverage available human and financial resources to achieve the higher level of performance required today.

Five additional examples illustrate possible ways to apply the invention to personal, business, and non-profit needs.

The first example is personal use by a new employee in a new job, or by that employee's manager. The invention is used to assemble and compile one or more Alternates that provide on-the-fly access to skills, relationships, explanations, underlying technology, performance guides, and background information that is specific for the new employee's job. As is typical in many corporations, that employee's responsibilities may change often. As new responsibilities are added and old ones dropped, the Contextualizer may be used to modify the employee's current Alternate(s). In this manner, the Alternate functions as a learning tool that operates at the edge of the employee's new knowledge and performance, providing guidance and support in becoming productive earlier when each new responsibility is added. The design of the employee's tool may be directed by management, by the employee, or by blending their combined insights and experience.

The next example is personal use by an independent professional such as a corporate attorney who repeatedly encounters new situations and Contexts, for example, in drafting agreements with foreign corporations, defending against unexpected product liability lawsuits, or spinning off a high technology work group as a separate company that markets new information systems. This attorney may modify his Alternate to include the Contexts he needs in each new legal project, to boost his productivity in the unfamiliar areas. If a rush project arises, he might rapidly create a new Alternate for that project, collecting the preferred Contexts he needs and rapidly organizing them into a framework for both early progress and later rapid advance to sophisticated results.

Two examples of corporate uses illustrate the two sides of technology-based competition. One example is of a company that wants to drive innovation; the second is of a company that must respond to it.

The first example is a business unit dedicated to doubling the life of small consumer batteries while cutting their price in half (this is comparable to what has been achieved in many products, with numerous examples in consumer electronics). This battery business unit is attempting to use innovation strategically, to leapfrog its industry with a next-generation product and establish itself as the leading company while defeating its competition. To succeed, it might use the Contextualizer both centrally and locally to create and manage a time-phased transformation of its situation first internally and then externally. This begins with developing Alternates that start from the present skills and relationships in each department: research and development (R&D), product design and marketing, manufacturing, distribution channel control, etc. The Alternates introduce initial situation shifts in each department, with successive Alternates introduced to stimulate a comprehensive transformation to the preferred situation: research, developing and manufacturing the new products, market testing, launching them to establish market share, and capitalizing on every type of competitive advantage that they imagine. Thus, this invention might help companies leapfrog their competitors by developing and commercializing new technologies.

The next example illustrates how competitors might use the Contextualizer to respond to the new battery technology quickly to avoid losing market share (as happened when products like radial tires were introduced by Michelin, faster supercomputers by Cray Research, Ready Asset Accounts by Merrill Lynch, etc.). To accelerate their response, the Contextualizer might be used to develop Alternates that include the new skills, procedures, internal and external relationships, and implementation sequences needed to respond in key jobs and departments. To increase the speed of response and provide enhanced performance at an earlier date from many key areas throughout the corporation, the Alternates may be distributed and accessed on local microcomputers or terminals at employees' desks. Thus, this invention might help the organization accelerate its adaptation to sudden technological attacks.

A final example is a nonprofit environmental group which wants to launch a new program of setting up wildlife shelters for injured animals outside of major cities across America. It uses the Contextualizer to access Context Bases to collect Contexts it needs about non-profit organization fund raising and growth, wildlife feeding and habitats, veterinary care, ecology, and zoo management. It then rearranges the Contexts into appropriate Alternates: volunteer recruitment, fund raising and membership drives, animal helpers (veterinarians, daily staff, and part-time volunteers), zoological management, and Alternates for other functions needed to develop this new program.

Built on the foundation of these examples, the larger vision is clearer. The capabilities of individuals, groups, and organizations are often underestimated. In virtually every kind of situation, people display competence and creativity in dealing with both routine and novel difficulties. An extraordinary richness of talent is advancing a wide diversity of interests in modern societies. Extensive personal and organizational abilities create and drive the changes.

The invention is useful as a practical tool for those who lead or are involved in personal, group, or organizational change—especially adjustments or alterations based on new types of goals or new technologies. The users of the Contextualizer project (1) what they prefer their situation to be, and (2) how they want to model and implement the changes. The Contextualizer may be used in free-form exploratory ways, or it might be applied via structured methodologies. The Contextualizer is flexible in empowering the forces of individual imagination and belief.

Consider the potential role of imagination in a rationally managed business that is (partly) planned and developed using this new software. First, managers determine the preferred situation for the business. This includes defining goals and understanding the factors that cause various strategies to succeed in reaching the goals. With this in mind, models can be built to implement situation shifting. Once a conceptual model is developed, operating procedures and implementation sequences are specified along with systems to measure results and compare the outcome to milestones. If the outcome is above or below reasonable limits, new situations must be imagined and new models constructed to shift into them. If the outcome approximates what was desired, management succeeded in creating their preferred situation. A process like this might merge the imaginations of individuals, the belief systems of groups, the implementation talents of organizations, and traditional management sciences.

The invention will help extend the span of control over change itself to individuals and organizations which may prove useful in an age of rapid and strategic innovation.

Referring to the top of FIG. 10, it is clear that the conventional software development 102 and predictions for future software development 106, 108 include only three of these four circles; the imagination circle 104 is only minimally included and its potential contribution is not explicitly supported by software 102. The invention specifically recognizes, includes, and empowers the fourth circle 104; the human imagination is intimately merged with information technology and economic activity 109 until it increasingly becomes a potential source of everyday improvements in reality.

It is proposed that this new synthesis may become essential as the process of innovation and commercialization of new technologies increasingly merge to drive global competition. While science and technology are widely recognized as the foundation for global economic leadership and geopolitical power, it is "the differential ability of nations to carry out and capitalize on the results of R&D" that determines global leadership.

The imagination is a central part of this process, but this process has not been explicitly developed as a software application, nor has the imagination been empowered as the central feature of such software prior to this invention. A key element for modern commercial success may not be whether a company has powerful information processing systems, but whether information technology extends employees' abilities to transform the organization and the world by expressing and implementing new ideas and learning.

While this new type of software may move the origin of reality toward people's imaginations, may also produce greater control over the process of change. Since Alternates are designed in a flexible mental space (the imagination) that is represented on the computer's screen, many Alternates will start with the current situation and move incrementally, by a series of small situation shifts, to create the preferred situation. Other Alternates may leap ahead to the preferred situation, and attempt to design and introduce it as rapidly as possible. Alternates may or may not be realistic; it is up to each user to determine the preferred situations that are viable, when they should be implemented, by whom, and why. Though this invention may empower the imagination to shape reality, our dreams are kept reasonable by what is possible, desirable, and morally right for each user in each situation.

Executives, for example, normally work on a job in parallel by including many sources of information that may come from people, on paper, or from the computer screen. While the Contextualizer offers more Context Bases, it also provides tools for quickly narrowing what is collected, and rapidly focusing it into an Alternate that models the preferred situation, prioritizes tasks and sequences its implementation. Thus, it might make some contribution to concentrating the stream of parallel activities and controlling planned transformations.

The key situation shift that may be stimulated by this invention is a shift from being acted upon to acting on. Individuals, groups, and organizations in a variety of situations may be empowered to select more important or more appropriate goals and develop Alternates that may help them shift into their preferred situations. In a dynamic and free society, this is potentially a valuable capability for rapid progress, economic performance, and many types of human improvements. This may also be a strategic advantage that is only available to free societies. Cultures that support individual freedom may gain new personal and economic potentials from "imagination-driven" computing, and this may not be available to those that are organized to restrict and control human beings.

Implementation Example

Figure 1:
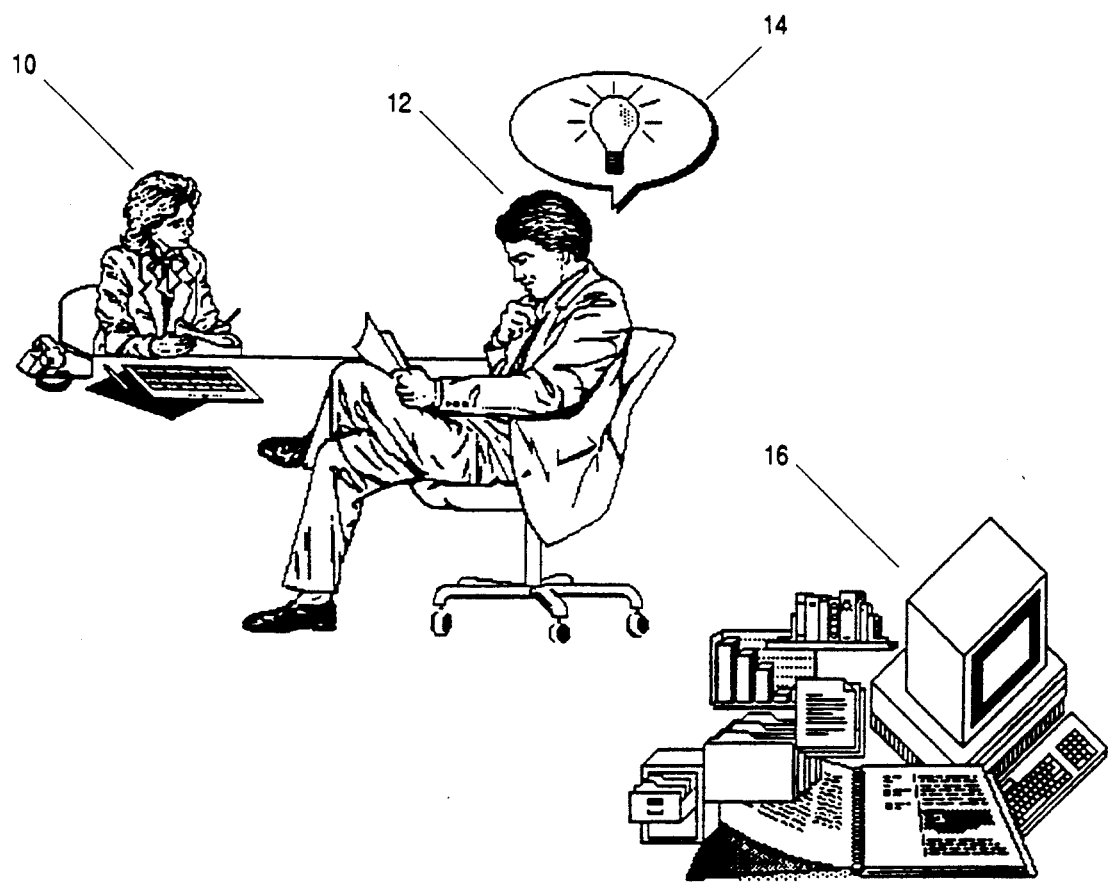
FIGS. 1 through 3 illustrate principles of the invention.

Referring to FIG. 1 imagine that a new Editorial Assistant 10 has been hired at a magazine publisher. This publisher is reorganizing itself to launch a major new magazine. Throughout the publishing company and in the Editorial Department, a series of shifts in operations are planned to accomplish the creation and launching of a new magazine with the current staff and resources. Conventional ways to teach and train the new Assistant are inadequate for the imaginative reorganization 14 conceived by the Managing Editor 12. Conventional ways to teach the new Editorial Assistant include on the job training, attending seminars and lessons, courses in schools, reading books and magazines, CBT (computer-based training), CAI (computer-aided instruction), interactive videodisc, and expert systems.

The limitations of the conventional approaches are (1) none of them leads directly and rapidly to the Editor's concept of what the Assistant ought to be, and (2) none of them takes advantage of the many information sources available in modern society that might help the Assistant learn faster on the job, and perform better. Modern society offers increasing ranges of useful information 16 to help create, describe, and implement the Managing Editor's conception (14) of the Editorial Assistant's job, but the conventionally available ways to teach and train her fail to use these resources adequately.

Figure 2:
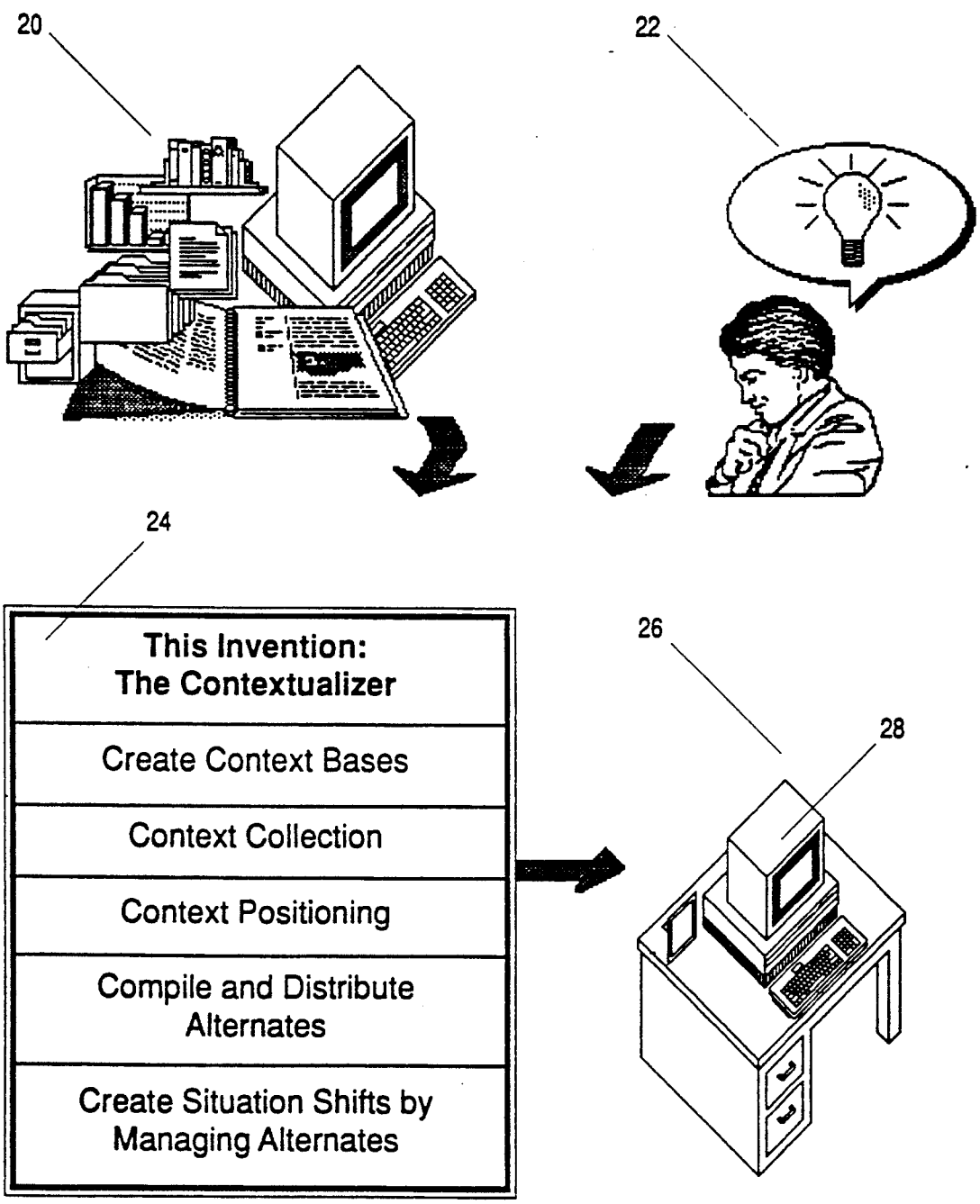

Referring to FIG. 2, the present invention is based on a new paradigm for computing: Imagination Driven computing. There are twin inputs, information 20 and imagination 22 to "The Contextualizer 24". The Context Bases come from modern society's accelerating generation of new knowledge and Context based information. The Editor's imagination 22 is capable of accessing and manipulating many sources of information to describe and explain the Editor's ideas for her job, and how it ought to be done. The Contextualizer 24 provides an interactive tool for creating and implementing imagination-driven concepts by rearranging Contexts from many areas. The Contextualizer 24 is used to create and deliver an "Alternate" 26 to a computer or terminal 28 at the new Editorial Assistant's desk. An Alternate 26 is an imagination driven construct that is used interactively, in this example to: (1) teach the new employee to perform the job as the Managing Editor envisions sees it ought to be performed; (2) increase the Assistant's span of responsibility rapidly, as desired; and (3) assist her in growing rapidly today and in adapting to change in the future. The Contextualizer may be run interactively at any time to modify and improve her Alternate to drive change (as in this example) or to respond to future needs.

Figure 3:
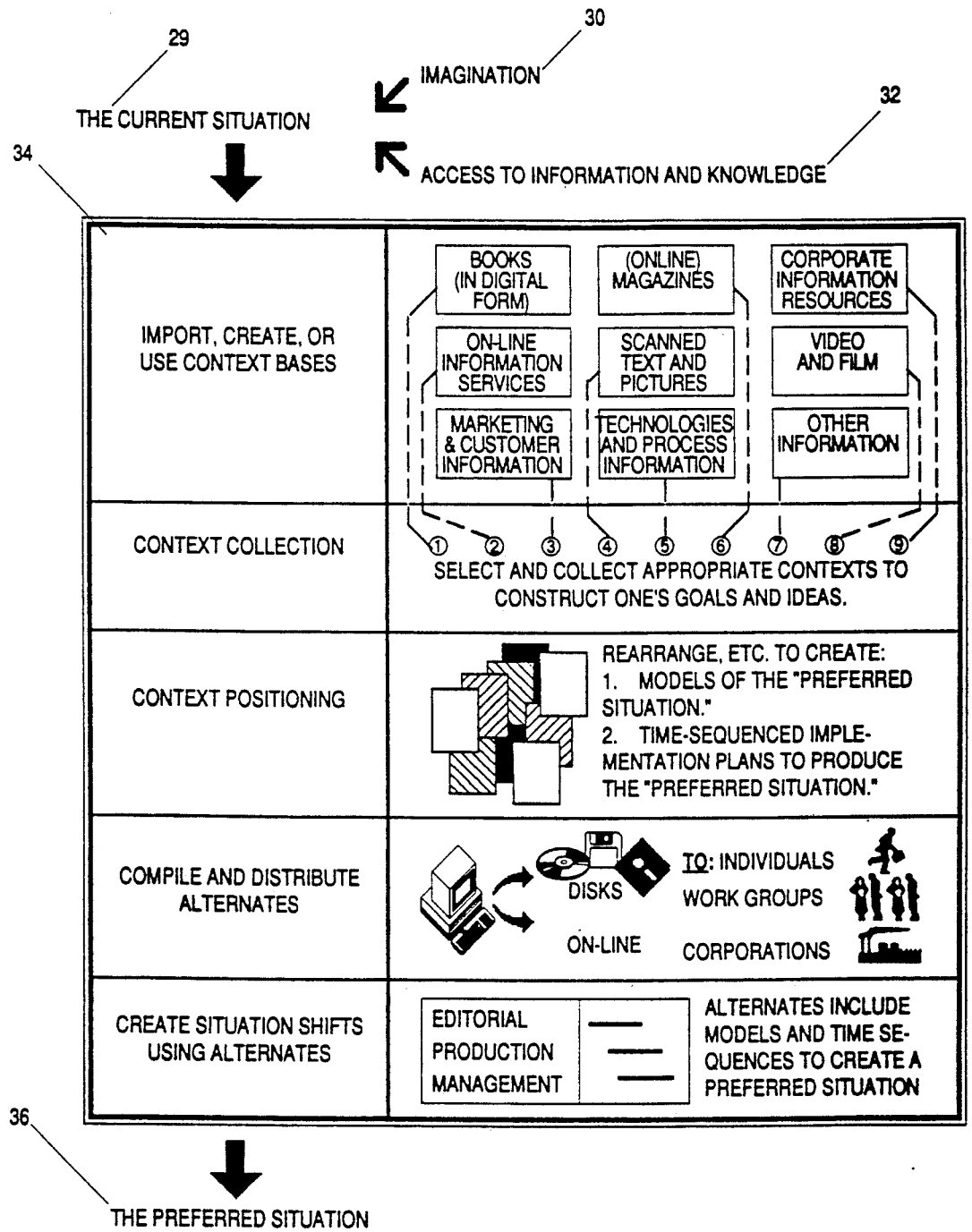
Figure 4:
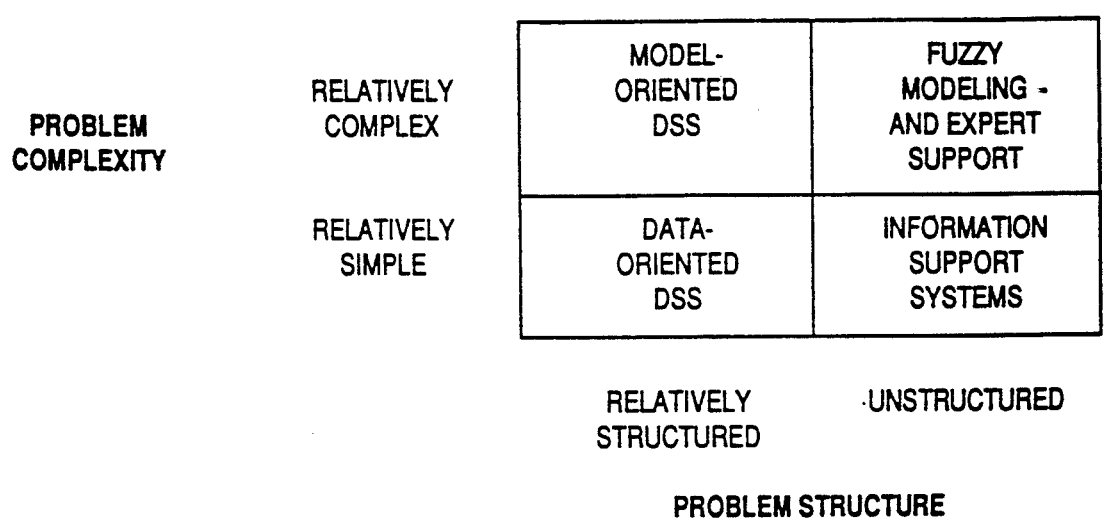
FIG. 4 shows the types of software needed to satisfy different types of business needs.

Referring to FIG. 3, the Contextualizer thus enables an overall transformation from a current situation 29 (with inputs in the form of imagination 30—and access to information and knowledge 32) to the preferred situation 36. The transformation is achieved by a set of operations and processes 34. The paradigm of computing represented by FIG. 3 is named "imagination driven computing." It starts from the current situation 29 at the beginning and assists in expressing and transforming it into the preferred situation 36. At its deepest conceptual level, the computer becomes a tool that helps move the source of everyday reality into the imagination. On a practical level, the invention provides a new type of tool for creating and introducing the changes and improvements that are desired by its users in jobs, work groups, organizations, and people's lives.

The preferred embodiment is illustrated through this prototypical example, which exhibits three principle advantages of the invention:

1. Enhanced performance in material transformations: The Alternate describes the accelerated assumption of a range of responsibilities by a new Editorial Assistant. She must rapidly become proficient at a wide range of specific new tasks according to the unique standards and rules of her new employer. Quality performance of a large span of activities is promoted by the invention.

2. Rapid learning and adaptation: The Alternate supports the new employee in learning her new job at a rapid rate and in carrying out additional tasks at an earlier date than otherwise. The invention may increase her ability to respond rapidly to new situations and requirements in a rapidly changing company and job.

3. Innovation: The job definition, scope, and range of responsibilities may be expanded or changed by creating or modifying Alternates. The process of creating an Alternate is a Context-filled opportunity to conceive new ways to re-organize responsibilities, job definitions, and performance, and to implement them productively. As the employee learns how to use the Alternate, she will use many of the same skills to modify her Alternate in the future. The process of using a series of Alternates may evoke new personal growth: the user may conceptualize a succession of new methods and procedures that increasingly expand performance and productivity.

The invention adds to the work environment a potential alignment of interests between management and employees. First, by using the invention, management may gain a computerized capacity to visualize the expansion of a job (or the organization) with additional responsibilities and expertise that benefit both the employee and the company. Second, by using the invention, the employee may gain accelerated career growth that may benefit the individual in income, managing changing responsibilities, and career satisfaction.

In other words, the invention may be used by management (top-down innovations, which express centralized expertise), or by employees (bottom-up innovations, which express decentralized familiarity with local conditions and needs), or by both, to imagine and implement a variety of organizational potentials.

The Main Menu

Figure 11A:
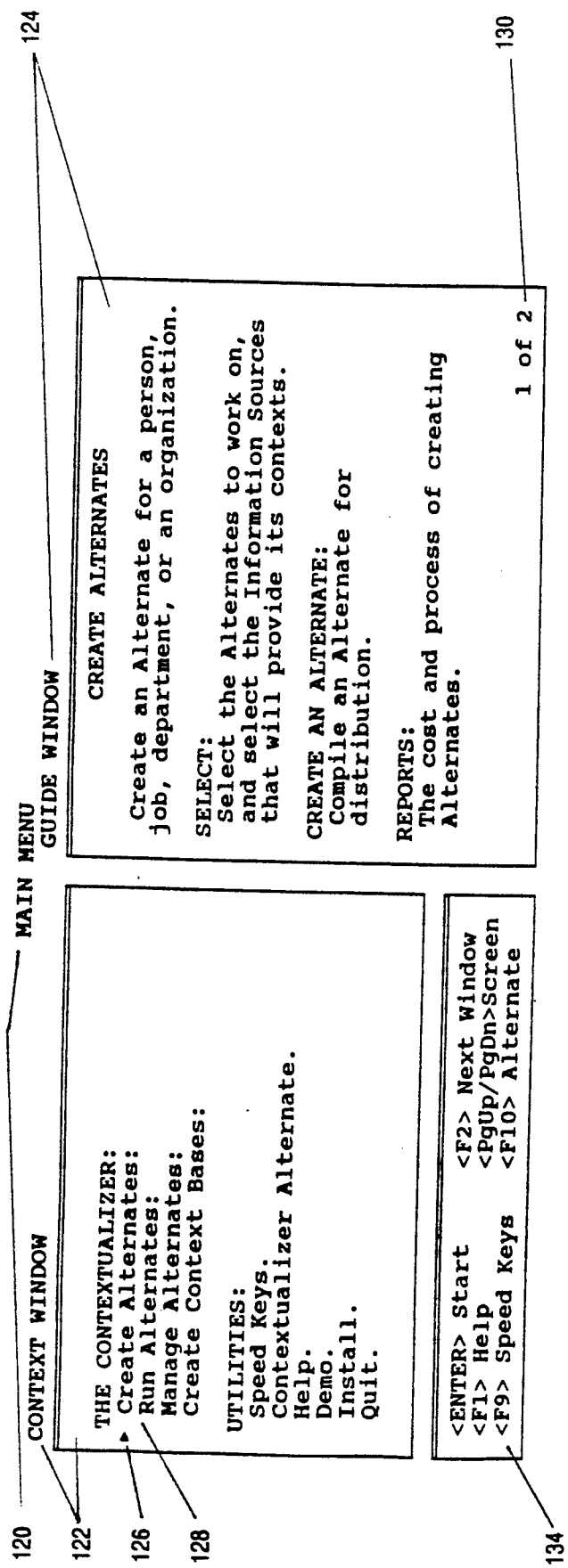
FIGS. 11 through 14(B) show the Main Menu.
Figure 11B:
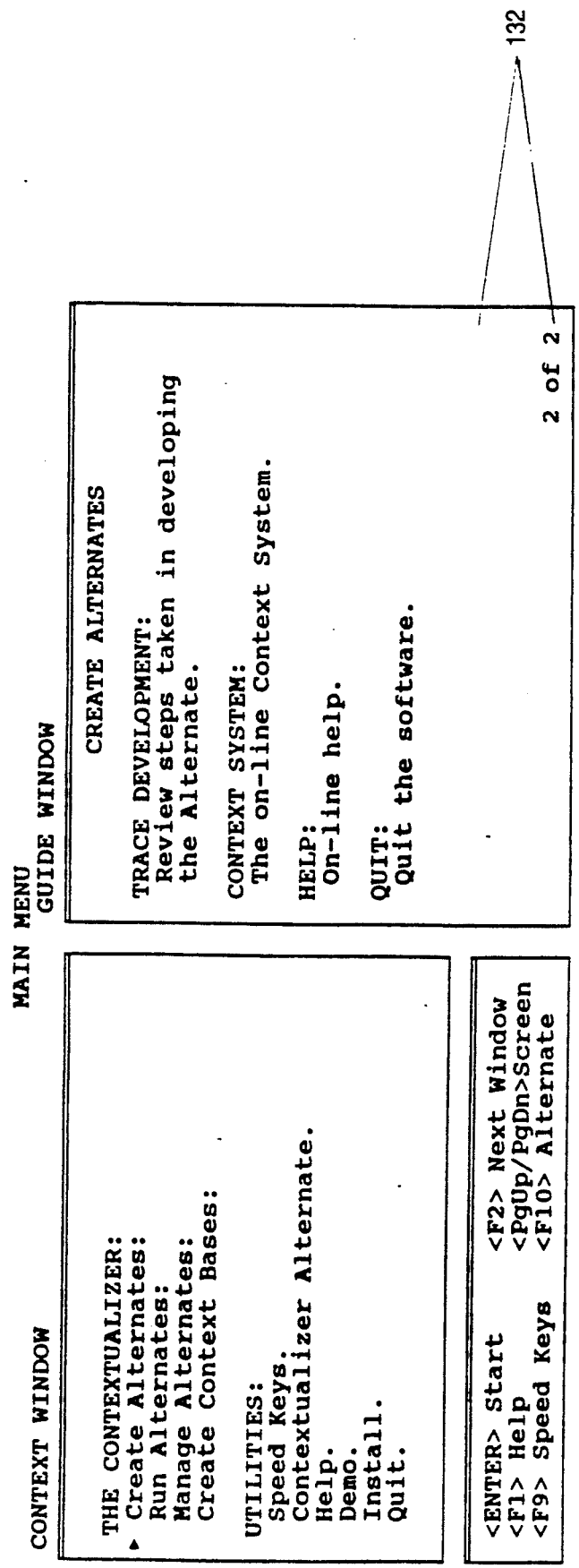
Figure 92:
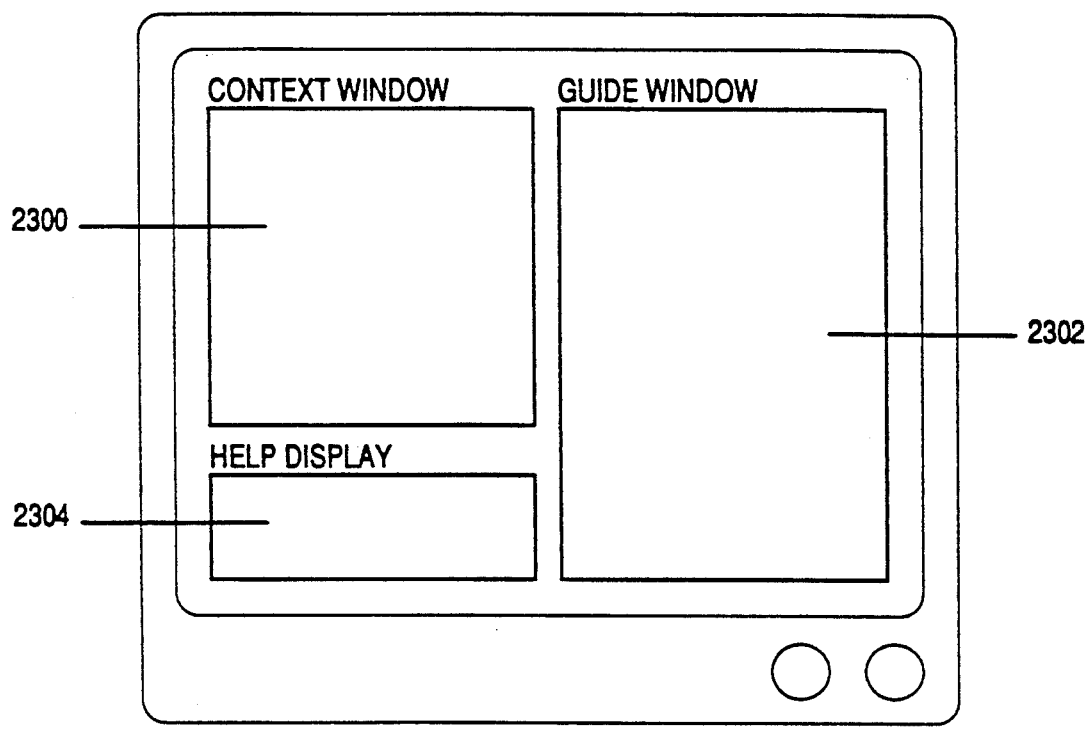

Referring to FIGS. 11 and 92, the "Main Menu" 120 of the Contextualizer is shown. The user knows his location in the software from the screen's top line 120, which identifies this as the Main Menu.

Figure 12A:
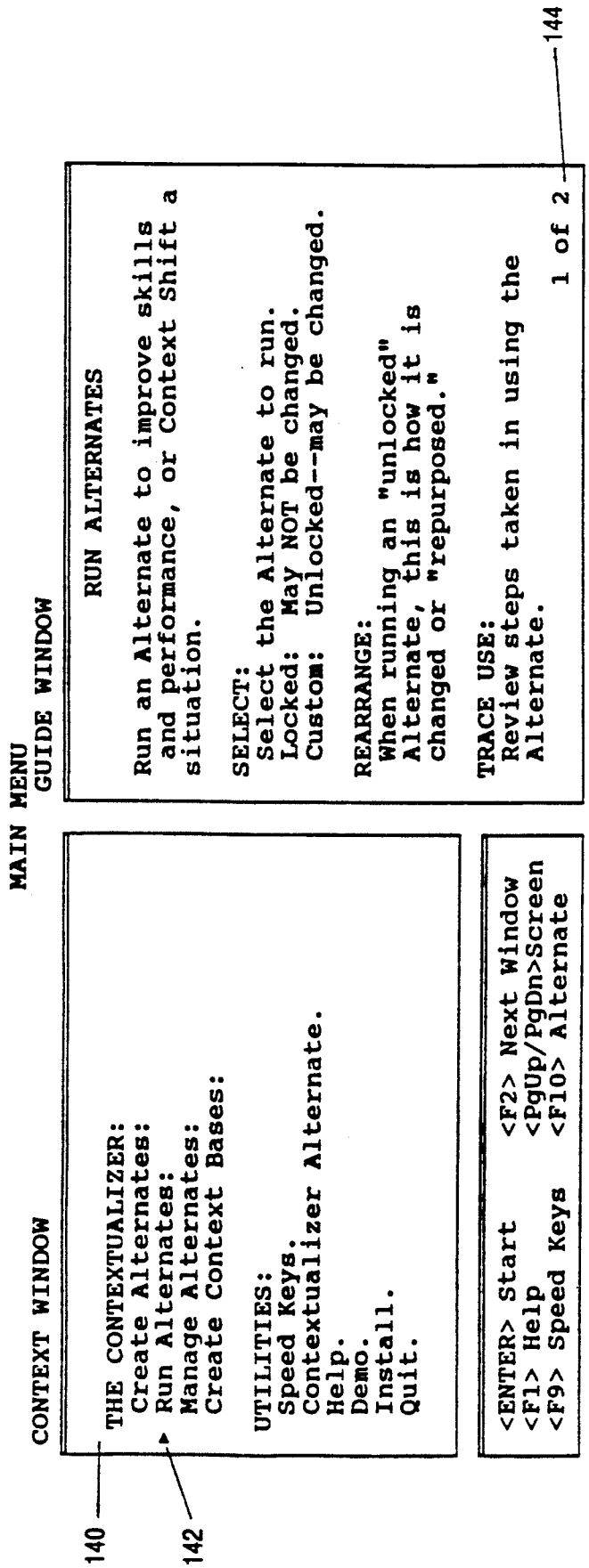
Figure 12B:
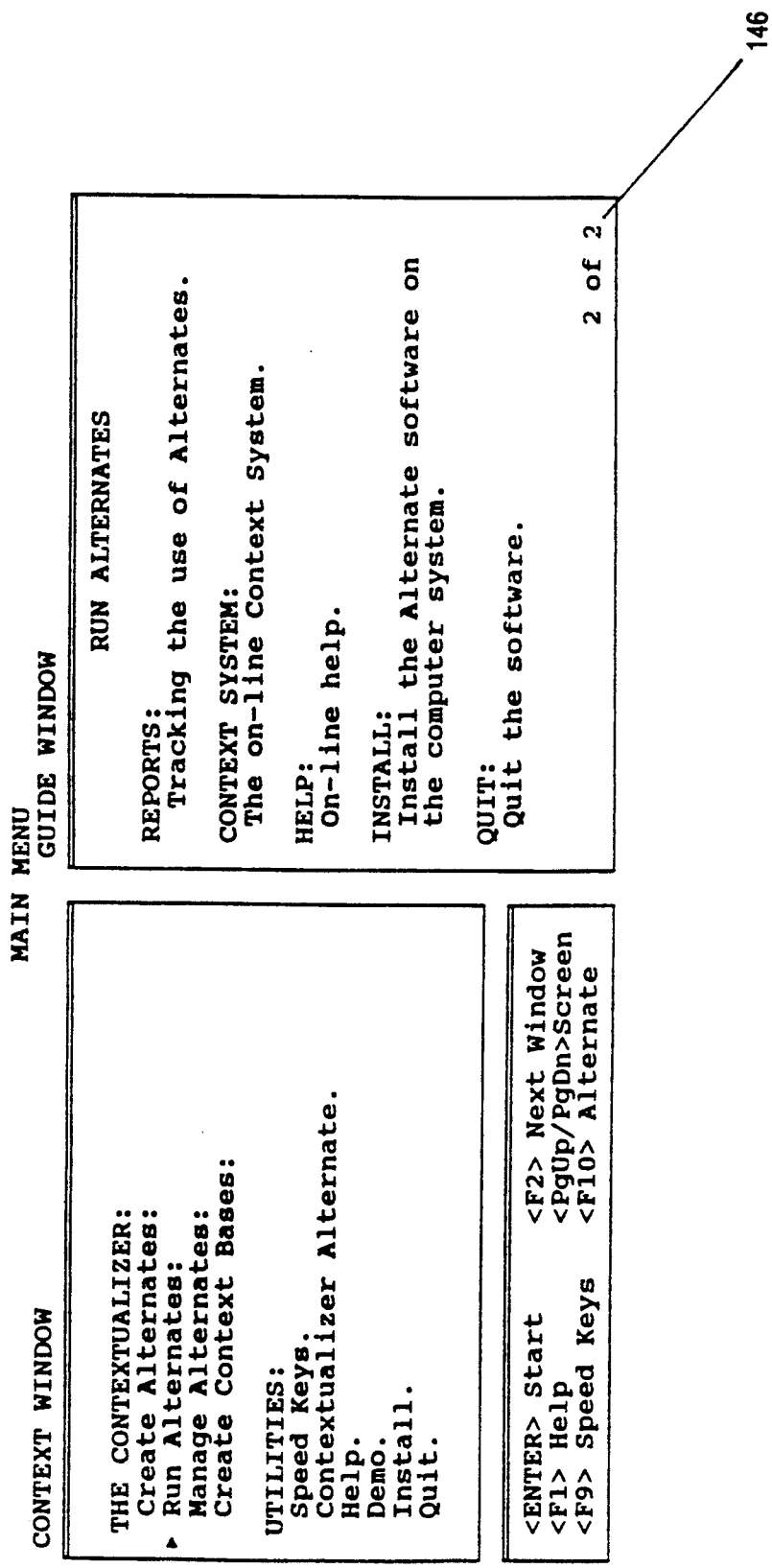

The menuing system is a multiple window system. In FIGS. 11 and 12 there is a Context Window 122, (2300 in FIG. 92) on the left, and there is a Guide Window 124, (2302 in FIG. 92) on the right. Each of these windows is labeled above its top border on the left.

The Context Window has a highlighted cursor bar that goes across the window from border to border. This cursor illuminates in reverse video the line on which the cursor is located. The highlighted cursor bar is represented on the FIGS. by an ">" arrowhead symbol 126. In FIG. 11, the arrowhead is located in the left margin of the Context Window and points to "Create Alternates:" 128 (3002 in FIG. 93).

Referring to FIGS. 11 and 137, as each choice or Context is highlighted in the Context Window 122, 9002, its contents are simultaneously displayed in the right Guide Window 124, 9003.

(As opposed to most software where one operation generally occurs at a time on a computer screen, the normal operation of The Contextualizer often involves two (or sometimes more) related operations occurring on the screen at a time.)

The right-hand Guide Window 124, 9003, shows the first screen of the guide to "Create Alternates." In the lower right-hand corner of the Guide Window, it shows that this is screen 1 of 2 (130). By using a function key 9010 to switch windows 9011, the user switches from the Context Window 122, 9002, to the Guide Window 124, 9003. Now, referring to FIGS. 12 and 138, when the user has activated the Guide Window 124, 9010, the user can press <PgDn> 9028, 9029 to show the second screen of the "Create Alternates" guide. See the second screen of FIG. 11, which shows the second screen in the "Create Alternates" guide 132.

Guides may be much larger than two screens. Referring to FIG. 138 when they are larger than one screen, the user can use a <Home> key 9024, 9025, to move to the top of the guide, an <End> key 9024, 9025, to move to the bottom of the guide, and <PgUp/PgDn> keys 9028, 9029, to move from screen to screen within it. As described in FIG. 139, the user may also zoom the guide up so that it fills the entire computer screen 9040, 9044. After moving around a zoomed guide and using it, the user may zoom the window back down to its previous size 9040, 9041.

In FIGS. 11 and 92, below the Context Window is a window 134, 2304, which indicates functions that will be triggered by certain keys.

Figure 93:
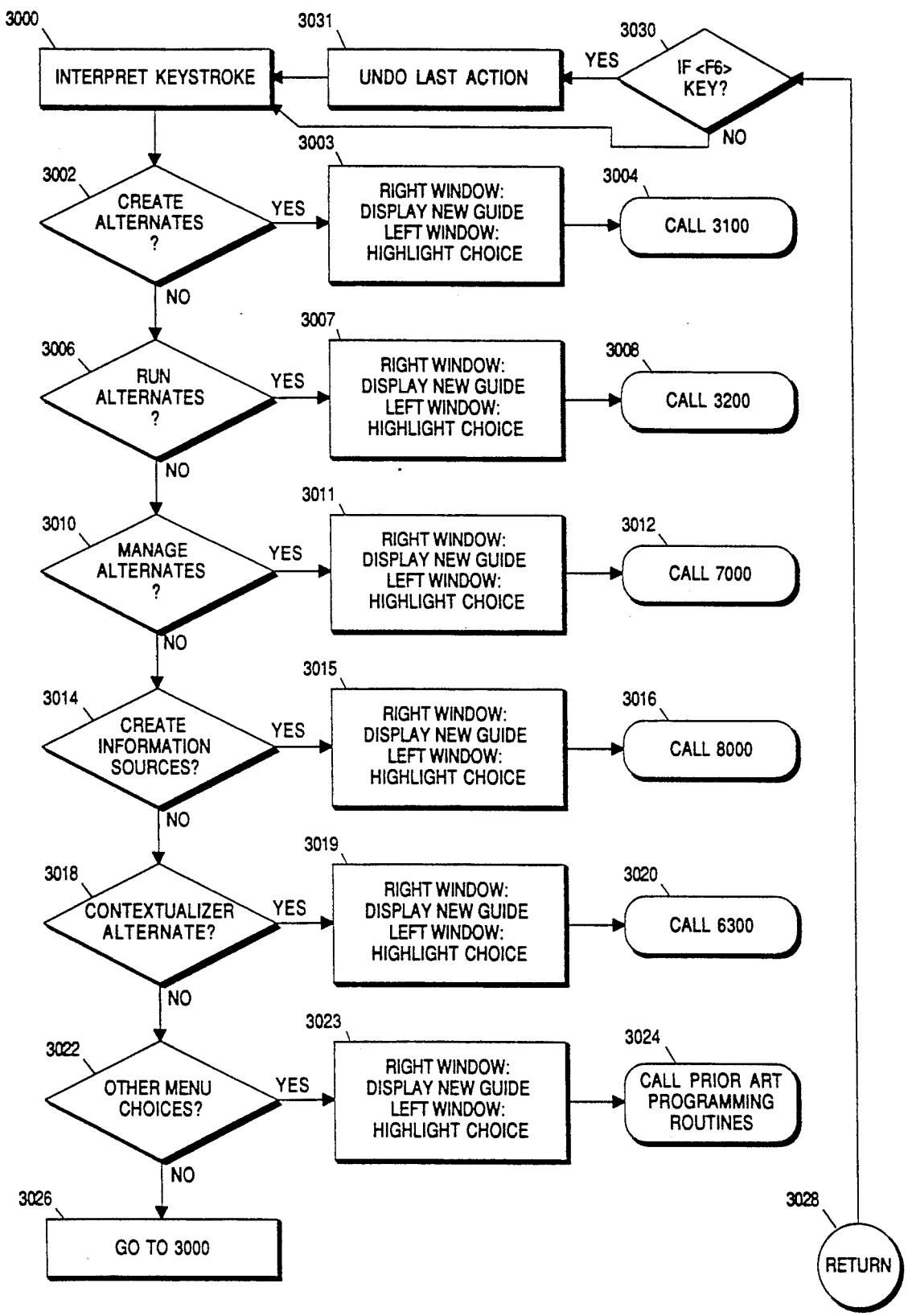

Referring to FIGS. 12 and 137, the user has returned to the Context Window 140, 9002, and has moved the cursor down one line to the "Run Alternates:" selection 142 (3006 in FIG. 93). Note that each possible selection represents a "token" that corresponds to an underlying segment of information in the context base. This automatically displays the Run Alternates Guide for this selection in the Guide Window 144, 146, 9003.

Figure 13A:
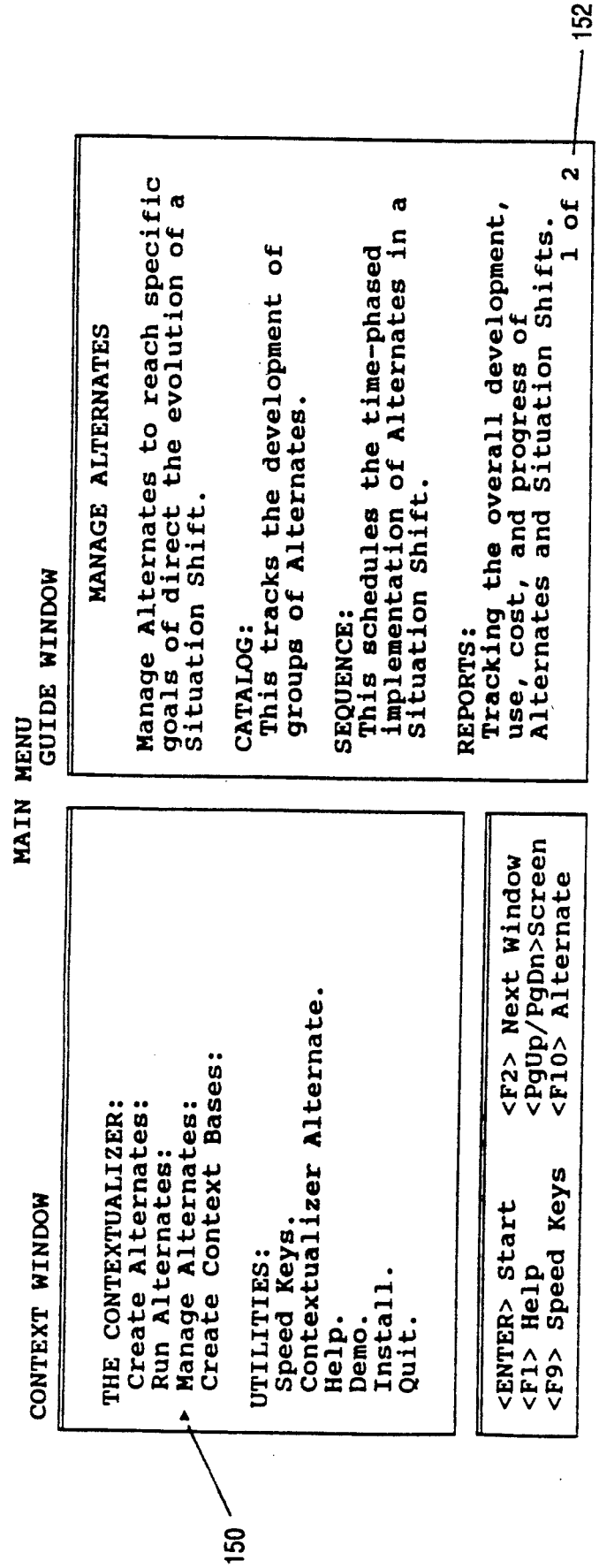
Figure 13B:
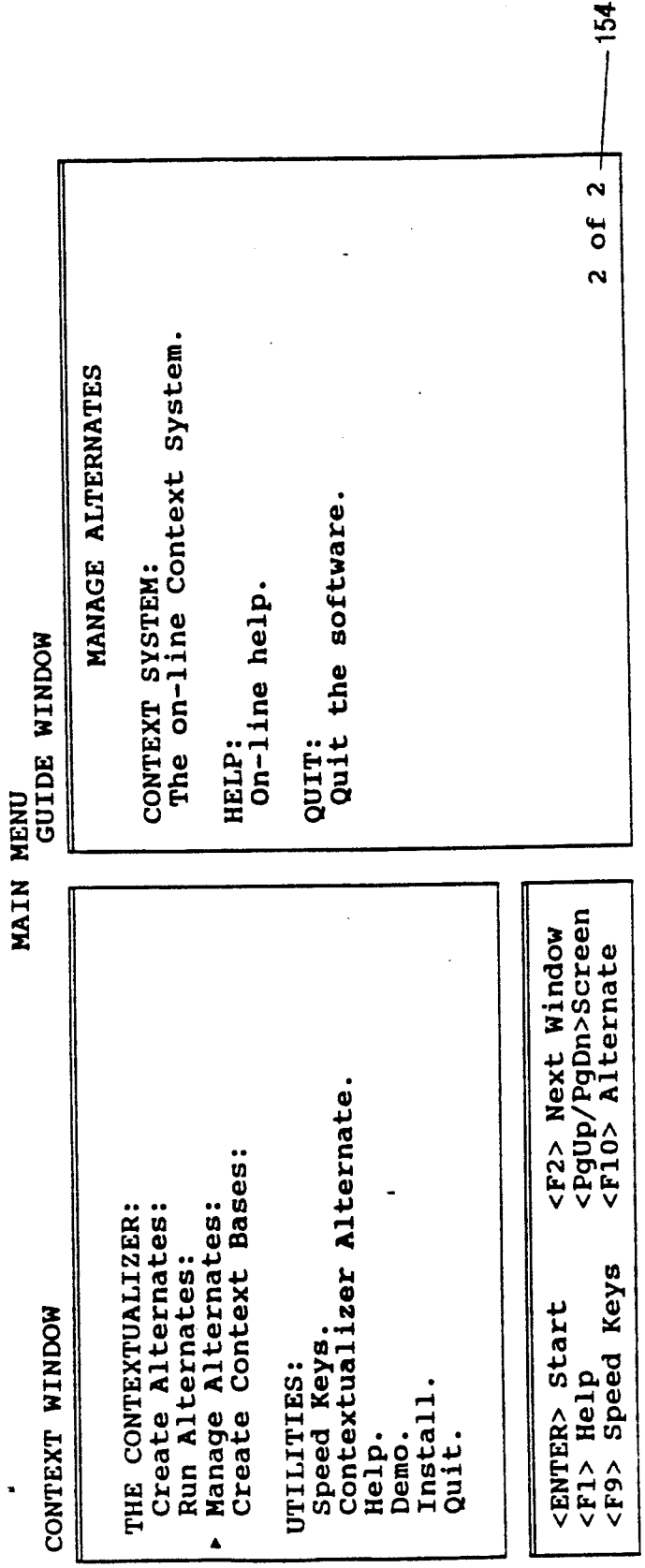

Referring to FIG. 13 and 93, the user has moved the cursor down to "Manage Alternates:" 150, 3010 and sees the two Guide Window screens for "Manage Alternates:" 152, 154, 3011.

Figure 14A:
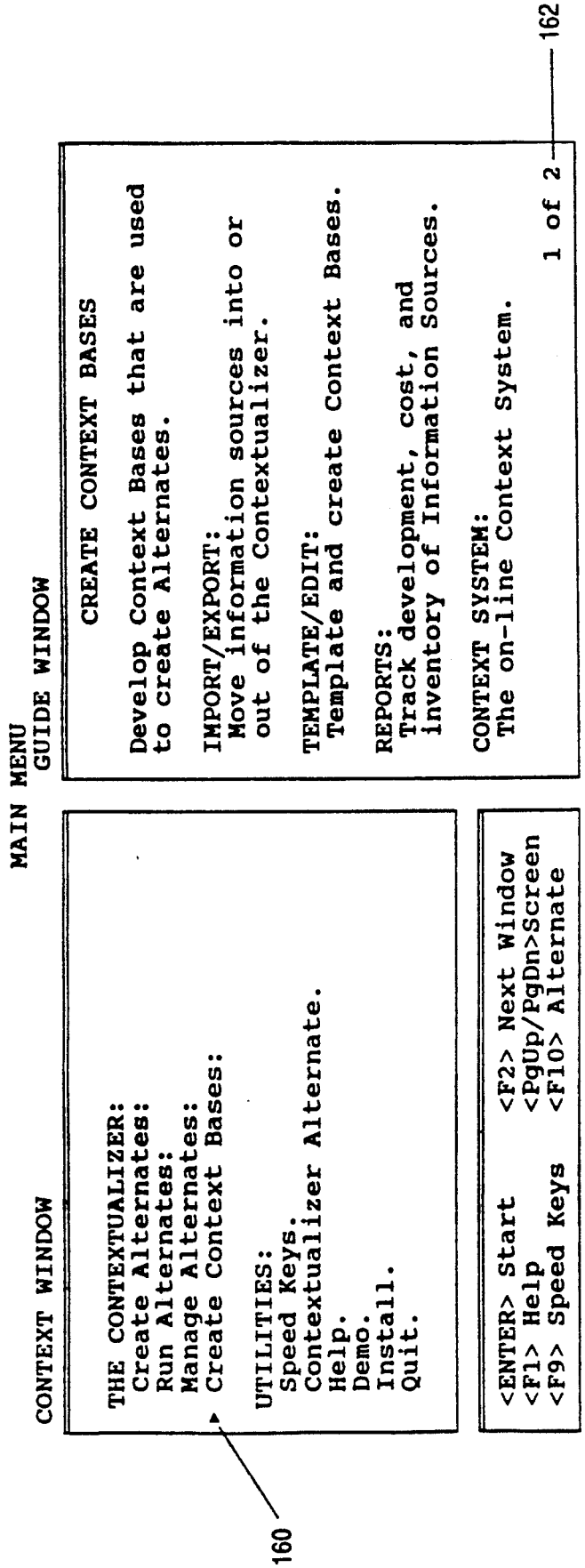
Figure 14B:
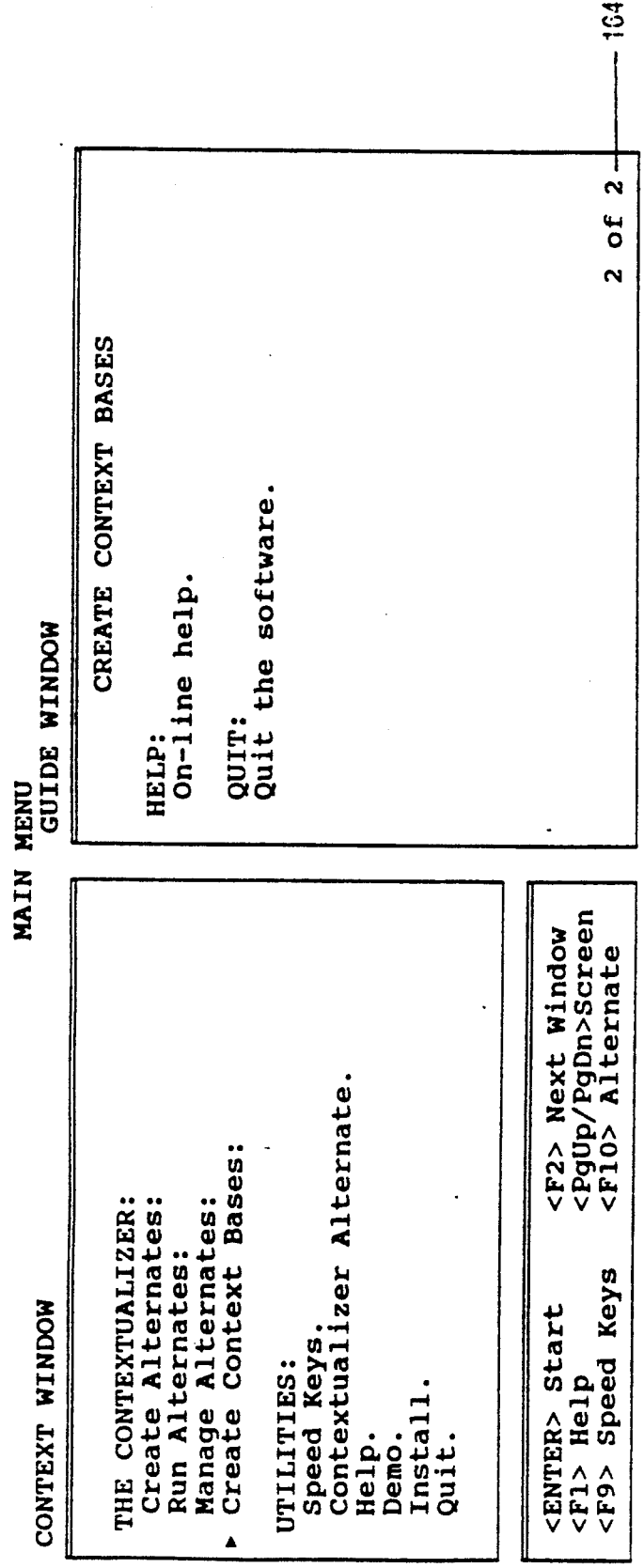

Referring now to FIGS. 14 and 93, the two Guide Window screens 162, 164, 3015 for the choice called "Create Context Bases" 160, 3014 are displayed.

Referring to FIGS. 15 and 93, the Contextualizer Alternate choice 170, 3018 has been selected, displaying the "Contextualizer Alternate" 170, 3018, and FIG. 141 which is, in itself, an Alternate that is built into a software program. Unlike an on-line "Help" system, the built-in Alternate provides an imaginatively conceived collection of Contexts from the skills, situations, expertise, products, markets, specific customers, technologies, and other possible Contexts that relate to the use of that software application 172, 3019.

Just as an Alternate may be a free-standing software application or program, it may also be included within a software program as a different and new type of on-line Contextual assistance for the users of that software program. The bottom half of FIG. 15 shows a screen 174 from the on-line "Contextualizer System". Two example uses for Alternates, built into other software as on line tools, are described below.

First, customer support can be provided with an on-line product and procedure guides that support staff can access quickly while providing phone support, and do this seamlessly from within their Customer Support software.

Second, to handle phone calls about questions like slow checks, Accounts Payable clerks can branch from accounting software to the contexts such as the company's payment and other business policies that might be included in an on-line Alternate. This prevents supervisors from being interrupted for trivial questions while clerks provide higher quality relationships with vendors.

Making Alternates available within other software provides interactive, on-the-spot access to the Contextual information people need when working as a knowledgeable and competent part of a complex business system, especially when that system changes rapidly or often.

Referring to FIGS. 15 and 93, the first choice from the Main Menu is called "Create Alternates:" 176, 3002. Pressing the <Enter> key brings up that portion of the Contextualizer 3002, 3003, 3004.

Context Collection

Figure 16:
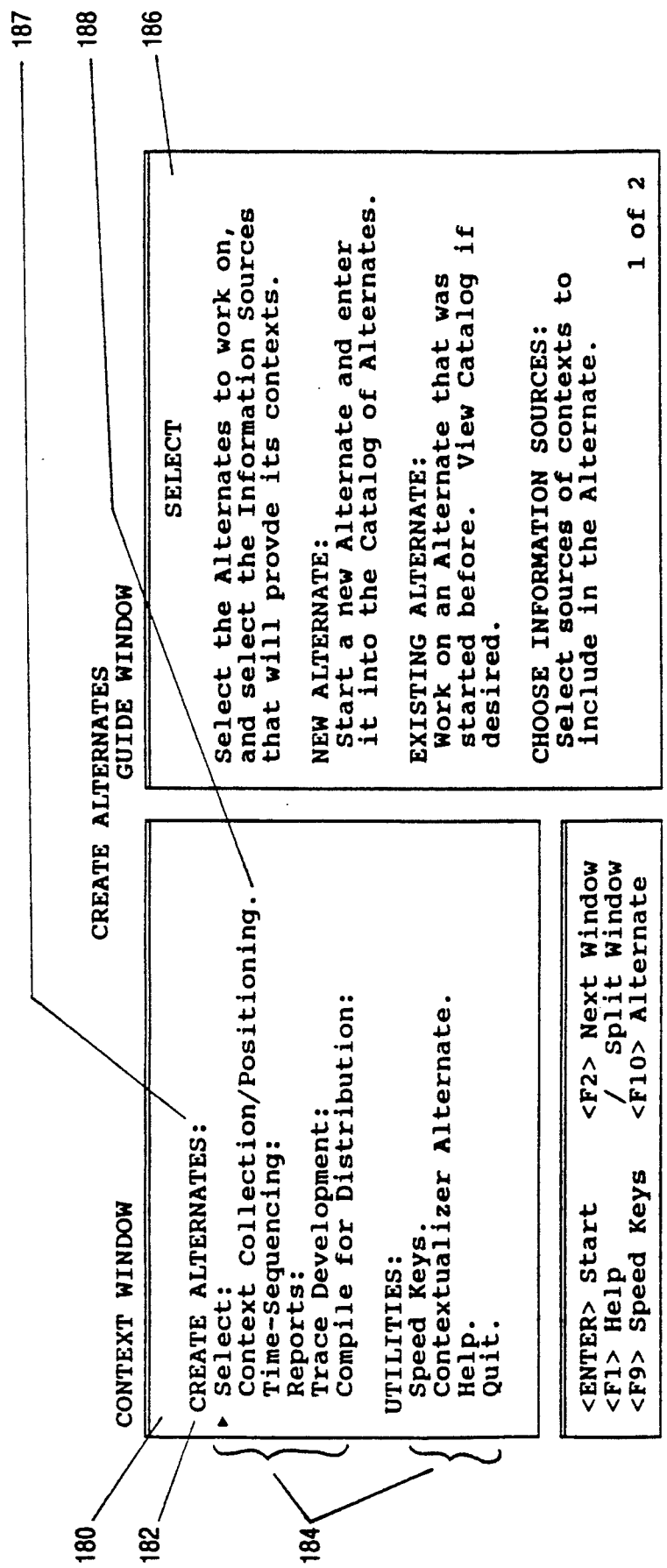

Turning now to FIGS. 16 and 137 the user now sees the available "Create Alternates:" selections 182 in the left Context Window 180, 9002. As the cursor is moved up and down to the different Contexts 184 in the left window, the content of each selection is displayed in the right Guide Window 186, 9003. This general function of the two windows is followed consistently throughout the Contextualizer.

In the Context Window, 180, 9002, the end of each line has one of two punctuation symbols. These symbols indicate whether or not additional choices are subsidiary to that item. If the punctuation is a "colon" (:) 187, 9012, 9013, then additional choices are subsidiary to it. For example, the first line "Create Alternates:" ends in a colon 187. The first topic below that shows why that colon is there, 9012, 9013.

If the punctuation is a "period" (.) 188, 9012, 9013, then there are no additional choices subsidiary to it. For example, the third item in the list, called "Context Collection/ Positioning." 188 ends in a period. There are no items subsidiary to that 9012, 9013.

Referring to FIG. 138, to show additional choices on the screen, or to remove them, the list is expanded or contracted using the "Plus" <+> key 9018 to expand the list to its next level of detail 9019, or the "Minus" <−> key 9018 to contract the list to the next higher level 9019. The list may be expanded to its maximum detail using the <Shift-Plus> key 9021, 9022 or contracted to its minimum level of detail using the <Shift Minus> key 9021, 9022.

Figure 17A:
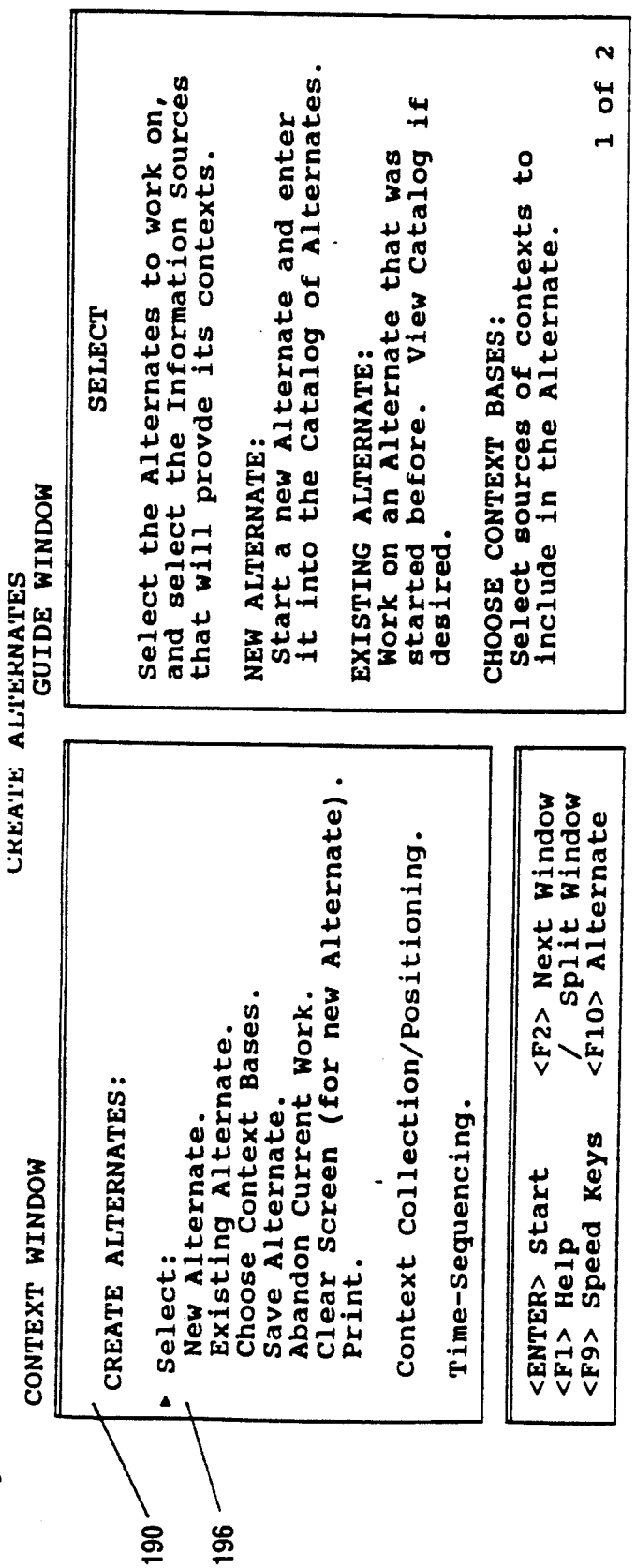
Figure 17B:
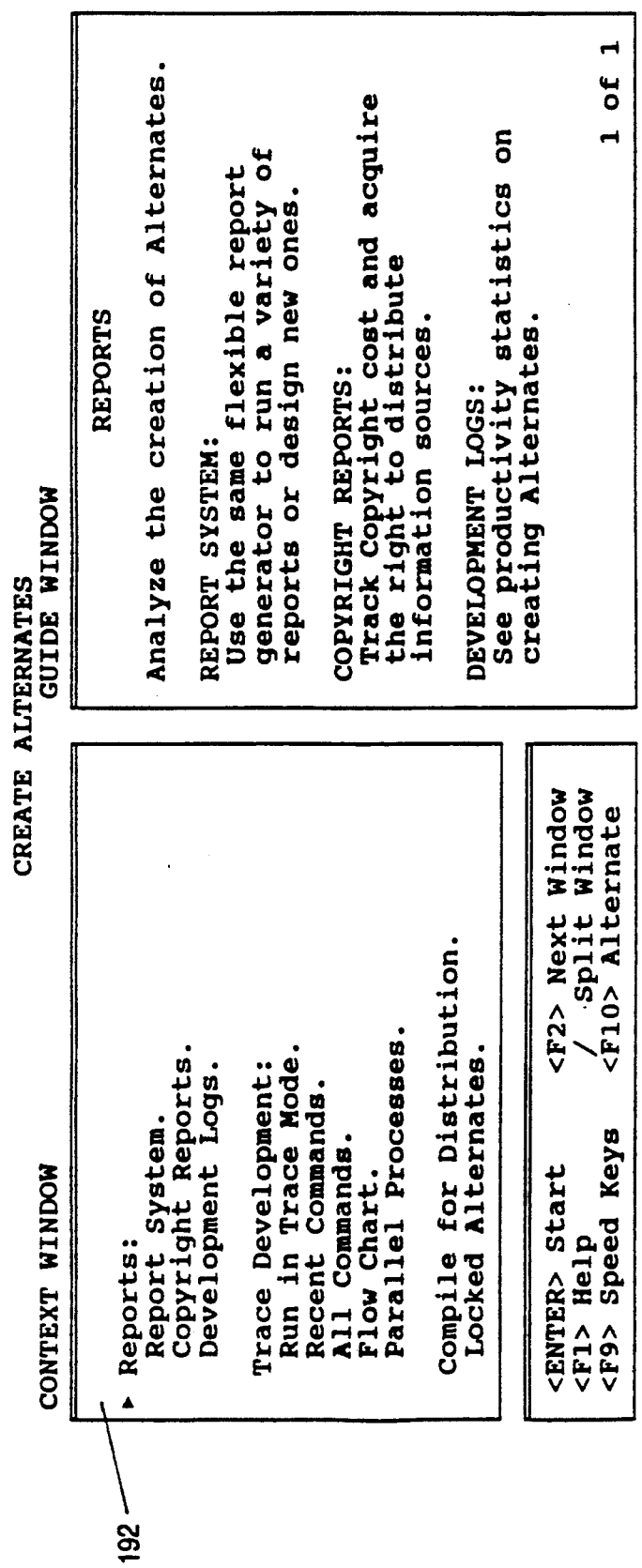
Figure 17C:
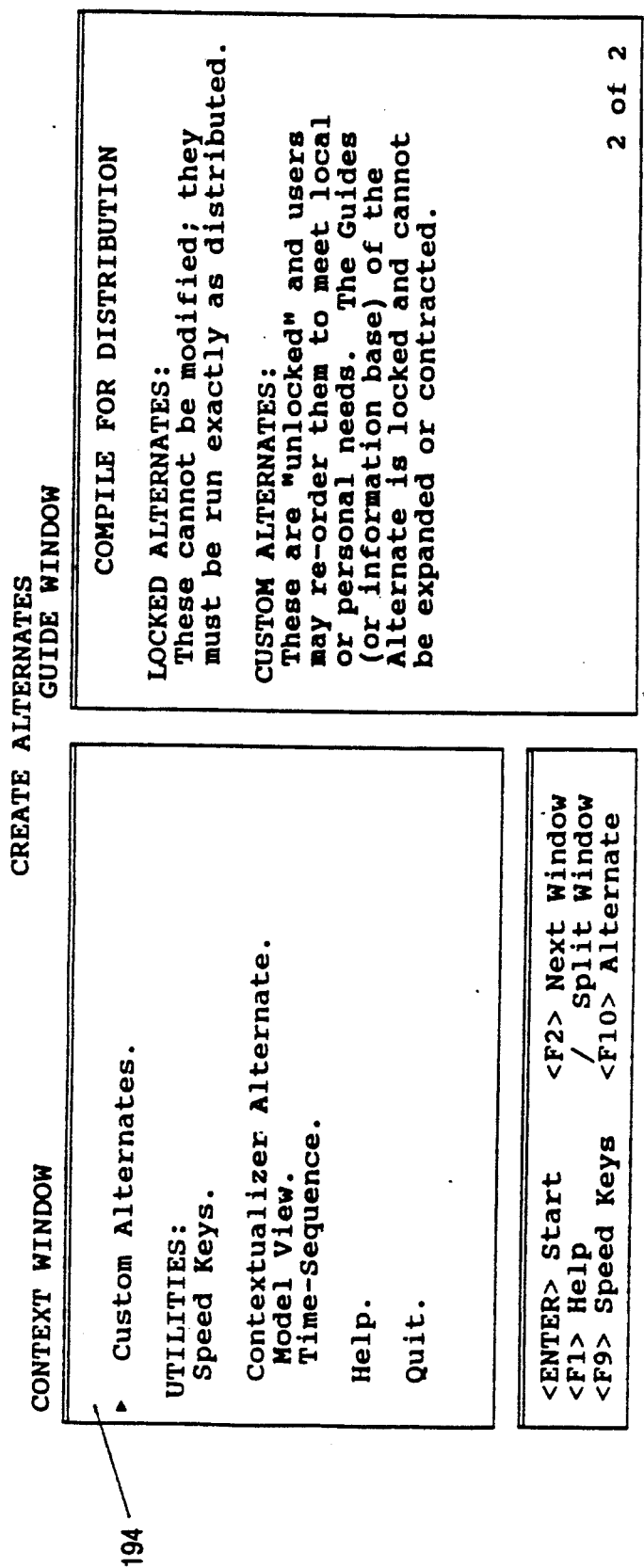

Turning now to FIG. 17 and referring to FIG. 138, the list in the Context Window 190 has been expanded one level of detail 196 by pressing the <Plus> key 9018, 9019. As shown, the "Create Alternates:" portion of the software may have within it many various options and functions.

The user scrolls down to the second 192 and 10 third 194 screens of the "Create Alternates:" expanded menu by pressing <PgDn> 9028, 9029. All three screens of this menu 190, 192, 194 are printed in FIG. 17.

Figure 94:
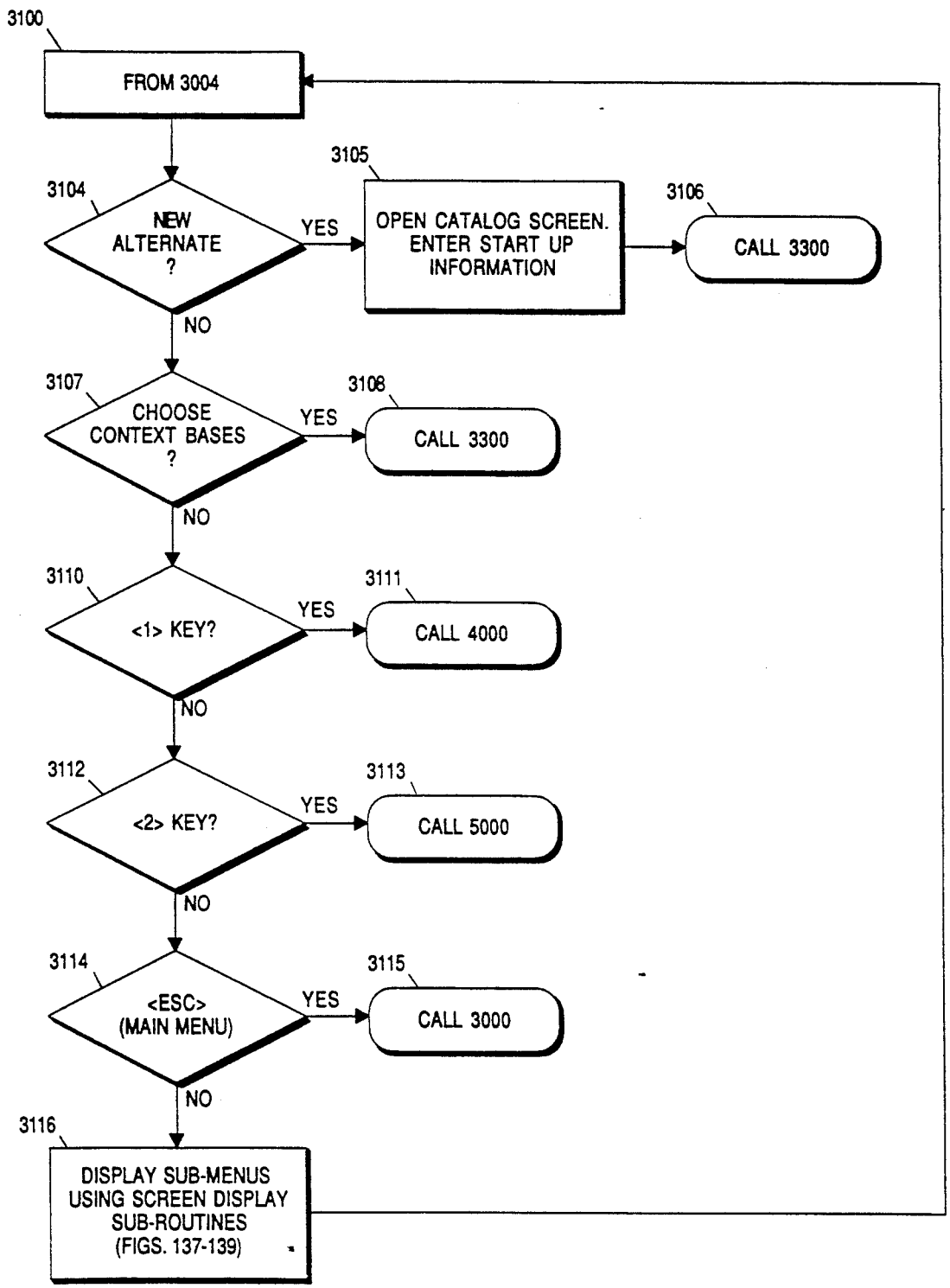
Figure 95:
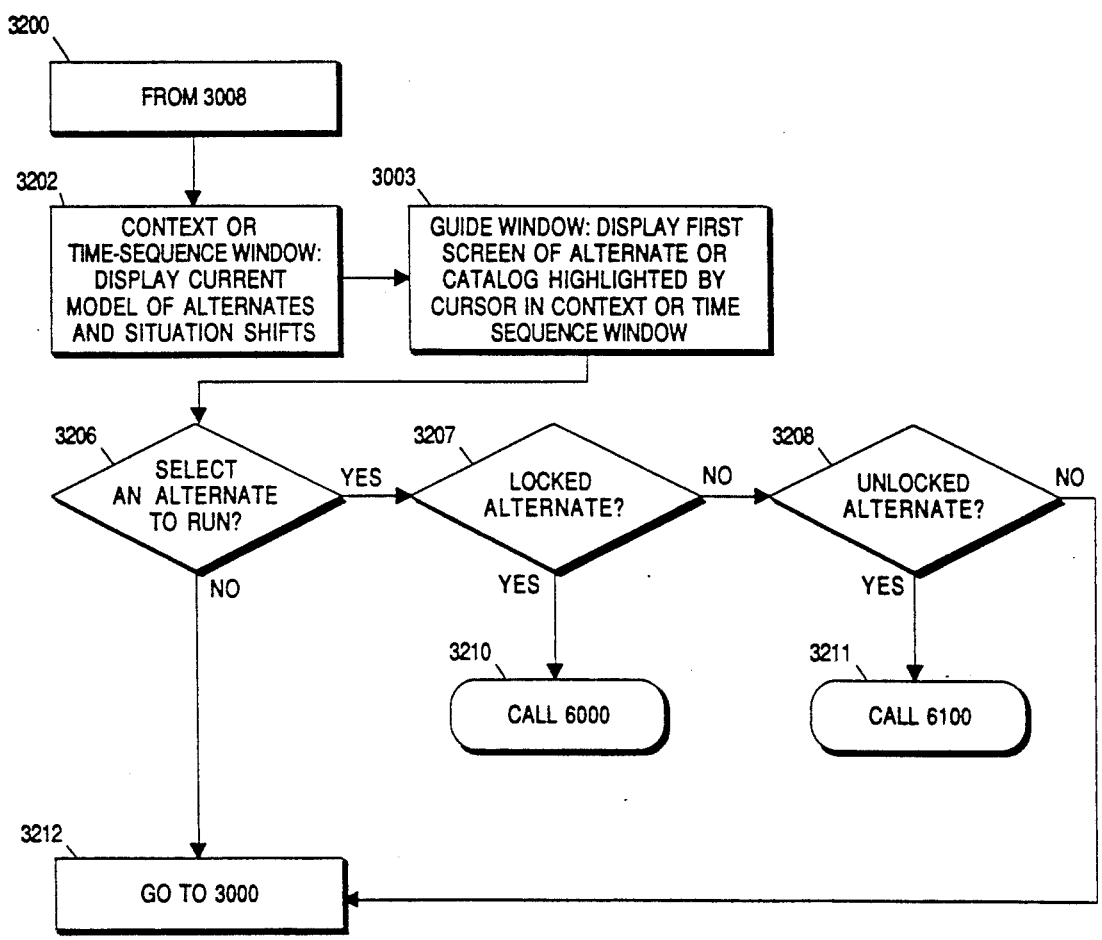

Now referring to FIGS. 17 and 94, the user returns to the top screen of the "Create Alternates:" menu 190 and places the cursor highlight bar on "New Alternate" 196, 3104 and presses <Enter>.

Figure 18A:
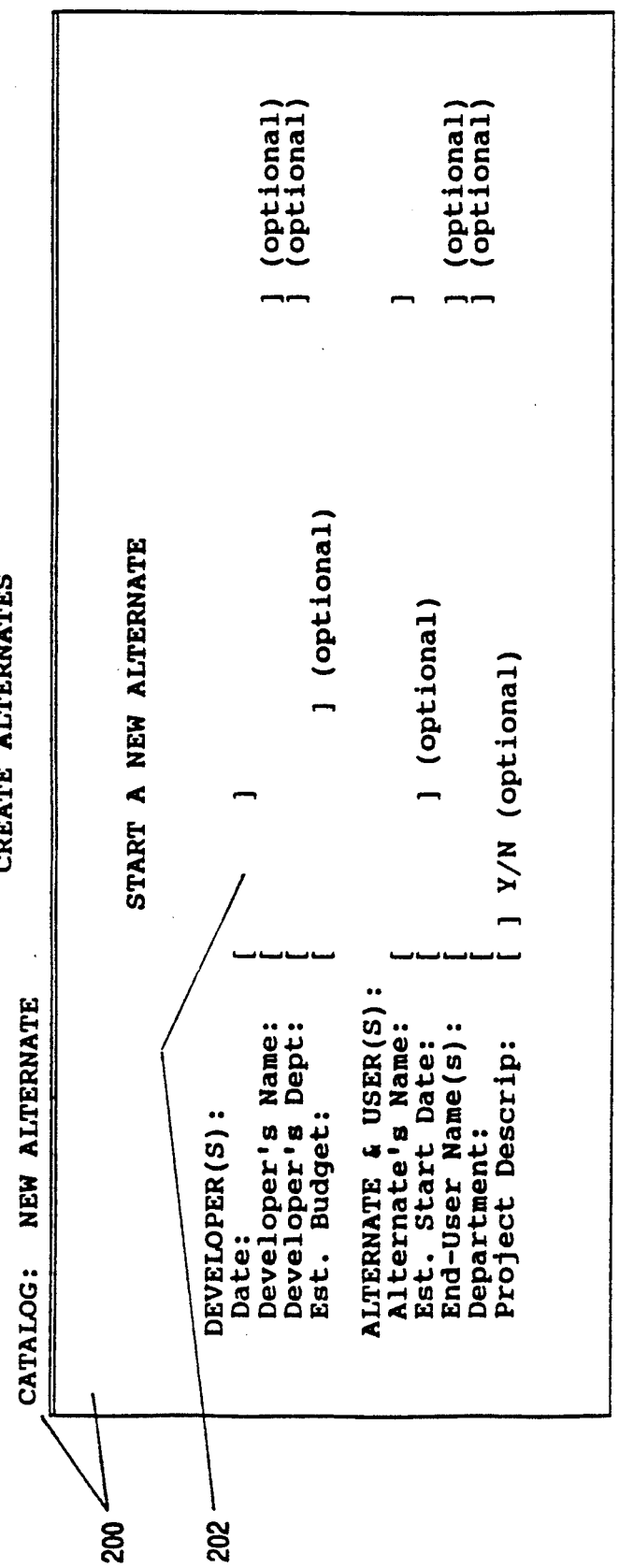
Figure 18B:
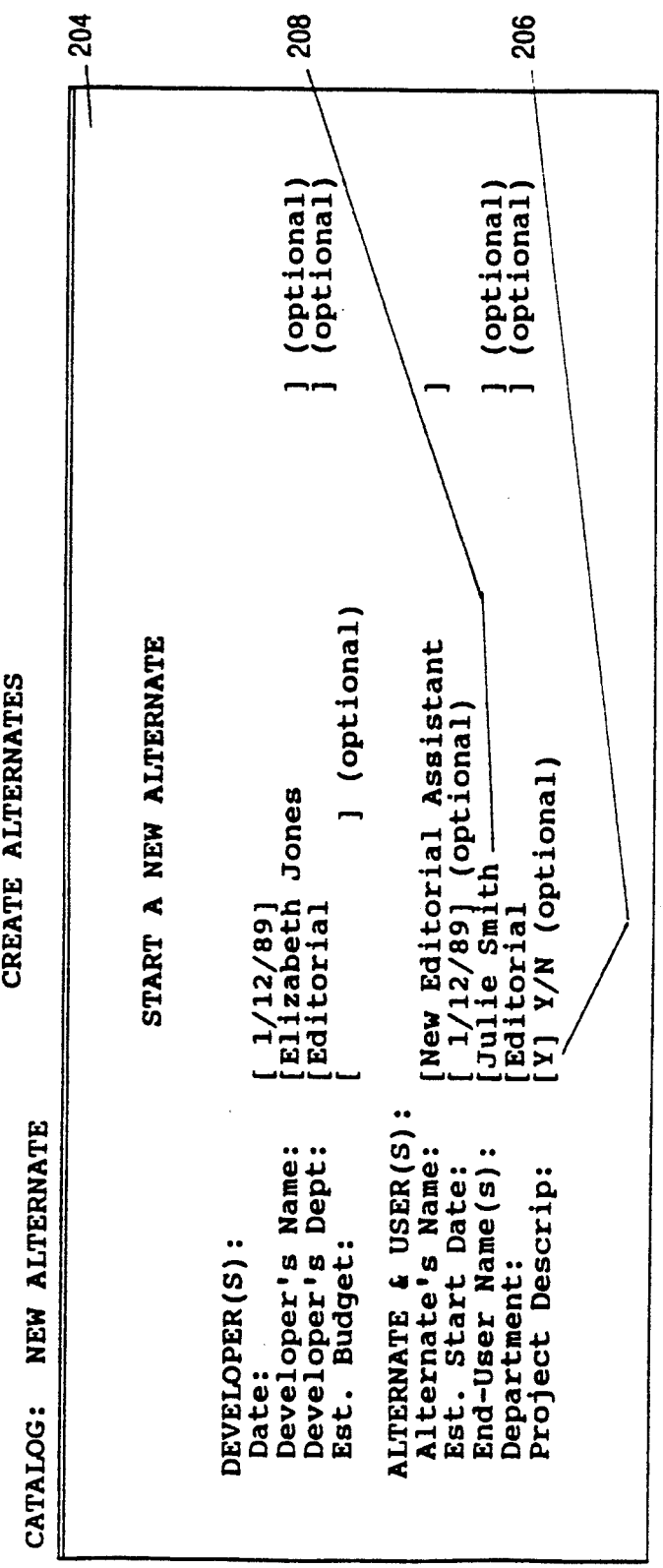

Turning now to FIG. 18, the top screen is the blank catalog for starting a new Alternate 200. To fill in this screen, the user types in the fields 202, 3105 individually. The second screen in this FIG. 204 shows a filled in sample screen for a sample Alternate for Julie Smith.

In the filled-in sample screen on the bottom of FIG. 18, the user has answered "Y" for the last field, "Project Description" 206. When the last field is selected as "Yes" and the user completes this screen, FIG. 19 shows that a "Notes/Concept" window 219 will be opened.

Figure 19B:
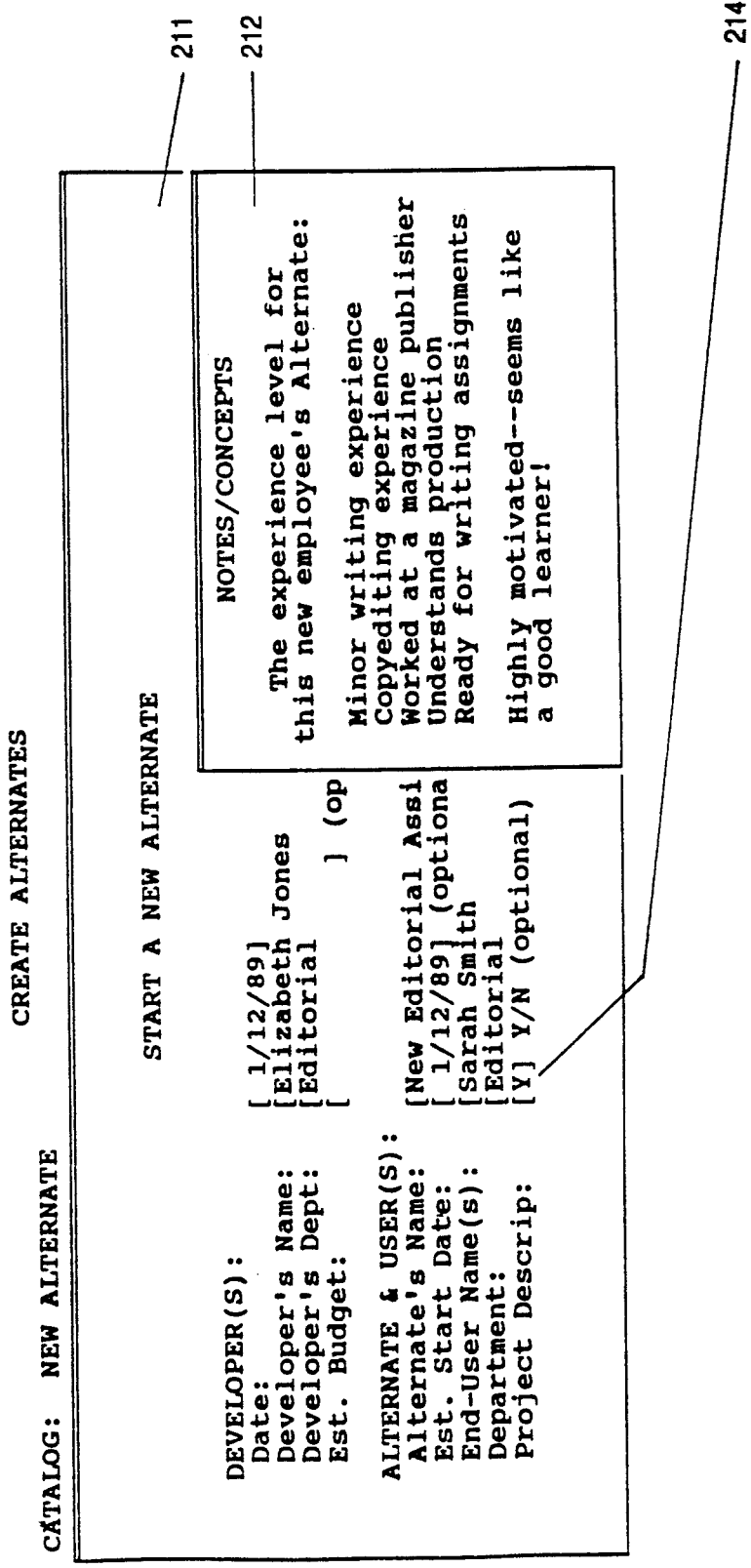

The Notes/Concepts sub-window 210 is shown in the lower right corner of the lower window 209 of FIG. 19. These Notes/Concepts are attached to this Alternate and may be opened at any time. They may also be modified at any time prior to compiling an Alternate for distribution.

These Notes/Concepts preserve information that describes the usefulness, origin, or any other aspect of this particular Alternate.

As shown in the Notes/Concepts 212 window in the second screen printed in FIG. 19, this Alternate is based on the specific experience level of the newly hired employee for whom the Alternate 211 was created. An Alternate may be created for an individual (by management or by that individual); a general job position (created by management or by the employee); a department (created by management); to distribute new perspectives, responsibilities, or information (by the Context Base); or to influence many other purposes, situations, or processes.

This Alternate 211 is specific to this individual. It is based on her experience in writing, copyediting, and publishing. It is also based on her motivation level, which reflects the pace at which she is expected to learn and grow. As a result of adding this description, it is possible to use this Alternate in the future, without changing it, if similar high-potential Editorial Assistants are hired again.

In the future, the Alternate may be modified by adding or removing specific Contexts that are needed or not needed by future Editorial Assistants. As a result, this Alternate is both re-usable and modifiable. If used as the basis for another Alternate, this Notes/Concepts description 212 assists in creating a similar but somewhat different Alternate.

Figure 20A:
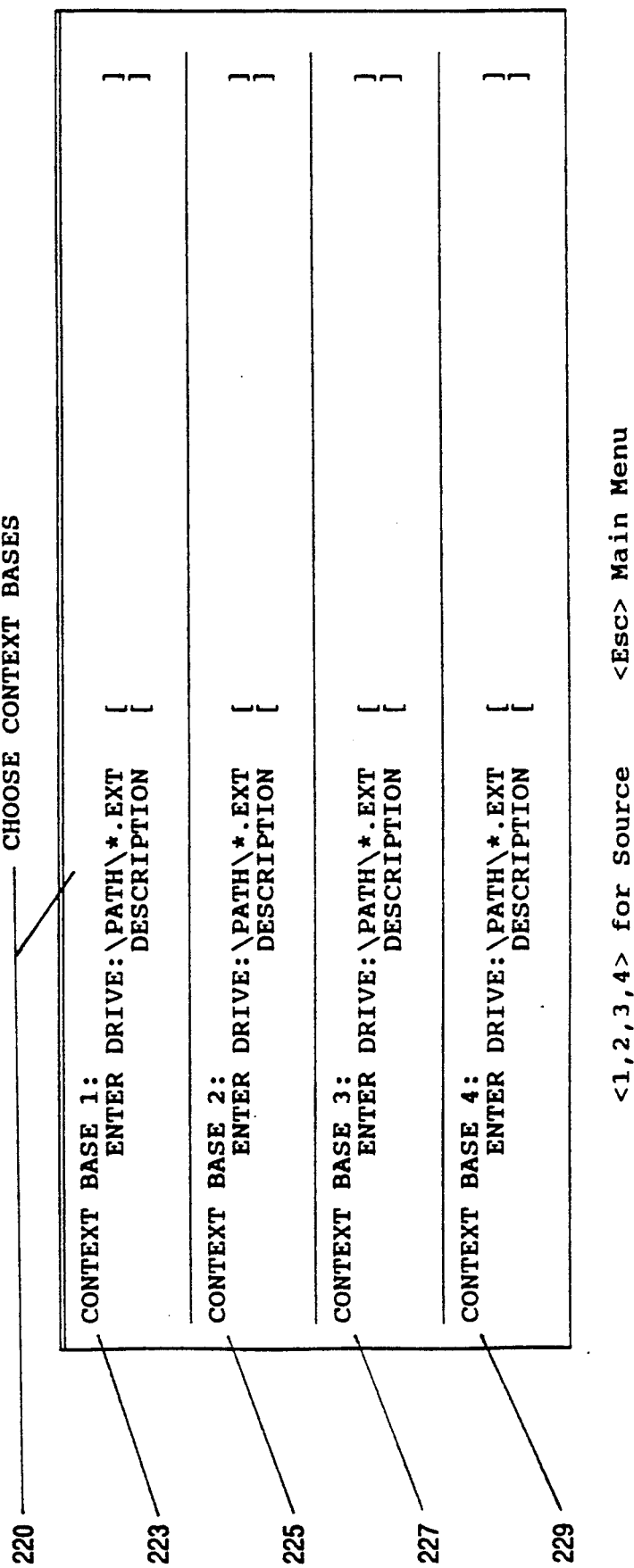
Figure 112:
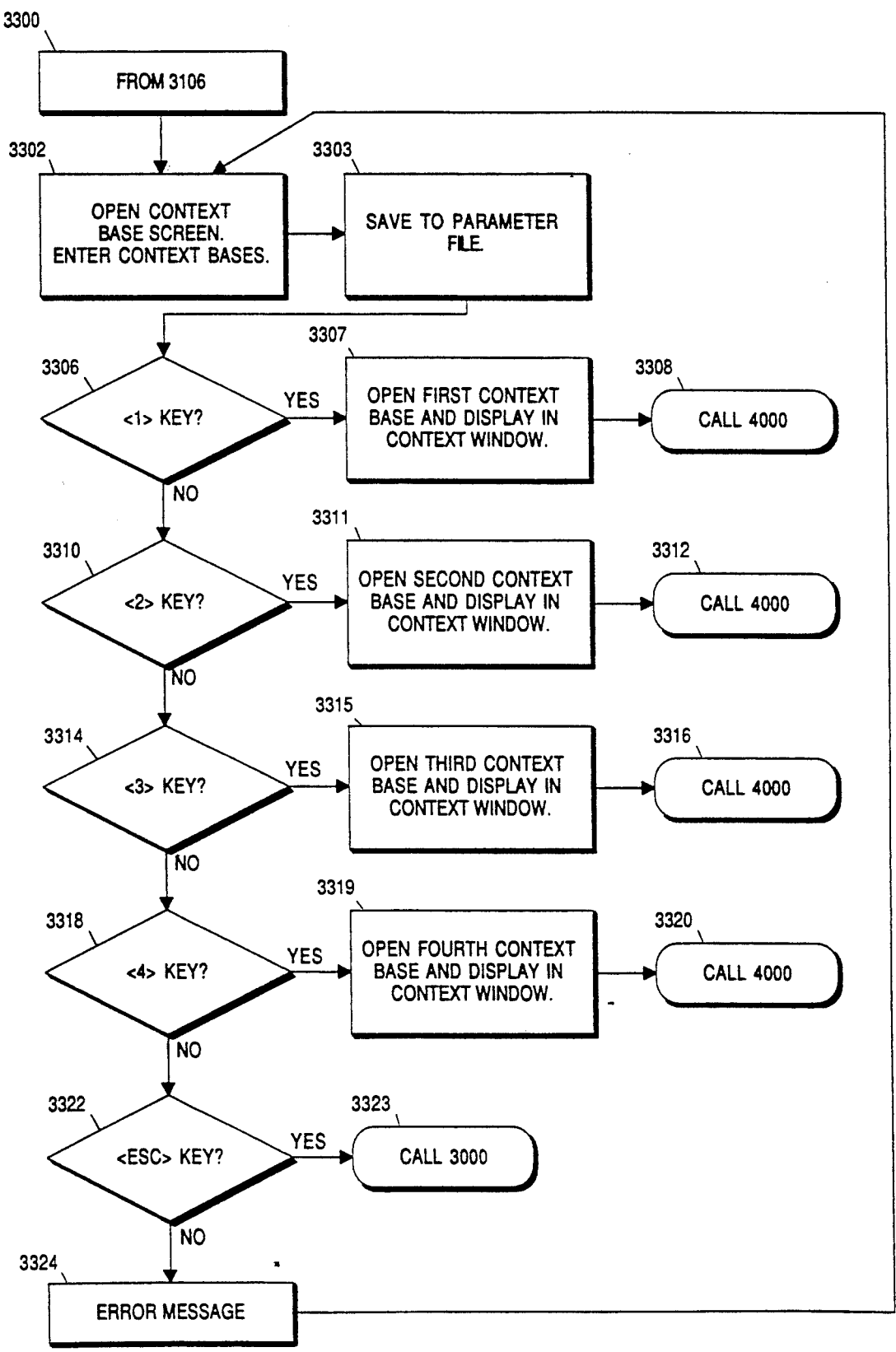
Figure 113:
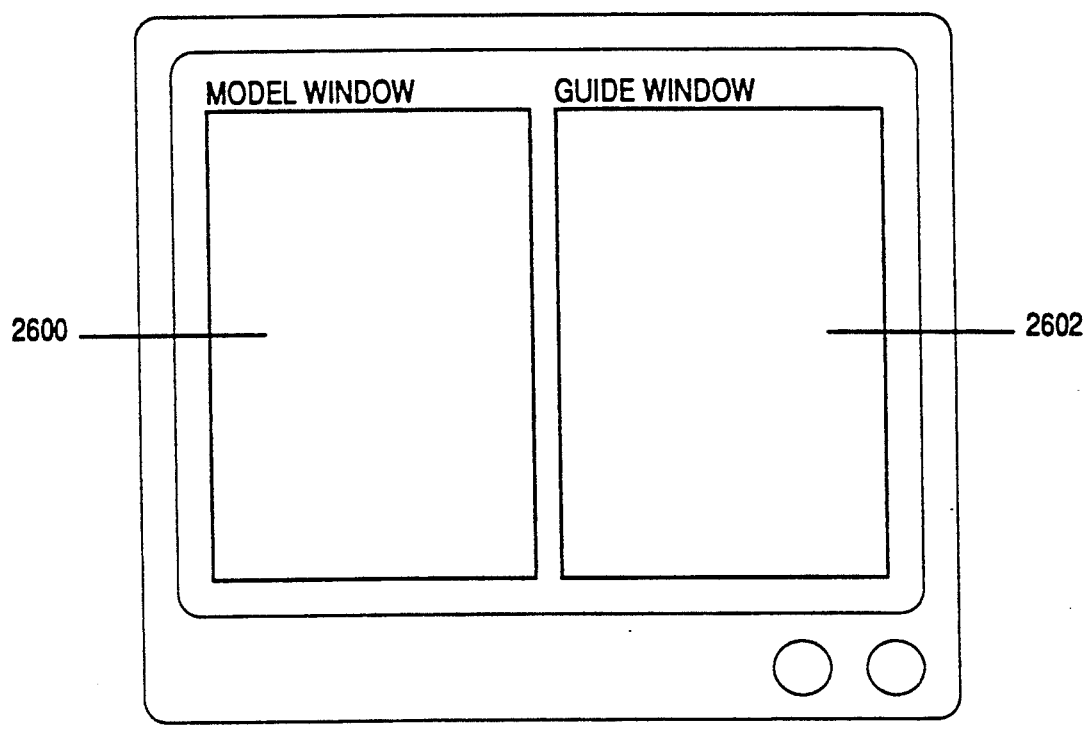
Figure 114:
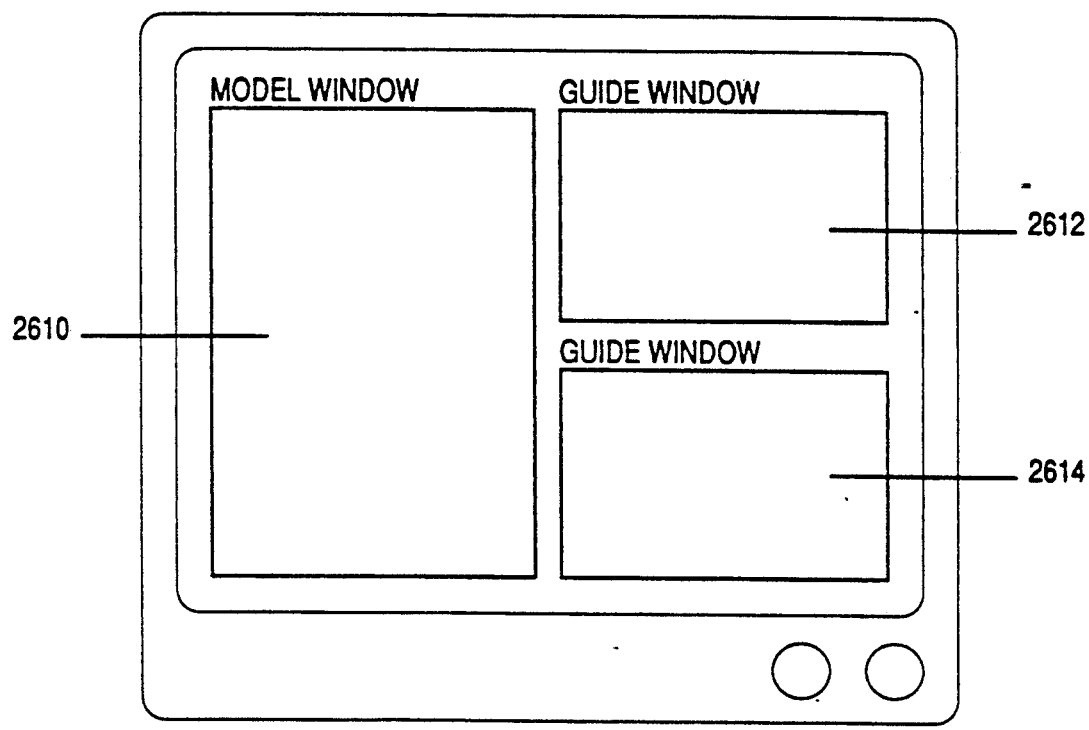

After returning to the main "Create Alternates:" menu, the user selects the "Choose Context Bases:" screen 220, 3302, which is shown in FIGS. 20 and 112. This screen 220, 3302 offers access to different Context Bases 223, 3306, 225, 3310, 227, 3314, 229, 3318 when creating a single Alternate.

This screen depicts a method for selecting up to four different Context Bases at one time. This process may be repeated if needed. The ability to access a larger number of Context Bases from this screen could be expanded.

The bottom screen 222 in FIG. 20 shows the Context Bases after they have been entered, including the display or entry of each Base s "Description" 224, 226, 228.

The first Context Base 224 in the bottom screen 222 of FIG. 20 is a simulated CD-ROM disc of "how-to" skills information for editors and writers that has been compiled by the present inventor as an "Editorial Department Context Base". FIG. 21 shows an excerpt from one of the "Context Bases" simulated. The "Editorial Department Context Base" (as shown in FIG. 21) is based on a variety of published books, but it could include sources such as articles from periodicals, entire periodicals, or other types of information such as text, graphics, audio, or video. The type of information that can be accessed and displayed is limited only by the capacity of the computer to access and display it.

The second Context Base 226 in the bottom screen 222 of FIG. 20 is the company's unique internal policies and procedures. This source will generally originate from one or more information systems or other internal sources owned by the company, including its computers and other information media.

The third Context Base 228 in FIG. 20 is an "unlocked Alternate" (defined in more detail later) containing expertise in the specific field in which this new Editorial Assistant will work. This field is CBT (Computer Based Training). This Context Base provides her rapid access to expert answers to all types of questions. This will help her (1) learn about CBT on a "need to know" basis, and (2) appear (in her writing, research, and dealing with writers) functional at a greater level of expertise than would be possible without extensive reference sources.

This third Context Base illustrates that any Alternate can serve as a Context Base from which Contexts and Guides can be collected to create or modify other Alternates. This supports the creation of a rich, interlinked information environment. Complex organizations function like the links in a chain with the work output of one group typically forming the input of other groups. In a similar way, the Alternates used to guide or assist the work of one employee or group are likely to offer Contexts and Guides that are useful for others in the organization. With this invention this information may be rapidly accessed and flexibility rearranged for the purposes and use of other departments or individuals throughout an organization.

Many types of Contexts and Context Bases are possible. The prototype in FIG. 20, for example, has three different types of Context Bases: job skills 224 (those generally needed in an Editorial Department), company Contexts 226 (how that particular department in that company wants the job of Editorial Assistant done), and expertise Contexts 228 (the field of CBT in which that Editorial Assistant will work). Additional types of Context Bases might concern processes, relationships, products, and market.

Processes

These might include Contexts an employee may need to use for new or existing manufacturing processes, such as in biochemistry: if biologists are working with unfamiliar chemicals, the Alternate might provide Contexts that relate to chemicals used [when A is mixed with B it produces a carcinogen that must not touch your skin], safety [now that you are using chemical C, it is toxic and must be disposed of properly; press <F#> function key to call up the appropriate procedures]; new procedures [the quantity of liquid in the new tank must not fall below level X nor rise above level Y]; systems [record the manufacturing errors by using the following new codes . . . ], etc.

Relationships

Contexts that describe how to function better with others in complex organizations. For example, relationship formation in a complex, multi-divisional or multinational business unit, corporation, or organization. Relationships Contexts might be cross-cultural, including customs, unique technical jargon in a foreign language, specific business customs or procedures, and knowledge about expanding relationships with a particular person or group (whether inside or outside of one's company).

Products: (Supply-Side Improvements)

New Contexts could apply to current or new products or services that are being manufactured or sold. By using an Alternate, the range of Contexts that apply to new or current products may be expanded. This may improve the value or usefulness of a company's product(s) to customers by providing faster responsivenes, a wider diversity of product uses, and more accurate information to assist with individual customer needs.

Markets: (Demand-Side Improvements)

New Contexts could apply to rapidly evolving market segments. For example, if one is in the health care industry and is selling to respiratory therapists in hospitals, specialized expertise Contexts may be needed to understand the procedures used with a new product. In addition, buyer Contexts include hospital purchasing procedures, capital budgeting, and payment options. By preparing an Alternate, a company might be able to launch a new product for respiratory therapists and before the first day give its nationwide sales force an Alternate that enables them to customize the specific Contexts of each buyer relationship for this new product, no matter what the responsibilities of the person they are communicating with (which may blend medical specialization, purchasing responsibility, and department administration).

These and other types of Context Bases (such as technologies or competitors) may be accessed and blended together through the Contextualizer to create supportive and useful Alternates.

Figure 22A:
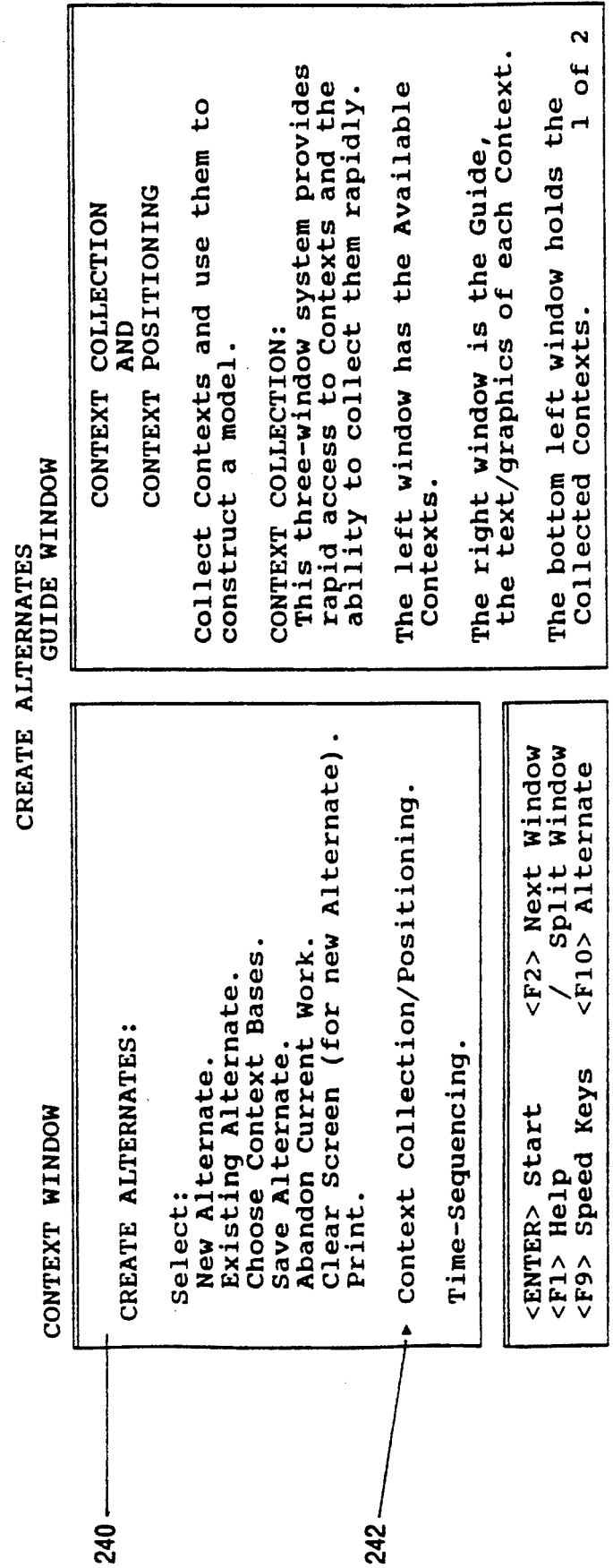
Figure 22B:
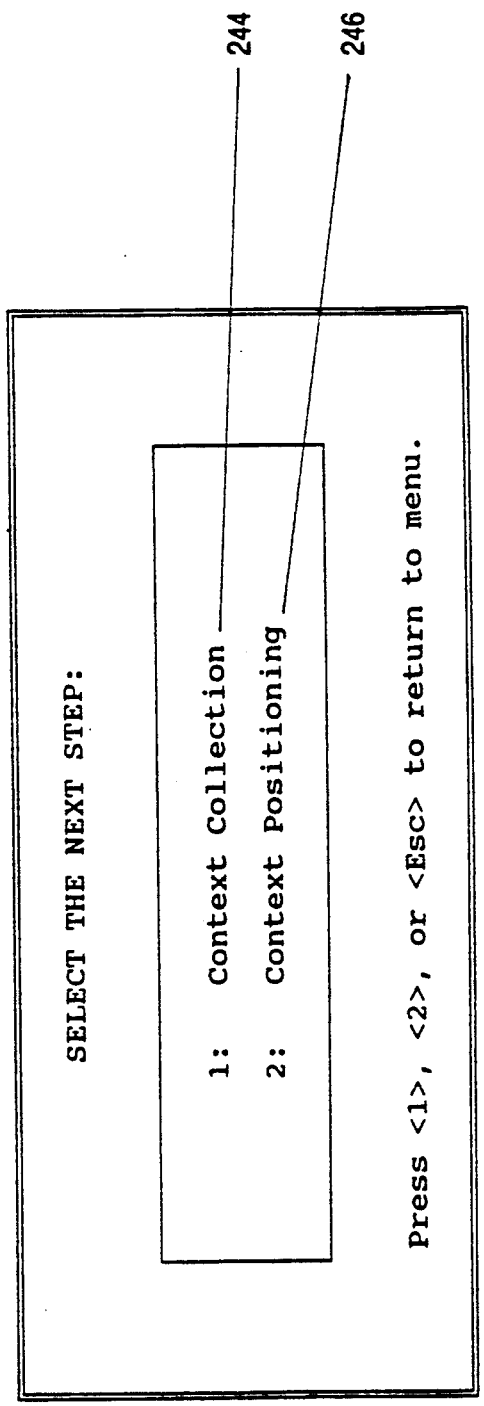

Referring to FIG. 22 and our example, the user returns to the "Create Alternates:" menu 240 and moves the cursor down to "Context Collection/Positioning" 242. By pressing <Enter> the bottom screen in this Figure offers two choices: First, collect Contexts 244,3110 and second, position Contexts 246,3112. The user presses <1> to begin Context Collection.

Figure 23A:
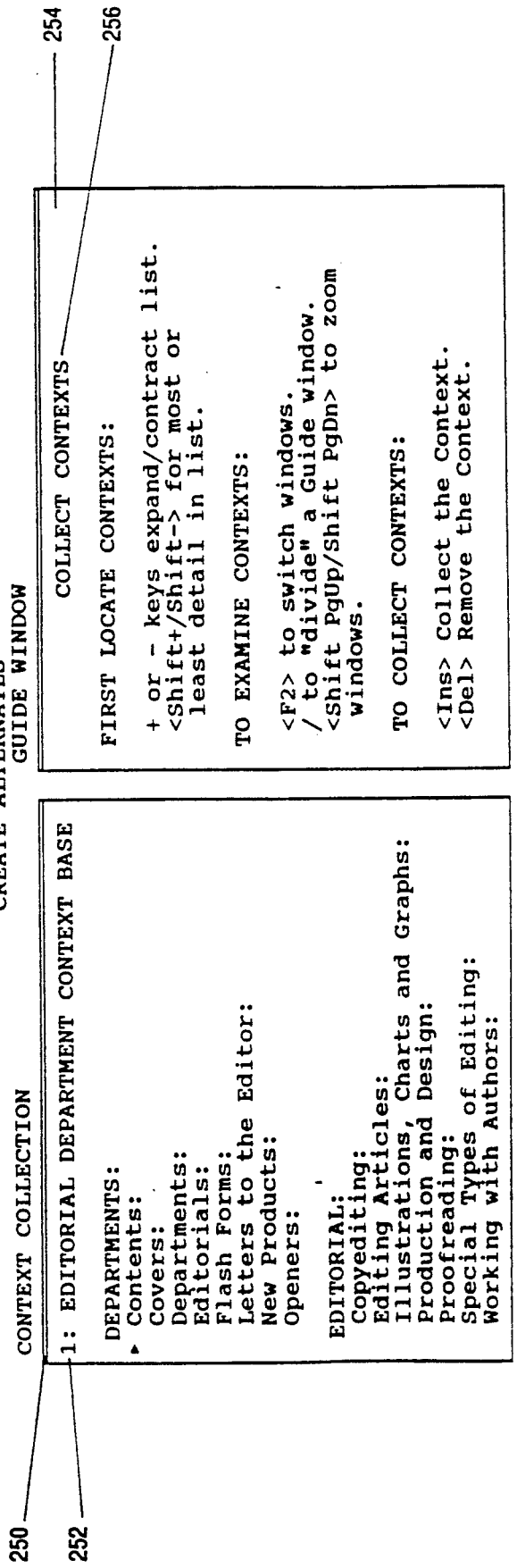
Figure 23B:
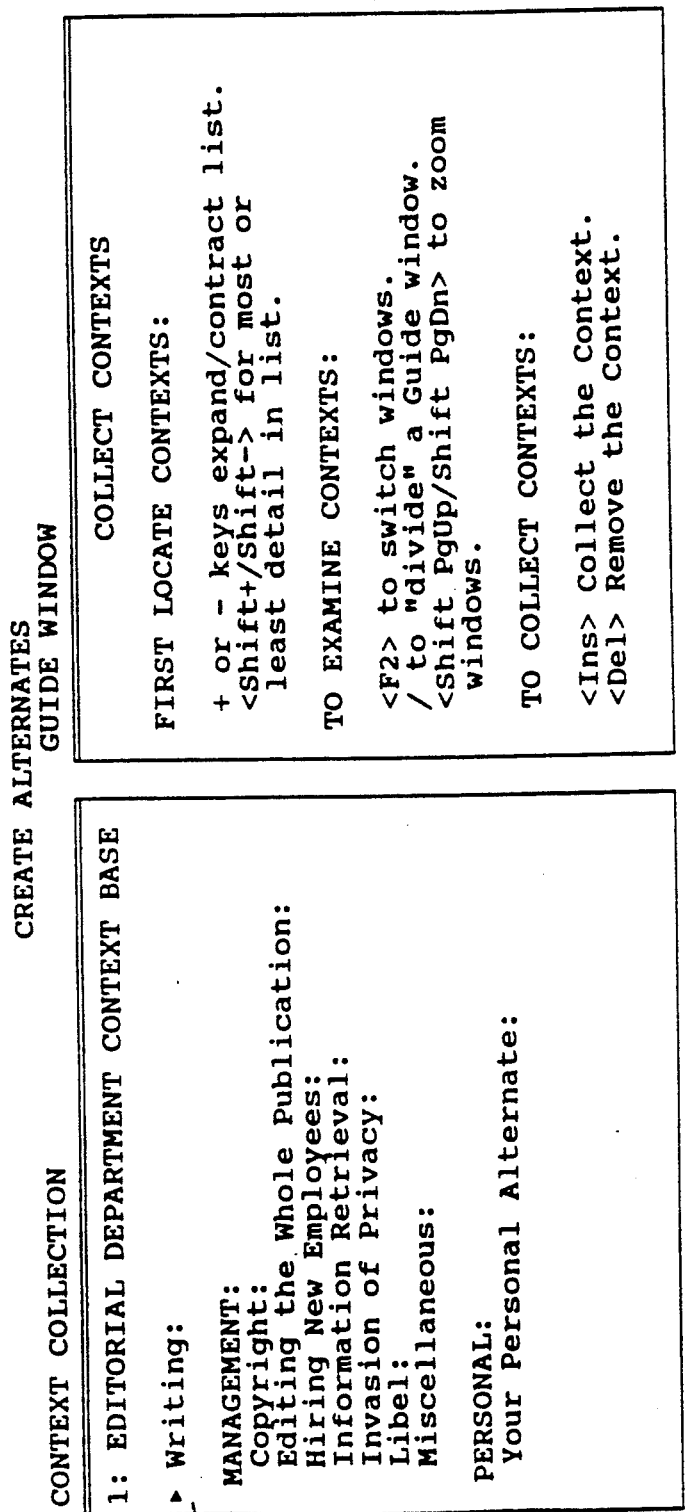

Referring to FIGS. 23 and 112, entering Context Collection starts automatically at the first source, the "Editorial Department Context Base" (previously selected by the user) 224, 3307. For the user's clarity in navigation, the prototype shows this in the left Context Collection window 250, on its first (top) line 252. The number "1:" means the first Context Base, and the name of that Context Base is also displayed.

Referring now to FIGS. 23 and 138, in the right-hand Guide Window 254, 9017, general how-to instructions 256 may be displayed when the cursor in the left window is not on a specific Context 9016. Since the user is in the Context Collection window250, this Guide Window explains some of the steps in how to collect Contexts from Context Bases. As a result, the user sees the main keys to operate the process of collecting Contexts.

The two screens in left Context Collection Window show the structure of the Editorial Department Context Base 250, 258, which is the structure of this Context Base. One page from that Context Base is also displayed in FIG. 21 230.

Figure 24A:
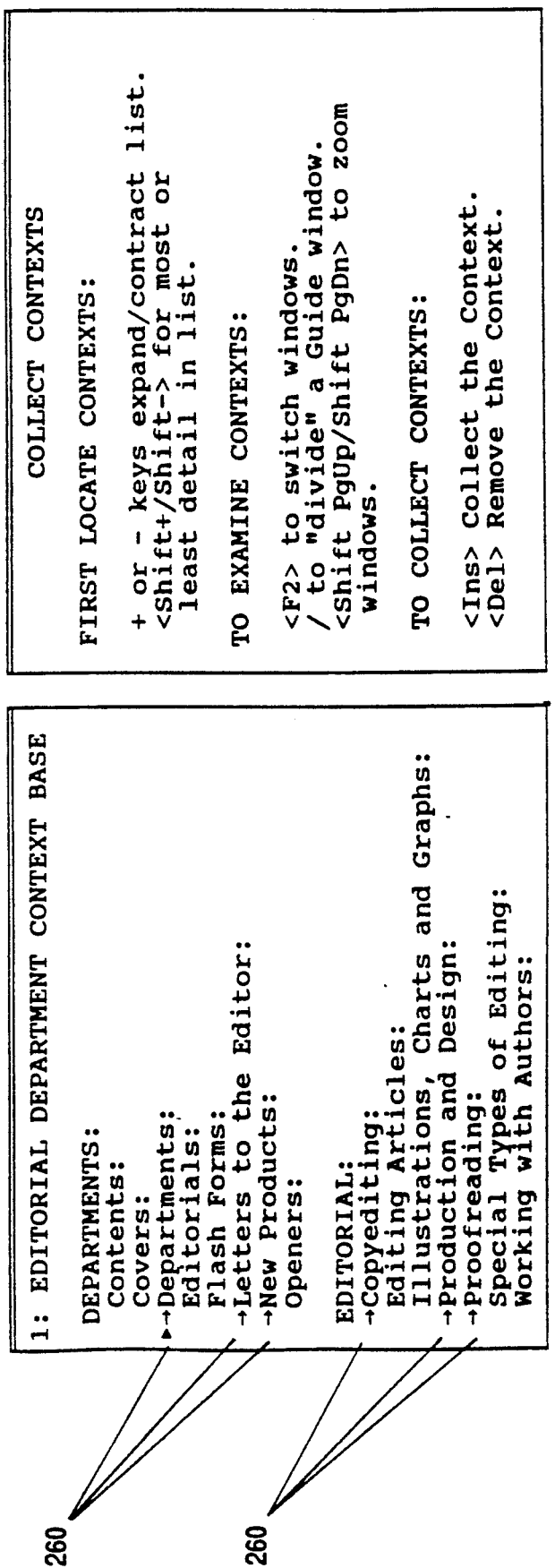
Figure 24B:
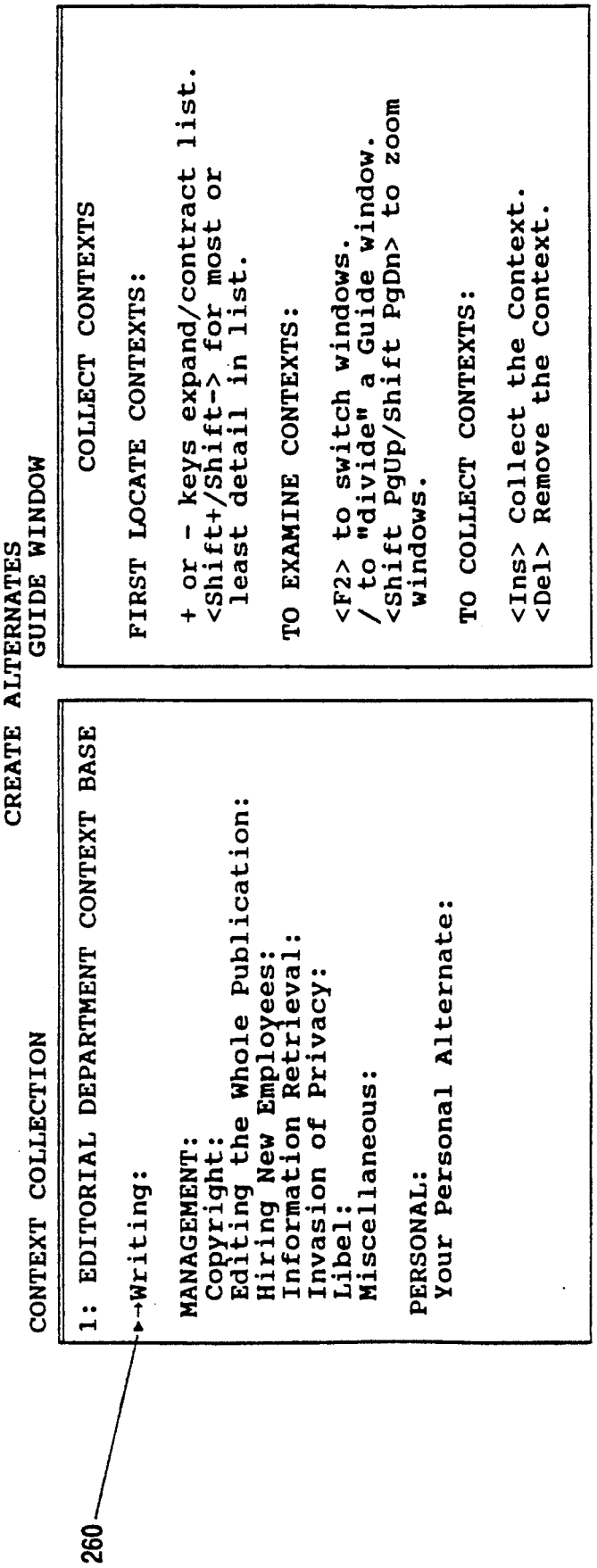
Figure 97:
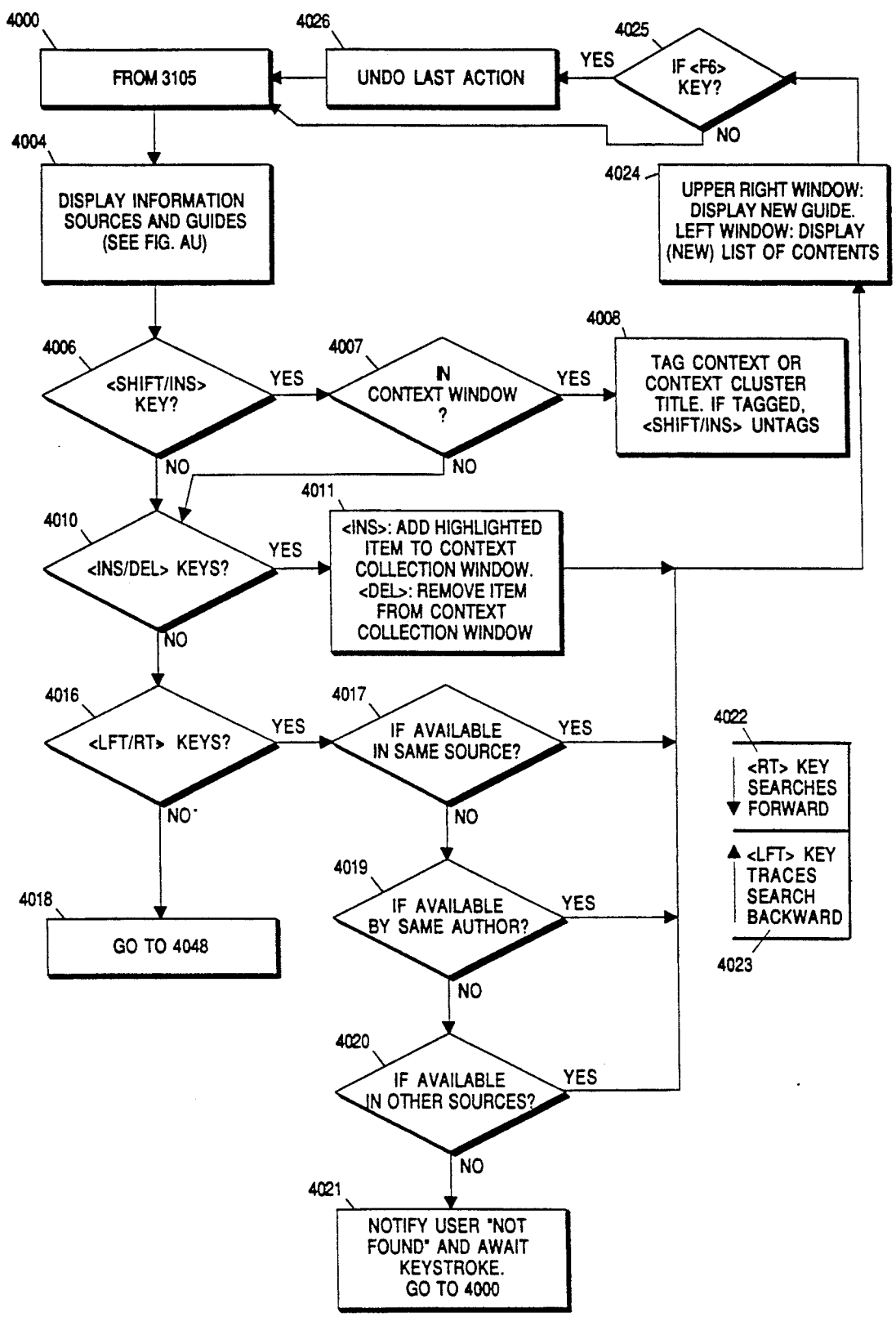

Turning now to FIG. 24 the user sees in reverse highlight (arrows in the Figure) 260 the specific clusters of Contexts that he tagged one at a time (4006, 4007, 4008, in FIG. 97). These relate to the job skills that the new Editorial Assistant will need in her job. In the printed screens they are marked with an arrow pointing to the right. These may be explored one at a time or they may be explored all together. In the following text, the user will explore them one at a time.

Figure 25A:
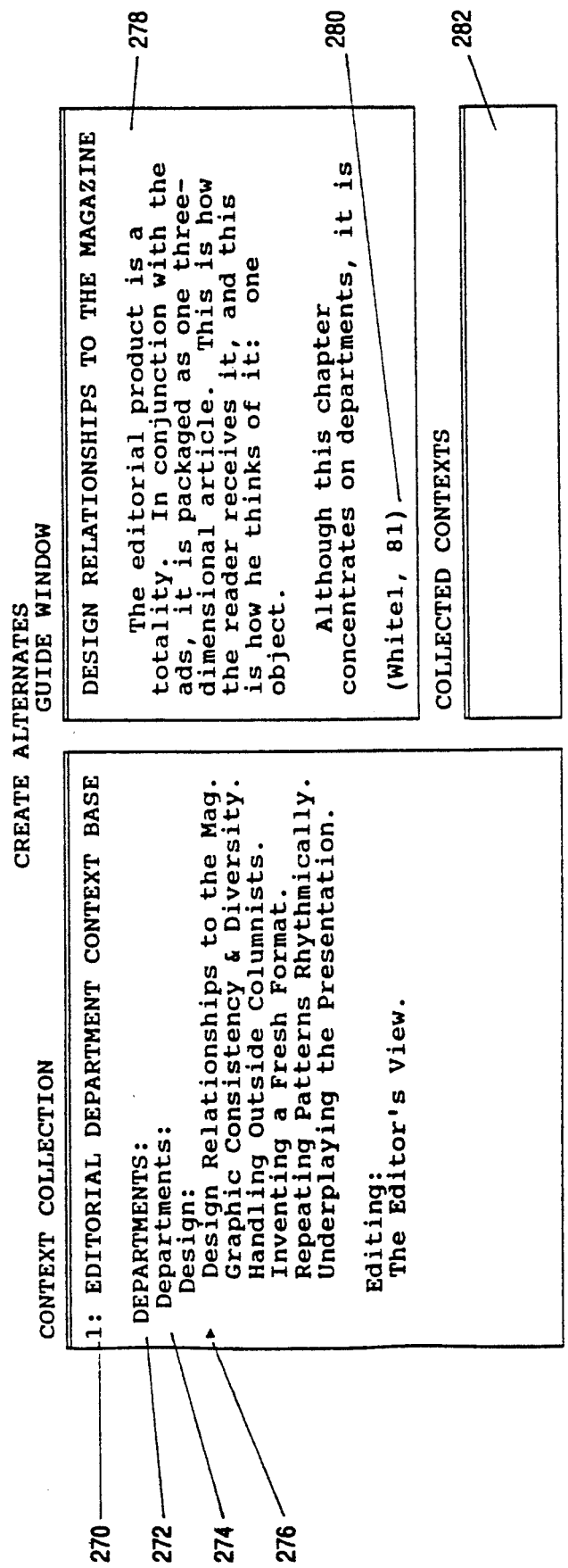
Figure 25B:
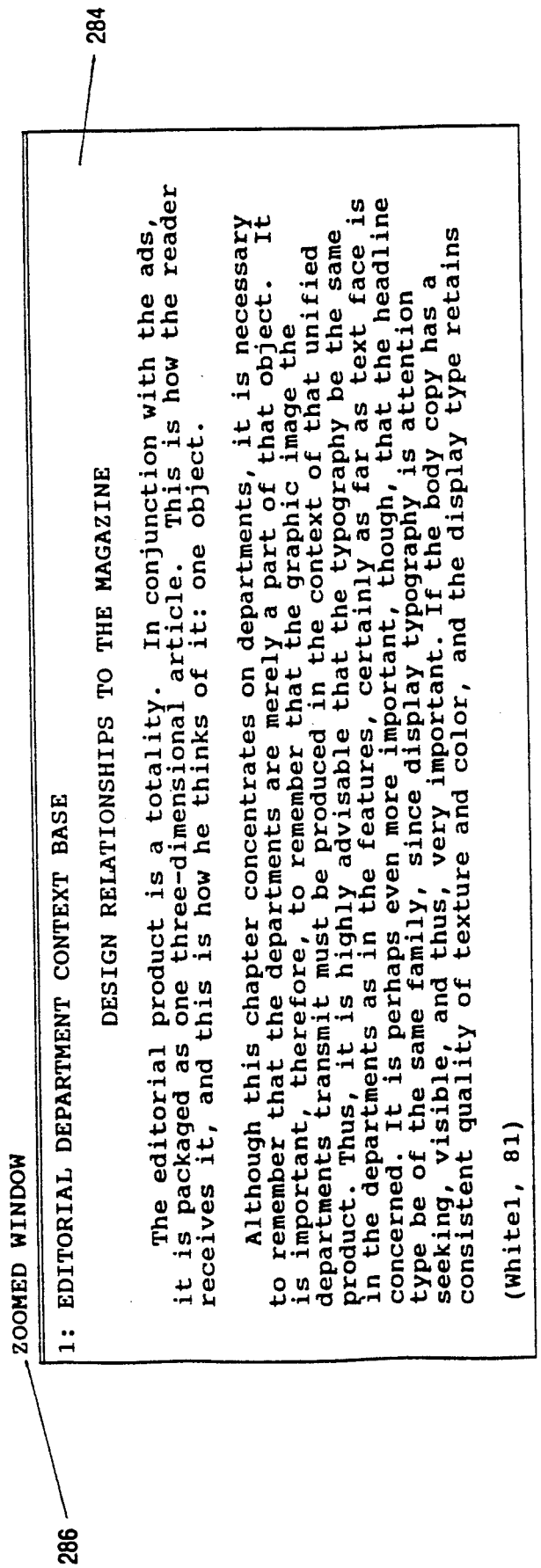

Referring to the top screen 270 in FIG. 25 and also to FIG. 138, by putting the cursor on the first cluster selected ("Departments:") and pressing the <Plus> key 9018 twice, this cluster expands to show all of its individual Contexts 9019. Referring to FIGS. 25 and 137, the user now sees the working of the punctuation at the end of each line in the Context Collection Window 9012, 9013. Both "Departments:" 272 and "Design:" 274 have colons after them because they have additional Contexts below them. Each of the individual Contexts 276 has a period after it because it does not have subsidiary Contexts below it. The cursor is on the first Context, which is "Design Relationships to the Magazine" 276,9002. The content of that Context is displayed in the top right Guide Window 278, 9003. In the Guide Window 278, 9003, the bottom line 280 shows the source of that guide and the page number in that source on which it begins.

Figure 96:
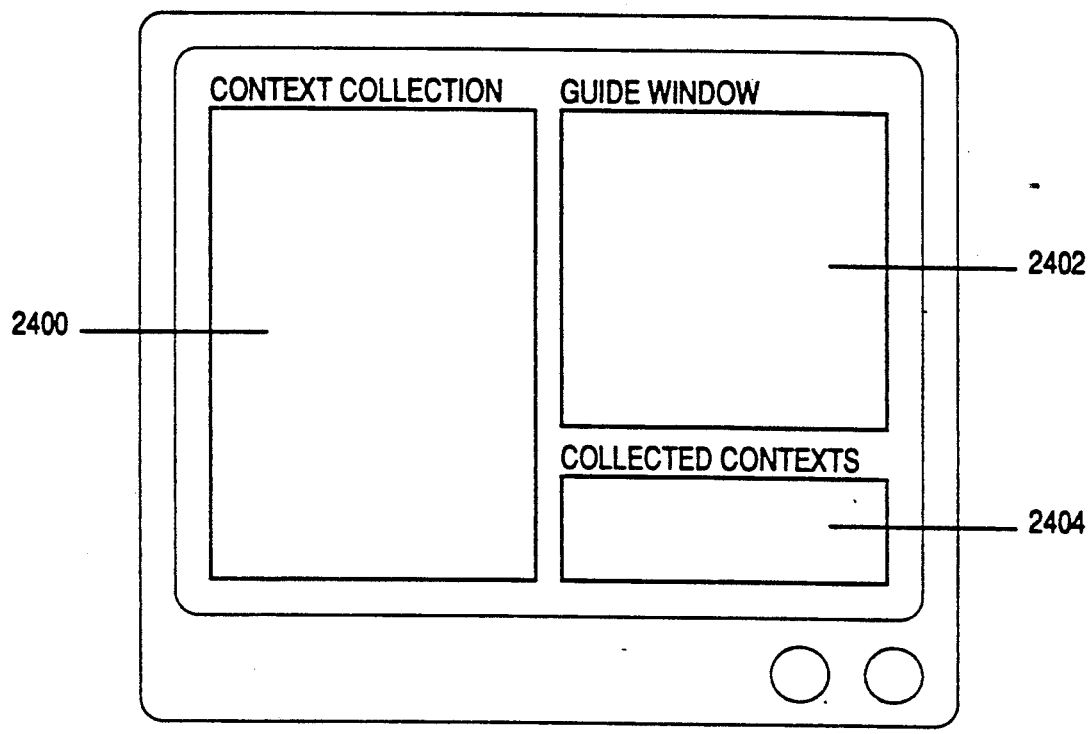

In FIGS. 25 and 96 there is also a third window 282, 2404 on the lower right, called "Collected Contexts." This window is displayed automatically as part of the process of Context Collection. The user may examine, at any time, the Contexts that have been collected for that Alternate.

At the bottom of FIG. 25 and referring also to FIG. 137, the user has moved to the Guide Window 278, 9003, by using <F2> 9010, the "switch window Function Key" 9011. The user then zoomed the Guide Window to fill the entire screen 284. In FIG. 139, the zooming function 9040-9044 is described. The fact that this is a zoomed window is displayed in the upper left 286.

As shown in FIG. 138, the user may use a zoomed Guide Window to examine the content of any Context 9024-9034. Keys such as "Page-down" or "Page up" may be used to examine various portions of the guide 9028, 9029. Keys such as "Home" or "End" may be used to jump rapidly to the guide's beginning or end 9024, 9025. Based on examining the guide, the user has decided to "collect" this Context.

Figure 26A:
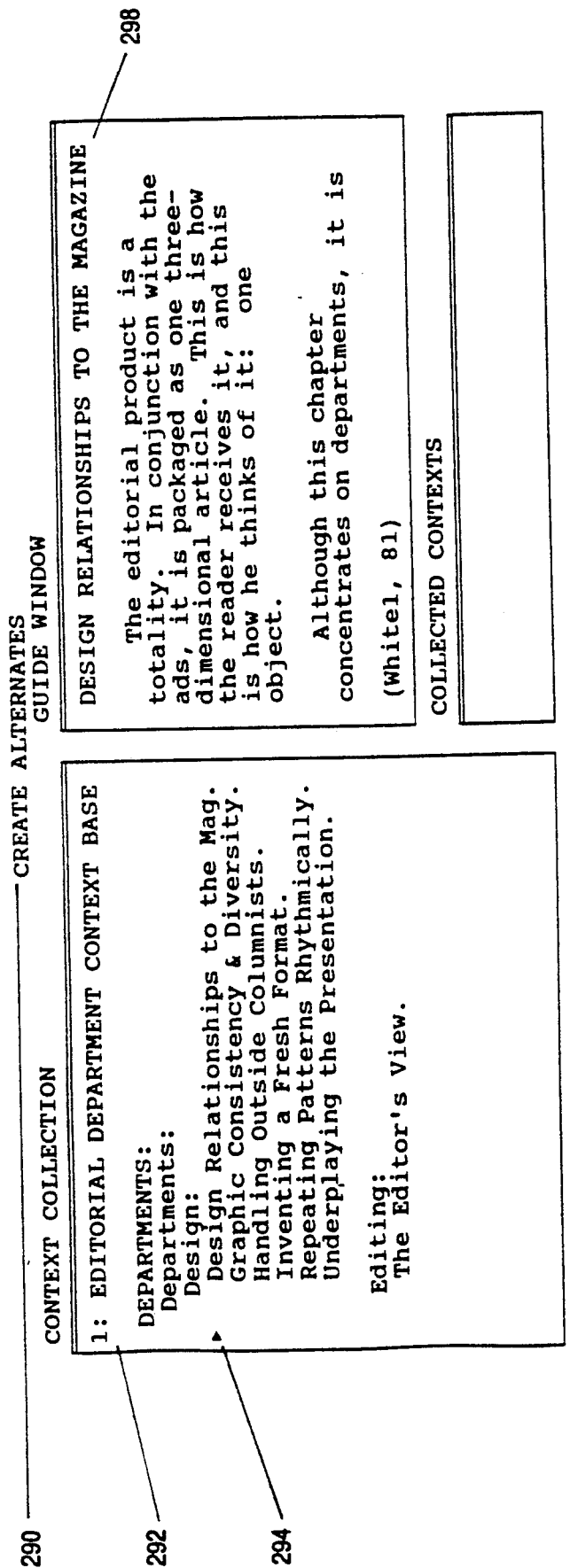
Figure 26B:
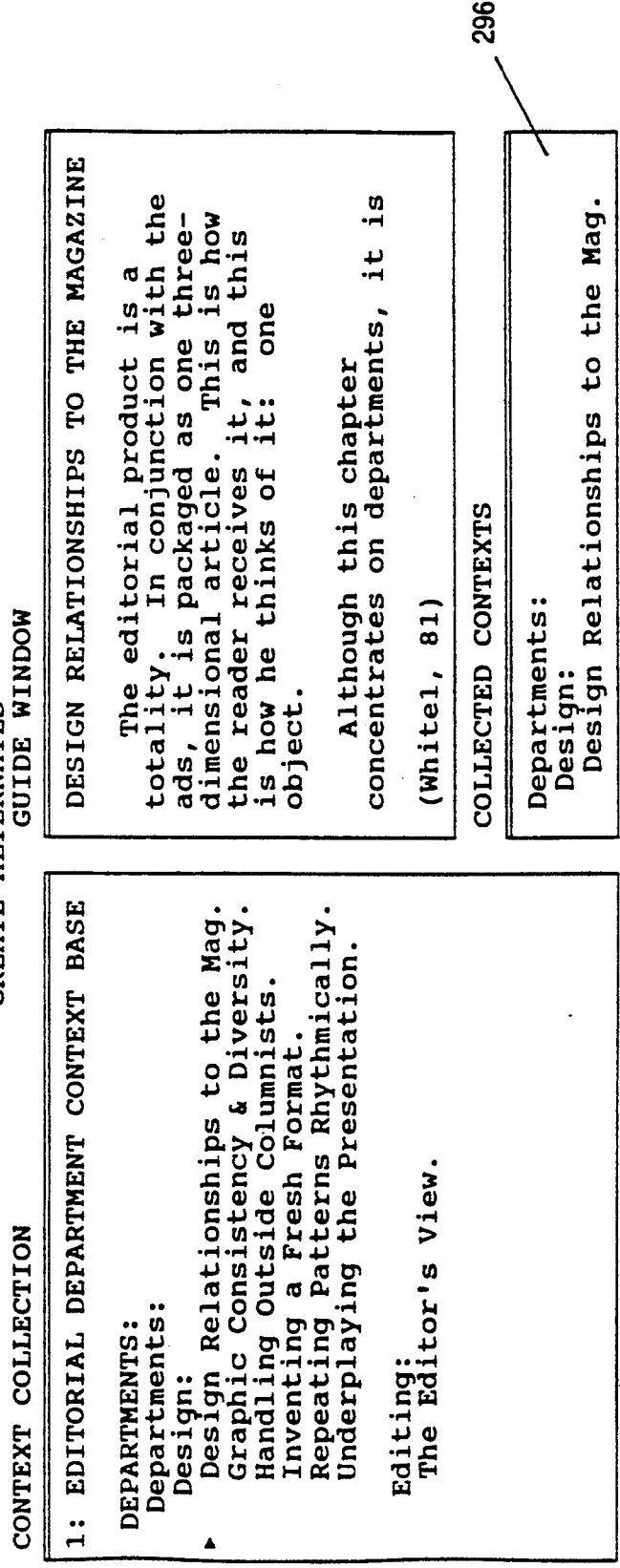

Turning now to the top screen 290 in FIG. 26, the window has been zoomed back down (9040-9044 in FIG. 139) and the user has switched (9010, 9011 in FIG. 137) to the left Context Collection window 292. Referring to FIG. 26 with FIG. 97, with the cursor on the desired Context 294, the user presses the <Insert> key 4010, 4011 which collects this Context to the Collected Contexts window 296 at the lower right of the screen.

Context Collection is a scaffold that makes it possible for users to move rapidly through large and diverse Context Bases and rapidly collect the Contexts they will use to fabricate Alternates.

Context Collection involves at least three simultaneously interacting windows 292, 2400, 298, 2402, 296, 2404, as illustrated in FIG. 26 and 96. In the invention, the primary use of these windows is to provide simultaneous access to information at different stages of its identification, collecting, rearrangement, and management in real-world situations. In general, the user whose window display is configured as in FIGS. 26 and 96 would select Contexts in the left window 292, 2400 and switch to the top right window 298, 2402 to examine the Guides in detail. As described in FIG. 137, the user switches from one window to the next by pressing a Function Key 9010, 9011. (In the prototype, keys are named and numbered based on IBM PC/AT/PS2 and compatible keyboards.) FIG. 97 shows that Contexts are collected by pressing the <Ins> key 4010, 4011 when they are highlighted in the left window or are being examined in the top right window. In FIGS. 26 and 96, the bottom right window 296, 2404 shows the Contexts that have been collected.

In FIGS. 26 and 96, the left window 292, 2400 is called the "Context Collection" window. This window shows the items in the Context Bases in outline form with one item per line. In the left window, the items are listed according to subject. FIG. 97 illustrates a custom search 4016-4023. The user can rapidly do custom searches, as explained later. (An optional display format for the left window, called the "Cognitive Window," is explained below.)

In FIGS. 26 and 96, the top right window 298, 2402, is called the "Guide" window. This displays the text and graphics and other data in each Context. The Guides are the information that is collected and put to practical use in the Alternates.

The bottom right window 296, 2404 is called the "Collected Contexts" window. This is where the Contexts are collected so that Alternates can be constructed. (See the section on Context Positioning.) In actual use, a user moves seamlessly back and forth between Context Collection and Context Positioning simply by operating in different windows, which automatically changes their views and relationships, though these processes are described separately here. While this description makes it appear as if a user collects Contexts first and fabricates an Alternate separately in Context positioning, the user may follow any order of collecting and positioning Contexts desired.

The use of Contexts to create preferred situations is a complex process that may be done with multiple views and Contexts. The use of multiple windows (which may be overlapping windows instead of separate as shown in the Figure) provides access to simultaneous views and Contexts that are an essential part of gathering the Contexts needed to represent the user's conceptions.

Figure 27A:
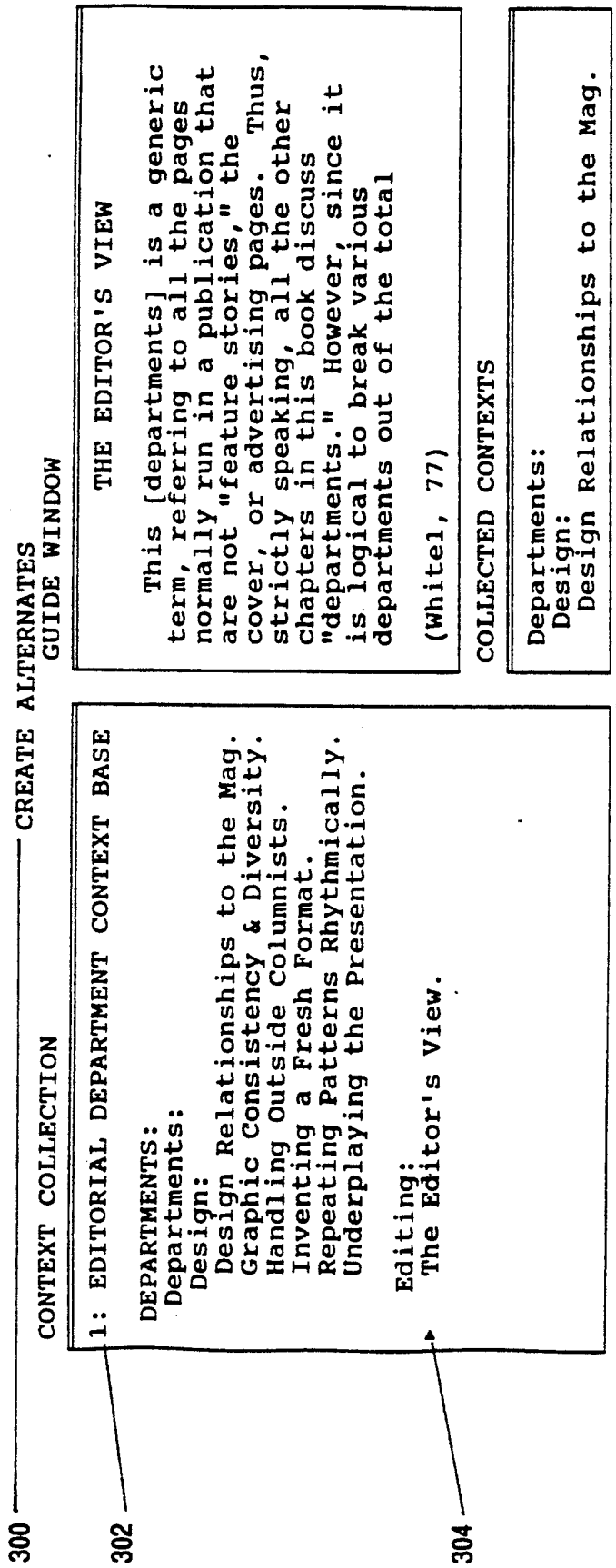
Figure 27B:
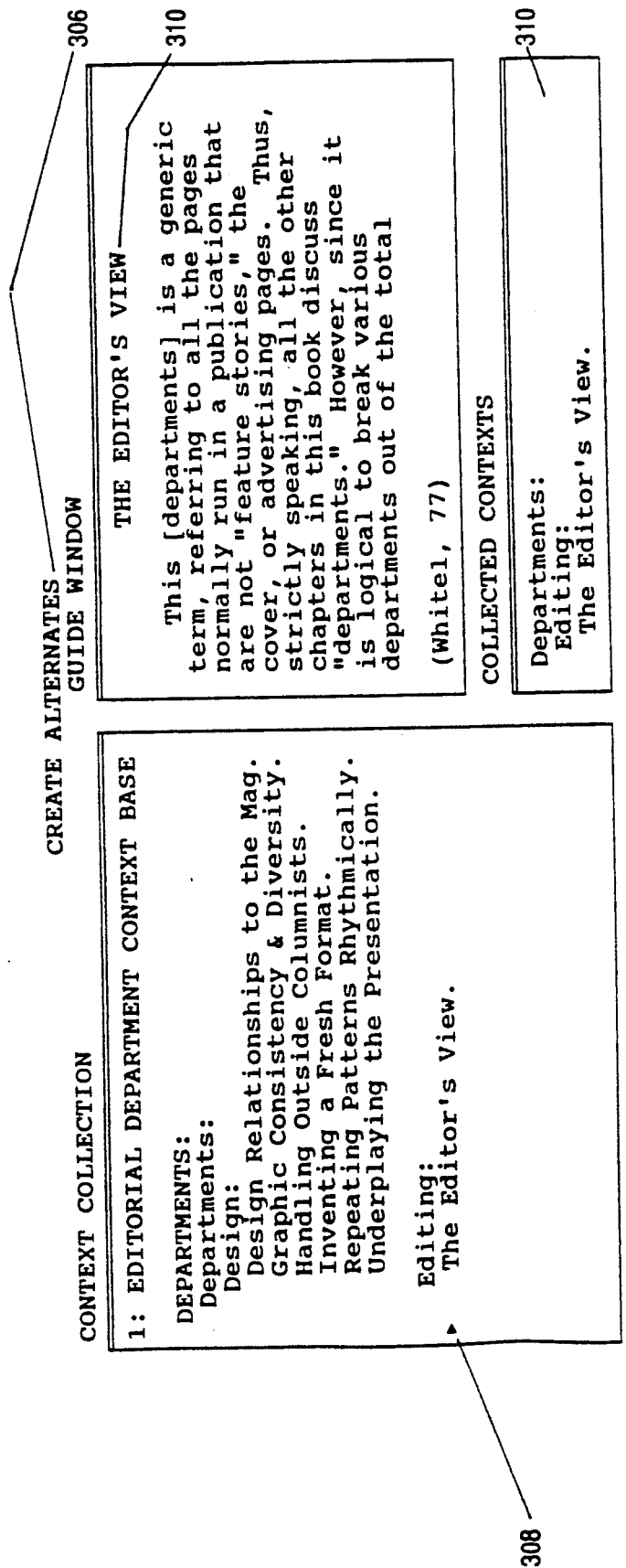

Turning now to the top screen 300 in FIG. 27 and also to FIG. 138, the user reads the rest of the titles in the (left) Context Collection Window 302. Most of them have to do with graphics, which are not among the responsibilities of the new Editorial Assistant. The last Context, however, is "The Editor's View" 304 and this appears relevant. By pressing the <End> key 9024 to go to the end of the list of Contexts, the user jumps to the bottom of the list 9025. This is displayed in the bottom screen 306 printed in FIG. 27. "The Editor's View" is highlighted by the cursor bar 308, and the content of this Context is displayed in the Guide Window 310.

Referring to FIG. 97, because "The Editor's View" is valuable for the new Editorial Assistant while she is learning her job, this Context is collected to the lower right window by pressing the <Insert> key 4010, 4011. The bottom screen 306 in FIG. 27 shows that "The Editor's View" has been collected to the Collected Contexts window 310 on the lower right of the screen.

Referring now to FIG. 138, the user then uses the <Minus> key 9018, 9019 to condense the "Departments:" list. Turning now to the top screen 320 in FIG. 28, the user has condensed the list 322 to show the Context clusters in the Editorial Department Context Base. The user moves the cursor down to the cluster titled "Letters to the Editor" 324. By pressing the <Plus> key 9018, 9019, this section is expanded to show the one Context within it. This expansion is shown in the bottom screen 326 in FIG. 28.

Figure 28A:
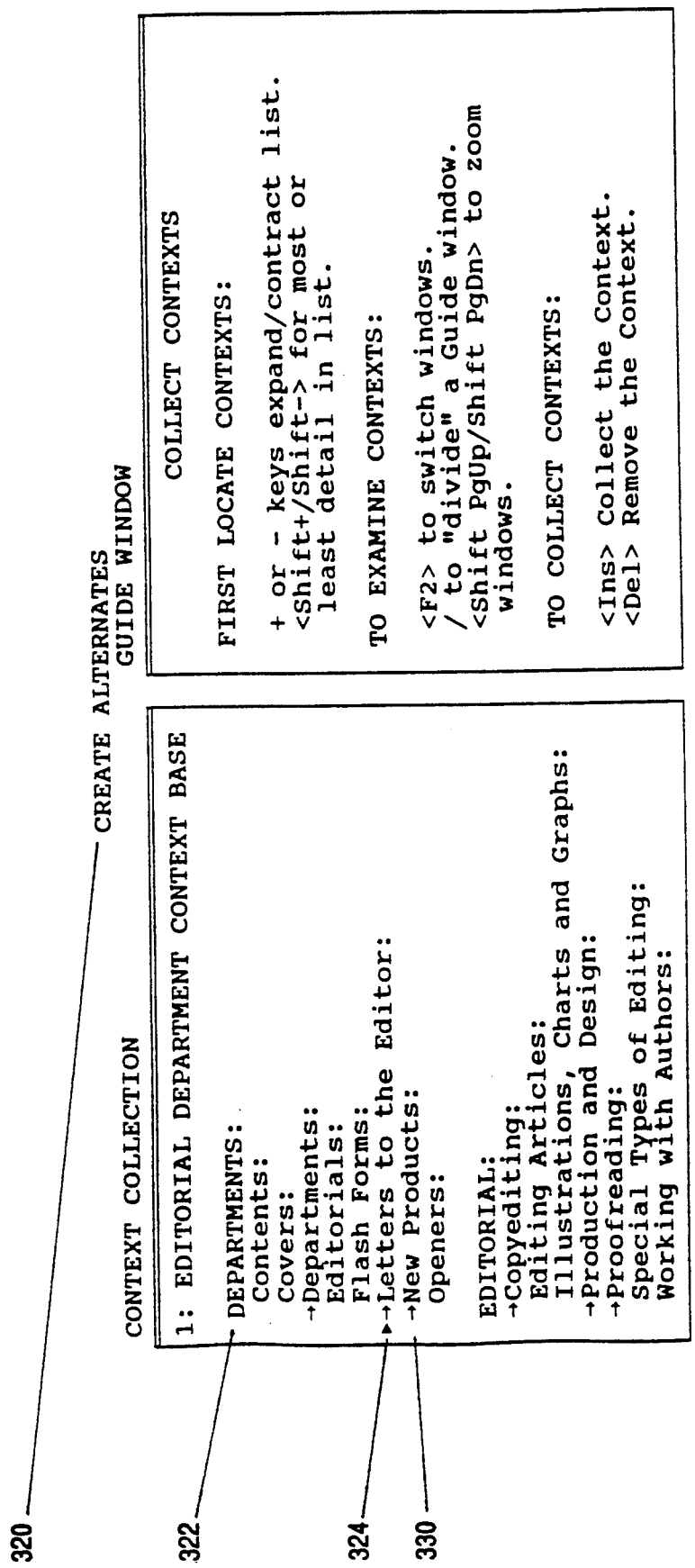
Figure 28B:
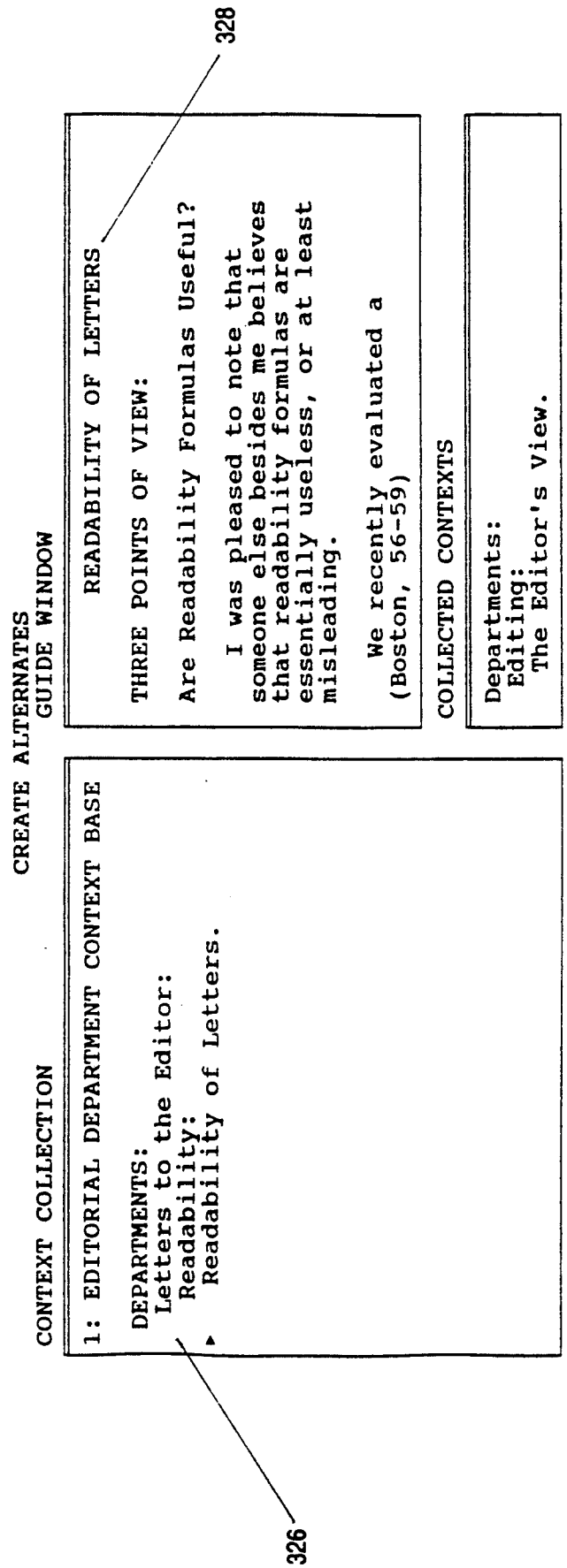

Still referring to FIGS. 28 and 138, the one Context in this cluster concerns the readability of Letters to the Editor. The user does not believe that this information 328 is relevant to the Assistant Editor's job. The user rejects this by pressing the <Minus> key 9018, 9019 to condense the list and exit this cluster. This returns the list to the outline of the Editorial Department Context Base 322 as shown in the top screen 320 of FIG. 28. The user then moves the cursor highlight down to the next cluster 330, which is "New Products:".

Figure 29A:
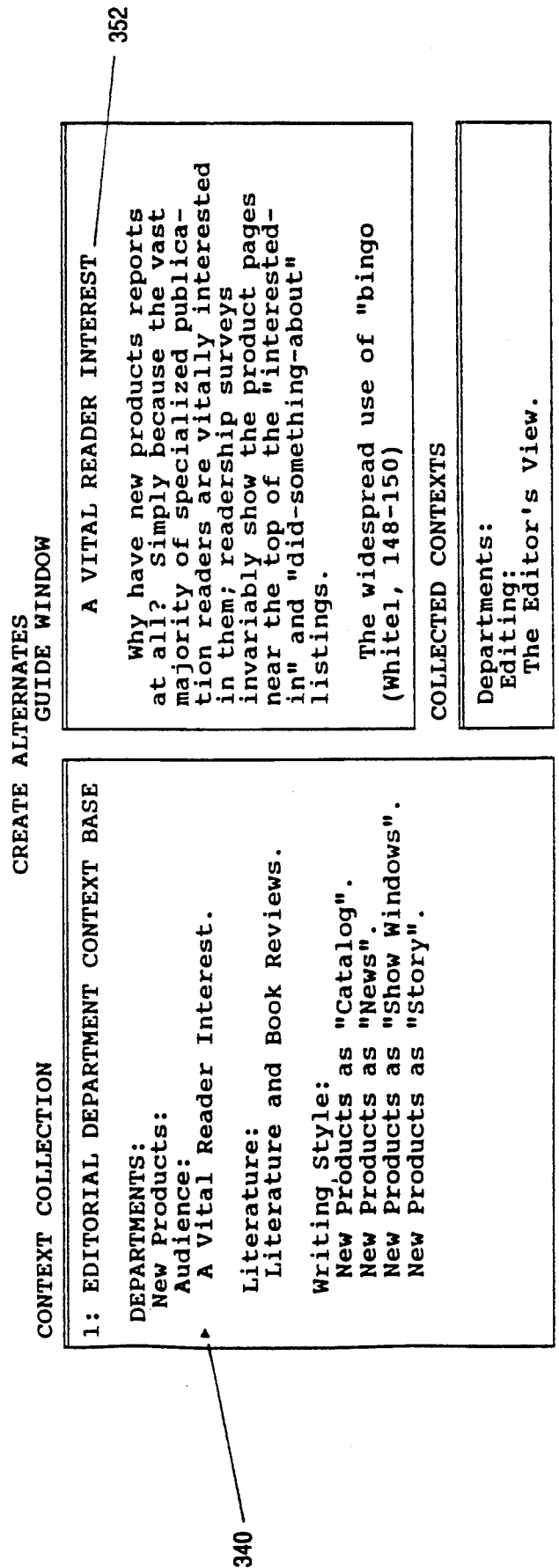
Figure 29B:
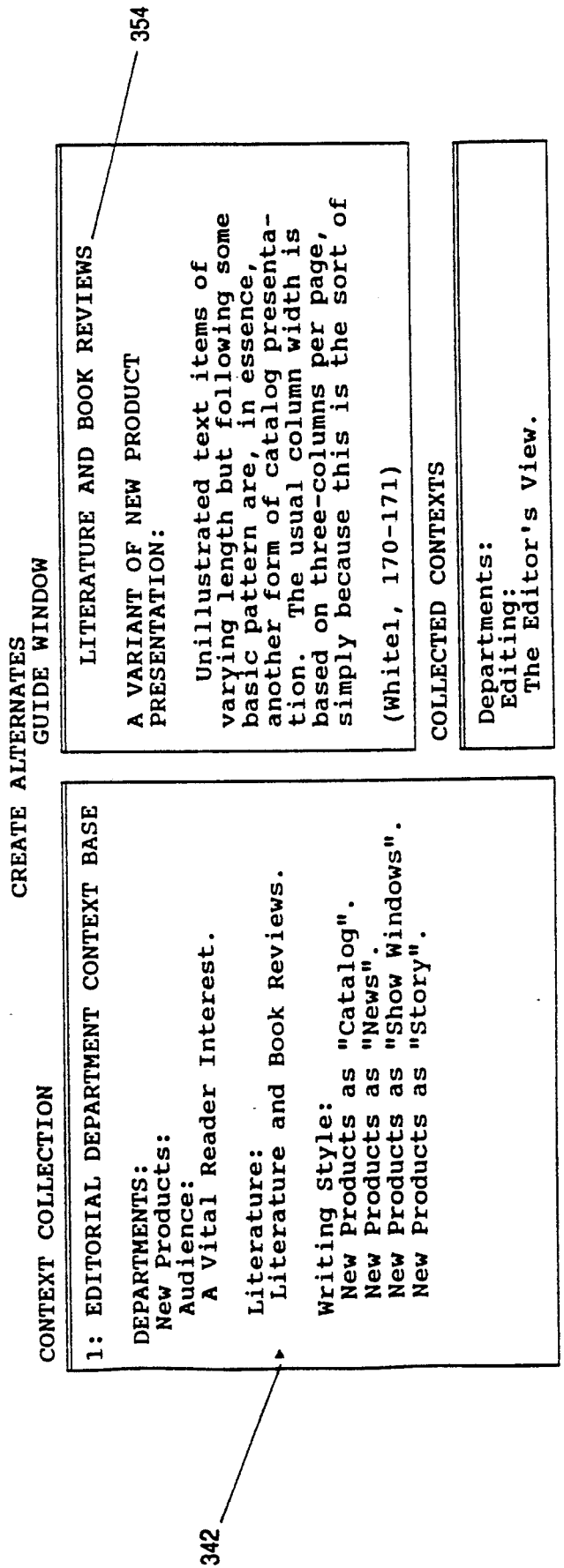
Figure 29C:
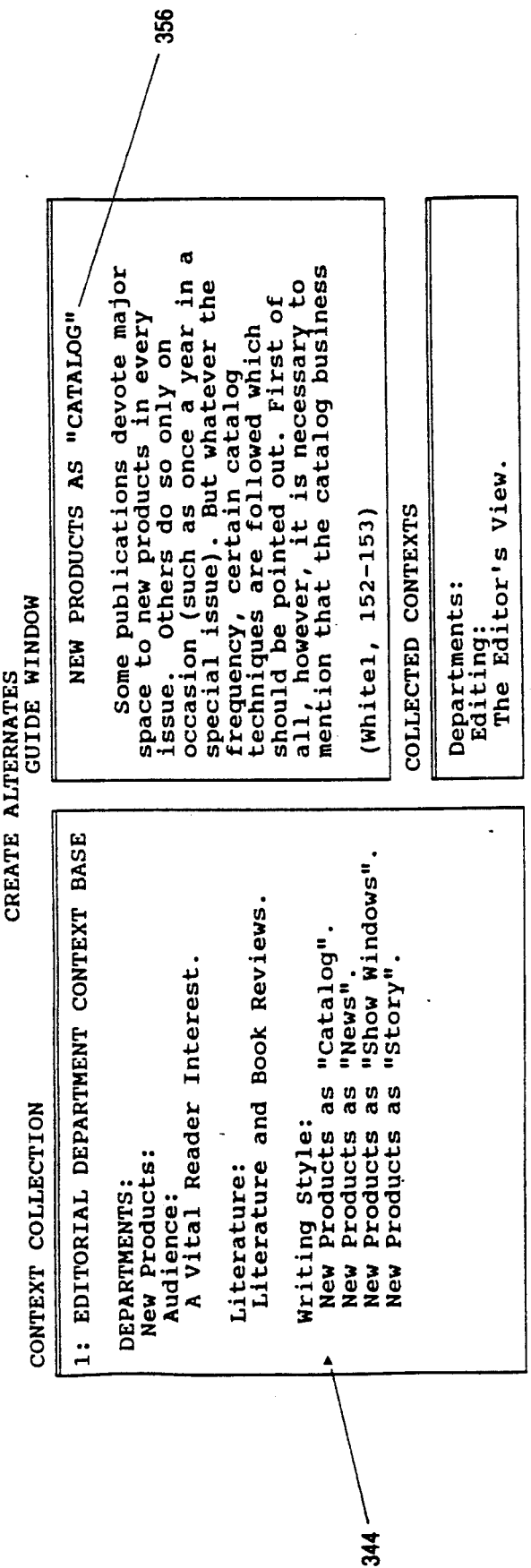
Figure 30A:
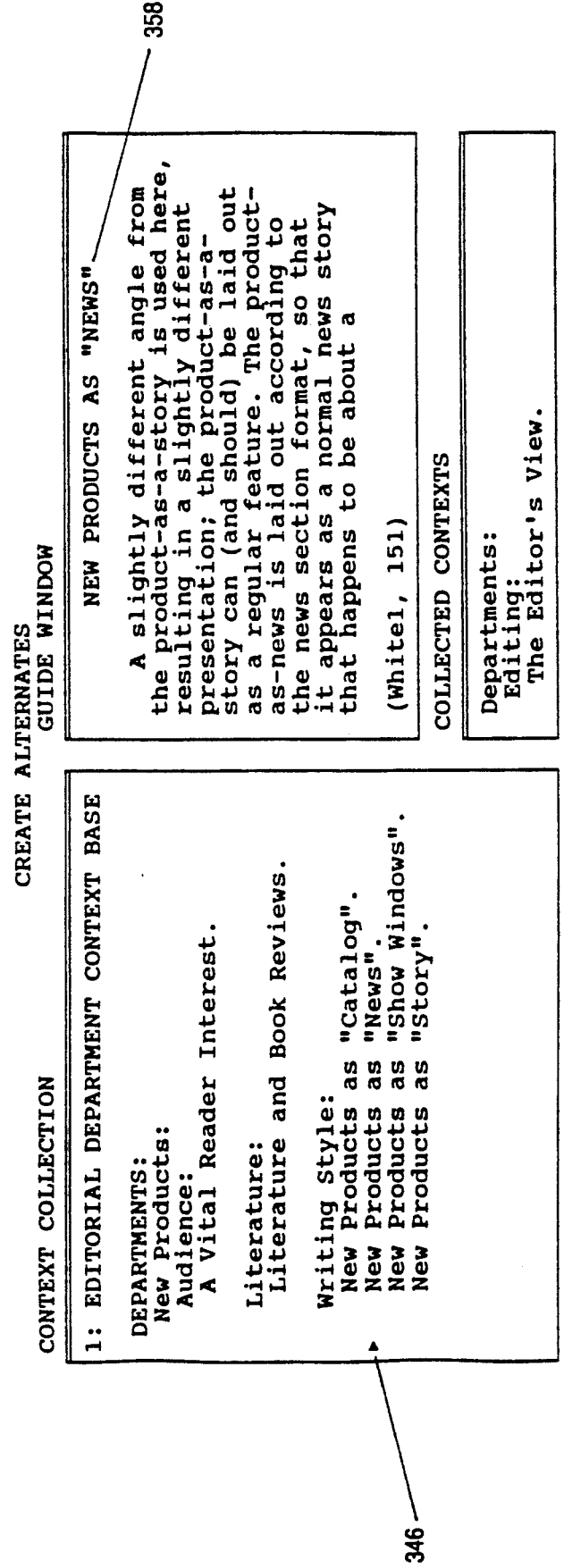
Figure 30B:
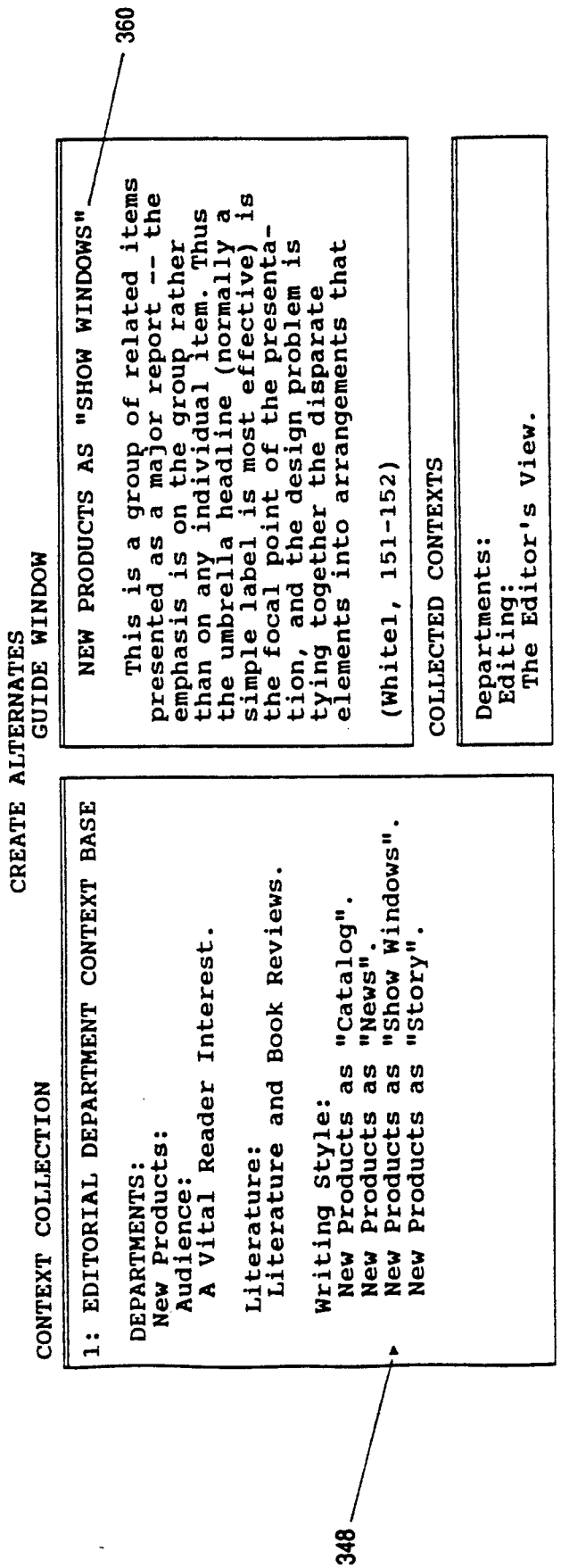
Figure 30C:
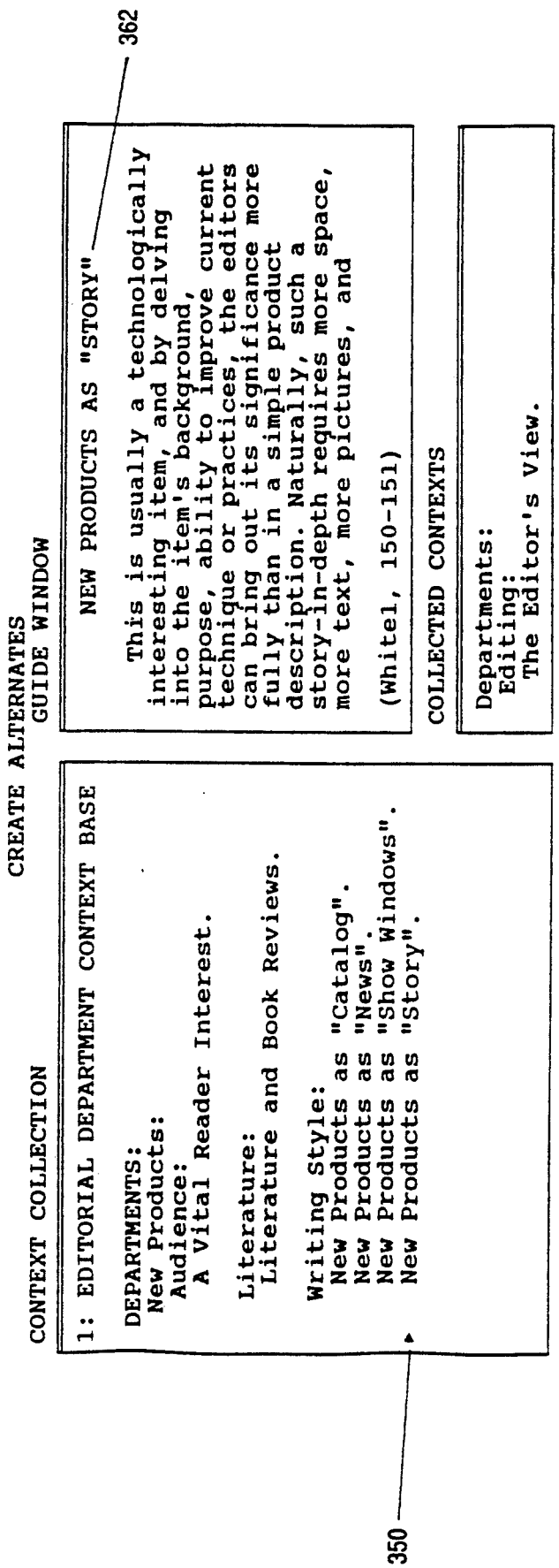
Figure 31A:
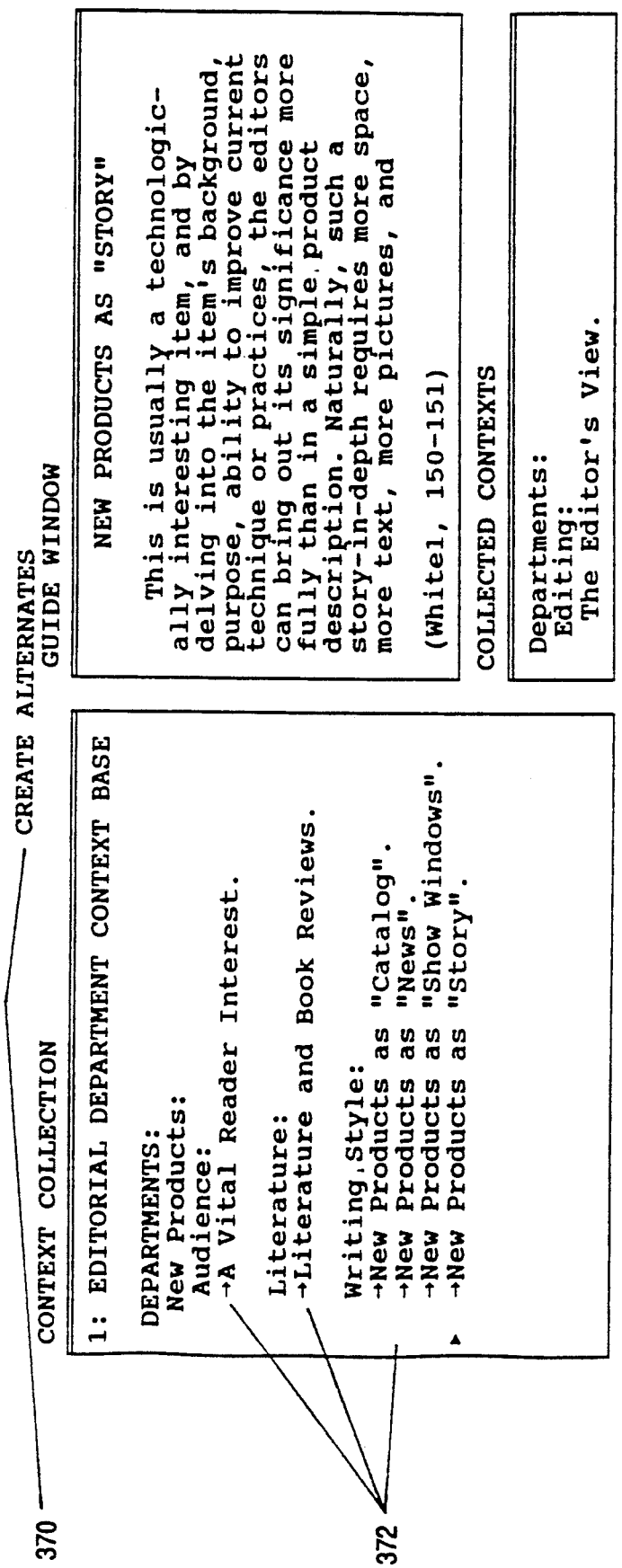
Figure 31B:
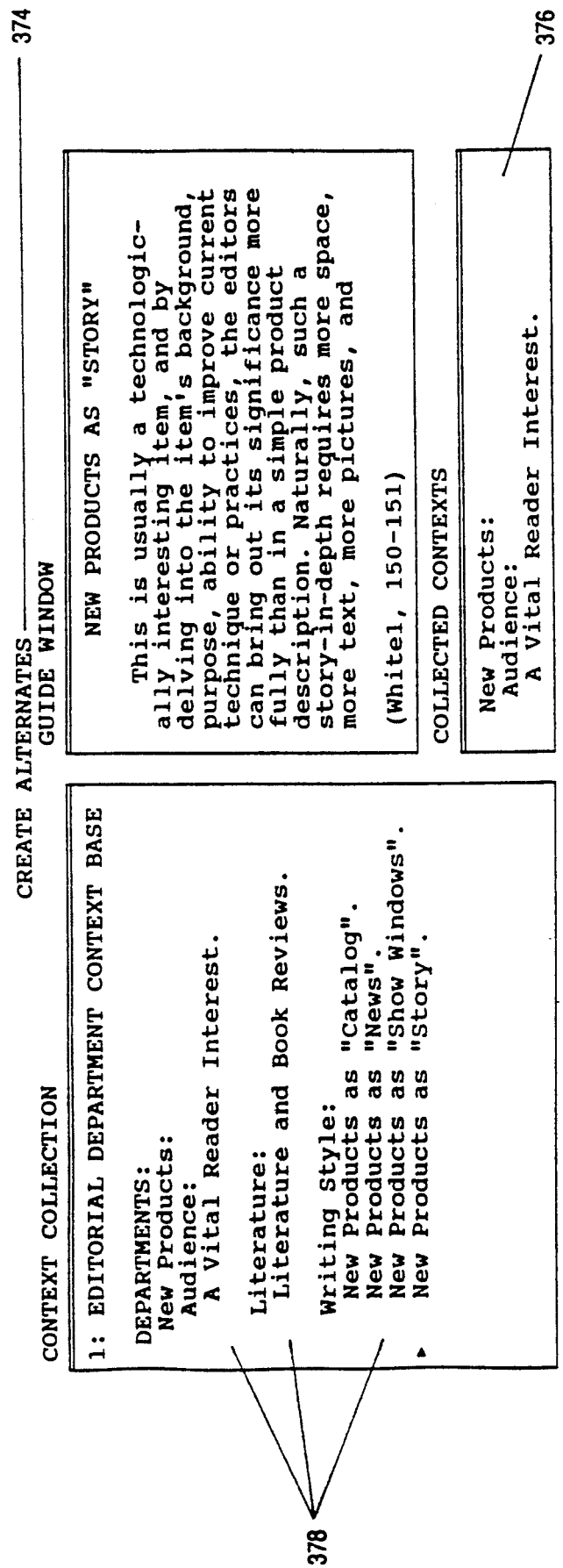

Turning now to FIGS. 29 and 30, the user knows that the Editorial Assistant will be responsible for writing the "New Products" departments of the magazine. This is an essential area for the new employee to learn rapidly.

The user scrolls down this list of Contexts one line at a time in the left Context Collection window 340, 342, 344, 346, 348, 350. At the same time, the user examines the content of each of the Guides in the Guide Window 352, 354, 356, 358, 360, 362 to verify that it is appropriate and helpful. These Guides are displayed in FIGS. 29 and 30.

The user decides that all of these Contexts are valuable for the new Editorial Assistant. Using the Method shown in FIG. 97, 4006, 4007, 4008 the user tags all of them. Turning now to the top screen 370 in FIG. 31, the FIG. shows all of the Contexts are selected (an arrow is displayed to the left of each Context selected 372). Referring to FIG. 97, the user then collects all the Contexts by pressing the <Insert> key 4010, 4011. The screen 374 that shows this process has taken place is at the bottom of FIG. 31. The first Context that was just collected is displayed in the lower right window 376, and all the small tagging arrows have been removed 378, indicating that the Contexts were collected.

At any time, the user may examine the Contexts that have been collected into the Collected Contexts window at the bottom right of the screen. Referring to FIG. 137, the user uses the "switch window Function Key" 9010 to shift between the windows in a clockwise direction 9011. By pressing this key once, the user moves from the Context collection (left) window to the Guide Window (top right). By pressing this key a second time, the user moves to the Collected Contexts (bottom right) window.

Figure 102:
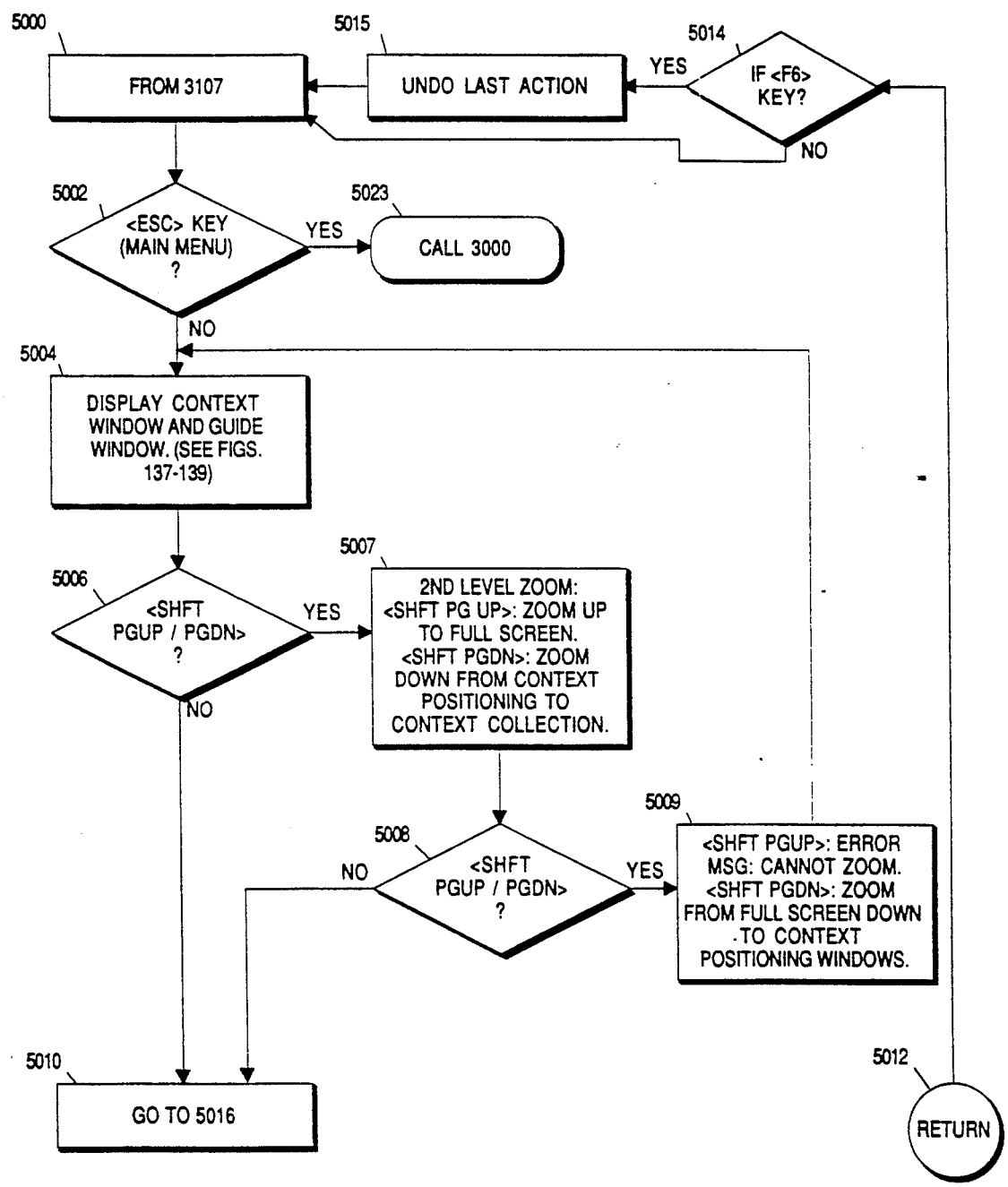

Now referring to FIG. 139, when the user goes into this latter window and zooms it up to fill the screen 9040-9043, the system seamlessly goes into Context Positioning mode 9043. This is shown in the top screen 380 of FIG. 32. In Context Positioning, the Alternate's name is listed on the top line of the left Context Positioning Window 382. The collected Contexts are listed in the Context Positioning window on the left 384. The content of each Context is displayed in the Guide Window on the right 386. As the user moves the cursor to highlight each Context (in the left window) 388, the guides are displayed in the right window 390. In this view the user may keep or discard any of the Contexts or switch windows to explore any of the Guides. As shown in FIG. 102, screen display functions in Context Positioning are described by FIGS. 137-139. The process of Context Positioning will be described below.

Figure 32A:
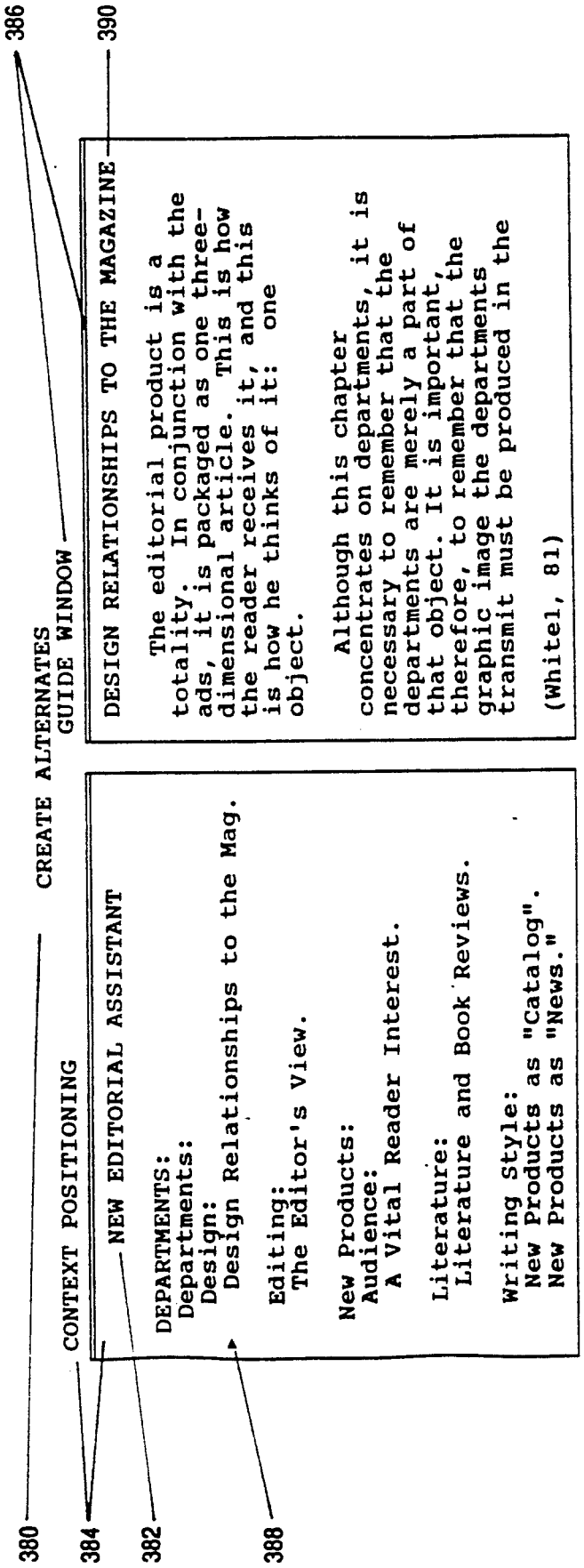
Figure 32B:
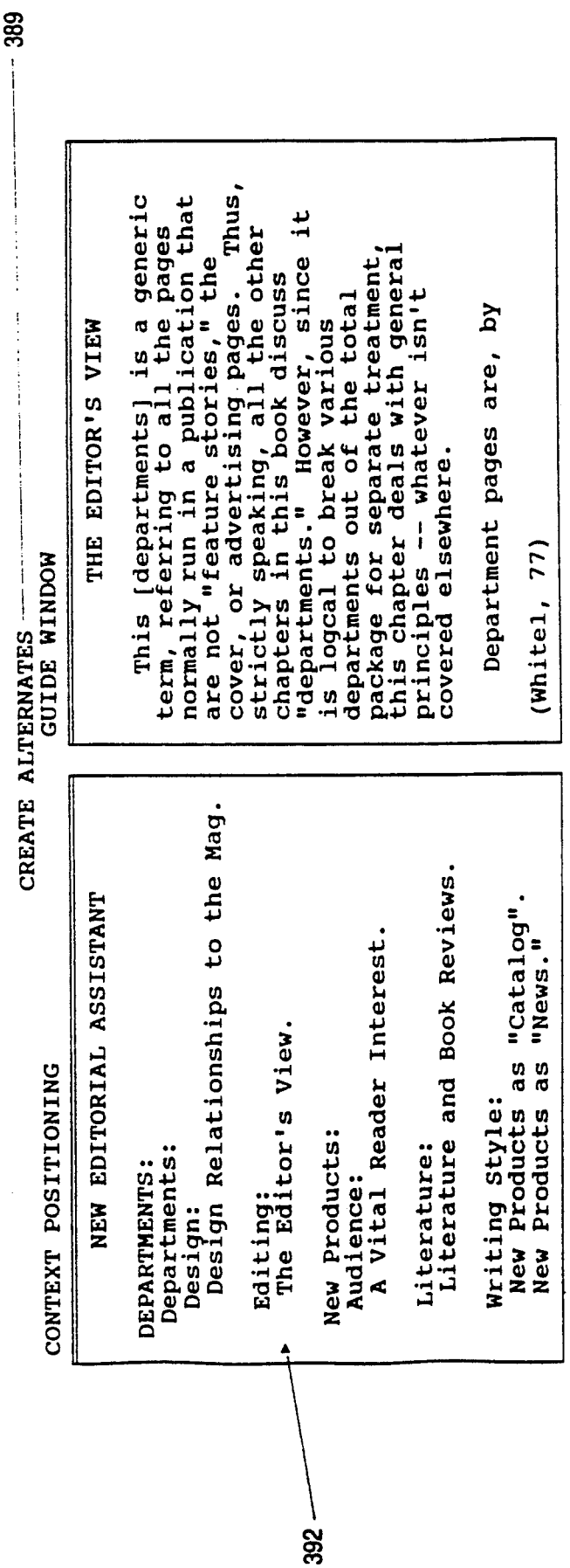
Figure 32C:
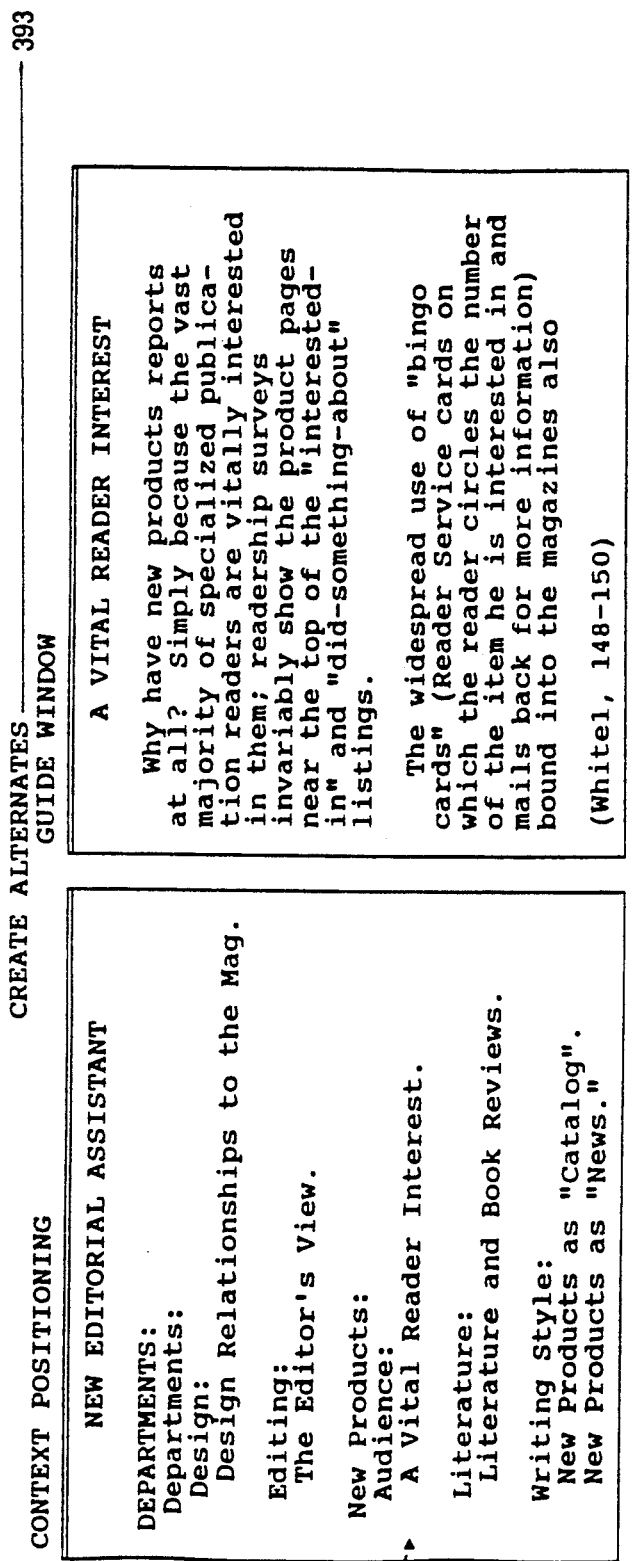

FIG. 32 shows screens from three of the Contexts that have been collected so far. The top printed screen 380 shows the cursor on the first Context, "Design Relationships to the Magazine" 388. The middle screen 389 shows the cursor on the second Context, "The Editor's View" 392. The bottom screen 393 shows the cursor on the third Context, "A Vital Reader Interest" 394.

The user then goes through the same process of returning to the main menu of the first Context Base 260, "1: Editorial Department Context Base", moves to each cluster of Contexts that relates to this Alternate, and selects the appropriate Contexts. This would be a fairly rapid process for a user who is this new employee's manager and simultaneously: (1) either knows or imagines the job the new employee ought to do, (2) has a basic familiarity with the skills available in the Editorial Department Context Base, and (3) understands how to use this invention to collect helpful Contexts for the new employee.

Later the user will return to the Contexts selected. Now the user will select the Contexts from the other Context Bases. (If interrupted, the user may save the work in process and return to it.) In FIG. 102, the user presses the key that returns to the "Create Alternates:" menu 5002, 5003. As shown in the top screen 400 in FIG. 33 and also in FIG. 94, the user moves the cursor up to "Choose Context Bases" 402, 3107, and presses <Enter> to go to this function.

Figure 33A:
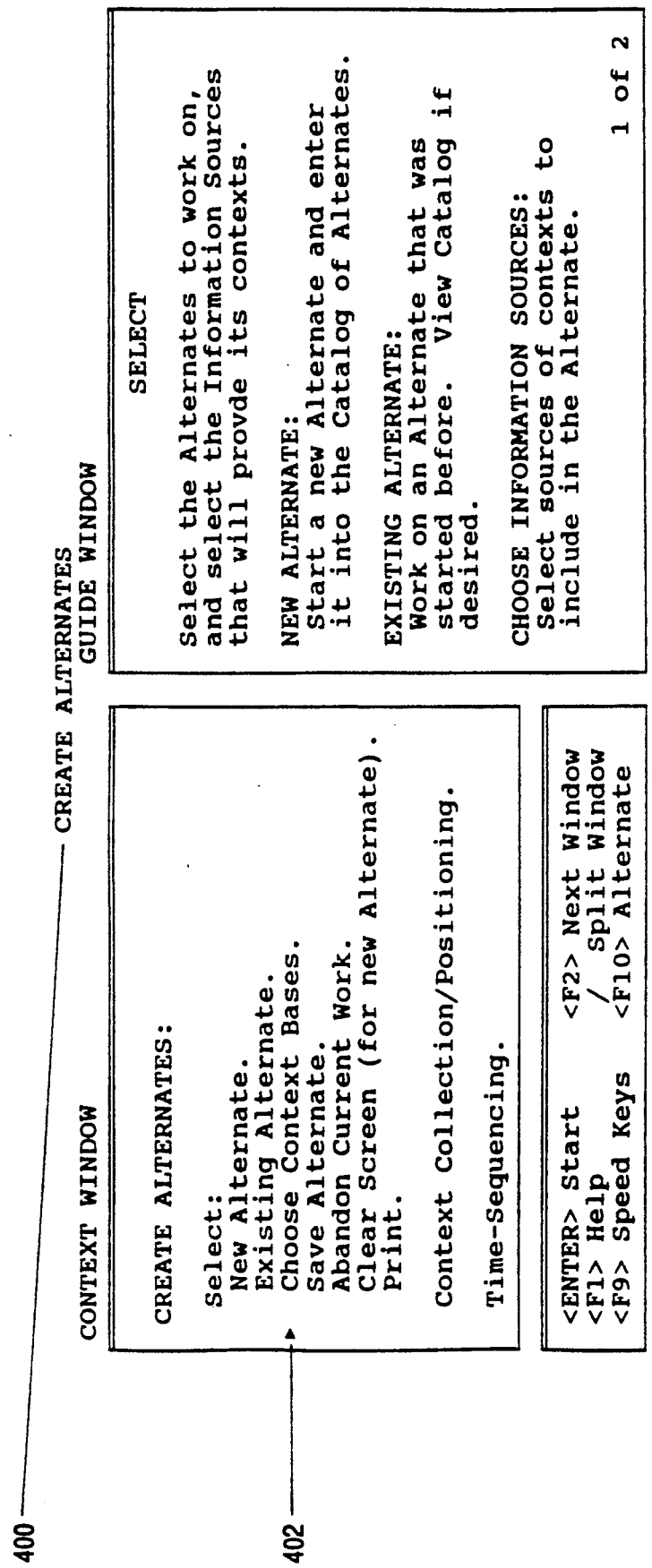
Figure 33B:
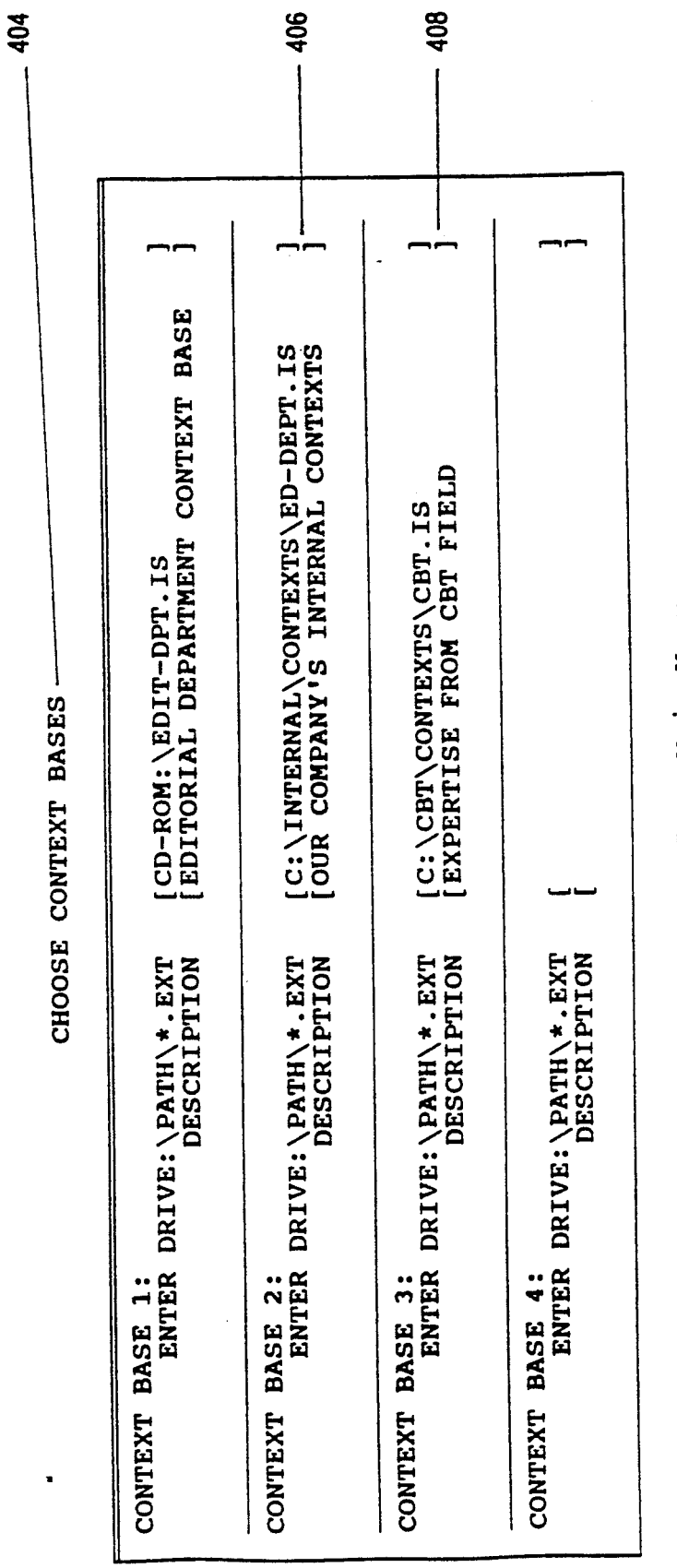

Turning to the bottom screen in FIG. 33, the user sees the "Choose Context Bases" screen 404. Referring to FIG. 112, the user selects the second Context Base 406 Information Source by pressing the number <2> 3310-3312. While different patterns may be used to identify keystrokes, the essential function here is that it is possible to go to each individual Context Base from where they were entered.

Figure 34A:
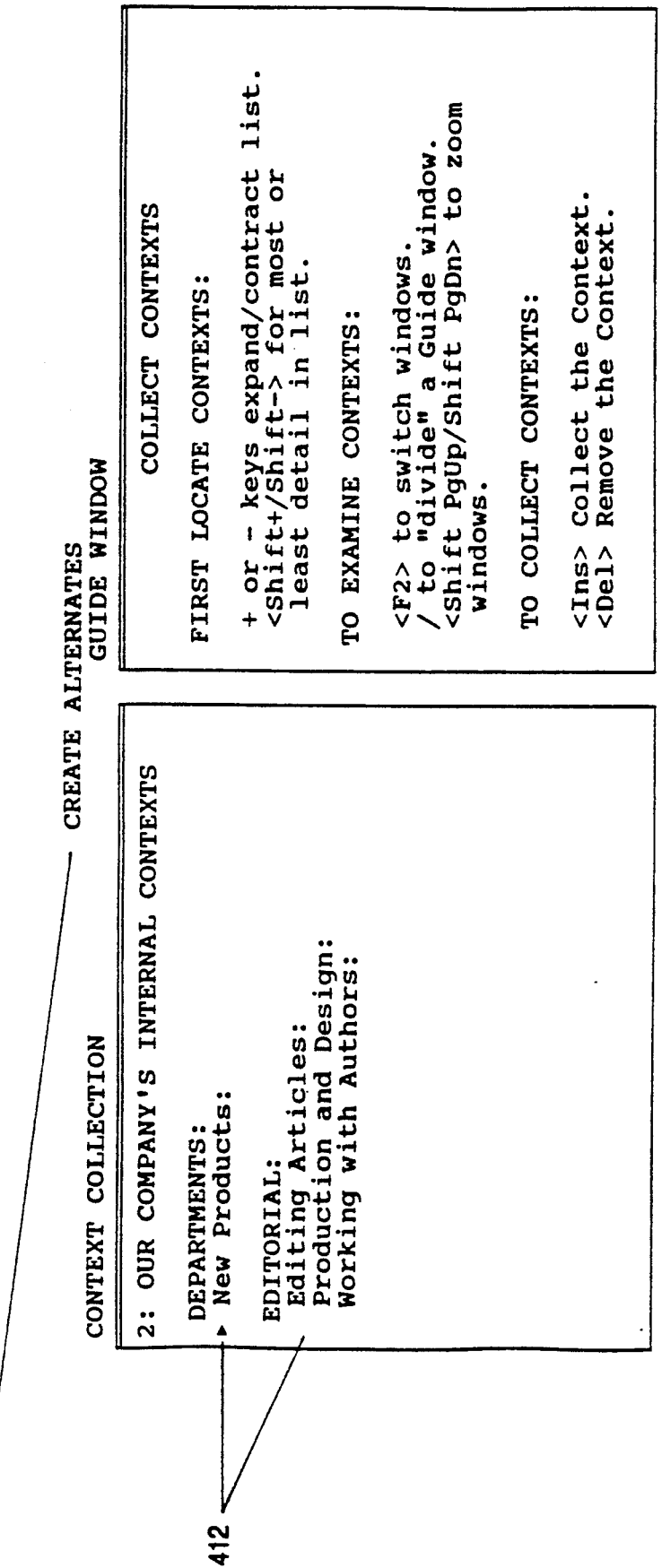
Figure 34B:
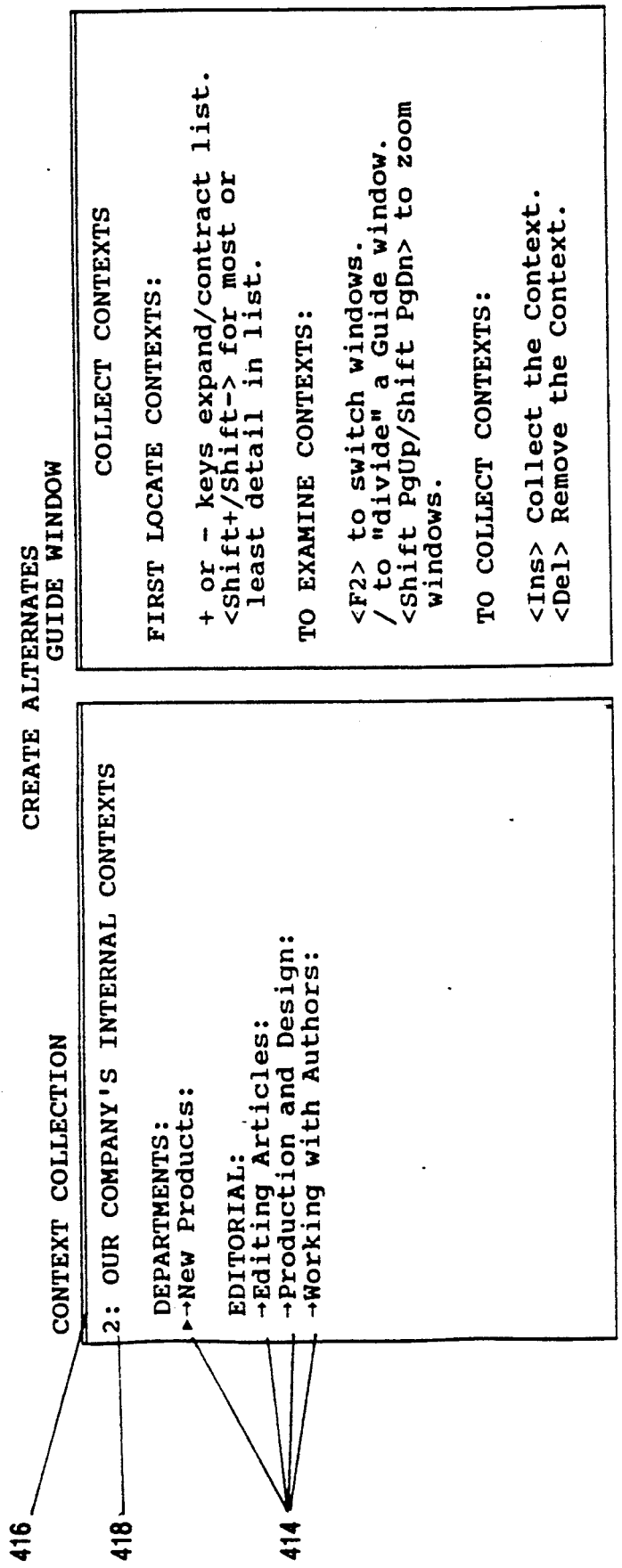

Turning now to the top screen 410 in FIG. 34, when the user calls up the company's internal Contexts, its titles and order 412 follow the Editorial Department Context Base 252, 258 shown in FIG. 23. The Editorial Department Context Base is a CD-ROM disc compiled externally. The company's internal Context base is prepared using the Contextualizer. Its arrangement is designed to match the main externally generated Context Base that the Editorial Department relies on. (See the section on "Creating Context Bases," below.) As a result, the two structures may be merged.

The user knows that all the areas in the "Company's Internal Contexts" may have individual Contexts that are valuable for this new employee's Alternate. All the areas 414 are selected by using the same key 4006-4008 described in FIG. 97 that was used to select all the Contexts in FIG. 31.

In the (left) Context Exploration window 416 in FIG. 34, the top line 418 clearly shows that the user is in the second Context Base (that is, the number "2:" is displayed clearly). As described in FIG. 137, it also displays the label from the Context Base screen 9002, called "Our Company's Internal Contexts."

This bottom screen in FIG. 34 shows that all the areas were selected 414. As shown in FIG. 138, the user next uses the <Shift-Plus> key 9021-9023 to expand the entire list of the company's Internal Contexts to its maximum level of detail.

Figure 35A:
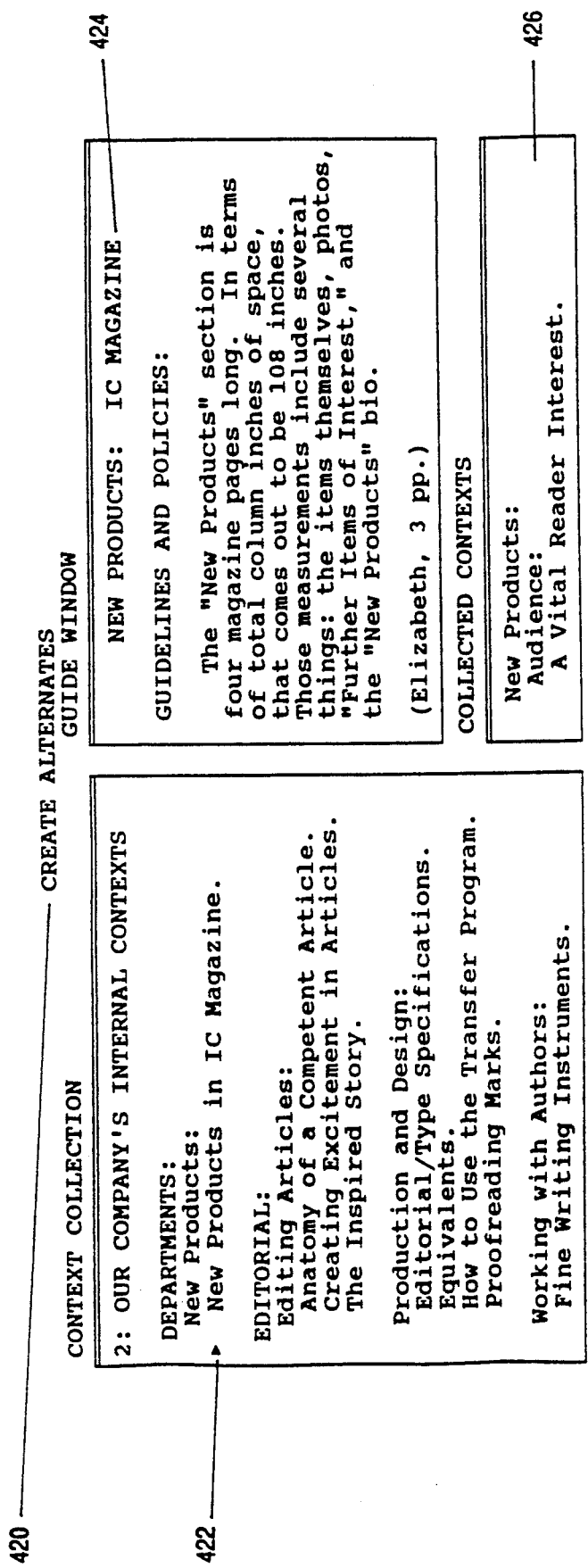
Figure 35B:
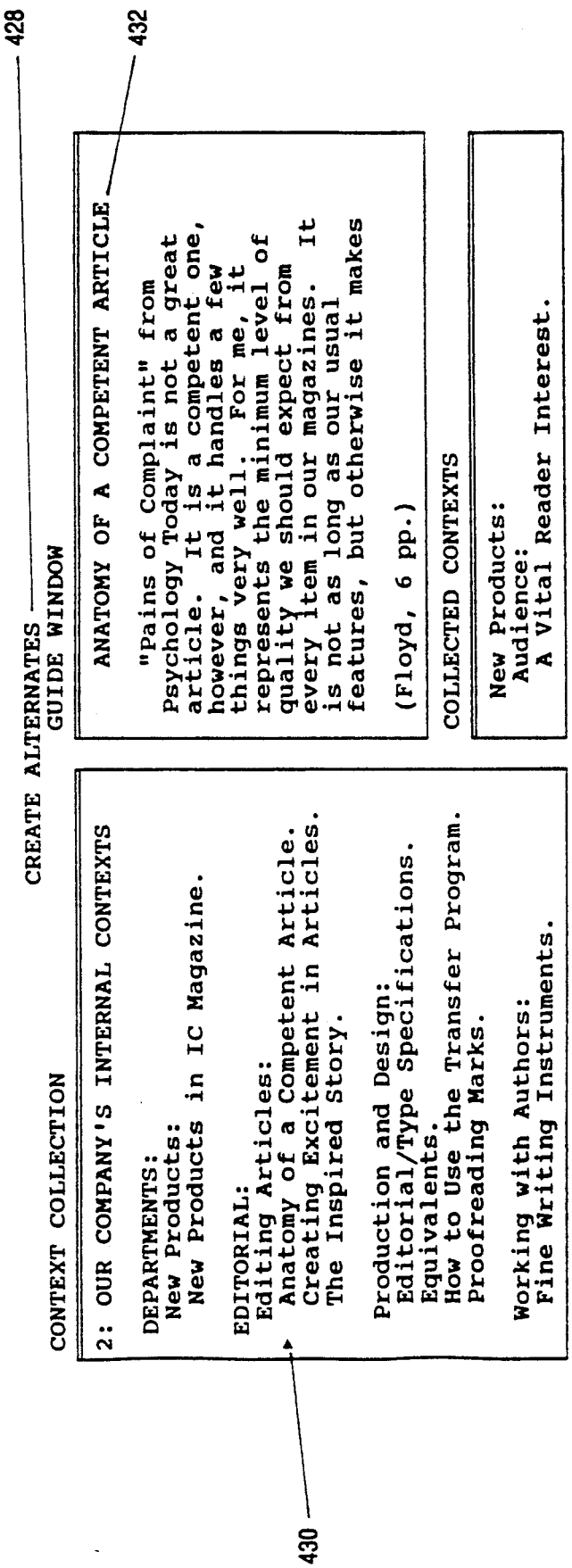
Figure 35C:
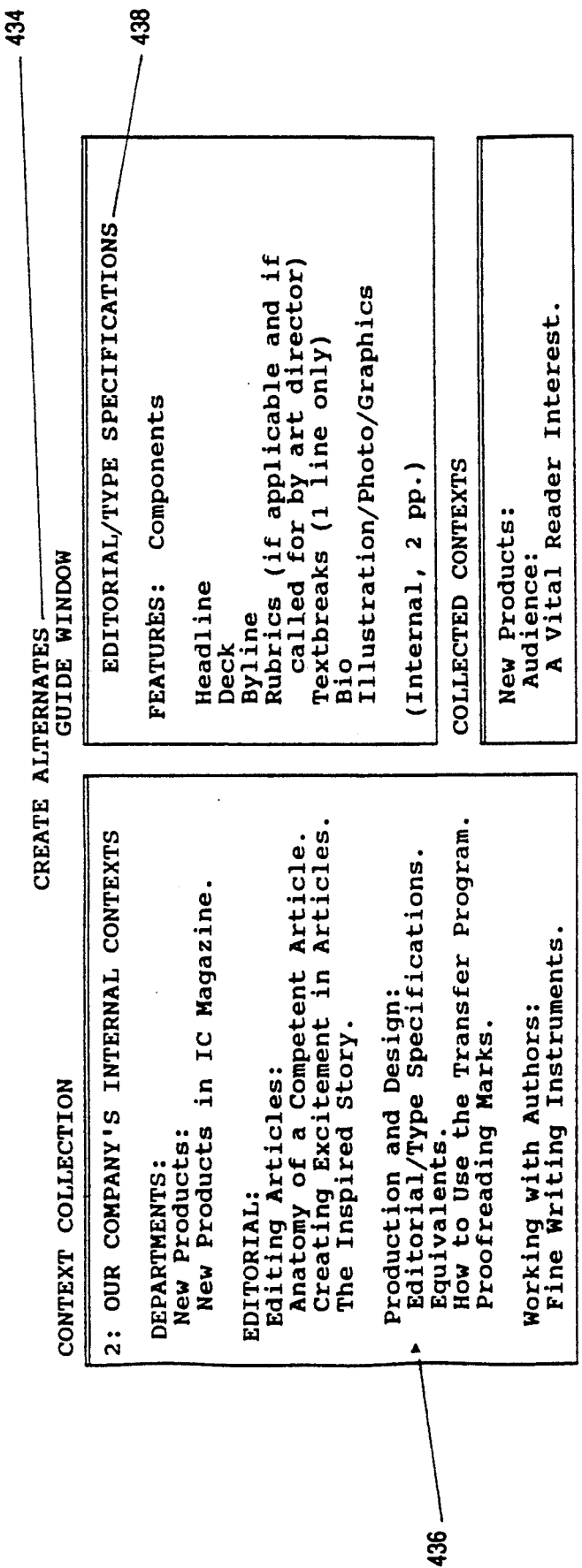

Turning now to the top screen 420 printed in FIG. 35, the cursor 422 is on the first Context in the list. The content of this Context is also displayed in the upper right Guide window 424. Note also that the Contexts that have been collected previously are still displayed in the lower right Collected Contexts window 426. In other words, a single Alternate is being constructed from multiple Context Bases.

The second screen 428 printed in FIG. 35 shows the second Context in the list, "Anatomy of a Competent Article" 430, 432. The user simply uses the <Down> cursor key to continue moving the cursor down line-by line in the left window. At each Context the user pauses to examine its contents displayed in the (right) Guide Window.

The item displayed in the third screen 434 of FIG. 35 shows the company's internal "Editorial/Type Specifications" 436, 438. This illustrates that a company's unique internal technical information may be placed into Contexts and made readily accessible through Alternates, based on each employee's individual need to use each specific Context to create material transformations in the products of their employers.

Figure 36A:
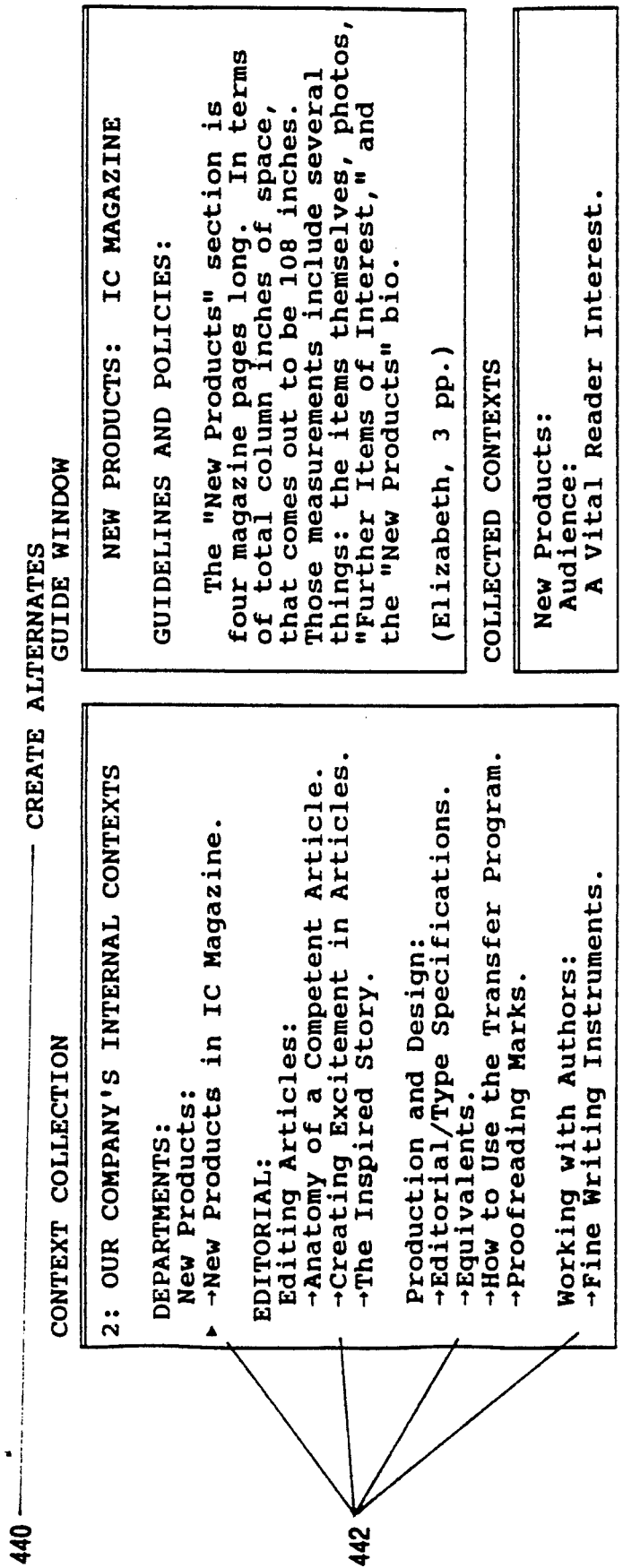
Figure 36C:
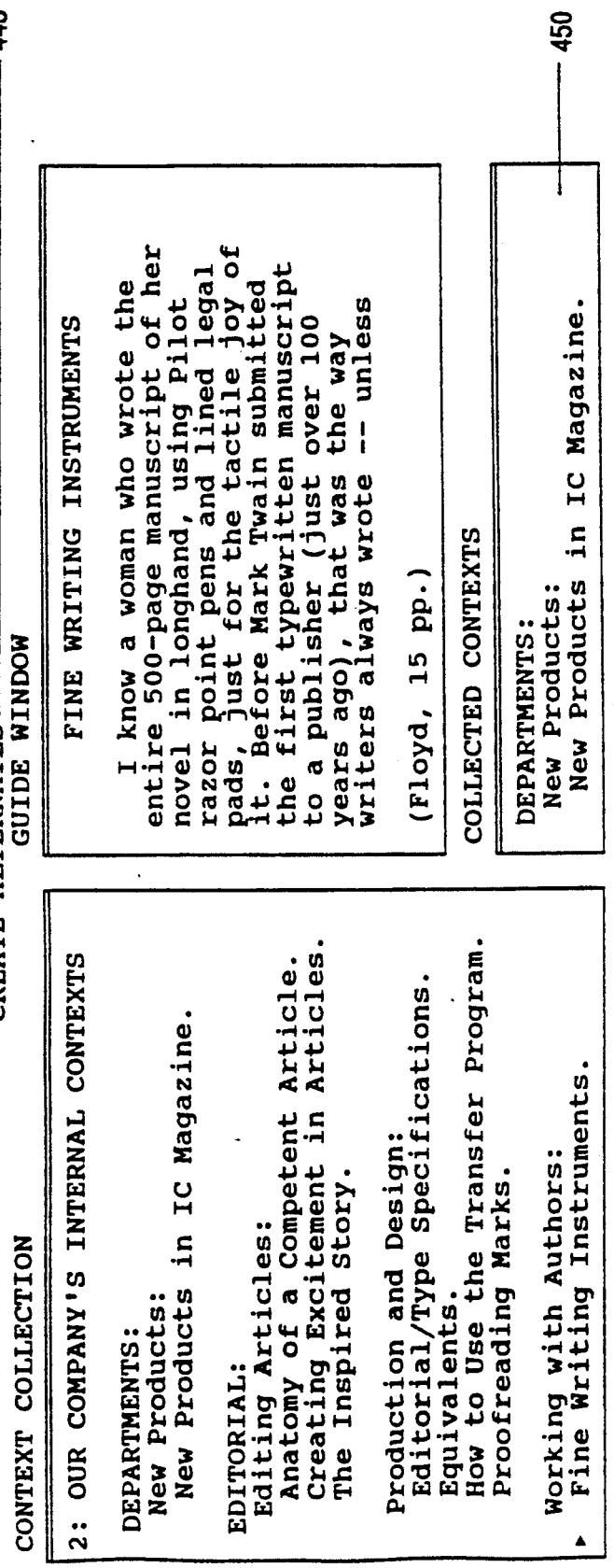

Referring now to the top screen 440 printed in FIG. 36, it turns out that all the company's Internal Contexts, except one, are useful for this new Editorial Assistant. Using the procedure 4006-4008 in FIG. 97, the user tags all the Contexts 442.

In the middle screen 444 in this FIG. 36, the user jumps to the last line in the left window by pressing <End> 9024, 9025, as described in FIG. 138. The user deselects the last item which is under the current highlight 446. FIG. 97 describes the method by which the context is untagged 4006-4008. The small arrow to the left of that Context has disappeared.

Referring to FIG. 97, the user then presses the <Insert> key 4010, 4011 to add all the selected Contexts to those already collected. In the bottom screen 448 printed in FIG. 36, the Collected Contexts (lower right) window 450 shows that the company's Internal Contexts have been added.

Figure 98:
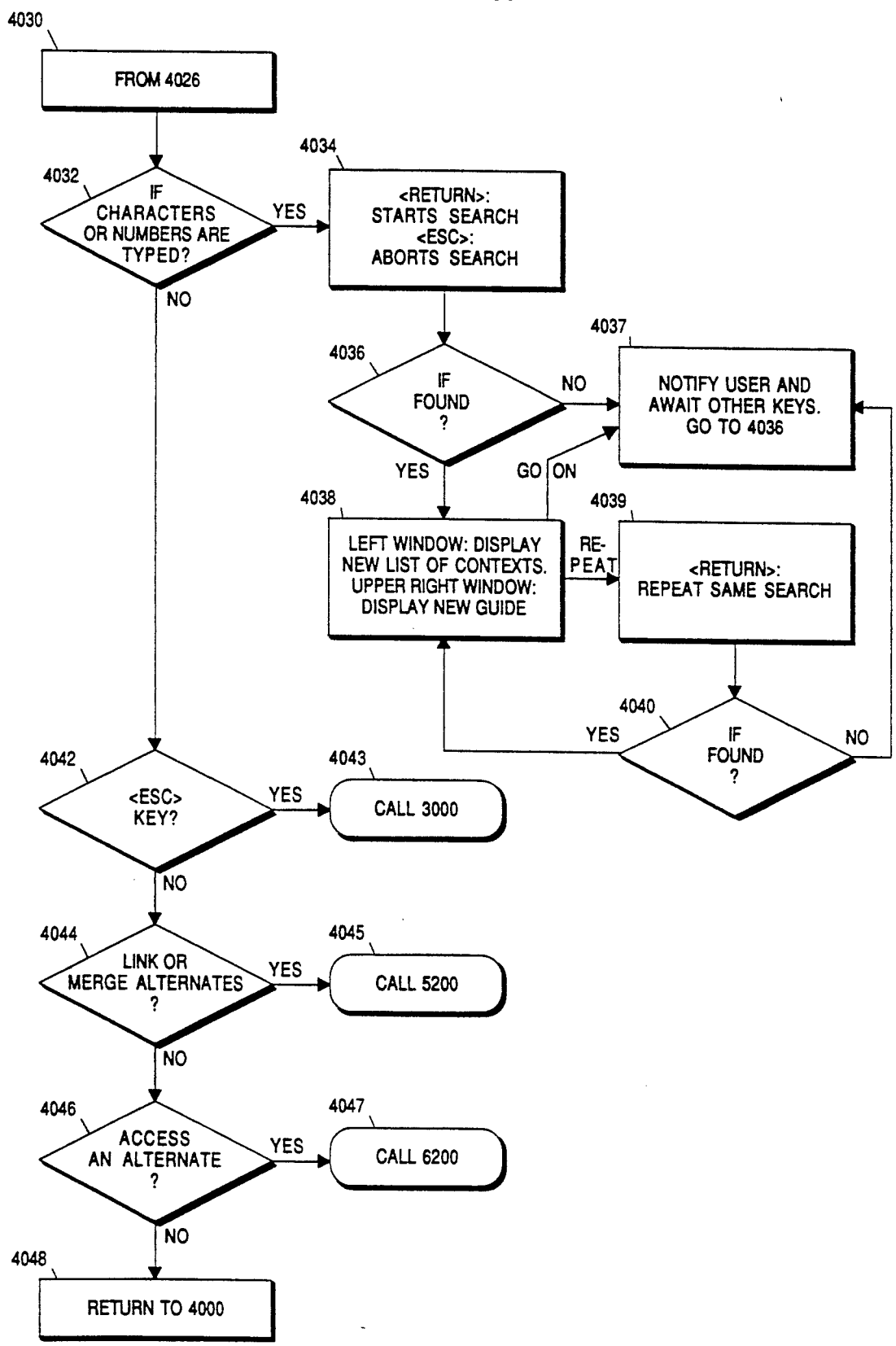

Using the escape key 4042, 4043 described in FIG. 98, the user returns to the "Create Alternates:" menu, chooses the "Choose Context Bases" 3107, 3108 as shown in FIG. 94, and enters number "3" for the third Context Base 3314-3316 as shown in FIG. 112. These are the CBT (Computer Based Training) Contexts that provide expertise knowledge of the field in which the employee will work.

Figure 37A:
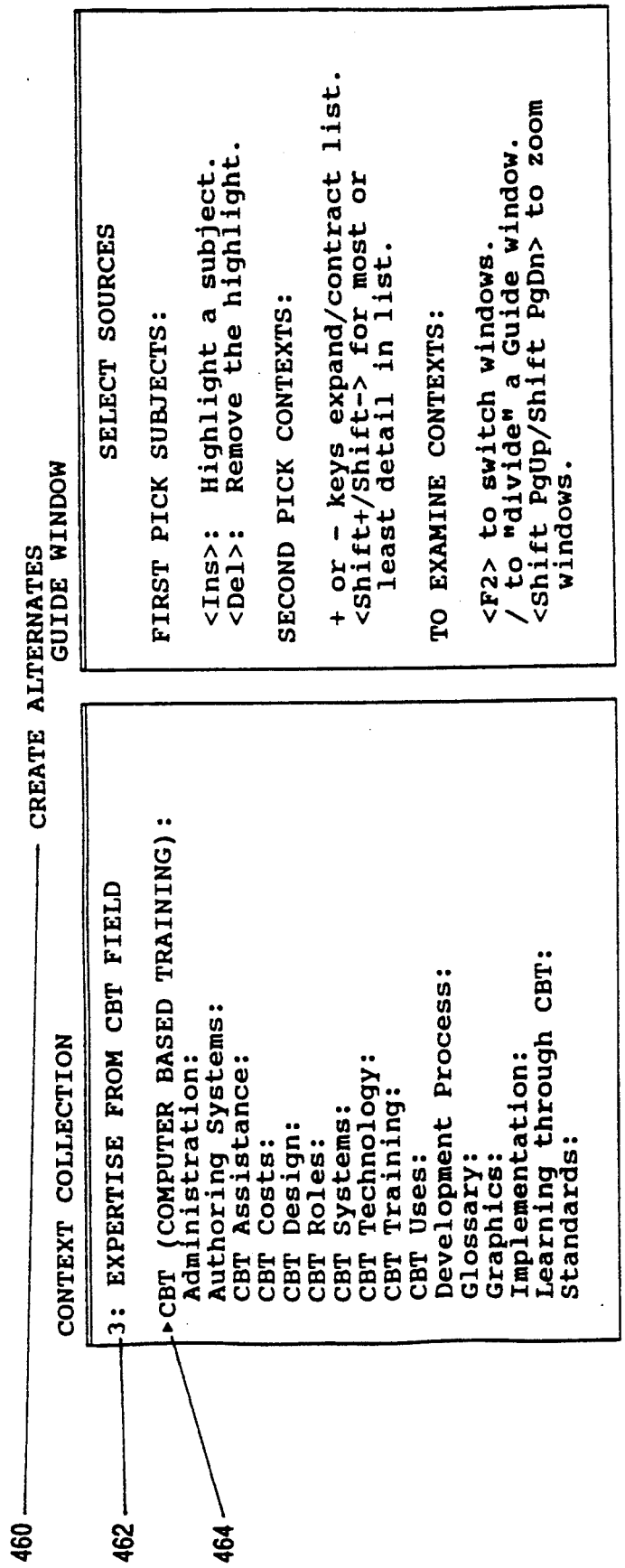
Figure 37B:
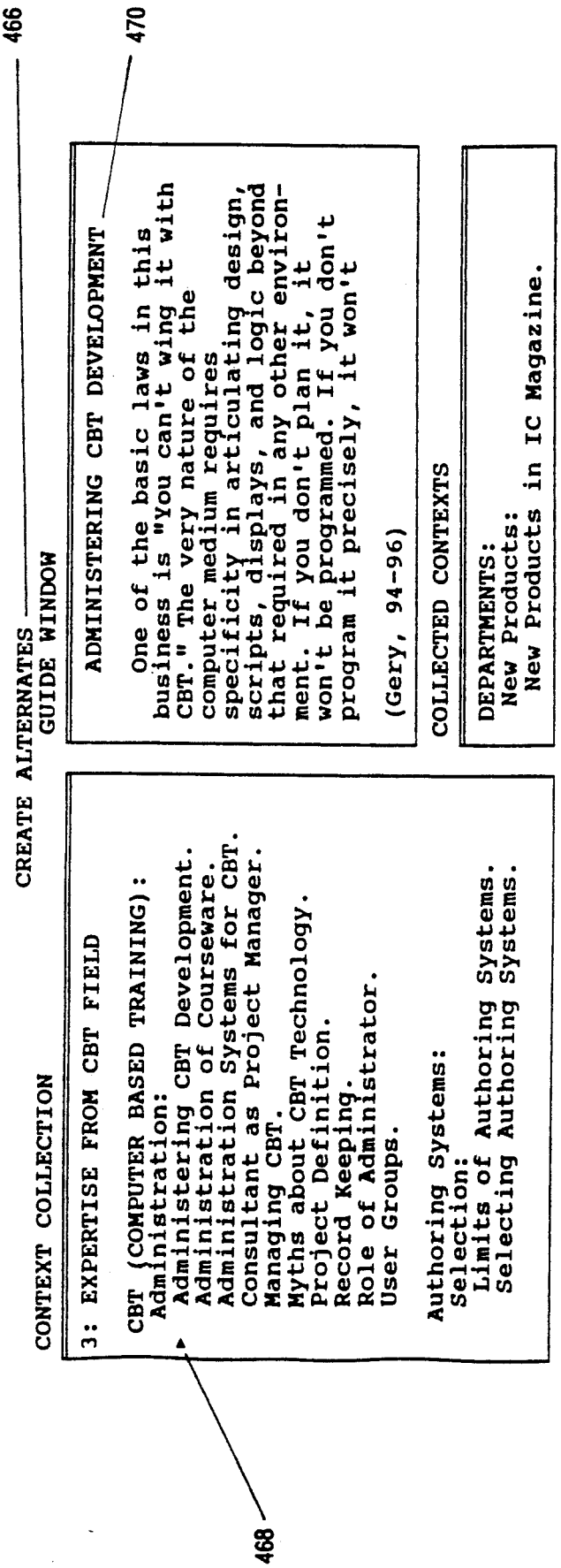

Arriving at the CBT Contexts, the user sees the top screen 460, 9002 in FIG. 37, see also 9016, 9017 in FIG. 138. In it, the first line of the Context Collection window 462 shows that the user is in Context Base #3. These are the Contexts of specialist expertise from the field of Computer Based Training. The left Context collection window is the overall list of Context clusters 464.

The second screen 466 in FIG. 37 shows that same list expanded to show the individual Contexts available. The cursor highlight is on the first Context 468. In the guide window, on the upper right, it shows the guide for "Administering CBT Development:" 470. As it can be seen from FIG. 37 and this Context, the expertise and knowledge offered from this type of Context Base is specialized knowledge of the field in which the new Editorial Assistant will work. This is commonly known as specialist expertise.

The creator of the Alternate decides that the new Editorial Assistant may have questions that touch almost any area of CBT: It is impossible to predict in advance the type of questions the Editorial Assistant will have to answer, or the types of answers that may be required in a given situation. Therefore, she should have access to all the specialist expertise about CBT in this Context Base. While the volume of information is considerable, it is not overwhelming because it is used as needed.

Therefore, instead of selecting individual Contexts from this Context Base, Bar, the user decides to provide all of it. Instead of integrating it into the Alternate, the user will link it to the Alternate.

This is an example of a situation where it is decided to provide a single end-user with more than one Alternate. To simplify the process of providing users with multiple Alternates, The Contextualizer includes a method to link them, instead of merging them into one larger Alternate.

Figure 38:
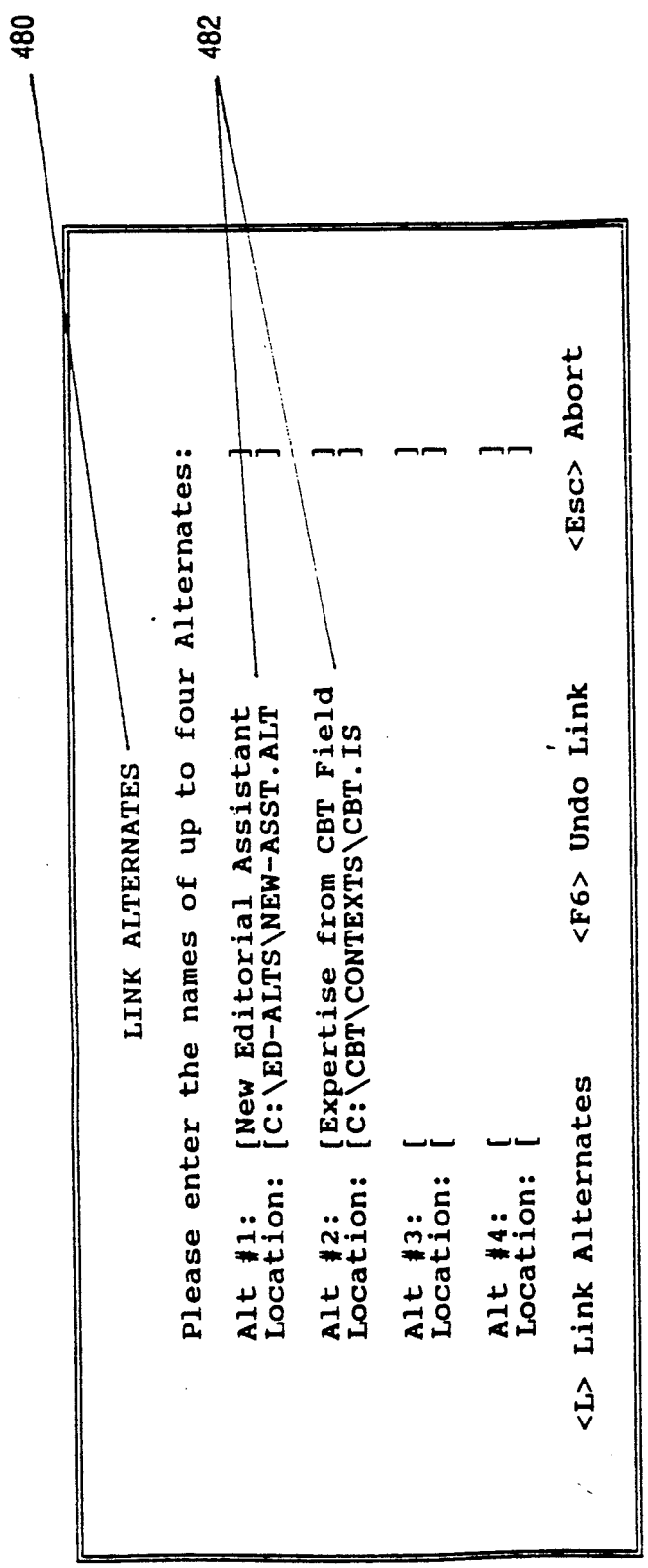
Figure 124:
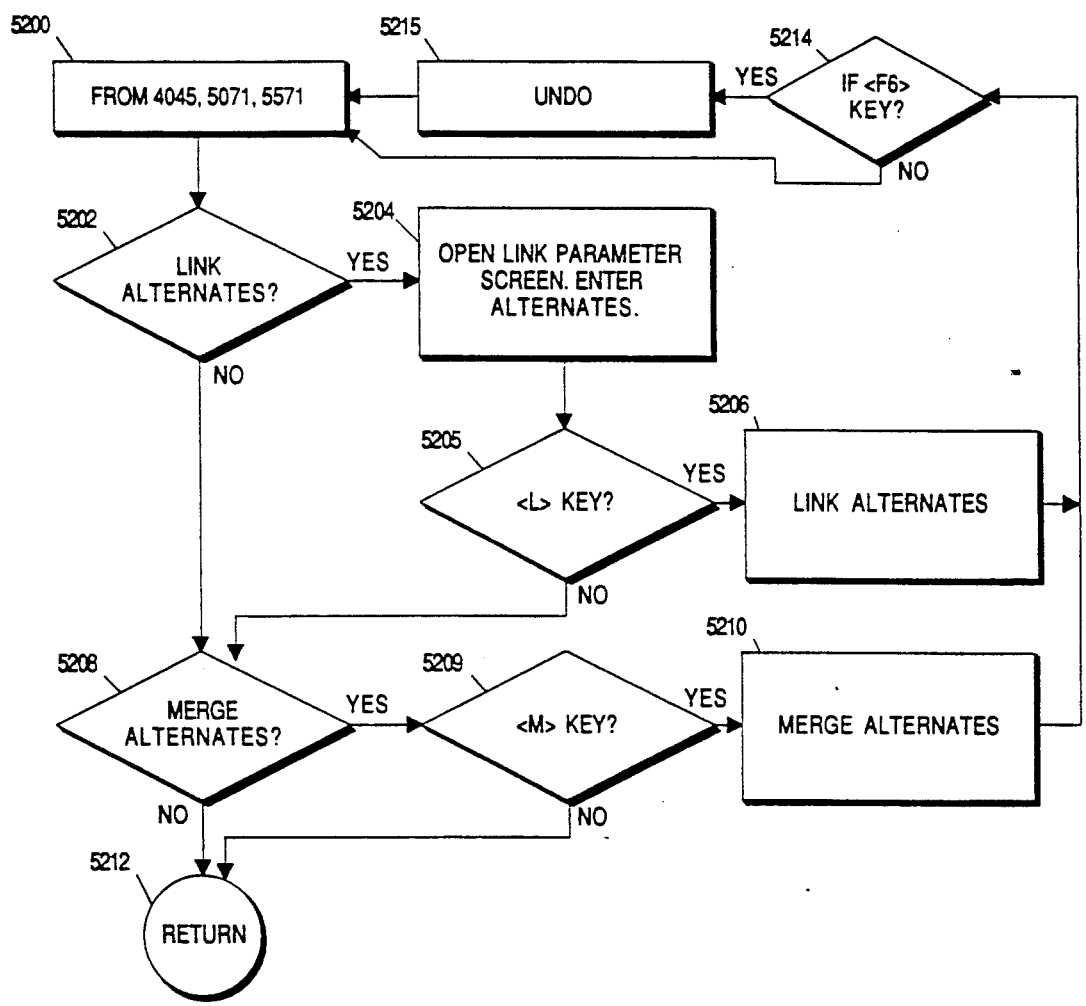
Figure 125:
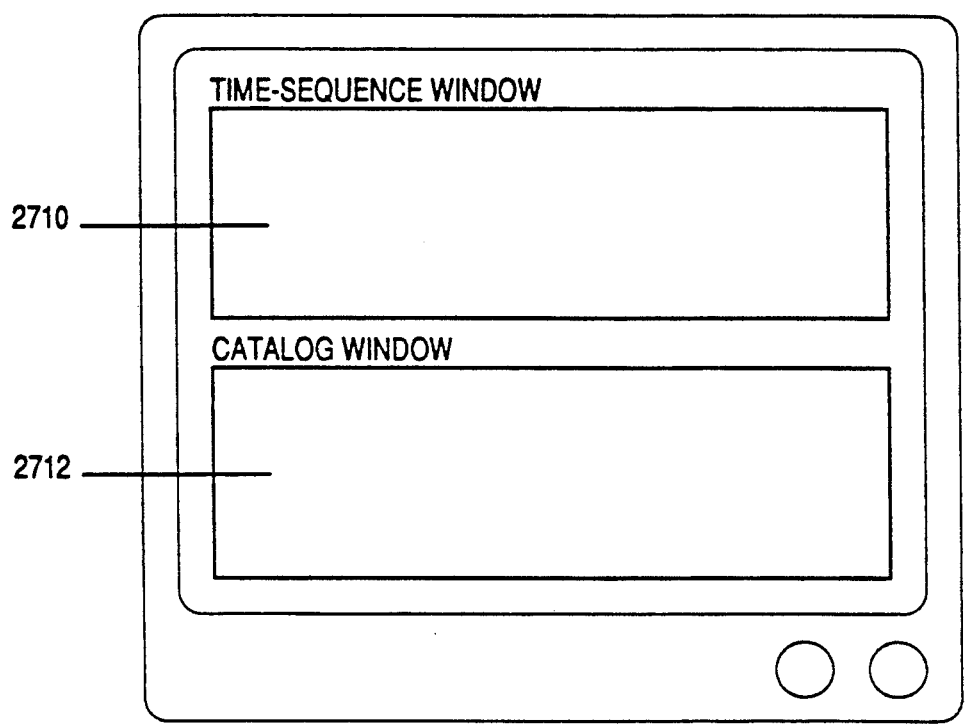

Turning now to the FIG. 38 and to FIG. 98, the user presses a Function Key 4044, 4045 to go to the screen 480 where Alternates are linked. FIG. 124 describes the process for linking alternates 5202-5206. The user enters the relevant information of the names of the Alternates 482 so that the "specialist expertise (CBT) Alternate" will be linked with the Alternate that is being constructed here: skills knowledge for the new Editorial Assistant, and internal company knowledge about the procedures, policies, and rules of this particular company.

Context Positioning

Figure 39A:
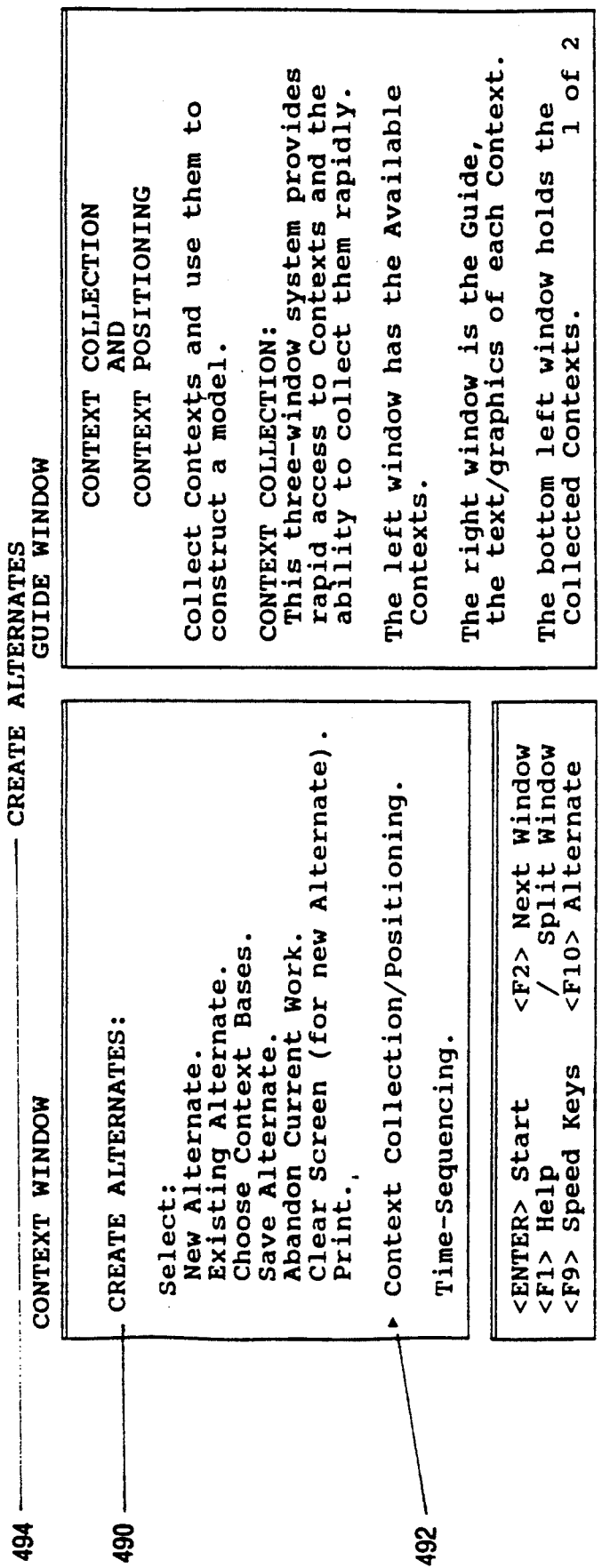
Figure 39B:
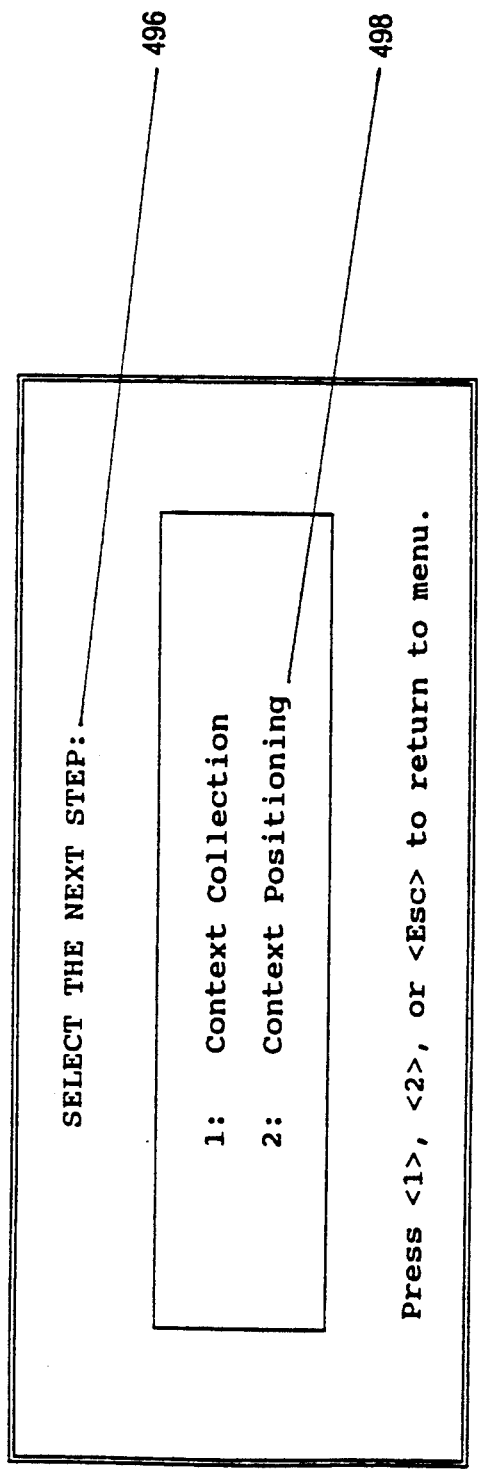

Referring to FIGS. 39 and 93, after linking the Alternates the user returns to the "Create Alternates:" menu 490. The user selects "Context Collection/Positioning." 492, which is shown in the top screen 494 printed in FIG. 39. Turning to the bottom screen 496 in FIG. 39 and also to FIG. 94, the user selects number <2> 498, 3112, Context Positioning.

As shown in FIG. 139, Context Positioning may also be reached seamlessly, by zooming up the Collected Contexts window in the lower right of the Context Collection screen 9040-9043.

Figure 40A:
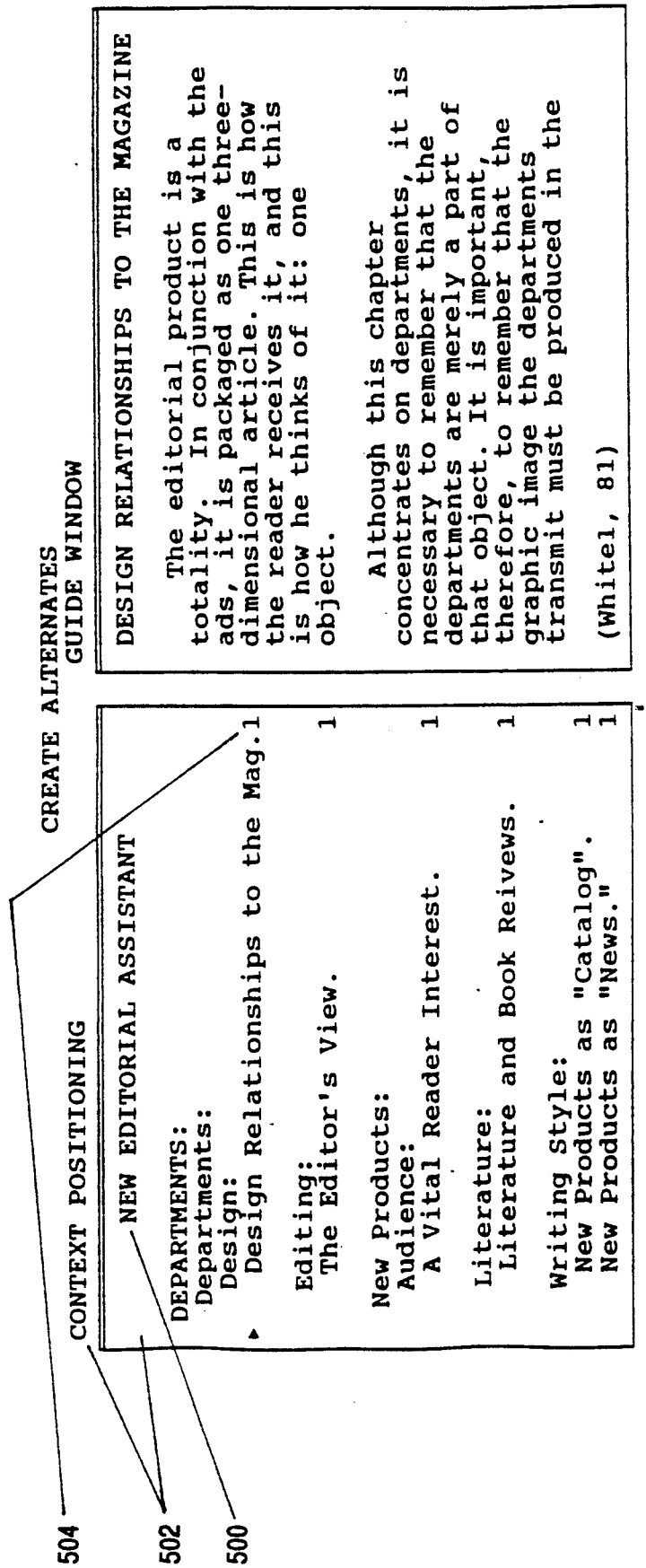
Figure 40B:
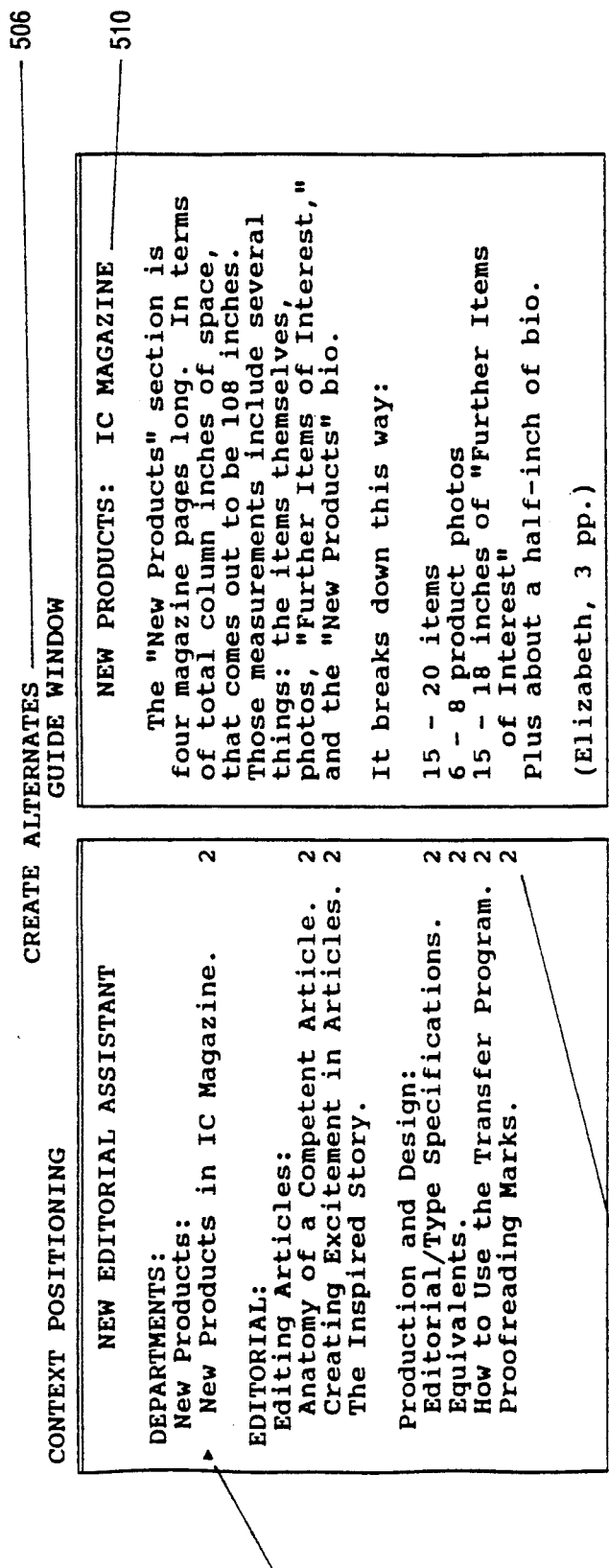

FIG. 40 shows two of the Contexts and Guides from Contexts that were collected. Referring also to FIG. 137, The top line 500 of the Context Positioning window 502, 9002 has the name of the Alternate in it, which is "New Editorial Assistant." At this time the user is beginning the process of creating the final order and sequencing of this Alternate.

In the Context Positioning Window 502, 9002, each Context has a number 504 to its right. The numbers in the top screen are all number "1". This means they all came from the first information source, the Editorial Department Context Base.

In the bottom screen 506, the numbers to the right of each Context 508 are all number "2", which shows that those Contexts came from the internal corporate information source.

Figure 99:
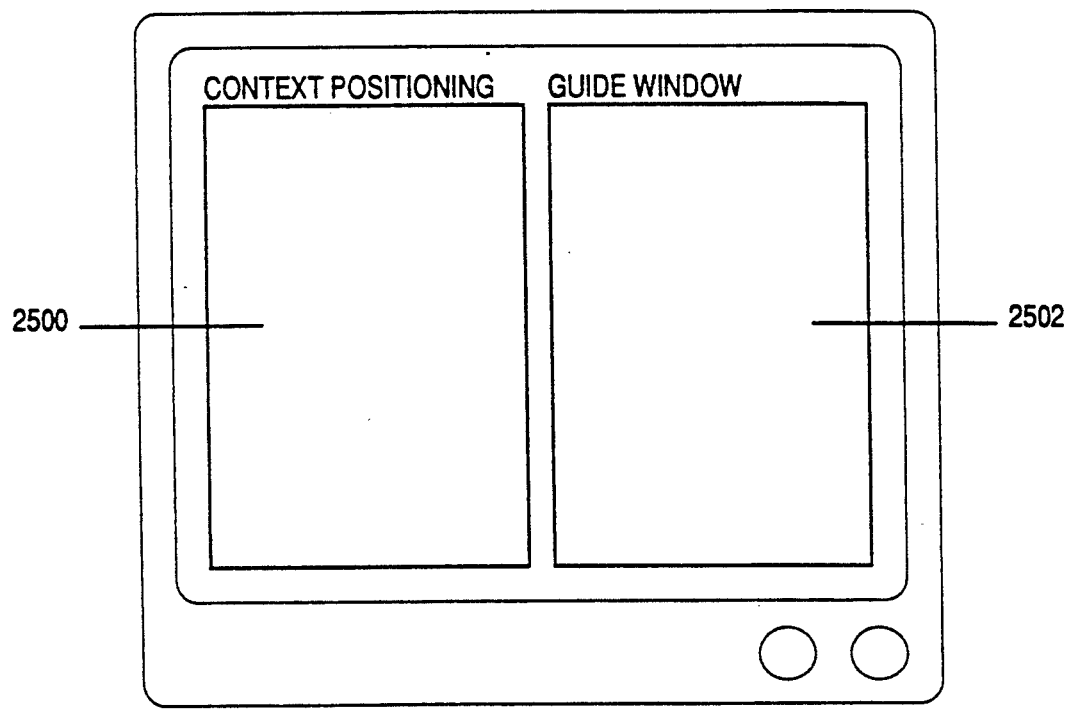

Still referring to FIGS. 40 and 137, except when examining an individual Guide, the user generally operates in the left window 502, 9002 (2500 in FIG. 99). This shows the Contexts collected using Context Collection, in the order the user added them. As the user highlights each Context 512 in the left window 502, 9002, its text and graphics are displayed in the right "Guide" window 510, 9003 (2502 in FIG. 99), permitting rapid viewing of the Contexts while the user rearranges them into an Alternate.

Figure 100:
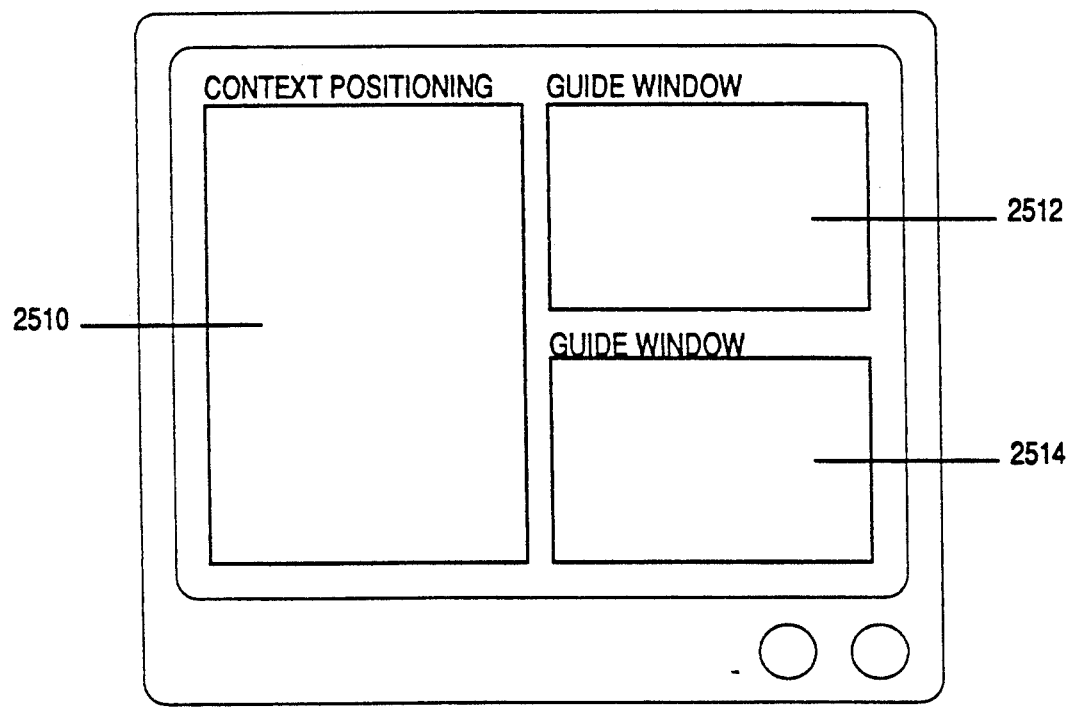

As shown in FIG. 100, it is possible to divide the right Guide window into two Guide windows 2512, 2514. As described in FIG. 137, this is done by switching to the Guide window 9005 and pressing the "Divide" key (/) 9006. By showing multiple Guides, users are able to make each of them active (5022-5024 in FIG. 103) to make rapid judgements about the relationships between various Contexts, to cluster them or to select the most appropriate ones for a given situation.

Figure 41:
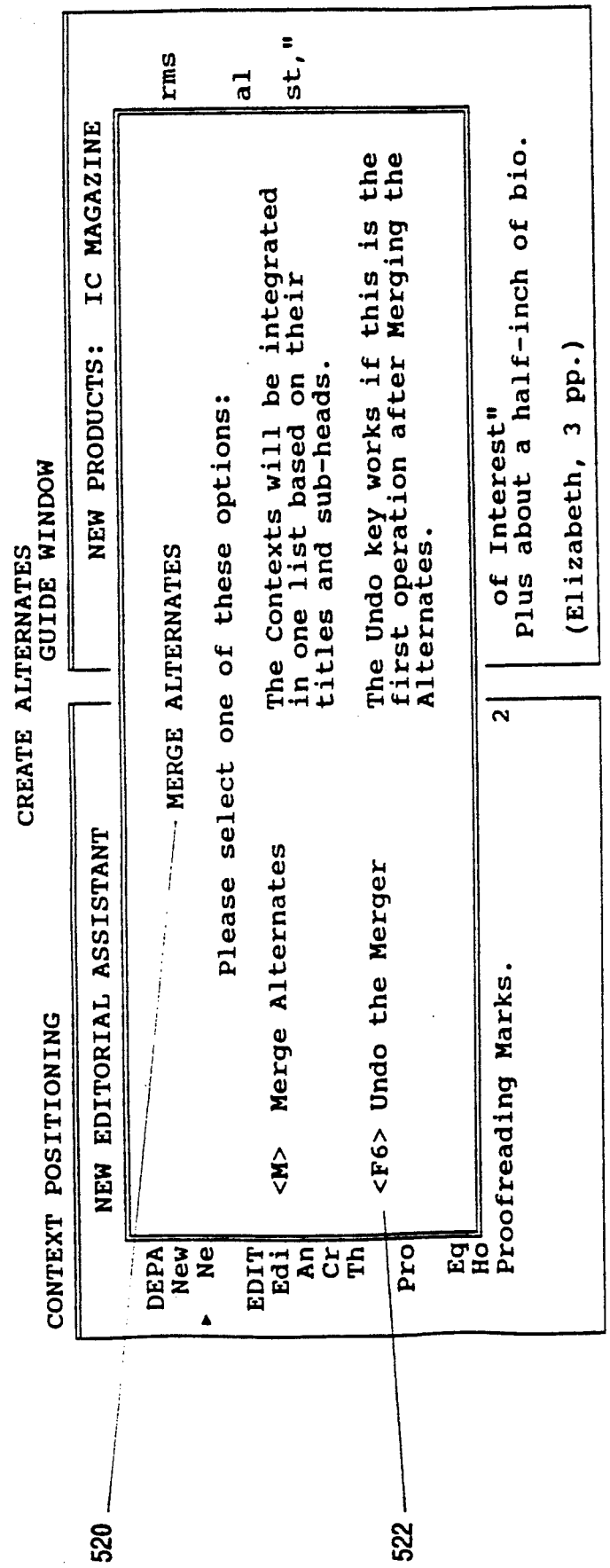
Figure 105:
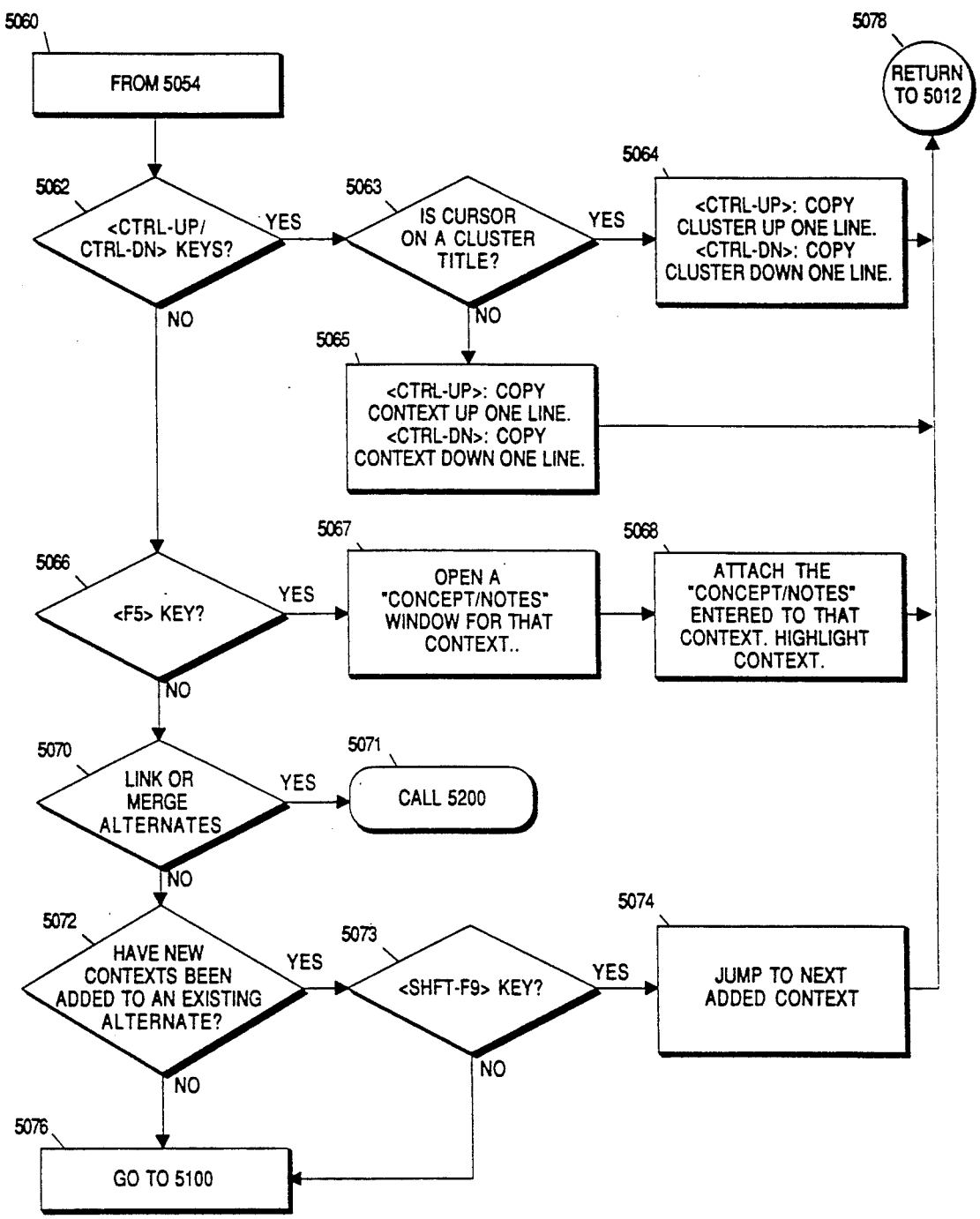

Turning now to FIGS. 41 and 105, the user is merging the collected Contexts from separate sources into one Alternate. To do this, the user presses the "Merge Alternates" function key 5070 (and 5208-5210 in FIG. 124). A new window 520 will appear on the screen which gives the user the option of undoing the merged Alternate 522, 5214, 5215 if it turns out that this action does not produce the results wanted.

Figure 42A:
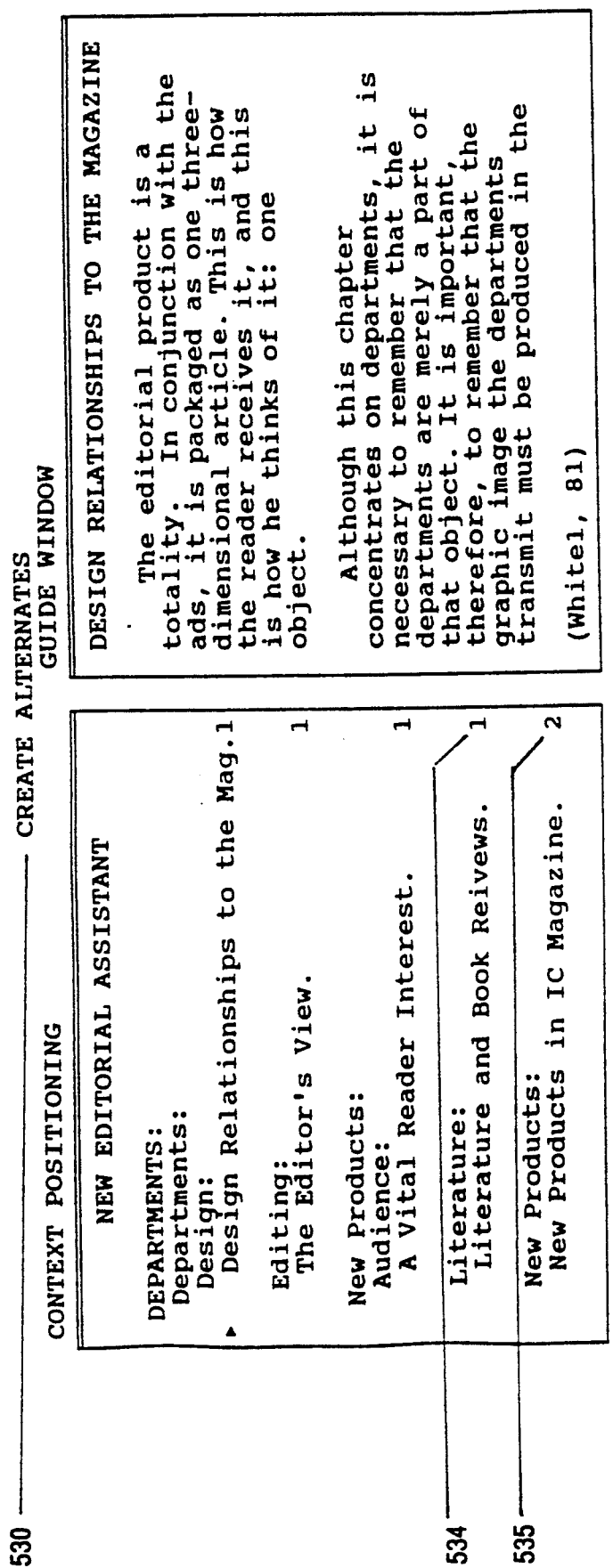
Figure 42B:
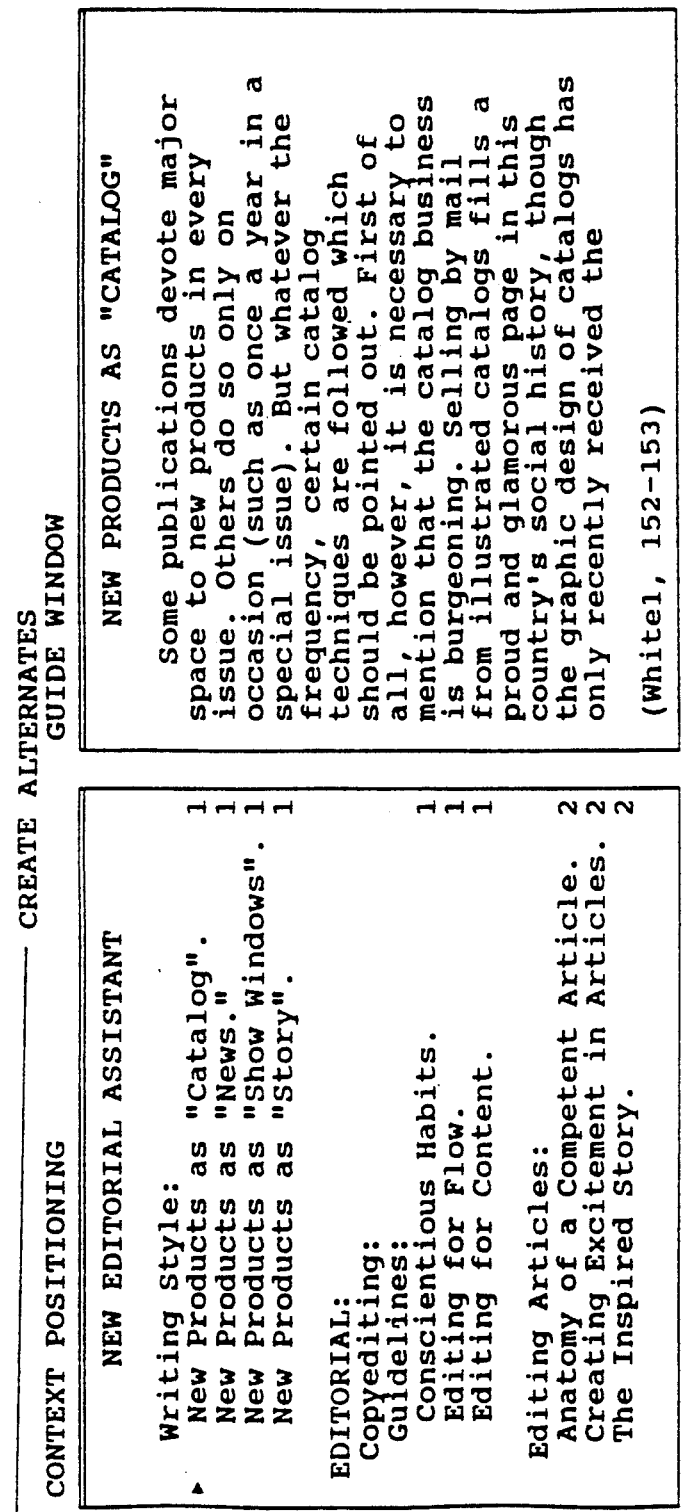

Turning to FIG. 42, two screens 530, 532 are displayed from the merged Alternate. Note that the Context Bases are combined and indicated by the number "1" 534 or "2" 535 in the right column of the Context Positioning window. This level of automated merger is possible because both Context Bases were set up with a parallel internal structure.

Figure 43:
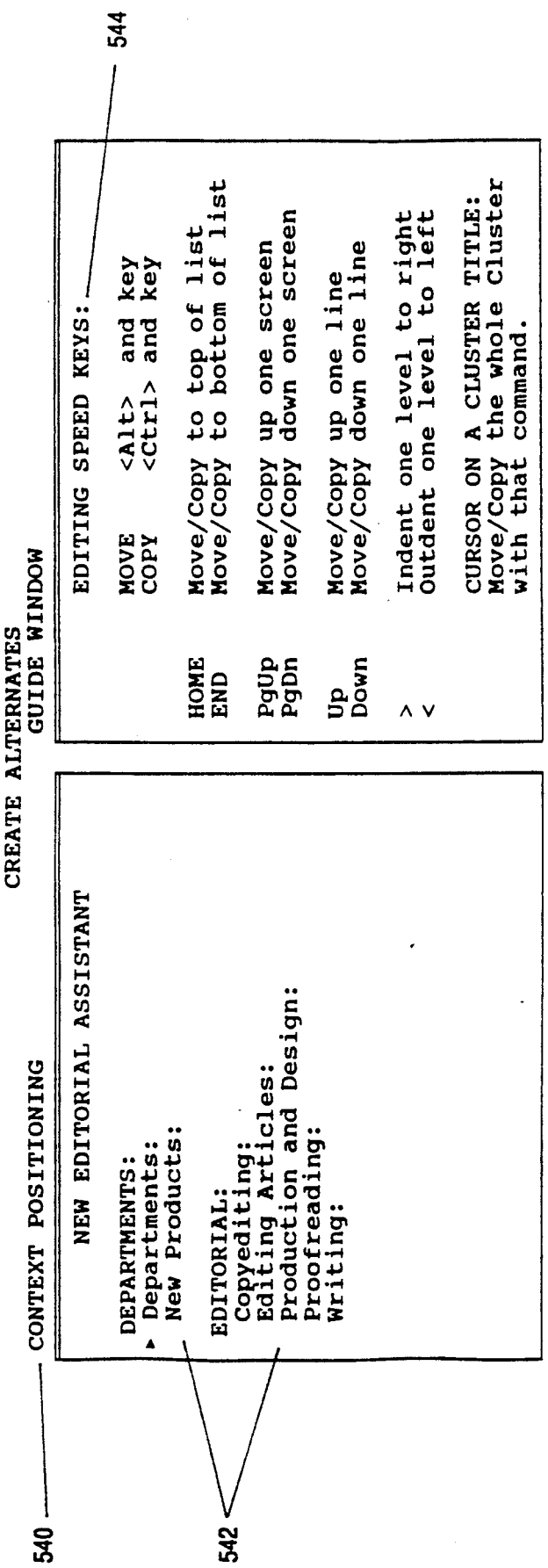

Turning to FIGS. 43 and 138, the user presses the <Minus> key 9018, 9019 until the list in the Context Positioning window 540 is contracted to the level shown. This brings to the forefront the current structure of the Alternate 542.

When the cursor is no longer on any individual Context the Guide Window displays a "how to" information screen 544, 9016, 9017. Since the user is in the Context Positioning mode, the "Editing Speed Keys" are displayed. These keys enable the user to rearrange the order of the clusters of Contexts, and the individual Contexts (depending on which level of detail is displayed in the Context Positioning window).

An editing method is built into the process of Context Positioning (FIGS. 102-106). This pattern of keys and displaying this information on the screen may be different depending on different types of software designs.

Figure 44A:
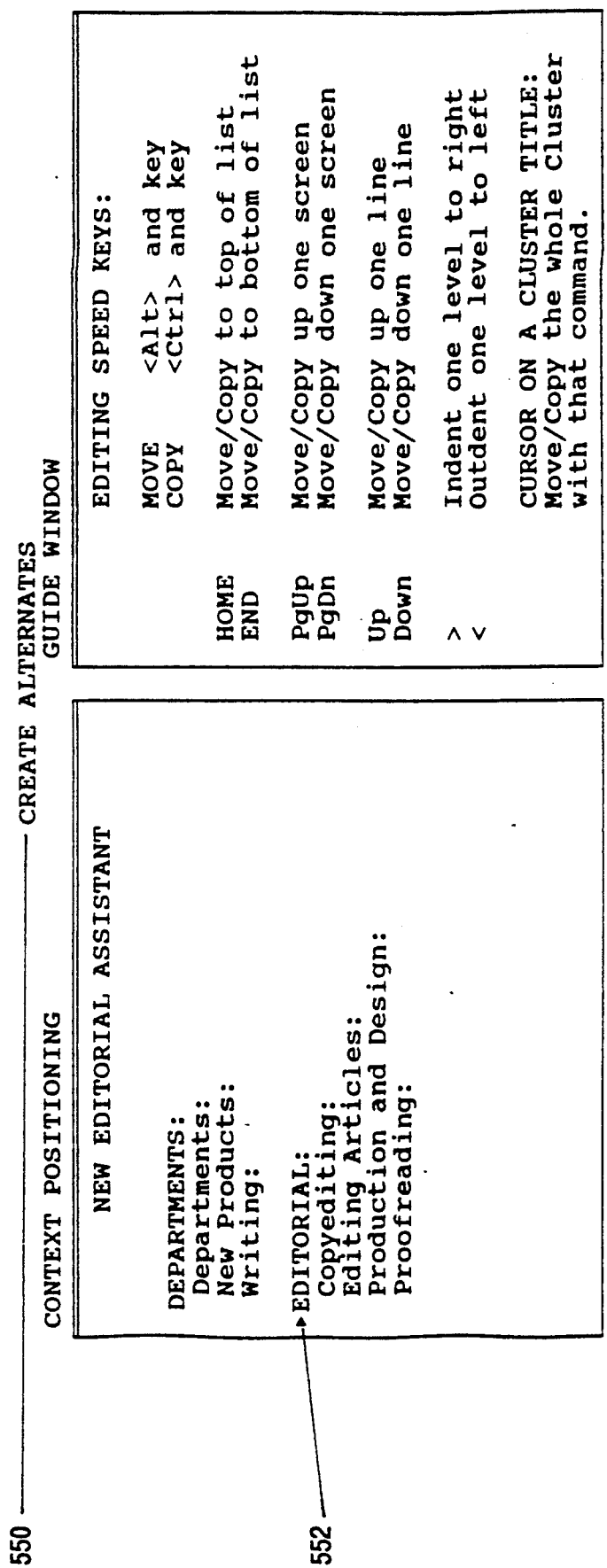
Figure 44B:
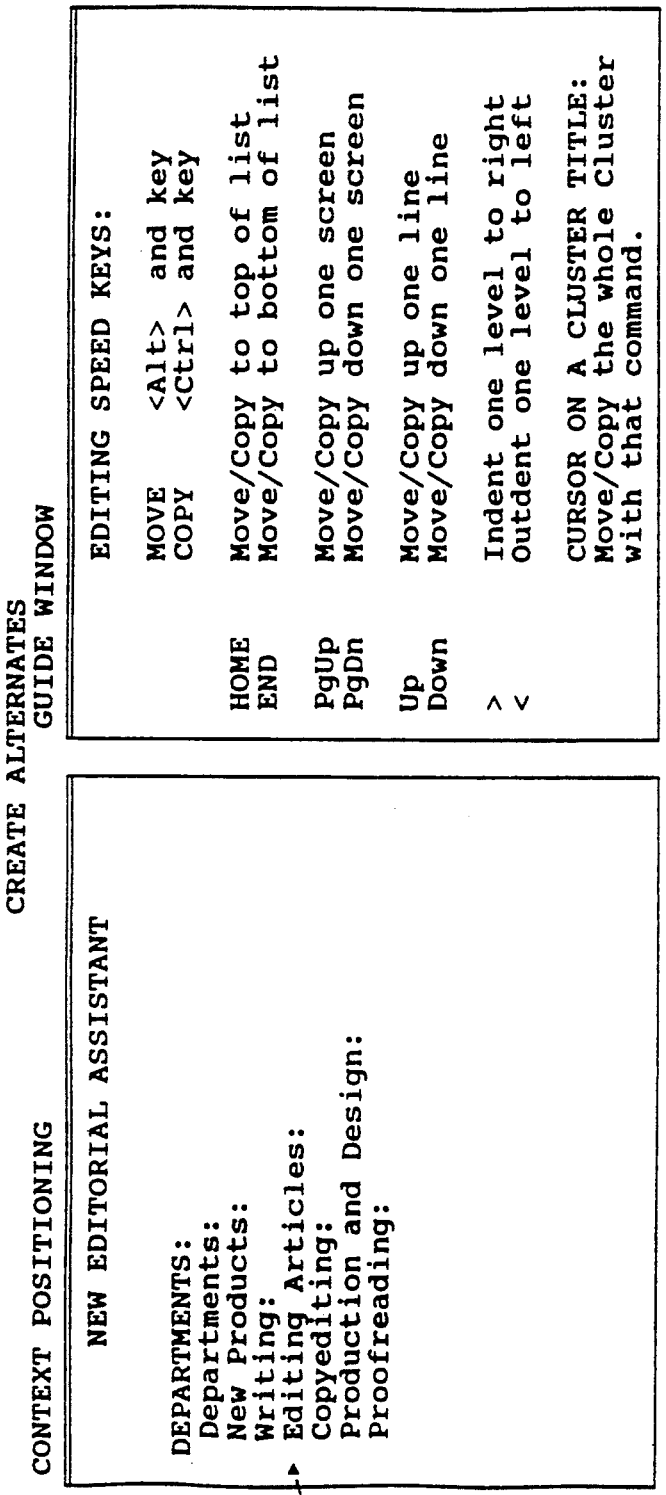
Figure 103:
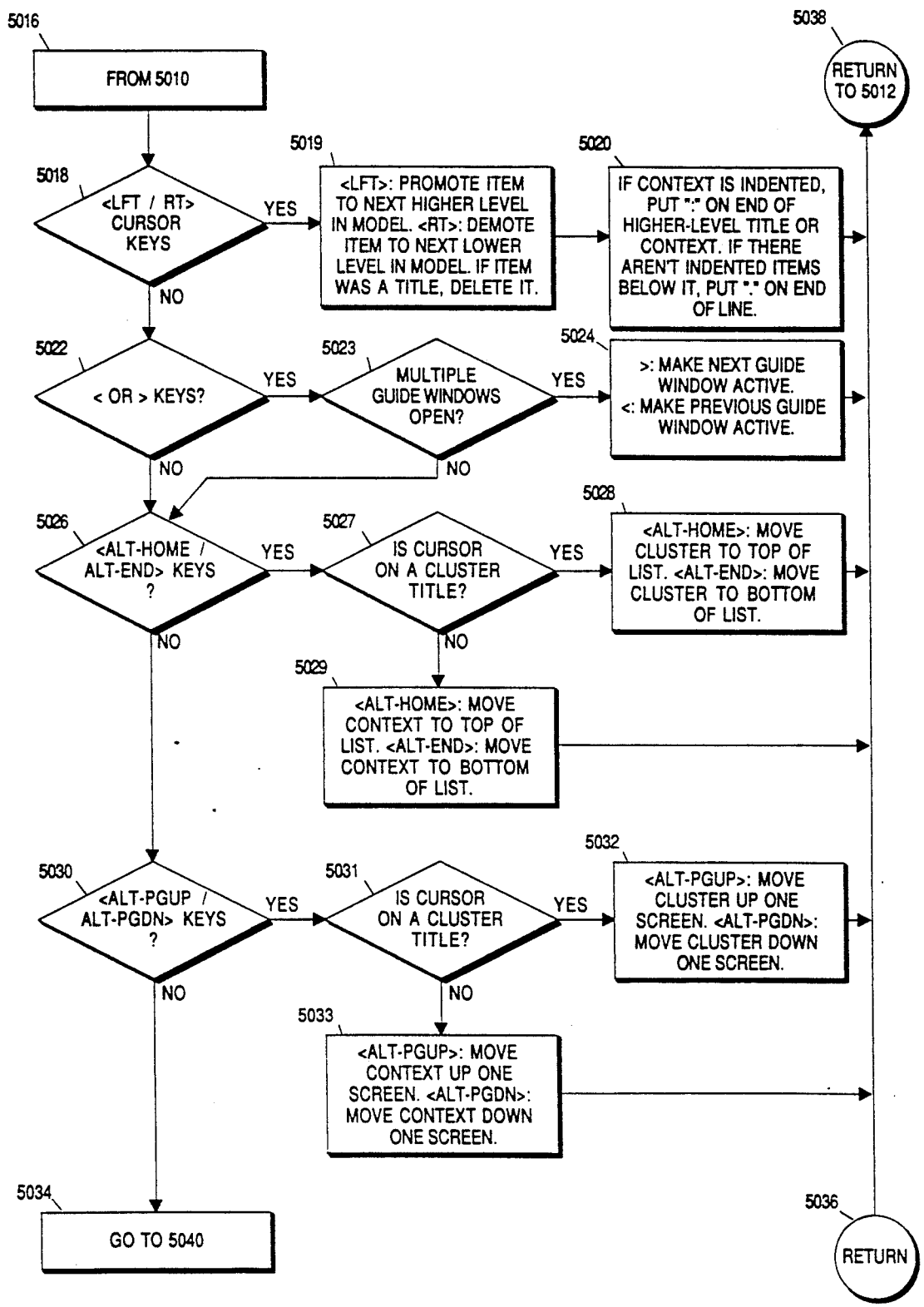
Figure 104:
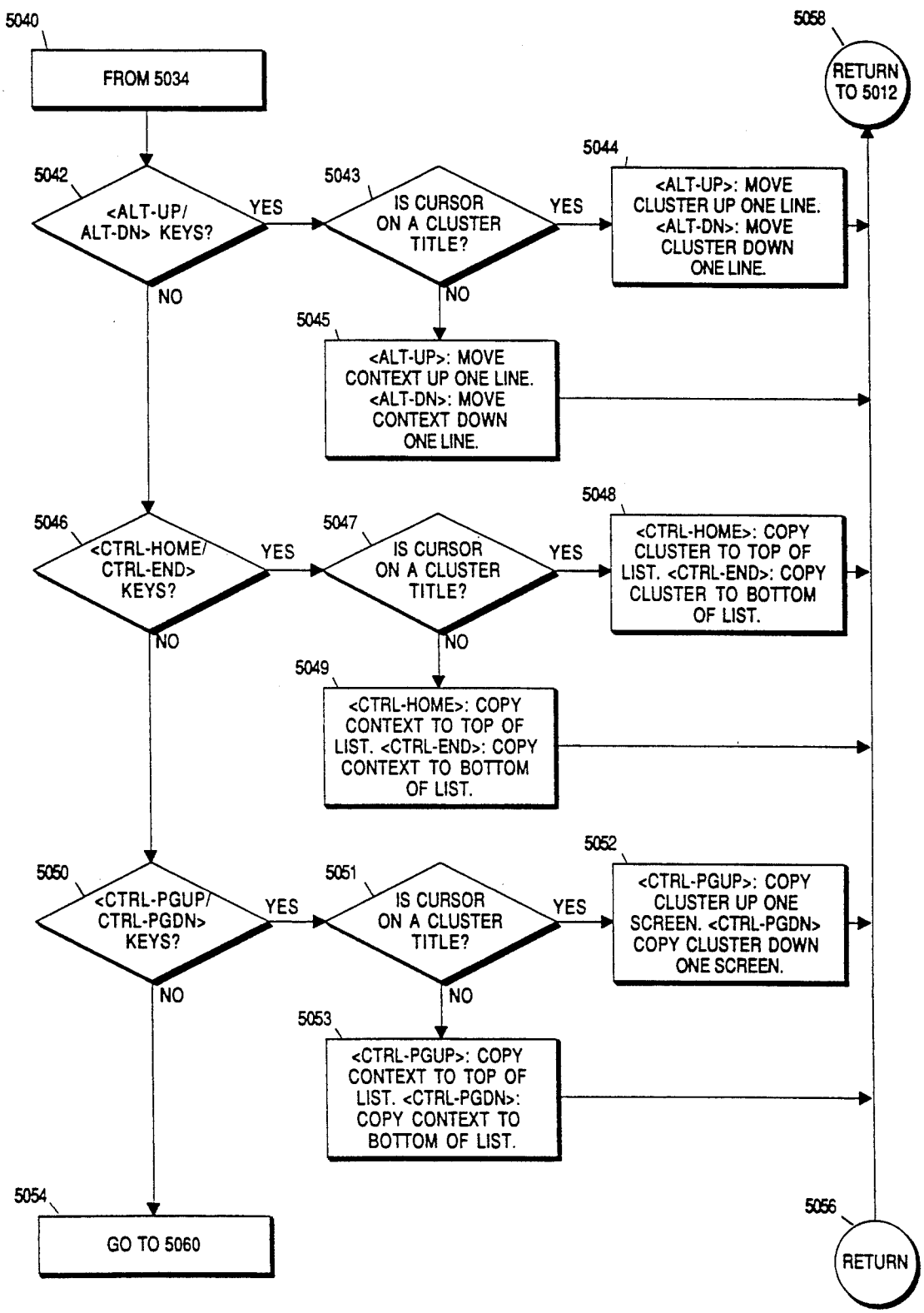

Several editing moves are unusual. Turning to FIGS. 44 and 103, the top screen 550 shows the cursor highlight on the line "EDITORIAL:" 552. By indenting "EDITORIAL:" to the right, this indents a title that is over a title, without any Contexts in between. As a result, the title that is indented disappears and is deleted, resulting in the line that is printed at the bottom of FIG. 44. As shown in FIG. 103, the indenting function is accomplished using the left and right arrow keys 5018, 5019.

Figure 45A:
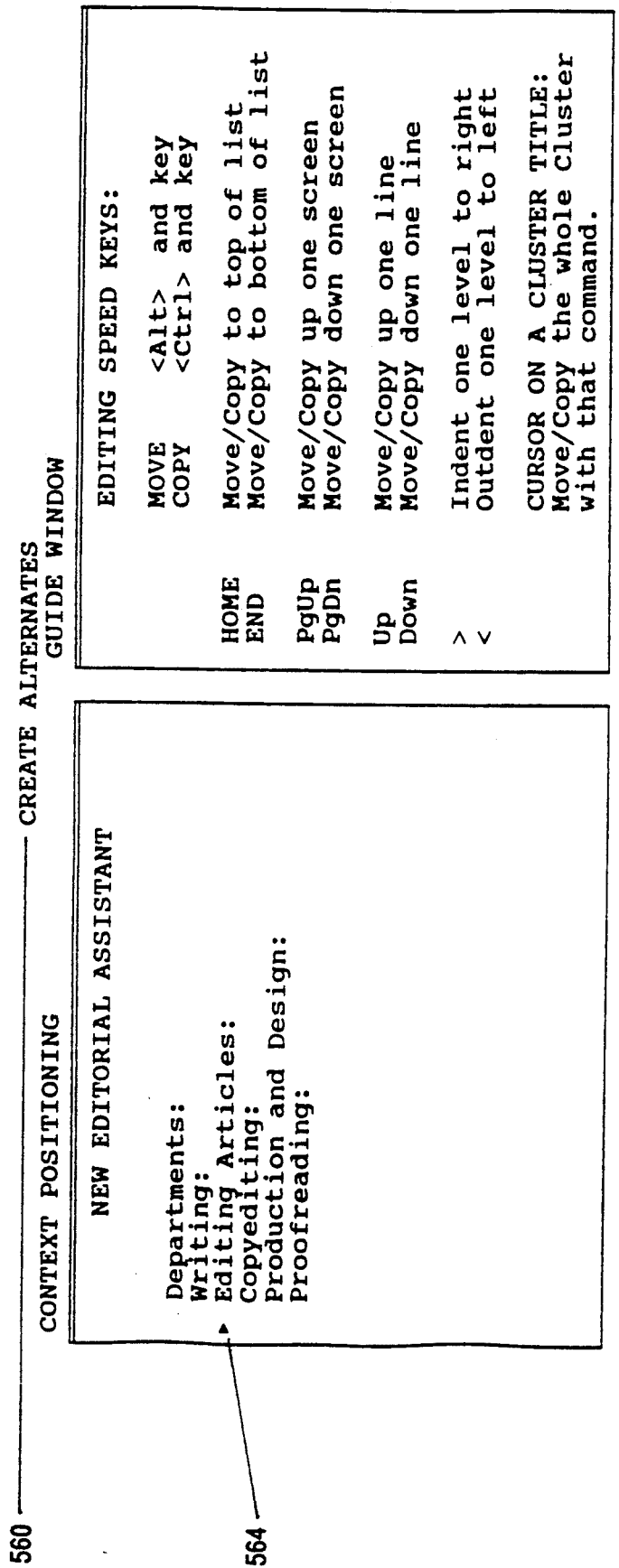
Figure 45B:
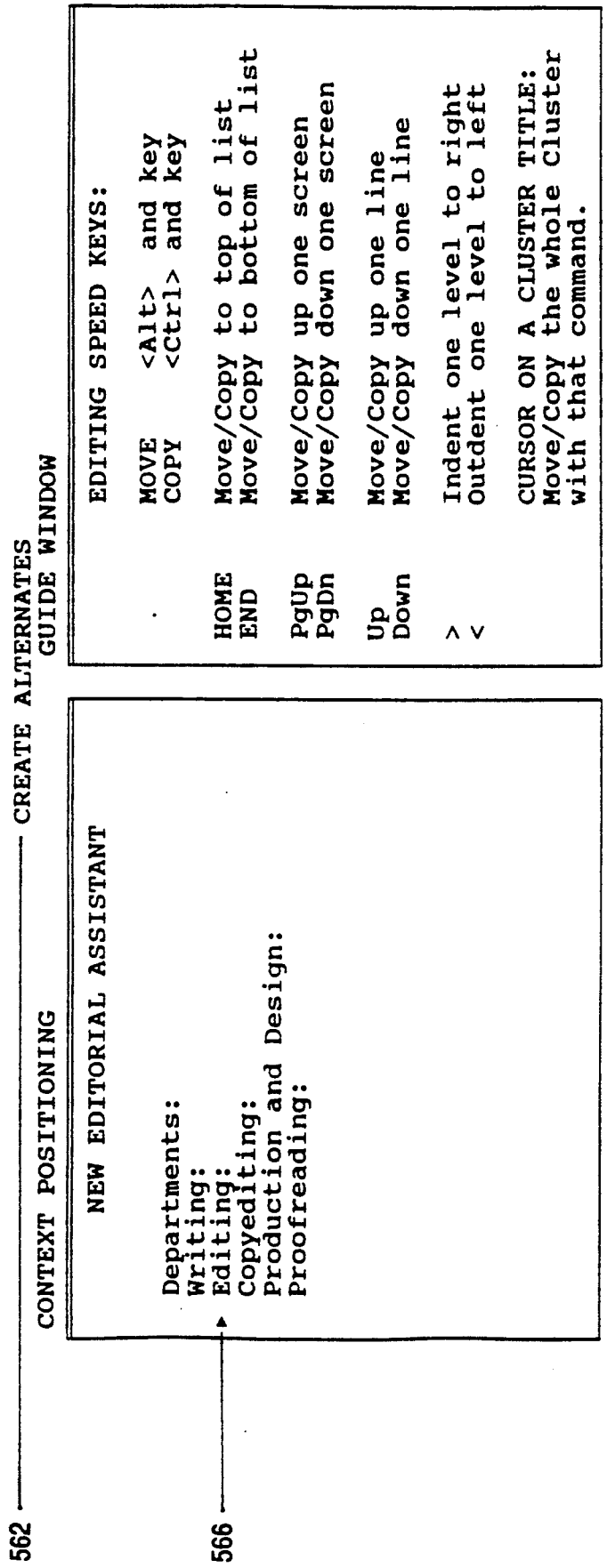
Figure 106:
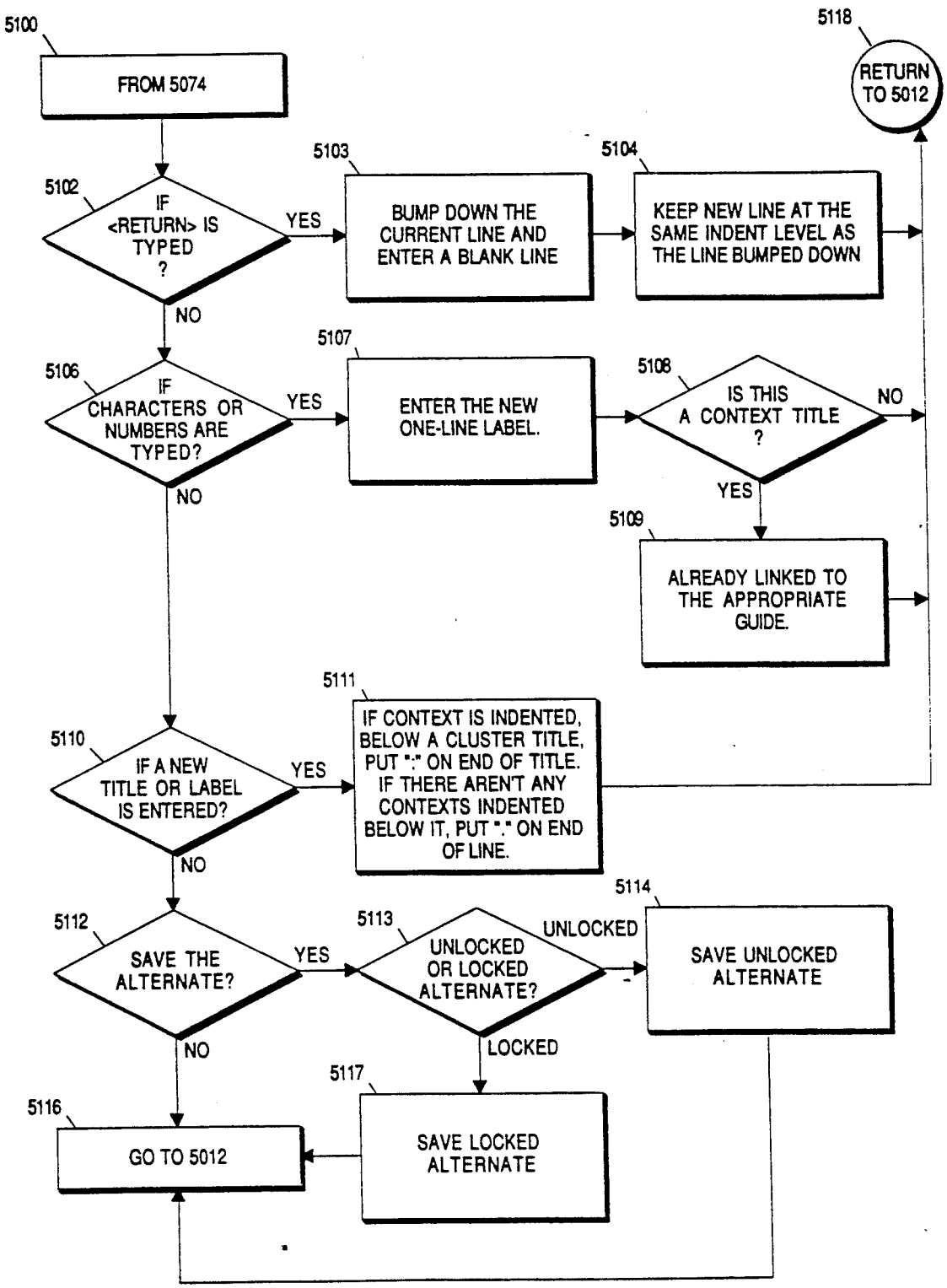

Another unusual type of editing is shown in the screens 560, 562 printed in FIG. 45. In the top screen 560, the cursor is on the title "Editing Articles:" 564. By "overtyping", the user is able to type in a new title, which is "Editing:" 566, as shown in the bottom screen 562. FIG. 106 describes the method for entering a new title 5106-5109. This title was changed because the job description and the Contexts that were collected apply only to editing, not to working with complete articles or with authors. Since only a limited number of Contexts were included in this area (the ones appropriate for a new Editorial Assistant to start writing Departments of the magazine), it was clearer to retitle this section.

Another type of editing is shown in FIG. 105. A Function Key 5066 opens a "Concept/Notes" window for that Context 5067. This window is blank and the user can type in concepts or notes to explain that Context, its use, value, etc. These concepts and notes are attached to that Context and they stay with it, just like its Guide, even if it is moved or copied.

Figure 46A:
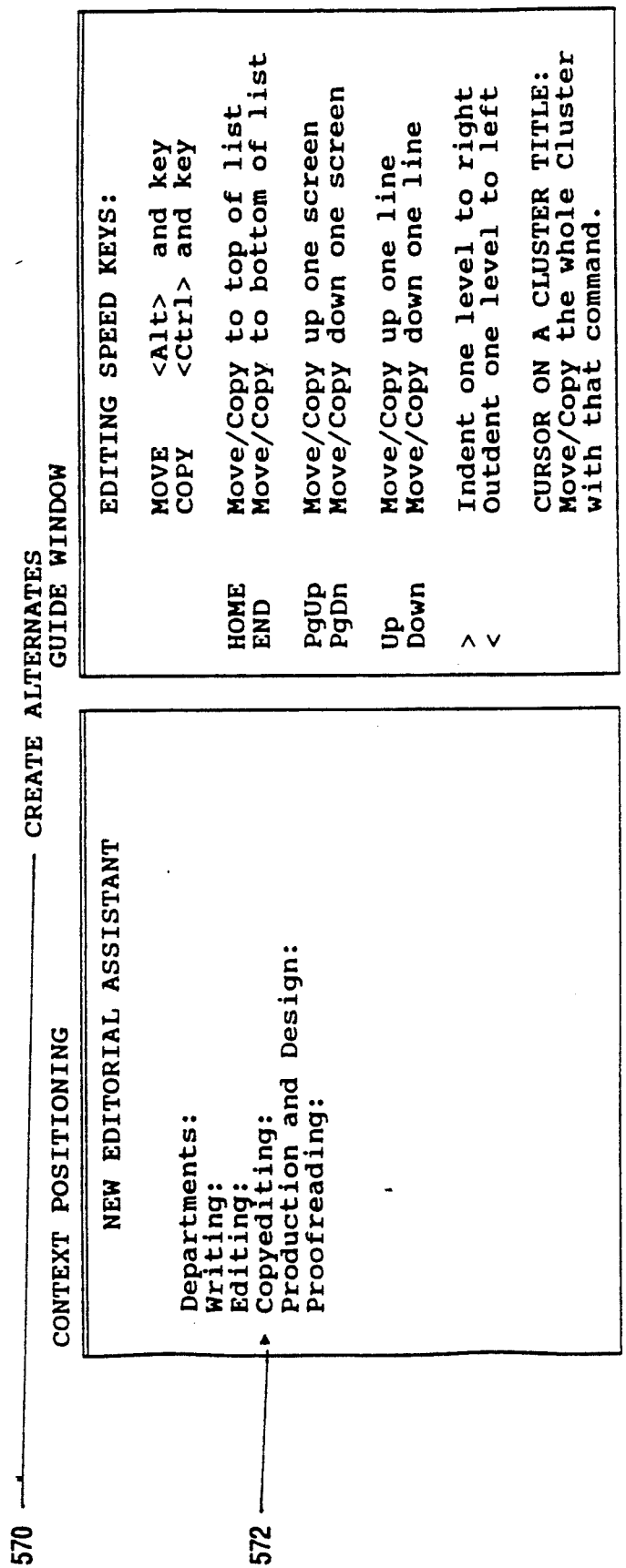
Figure 46B:
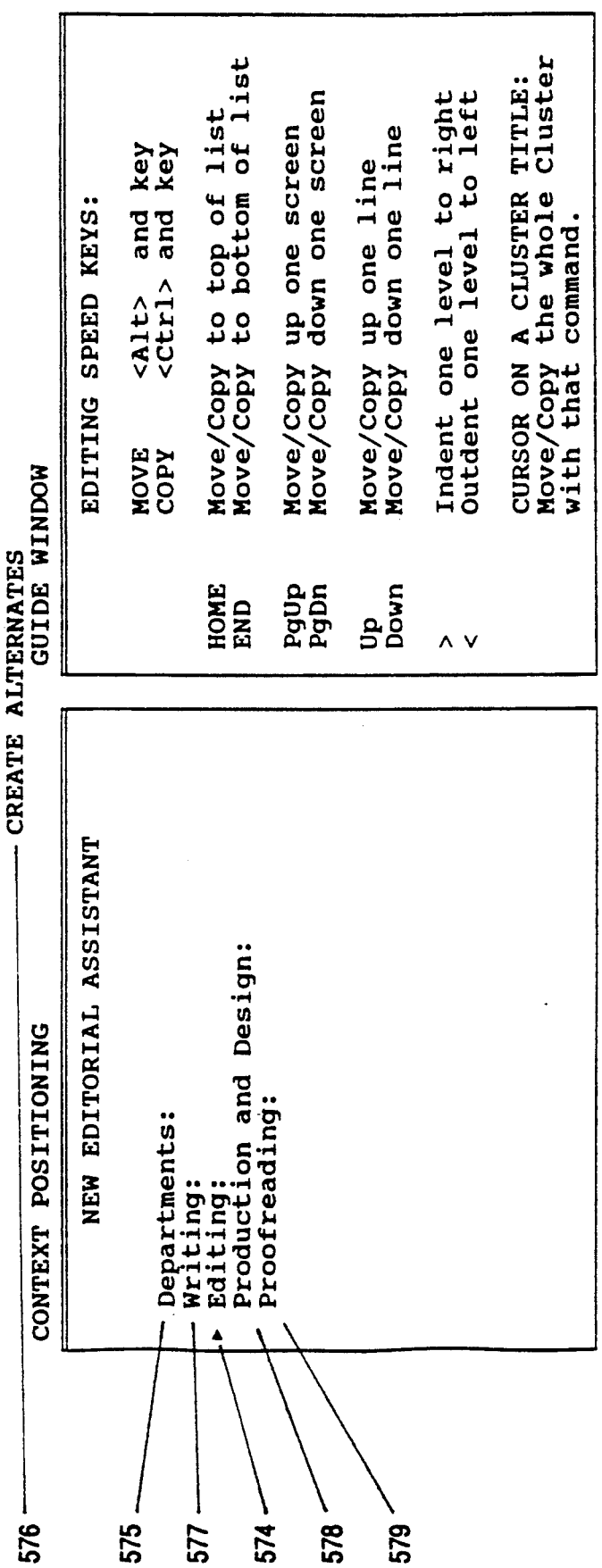

A third type of rearranging is illustrated in the top screen 570 in FIG. 46 and also in FIG. 103. The cursor highlight is on "Copyediting:" 572 (FIG. 46), which is one form of editing. Using the right indent key, 5018, 5019, "Copyediting:" is made a sub-head under "Editing:". The result 574 of this move is shown in the bottom screen 576 of that FIG. 46.

This bottom screen 576 in FIG. 46 shows the final Model for this Alternate. It is a considerable rearrangement from the initial order in which the Contexts were collected. This Model is one possible way to look at this job. In fact, this Model is how the manager believes the new Editorial Assistant ought to do her new job.

The Editorial Assistant's main responsibility is the Departments of the magazine. The first section, "Departments:" 575, explains them to her and answers questions about them when she works on them.

The second section, "Writing:" 577, is what she is going to be learning how to do. She needs to learn how to write Departments, and this section holds the relevant Contexts that can help her get up to speed as she writes the Departments.

Once she's written the Departments, she has to edit them. Therefore, Contexts about "Editing:" 574 comprise the third area of her responsibilities.

In addition to writing Departments, the new Editorial Assistant ought to have new responsibilities as the Editorial Department's liaison with the "Production and Design:" Department 578. Therefore she has been provided Contexts that assist her in learning and using the company's internal procedures. These include skills, policies, and relationships in the areas of production and design, and the transfer of text and graphics between the Editorial and Production Departments.

The last area of Contexts is "Proofreading:" 579. She must proofread the work that comes back from production before giving it to editors for them to check prior to publication.

Figure 47A:
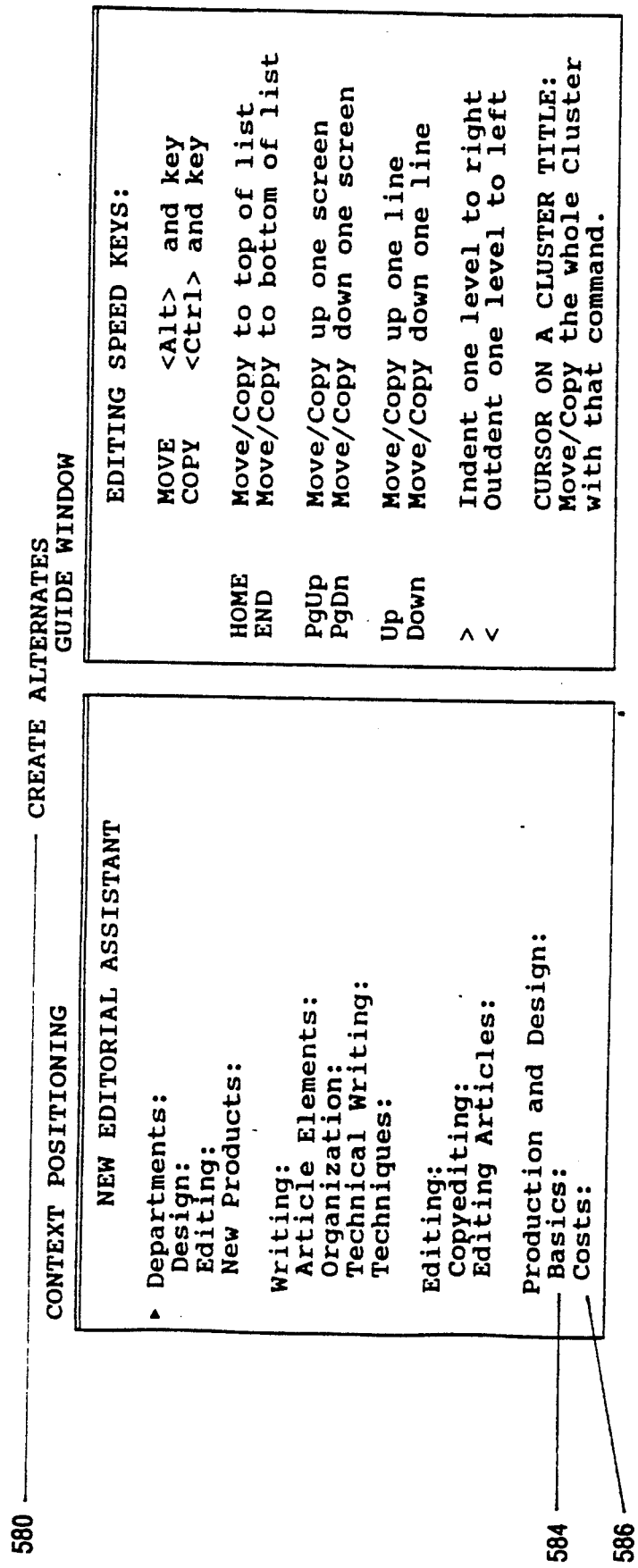
Figure 47B:
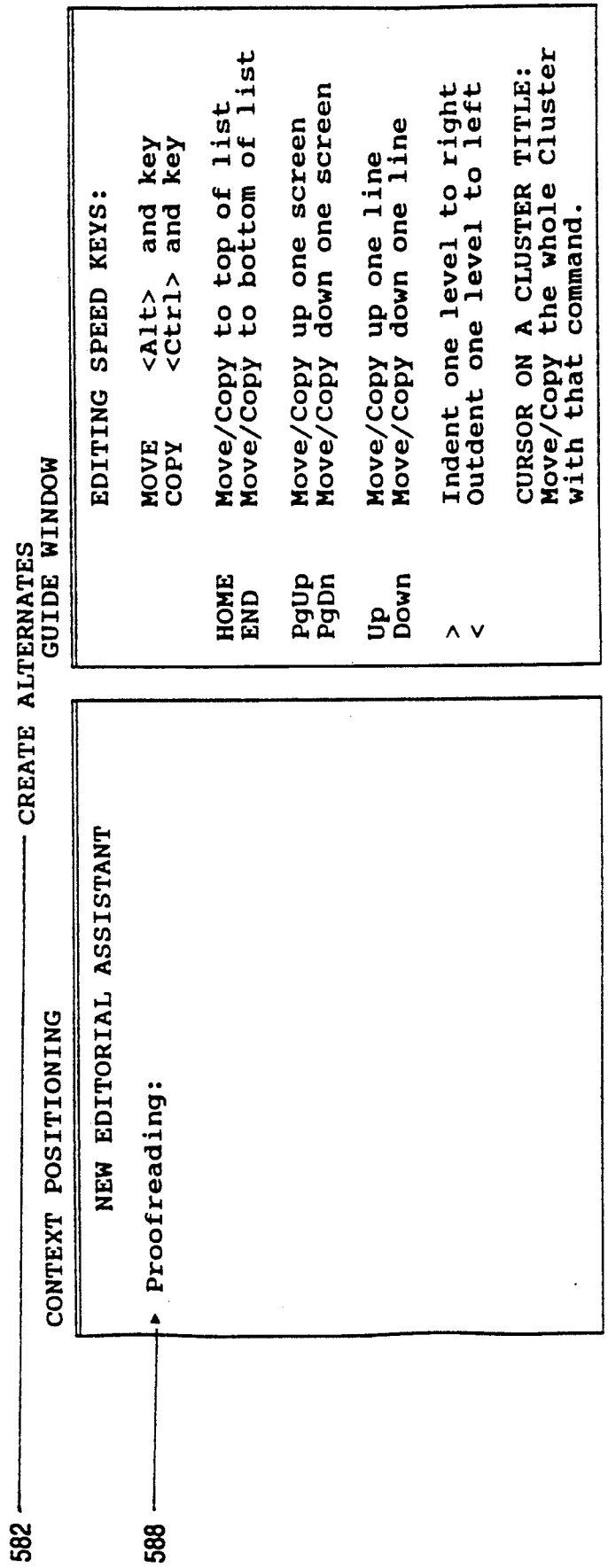
Figure 47C:
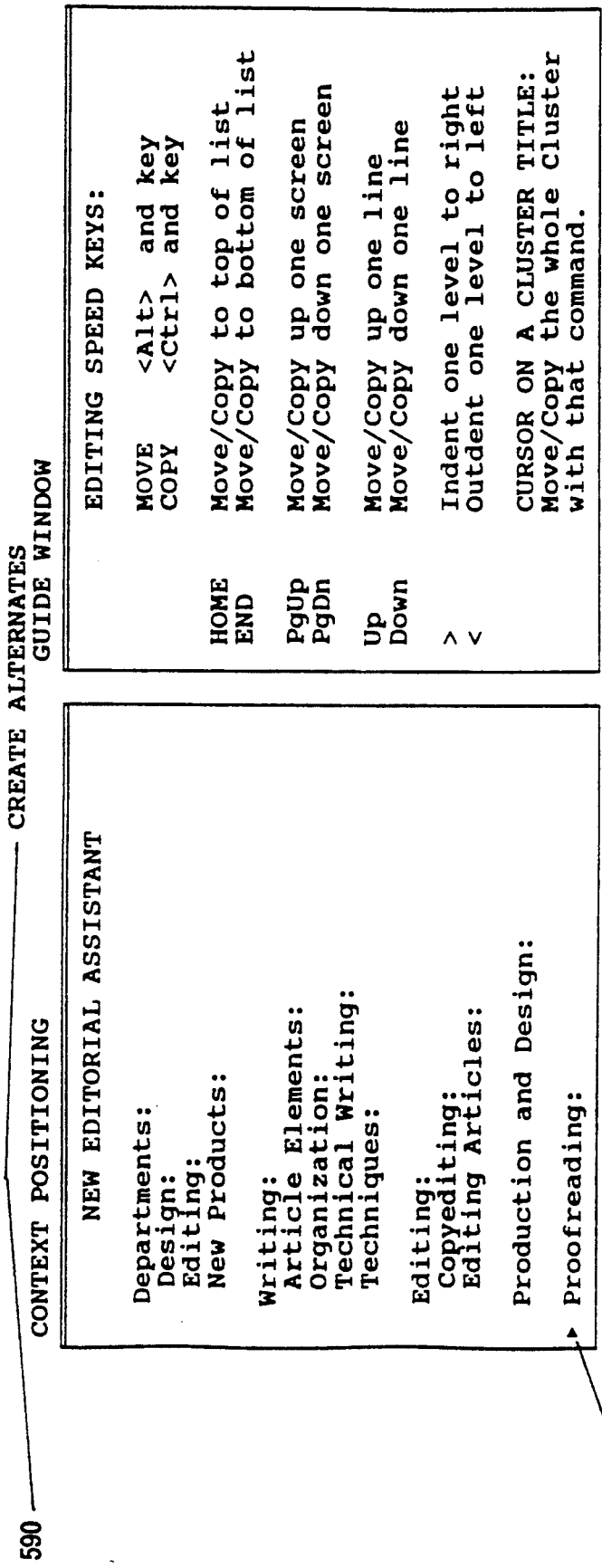

Turning now to FIG. 47, the top two screens 580, 582 are printouts of "New Editorial Assistant" Alternate after it has been expanded to the next level by pressing the <Plus> key 9018, 9019 (FIG. 138).

Since an Alternate is easier to access for a new user if its structure is displayed in one window, two options are possible: either change the size of the window or condense the Alternate. In this case the Alternate is condensed (i.e., edited). This shows how the same editing functions may be used to reshape the Alternate at each finer level of detail.

The main editing operation in FIG. 47 is to indent the two cluster titles under "Production and Design:". The cursor is placed on "Basics:" 584 and "Costs:" 586 and each one is indented to the right 5018-5020 (FIG. 103). This makes them disappear from the list at this level. As a result, the last title, "Proofreading:" 588, is moved to the bottom of this screen's window 592 from the next screen. 588

The bottom screen 590 in FIG. 47 shows the final Alternate at this level of detail.

In the same way that Context Positioning is used to create a "Outline Model View," it is also used to create a "Time Sequence Model" view. Both the Outline Model and the Time Sequence Model views may be present in every Alternate. They may be identical or they may provide two different orders of Contexts to access the Guides.

The value of an Alternate is greater than simply giving individuals access to Contexts that Model their Preferred Situation. The Time Sequence Model assists early adaptation and results.

The Time Sequence Model is specifically designed for the implementation of the Alternate. For many situations, it adds practical planning by providing an implementation sequence for the skills, responsibilities, and relationships in the Alternate.

The Time Sequence Model view resembles project management. Though project management is intended to be applied by project managers, the Contextualizer provides every person who has an Alternate with an implementation (time sequence) view of his or her jobs and his or her responsibilities.

As shown in FIG. 137, to access the Outline Model and Time Sequence Model views, the user activates the Context Positioning window, 9002, then uses the "Divide" key 9004. When that key is used in this window, it switches back and forth between the Outline Model view and the Time-Sequence Model view 9005-9008.

Figure 48A:
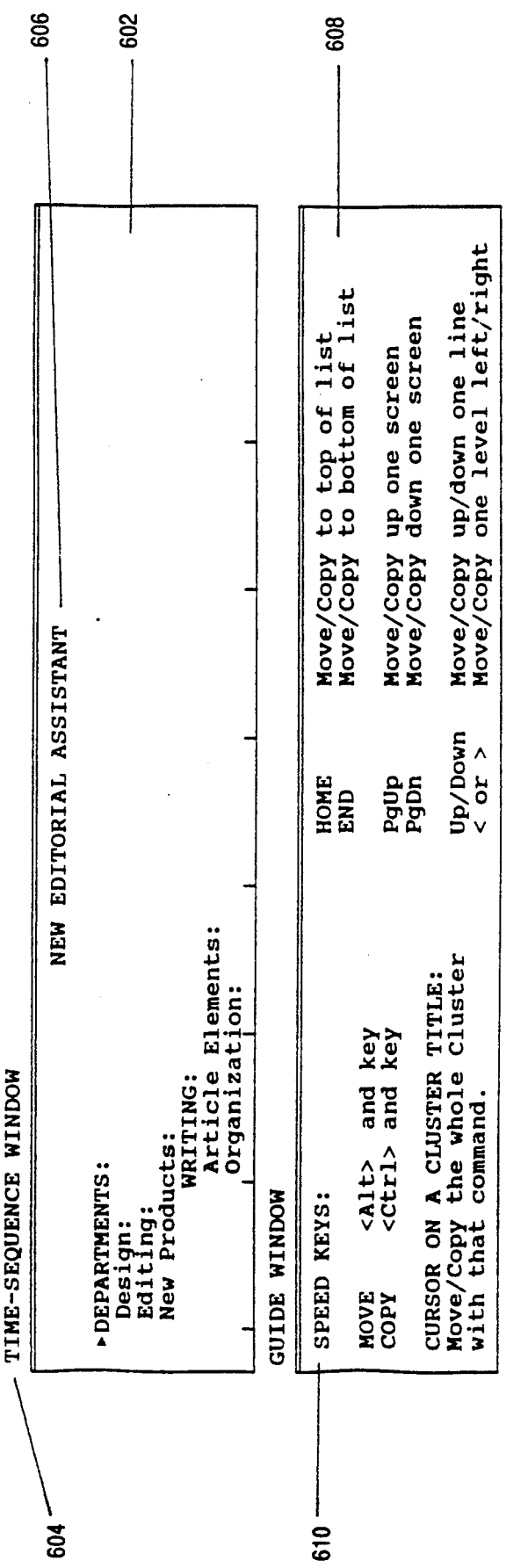
Figure 48B:
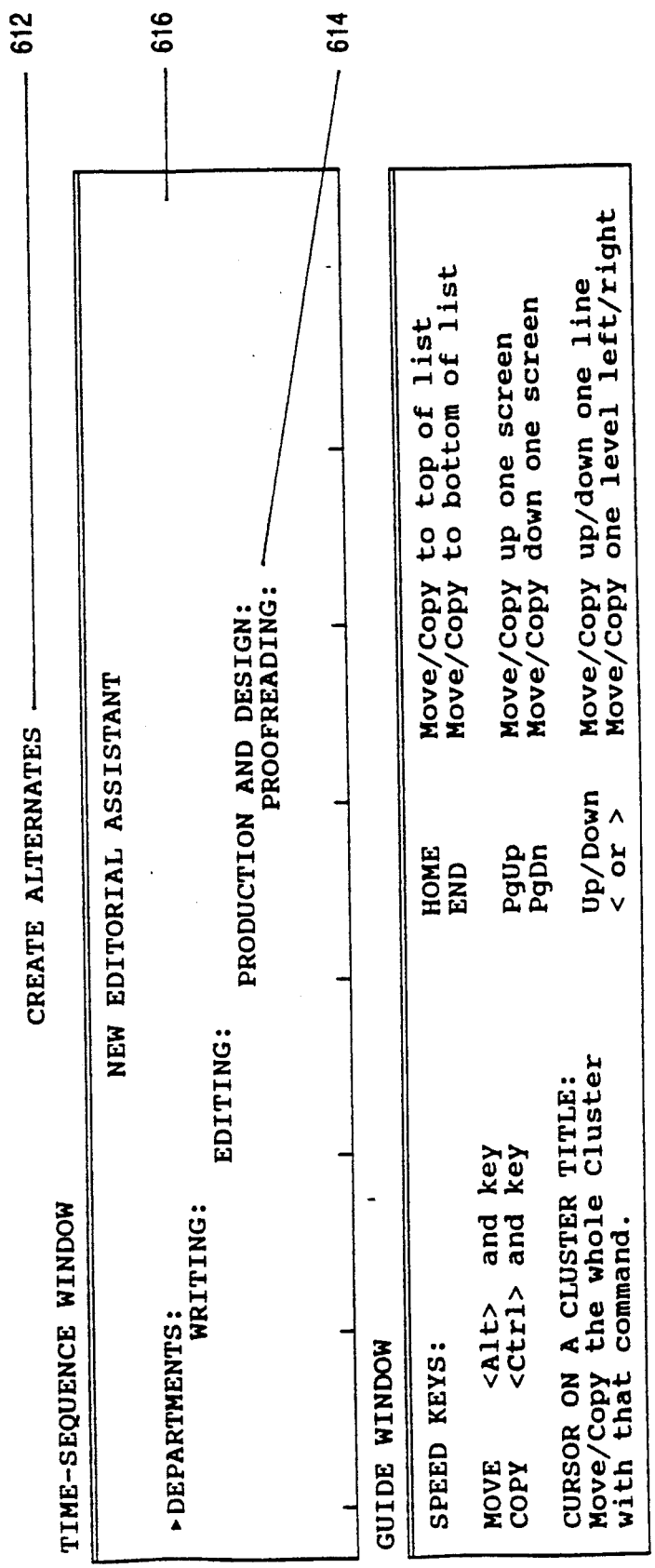
Figure 101:
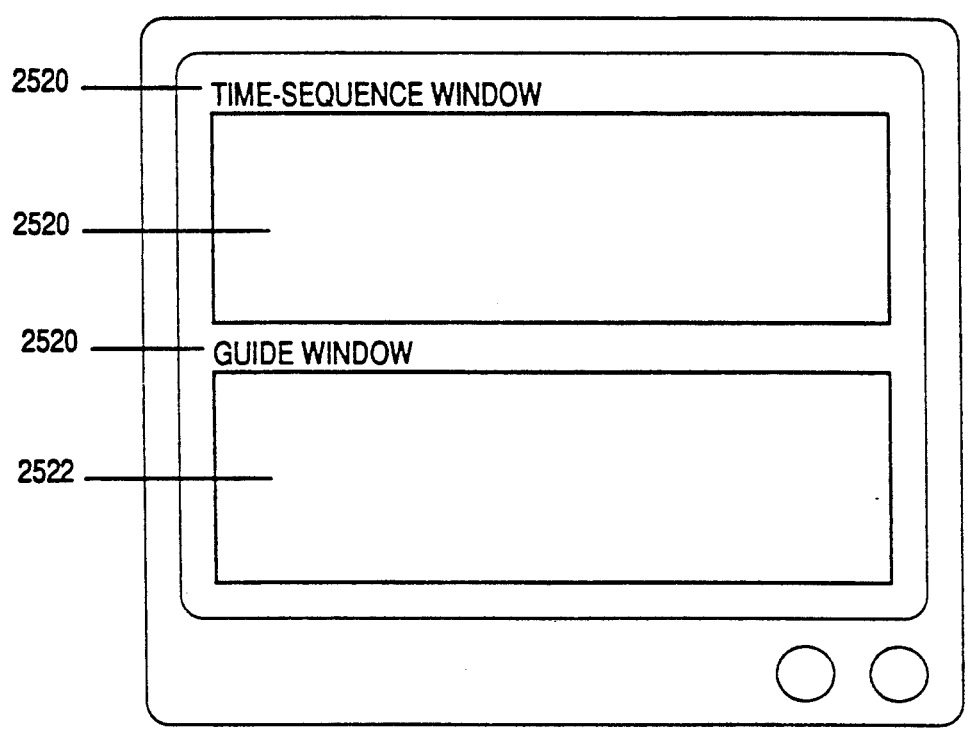

Turning now to FIG. 48 and 101, the top screen 600 shows the result when the "Divide" key 9004 (FIG. 137) is pressed over the Context Positioning window 9002 (FIG. 137) for the finished model. It is changed to the Time Sequence Model view, with the Time Sequence Model located in the top window 602, 2520.

In FIGS. 48, and 101 the Time Sequence Model window is labeled just above the window 604, 2521. The name of the Alternate is in the top line of the Time Sequence Model window 606. The Guide window 608, 2522 is now on the bottom of the screen. Since the cursor is on a title, rather than on a Context, an information screen 610 is displayed in the Guide window, 608 2522. Referring to FIG. 138, the information screen appears when the cursor is on a cluster title 9016, 9017. The user is in Context Positioning so the information that is most helpful concerns the Editing Speed Keys. These are the same Editing Speed Keys that were used to create a Model, and they work nearly the same way.

When a Time-Sequence Model window is first opened, it lists the same Contexts in the same order as the current Outline Model view 590. As the user rearranges the Time-Sequence Model, a dual structure emerges for the Alternate. The Outline Model is not changed. The eventual users will access the information in the Guide through either the Outline Model or the Time-Sequence Model, or both, based on the appropriate choice for their needs.

Figure 107:
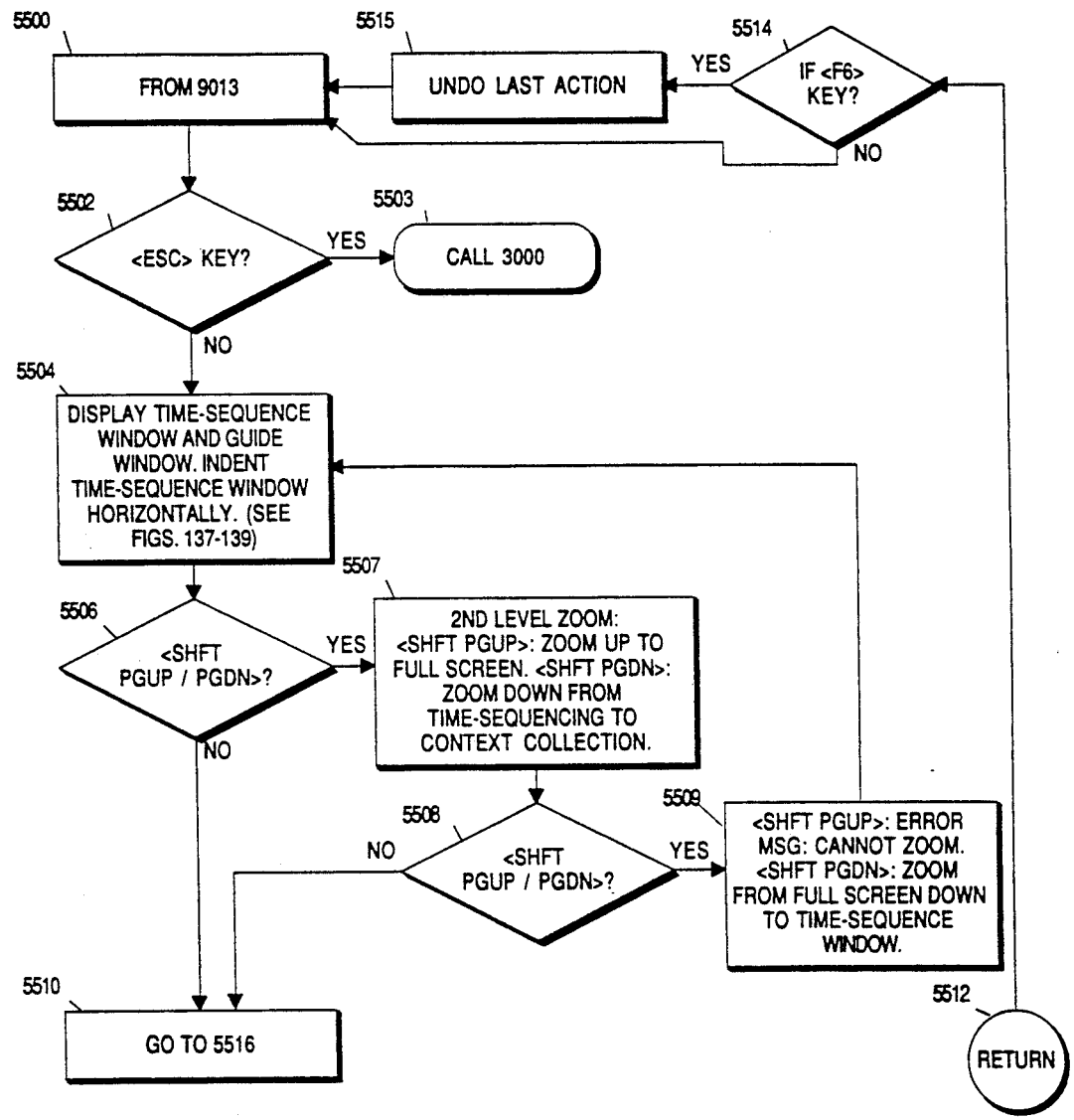

The bottom screen 612 printed in FIG. 48 shows the result of pressing the <Minus> key 9018-9019 (FIG. 138) to contract the list 614. In the Time Sequence Model window 616 it can be seen clearly that each major heading is indented farther to the right than the previous one 614. FIG. 107 describes the display of the time sequencing window 5504. The purpose of the indentation is so that the user can see the time relationships quickly, easily, and clearly.

The Time-Sequencing Model window has a different appearance than the Context Positioning window, but both use the same keys to rearrange the Contexts. The main difference is that, in the Time-Sequencing Model window, when the user moves an item upward or downward, it is moved to the left or right at the same time. This is because the emphasis shifts from the vertical outline (which dominates the Outline Model view) to the horizontal timeline. In the Time Sequence Model view, time is represented as moving from the upper left to the lower right. To show time clearly, indenting works this way:

(1) Each Context Cluster is a group and its members are indented together, with the Cluster Titles indented about as much as the Contexts underneath them.

(2) Each Context Cluster is indented to the right of the cluster just before it. When the user reads from top left to bottom right, this format clearly sequences the clusters.

Figure 111:
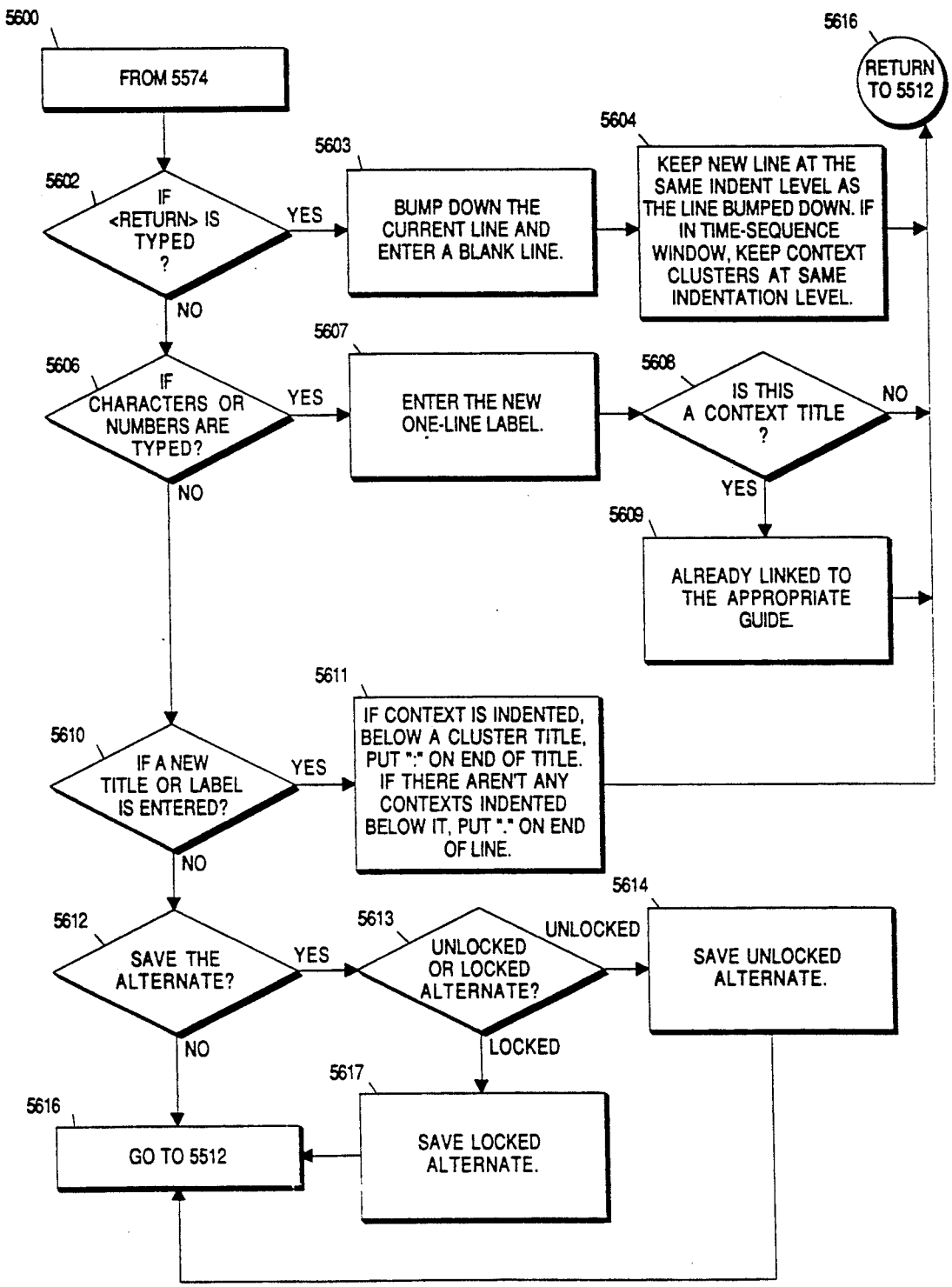

(3) A user may want to keep two (or more) Context Clusters at the same indent level, because they should be implemented at the same time. To do this, the user simply inserts a blank line between the two clusters 5602-5604 (FIG. 111). This automatically keeps them at the same indent level, while separating them visually for easier reading.

Figure 49:
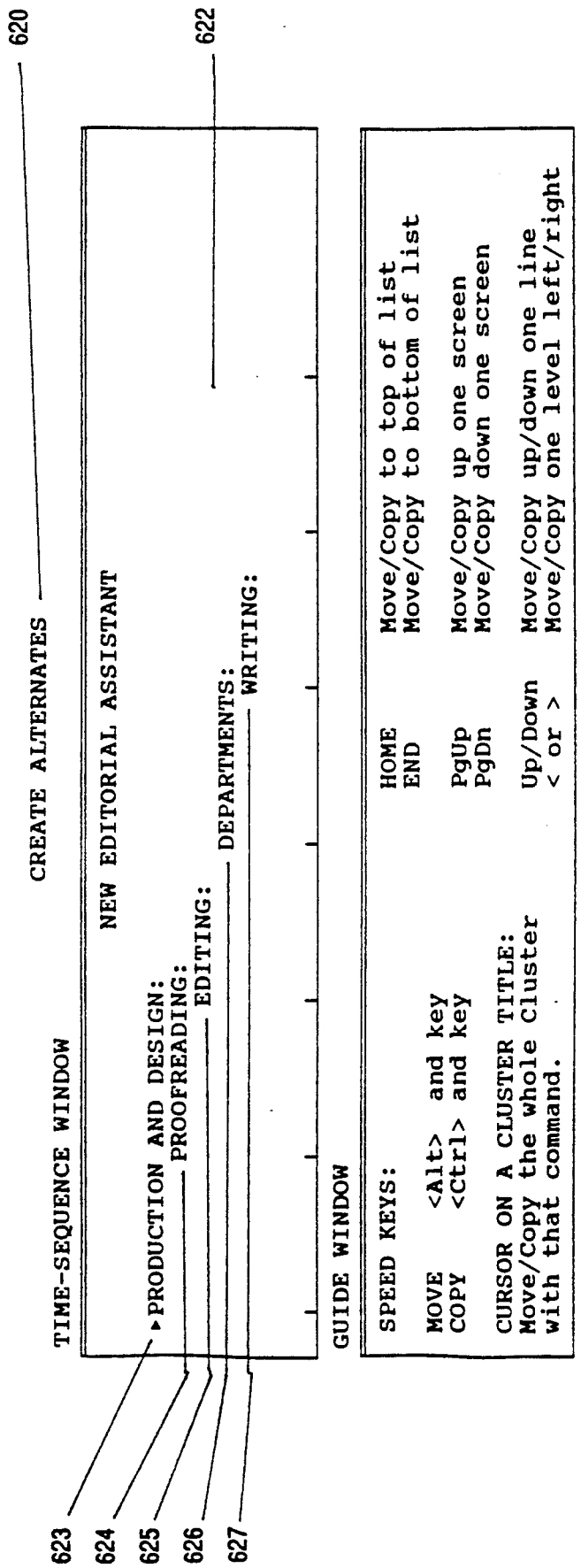
Figure 108:
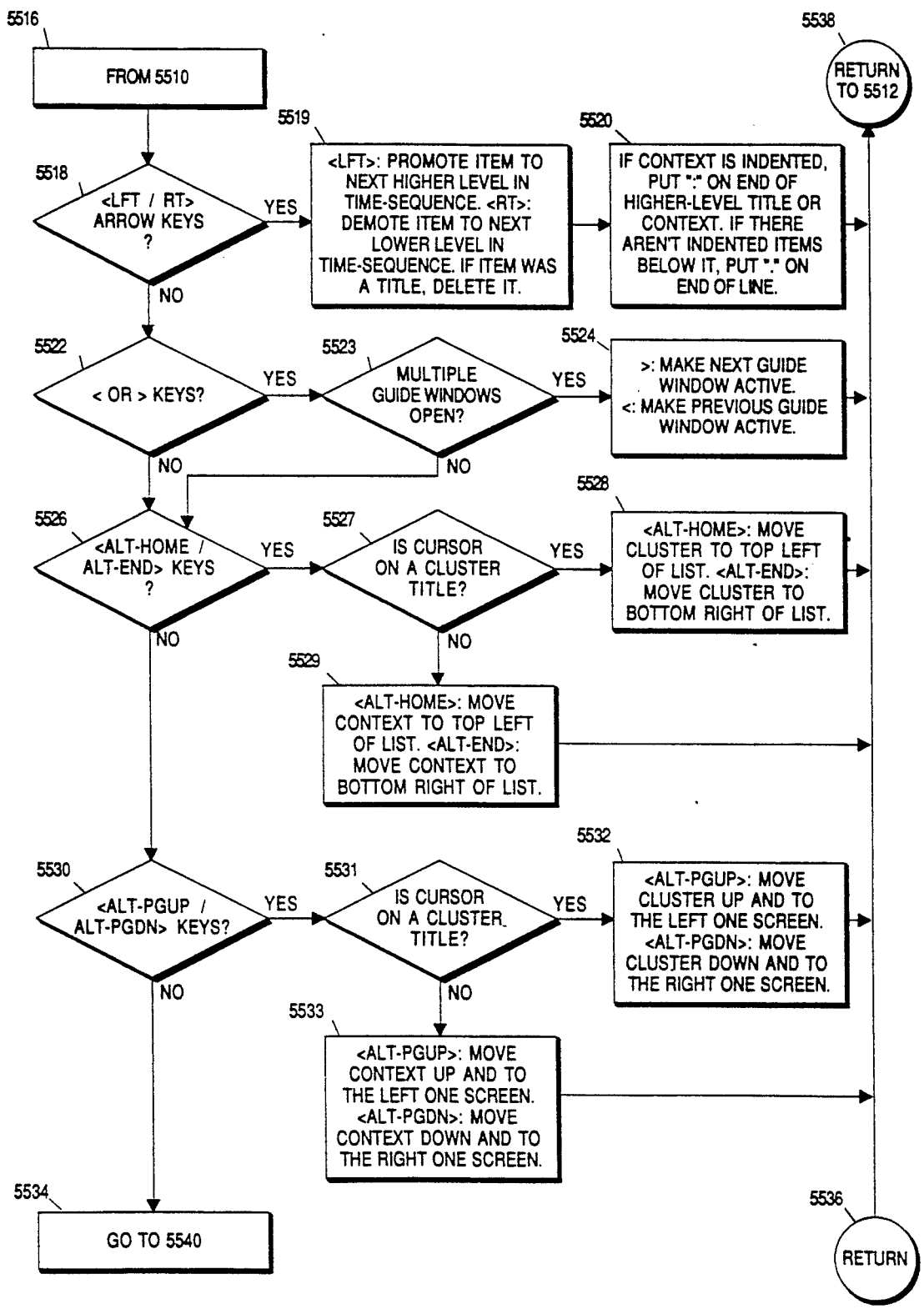
Figure 109:
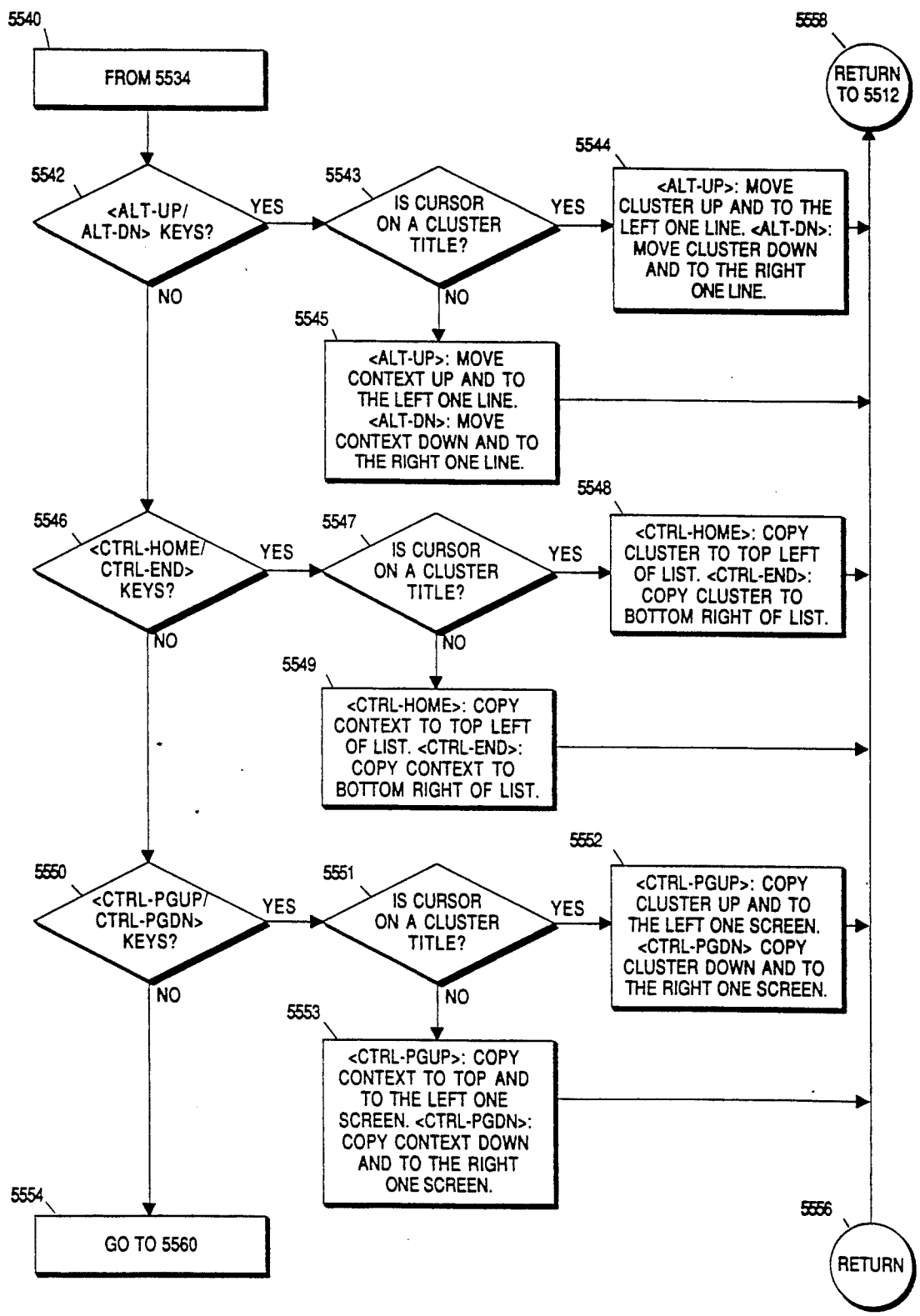
Figure 110:
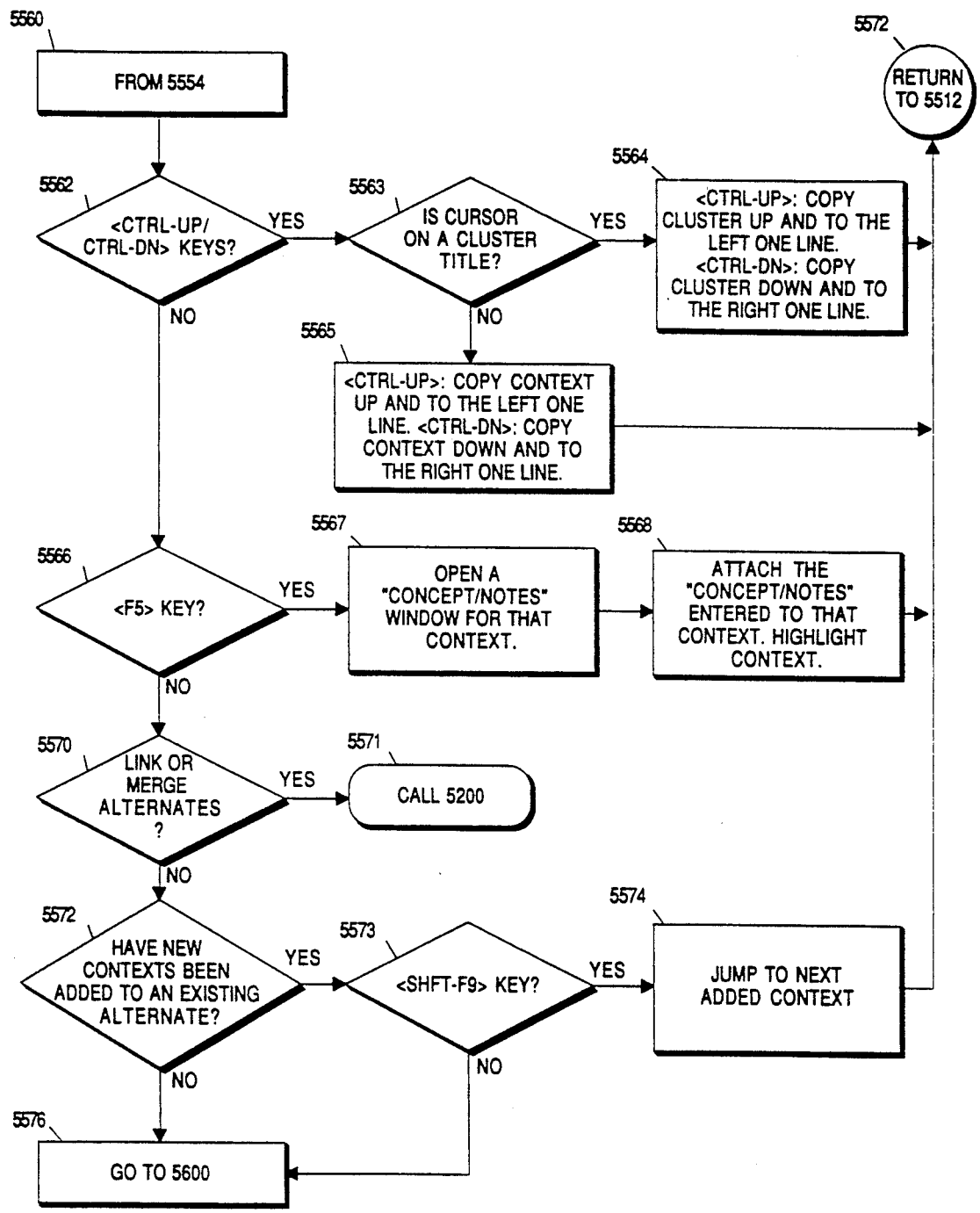

Turning now to the top screen 620 printed in FIG. 49, it is possible to see the finished Time Sequence Model 622. This was rearranged into this order from the order 614 shown in FIG. 48 by use of the Editing Speed Keys (FIGS. 107-111). The keys work slightly differently from their own in Context positioning since Contexts move simultaneously up and left, or down and right. FIGS. 107-111 describe the editing speed keys for Time-Sequencing Model in detail. Referring to FIG. 109, if the cursor is on a Cluster Title, the whole cluster will move one indentation up and to the left when the <Alt-Up> 5542, 5543 cursor keys are pressed, placing it above the preceding cluster.

The same type of simultaneous horizontal and vertical movement works for the other keys when the Time-Sequence Model window is active. Referring to FIG. 108, moving a Context to the bottom of the list also moves it to the far right of the list 5526, 5527, 5529. Moving a cluster to the top of the list also moves it to the far left of the list 5526-5528.

The other operations used for Context Positioning may also be used in the Time-Sequence Model window. For example, as shown in FIG. 138, the <Plus/Minus> keys 9018-9020 will expand or reduce the level of detail of the list in this window. With the <Shift-Minus> key 9021-9023 the user can rapidly review the basic structure of the Alternate, then use the <Plus> key 9018-9020 to add the main Cluster Titles and Contexts at each level until the full sequence is clear. If the user discovers something missing, it is easy to add a Cluster Title to identify what it is and mark the place 5602-5607 (FIG. 111), then go into Context Collection 5506, 5507, (FIG. 107) to collect the needed Contexts (such as tasks, goals, relationships, or procedures) that fill the gap.

In FIG. 49, in the final Time Sequence Model 622, for the new Editorial Assistant, the manager needed a different order to implement the Alternate than the Outline Model view. This order has its own logic, as follows.

The new Editorial Assistant will start with the most mechanical aspects of her job so she will learn its basics and form relationships with key people before moving into her more creative responsibilities. The first area will be "Production and Design:" 623. Through this she will establish working relationships as she moves the finished written articles from members of the Editorial Department into the Production and Design Department, and back again. As a result she will work with key people in both departments. As she works, her Alternate will provide many of the in-company procedures, codes, and guidelines that will help her rapidly fulfill the expectations she will encounter right away in both busy Departments.

"Proofreading:" 624 starts as soon as she receives materials back from Production. This will occur rapidly, since Production generally has a one-to-two day turnaround and work is already in process. She will consult her Alternate while she proofreads, to make sure she fulfills all that is expected of her in this area. Within a few days, these first two areas will familiarize her with many areas of the magazine and the staff in both Departments. With her Alternate helping answer questions and providing in-depth insight, she will rapidly gain working familiarity with the people and processes by which the magazine is produced at this publisher.

"Editing:" 625 comes in as soon as she starts understanding what is expected and needed in the Departments (the sections of the magazines she will write). She will be given the first drafts of the Departments that were written by others. She will be told to try and edit their work into the final quality and formats needed. The editors will tell her what they did and why, how topics were picked, and their goals for each piece. Her Alternate will give her considerable assistance in three areas: First, it will help her expand her editing skills. Second, she will use it to learn more about the Departments of the magazine, their role and value in the magazine, and how to create them. Third, she will access specialist expertise in the field of Computer Based Training in the linked Alternate. The Alternate will give her breadth of access and depth of information in these areas, based on the Contexts included by her manager. This will amplify her progress as she starts helping create the Departments.

Having learned in those areas and knowing what's expected of her, she will be ready to start writing "Departments:" 626 on her own. The last section of the Time Sequence Model, "Writing:" 627, will give her a great deal of assistance in the specific components of the writing process.

As an entire process, this Time Sequence Model gives her a tailored information sequence in which she can get up to speed quickly while learning the range of responsibilities and skills she will need as she does her new job the way her manager believes it ought to be done.

Figure 50A:
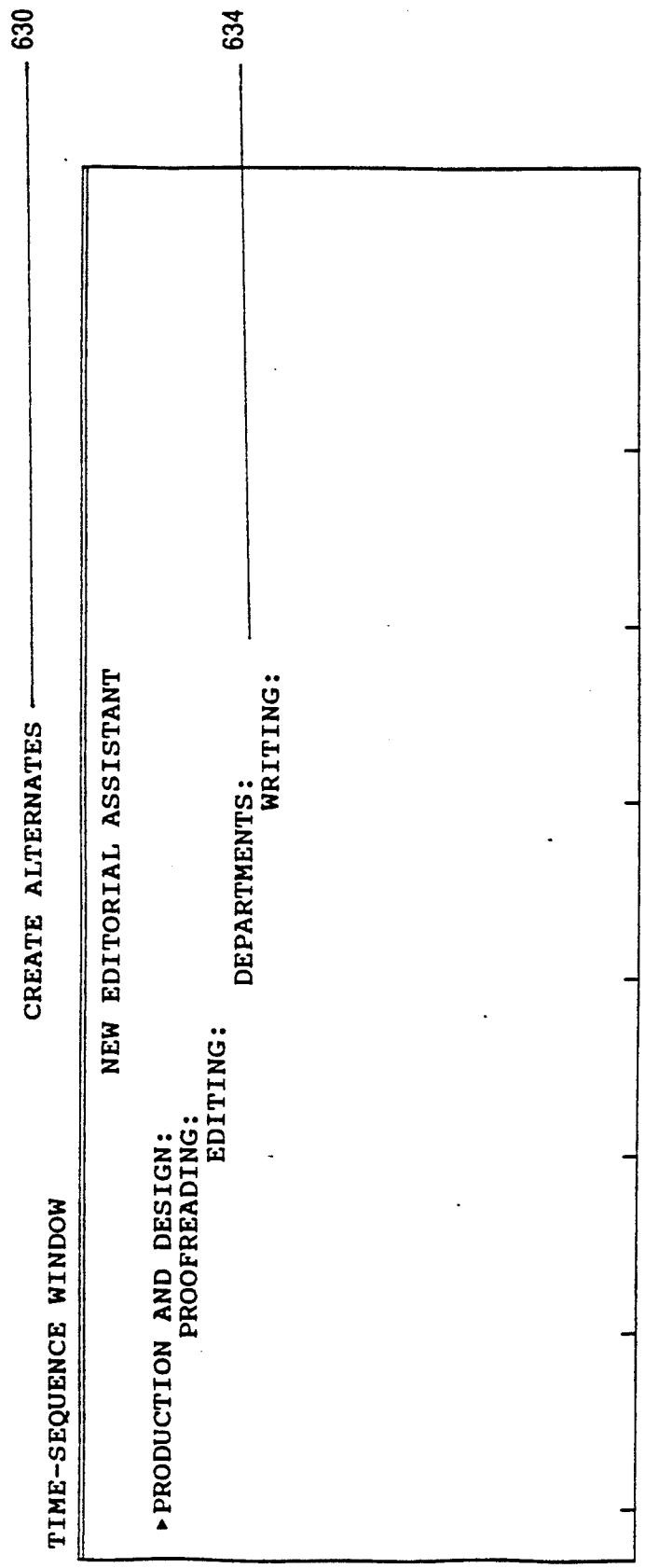
Figure 50B:
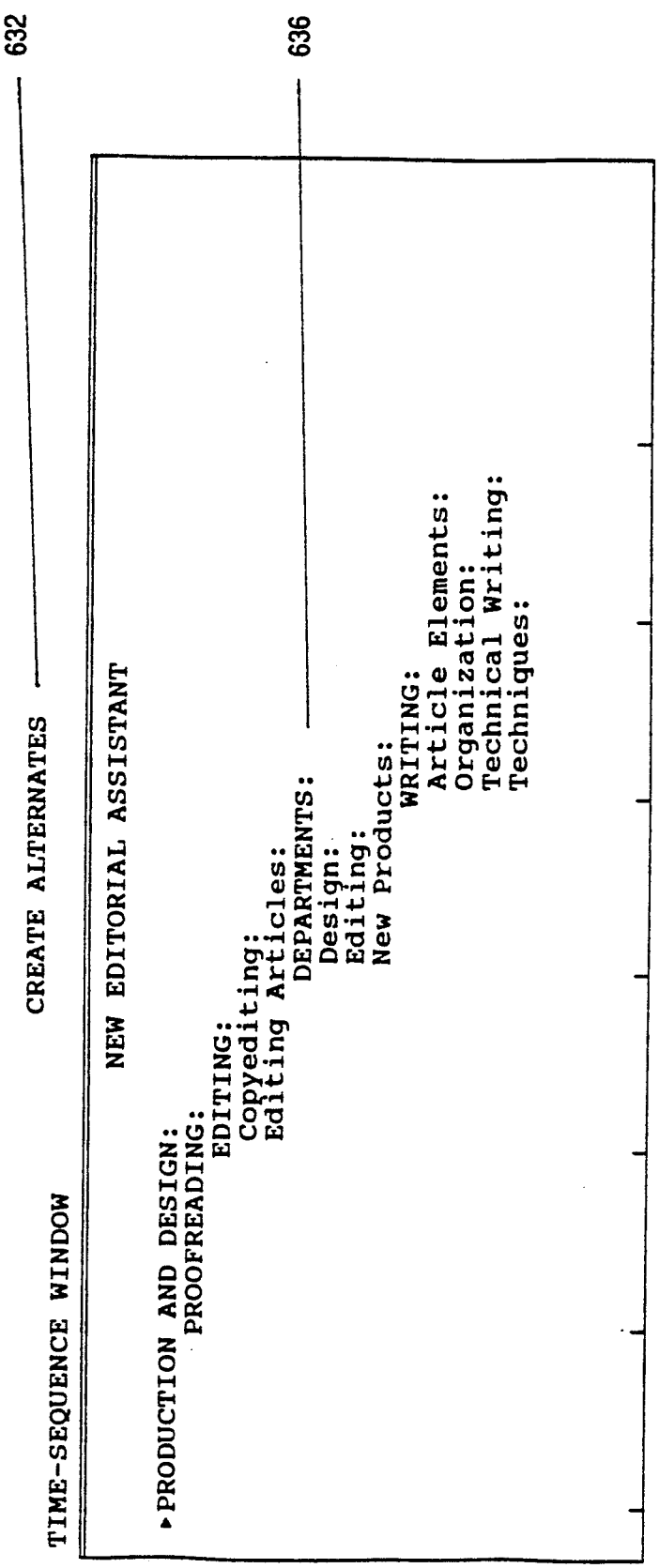

Turning to FIG. 50, the top screen 630 is simply the top screen of the Time Sequence Model window using the "Zoom Window Function Key" 9040, 9041 (FIG. 139) to expand that window to the size of the computer monitor's screen. The bottom screen 632 printed in that Figure simply uses the <Plus> key 9018, 9019 (FIG. 138) to expand that list 634 so that it is expanded to the next level of detail 636. If desired, the list may be expanded to the level of the individual Contexts 9021, 9022, (FIG. 138), and these may be re-ordered or re-titled as previously described.

This bottom screen 632 is the final Time Sequence Model view that the new Editorial Assistant will use in her job. The result is the new Editorial Assistant receives two ways to access the Contexts in her Alternate. First, the Outline Model view shows how her manager believes she ought to do her job. It shows her a model of this job's expanded responsibilities, and provides her access to guidance on how to fulfill them. Second, the Time Sequence Model view provides her information based on the order in which her manager thinks will be best for her to learn her job. It was designed by her manager to help her adapt to her job, the company, and co-workers in the shortest amount of time.

In summary, an Alternate is built by collecting and selecting the appropriate Contexts from a variety of Context Bases. Next, the Contexts are re-ordered by an imagination-driven process into both a Outline Model view and a Time-Sequence Model view.

It is now possible to compile the Editorial Assistant's Alternate for distribution. After an Alternate is compiled, it may be (1) run on that computer system, (2) copied to diskette(s) or other media may be used for distribution or sale to the user(s), or (3) multi-user computers may be used to provide multiple access to a single Alternate(s).

There are two ways to compile an Alternate. Both ways are shown in flowchart form 5612-5617 in FIG. 111. The first is as a "Locked" Alternate 5612, 5613, 5617 (FIG. 111). Turning to the top screen 640 in FIG. 51, the user sees that the cursor is on "Locked Alternates" 642 under "Compile for Distribution:" 644. The Guide Window 646 explains that a locked Alternate cannot be modified; the Alternate must be run exactly as distributed.

Figure 51A:
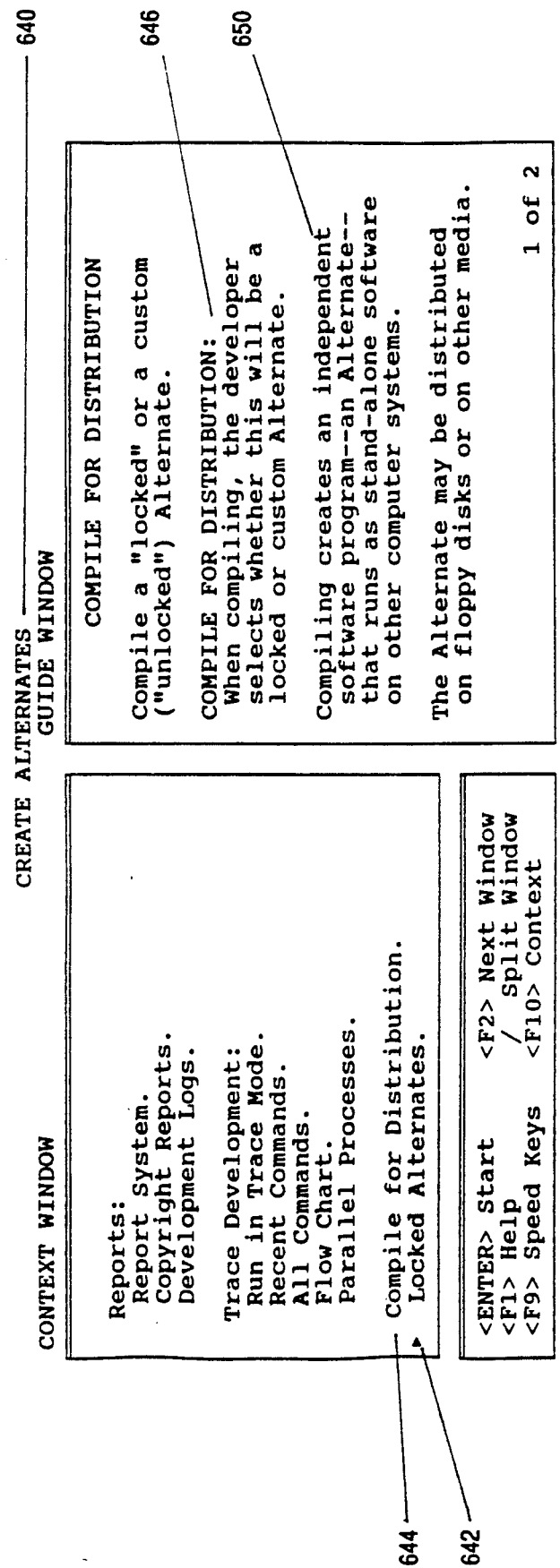
Figure 51B:
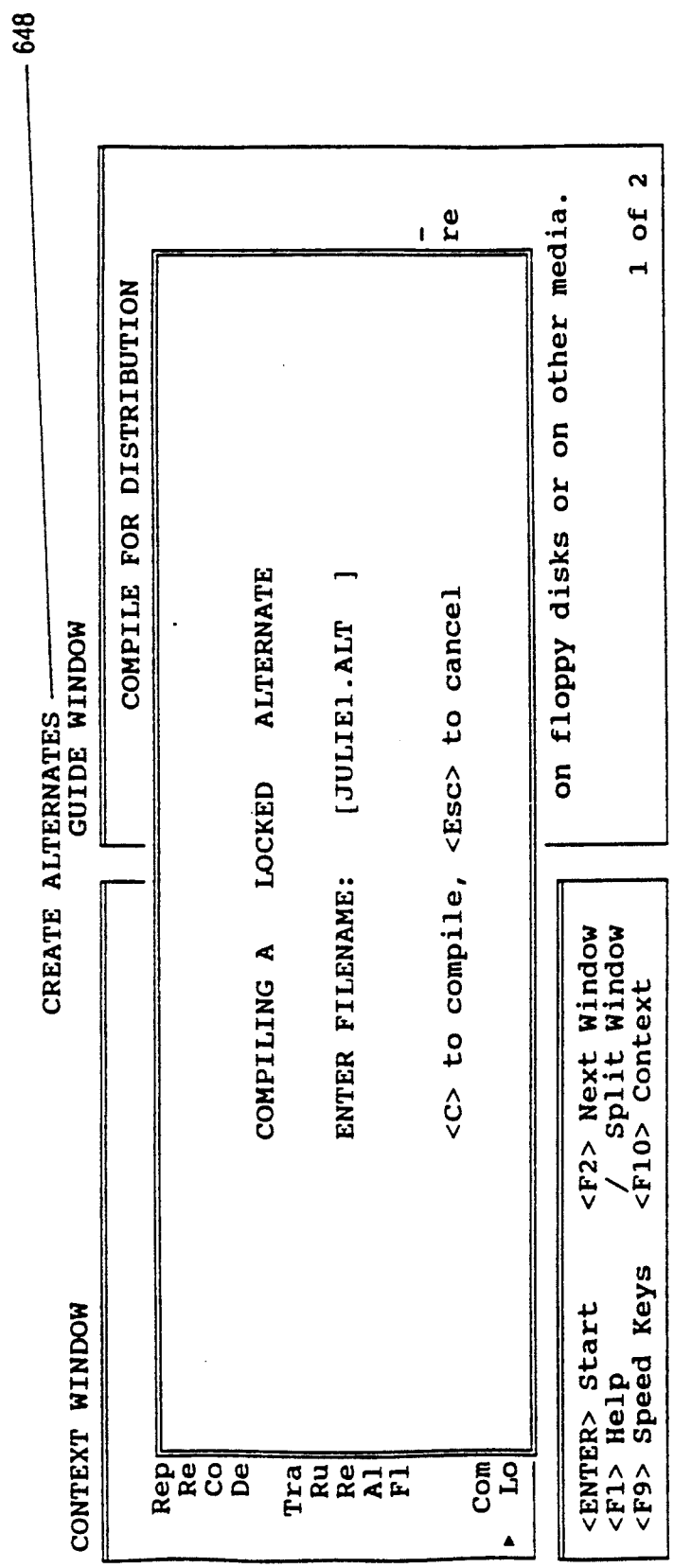
Figure 51C:
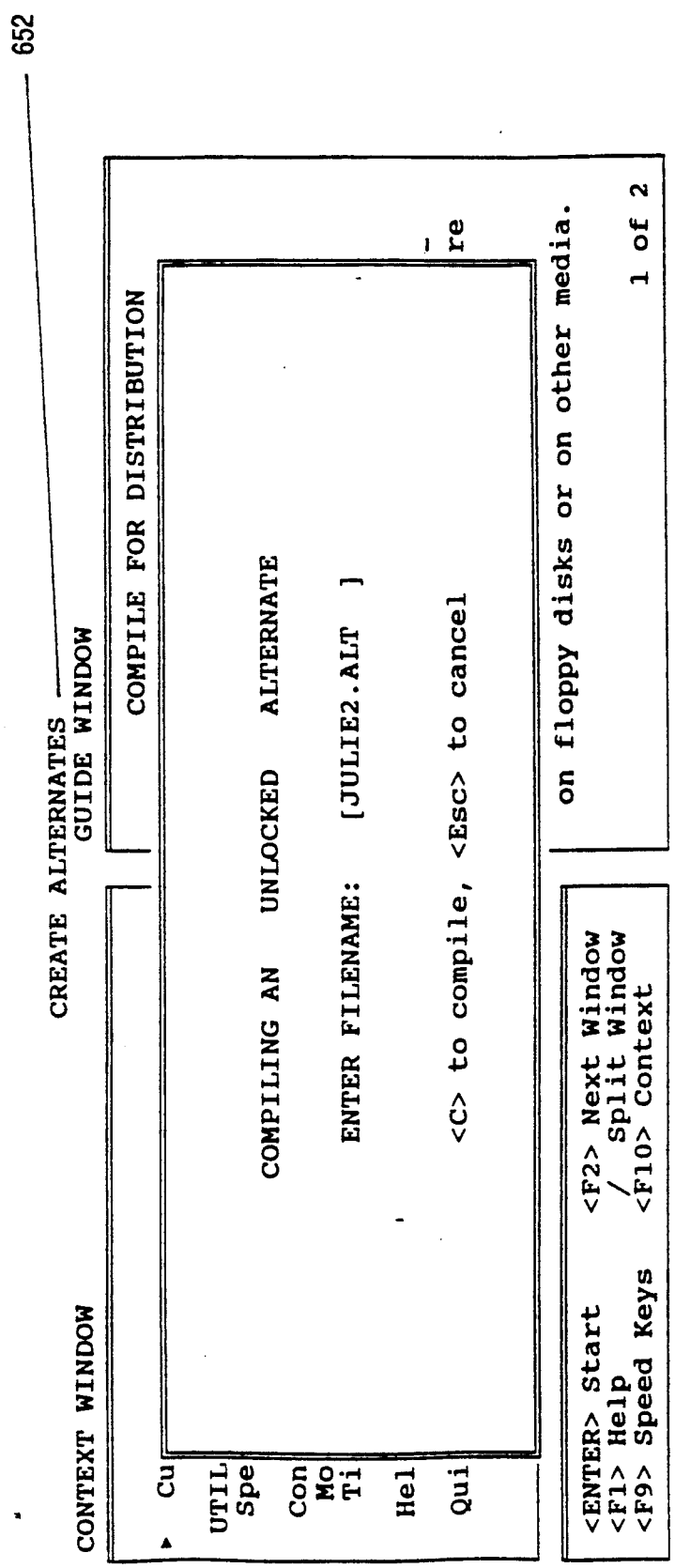

In the case of the Alternate for this new Editorial Assistant, a locked Alternate will be compiled (see the middle screen 648 in FIG. 51). The new Editorial Assistant will start her job by using the Locked Alternate. She will learn both the model that her employer wants her to see as her job, and the time sequence in which she should learn these skills.

At the same time an unlocked Alternate 650 will be compiled for her future use (see the bottom screen 652 in FIG. 51 and 5612-5614 of FIG. 111). When she is given the unlocked Custom Alternate, the Editorial Assistant will be able to re-order its Contexts in both the Outline Model view and the Time-Sequence Model view.

When the new Editorial Assistant has gotten up to speed in the eyes of her manager, her Locked Alternate will be replaced with the unlocked Custom Alternate. She will then have the ability to spend a few minutes and re-order the way she sees her job, so her Alternate mirrors her own perception of her needs.

In addition, by working with the unlocked Custom Alternate, the new Editorial Assistant starts learning how to create an Alternate for herself. The Alternate is run by using the same editing keys as the Contextualizer. In the future, as her job responsibilities expand, she will be able to use the Contextualizer alone or with her manager. They may modify her Alternate or create new ones. Thus, as she learns her job she can expand her responsibilities rapidly by adding new areas to her Alternate; when she is given special or rush assignments, she can rapidly access the skills, expertise, Contexts needed to tame them; when she changes "hats" in her job, her Alternate may be modified to match her new skill and information needs; and when she is promoted into a new job, she will inherit the former job holder's Alternates so she can rapidly gain her next range of skills, performance, and relationships.

In sum, locked and unlocked Custom Alternates are provided to support both centrally managed situations and locally managed situations.

"Locked Alternates" cannot be modified, only run exactly as distributed. This permits the use of centrally constructed Alternates for specific performance improvements or Situation Shifts, without allowing any modification of the Outline Model or the Time Sequence Model. The end users still determine the Guides that they access and when they use them, but this can be directed by managers. FIGS. 117-120 illustrate the use of Locked Alternates.

Figure 121A:
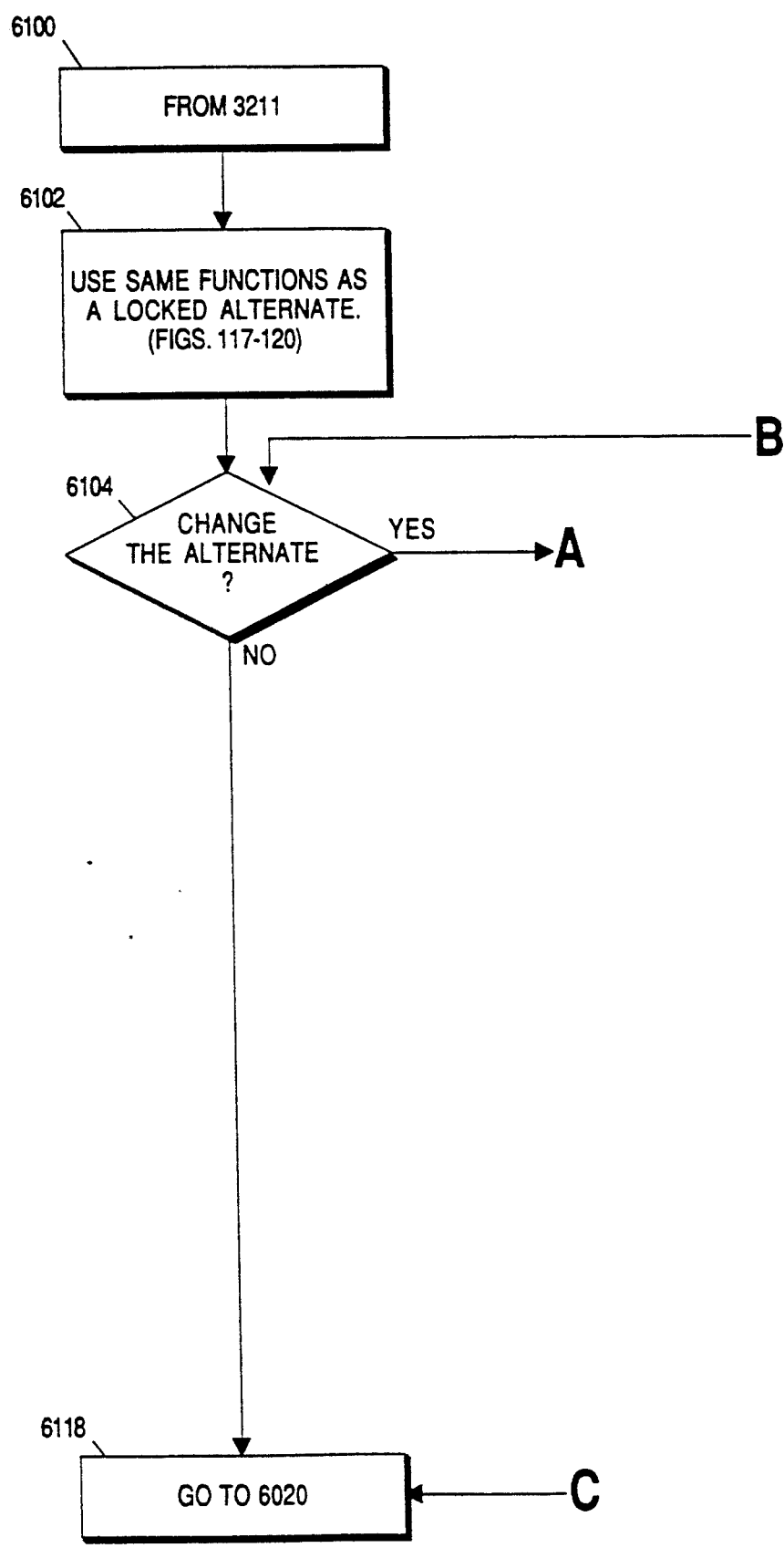
Figure 121B:
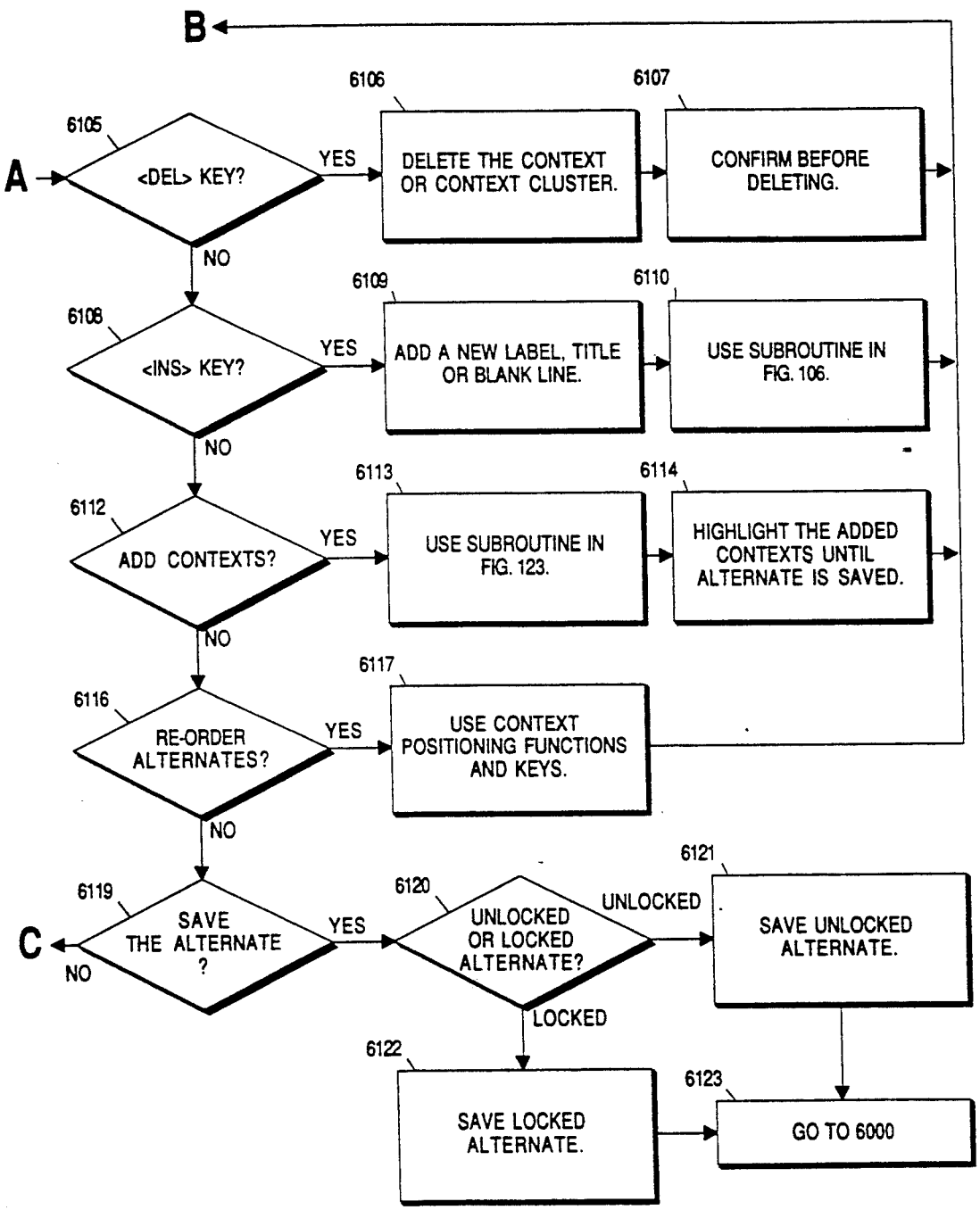

Unlocked "Custom Alternates" may or may not arrive as finished Alternates because users can re-order them on the spot to meet local or personal needs. FIG. 121 illustrates use of Unlocked Alternates 6104-6123. Users can modify these Outline Models and Time-Sequence Models. The Guides (the Context base) of the Alternate are locked, however: With Contextualizer software Contexts and Guides can be added or deleted, but with an unlocked Alternate alone (without contextualizer software), Contexts cannot be added or deleted. With an unlocked Custom Alternate, users may create personalized and evolving patterns for accessing the Contexts and Guides included in their Alternates.

Figure 52:
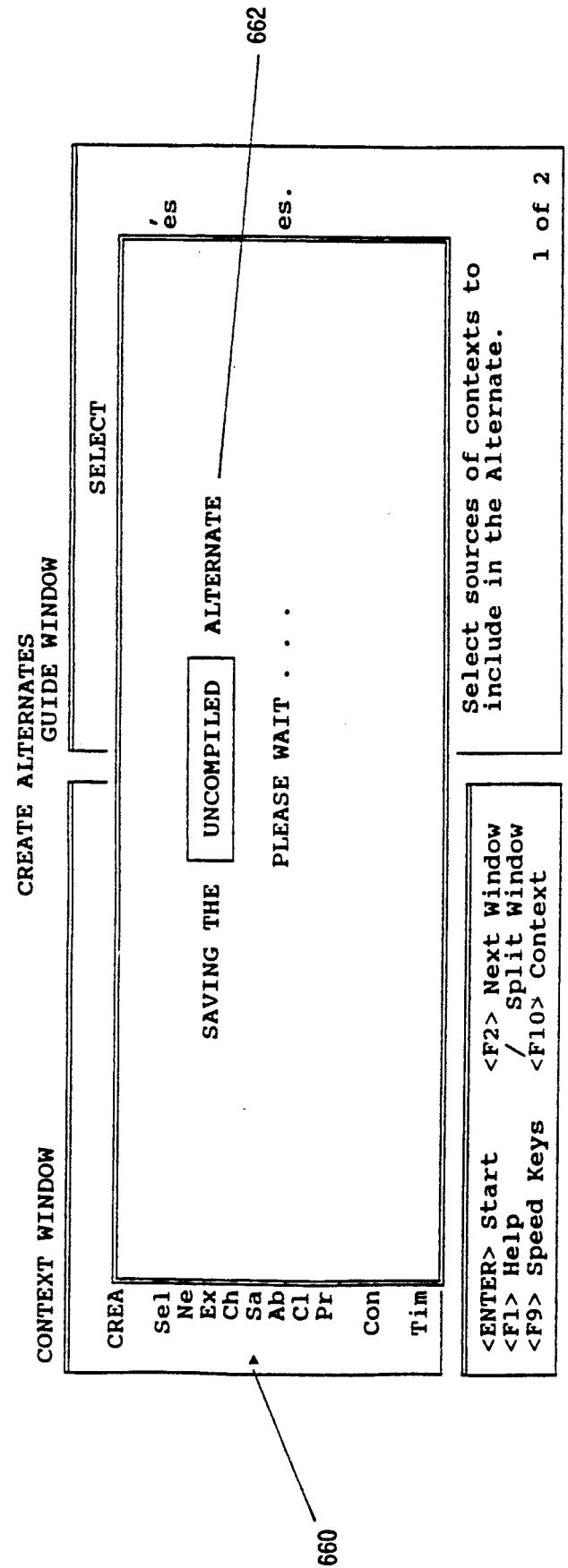

Turning to FIG. 52, the menu choice 660 for "Saving the Uncompiled Alternate." was selected. The uncompiled Alternate 602 is saved 662 so it can be called up and modified in the future. For example, it might be changed and compiled for other new Editorial Assistants when they are hired, to match their individual skill levels and need for expertise.

In addition, this Editorial Assistant may modify her own Alternate, and use this new type of computing to imagine how she can perform better, accelerate her rate of growth and performance, and expand her range of responsibilities. By interactively expanding her personal Alternates, she uses them to help expanded achieve her goals.

By "Saving the Uncompiled Alternate," 662 the work can be saved at any point during Context Collection, Context Positioning, or Time-Sequencing. A variety of reports can be printed during Context Positioning. For example, it is possible to print either a brief version of the Outline Outline Model or the Time Sequence Model, as one-line Cluster Titles and Contexts. It is also possible to print them with any notes and concepts that have been added to them. The Guides may be printed several ways. First, they may be printed in the order of the Outline Model or the order of the Time Sequence Model, as a complete reference. To print only one or a few Guides, they may be highlighted on the Outline Model or the Time-Sequence Modelby using a function key, then printed.

After the uncompiled Alternate has been saved, the user returns to the "Main Menu".

Using the Alternate

As explained, an Alternate is an imagination-driven construct that represents the Preferred Situation (or one stage in implementing the Preferred Situation) as its creator would like it to be. From the point of view of its user, an Alternate has three main components:

(1) The Outline Model is the way the Alternate is structured and arranged by its developer. It reflects the way the developer "sees" the current or preferred situation. The Outline Model is also an access pattern to the Clusters of Contexts and Contexts. As the user moves the cursor through the Outline Model, the Guide window changes to show the text and graphics of the current Context.

(2) The Time-Sequence Model is the implementation plan, if one has been included. In the simplest sense, it is the order in which Contexts might be added to the current situation. In the broadest sense, it supports Situation Shifting from the Current Situation to the Preferred Situation. (See the section on "Managing Alternates," below.) As the user moves the cursor through the Time-Sequence Model, the Guide window changes to show the text and graphics of the current Context.

(3) The Guides are the individual Contexts displayed in the Guide window. They are the text and graphics (pictures, data, illustrations, audio, video, etc.) in each Context.

Figure 53A:
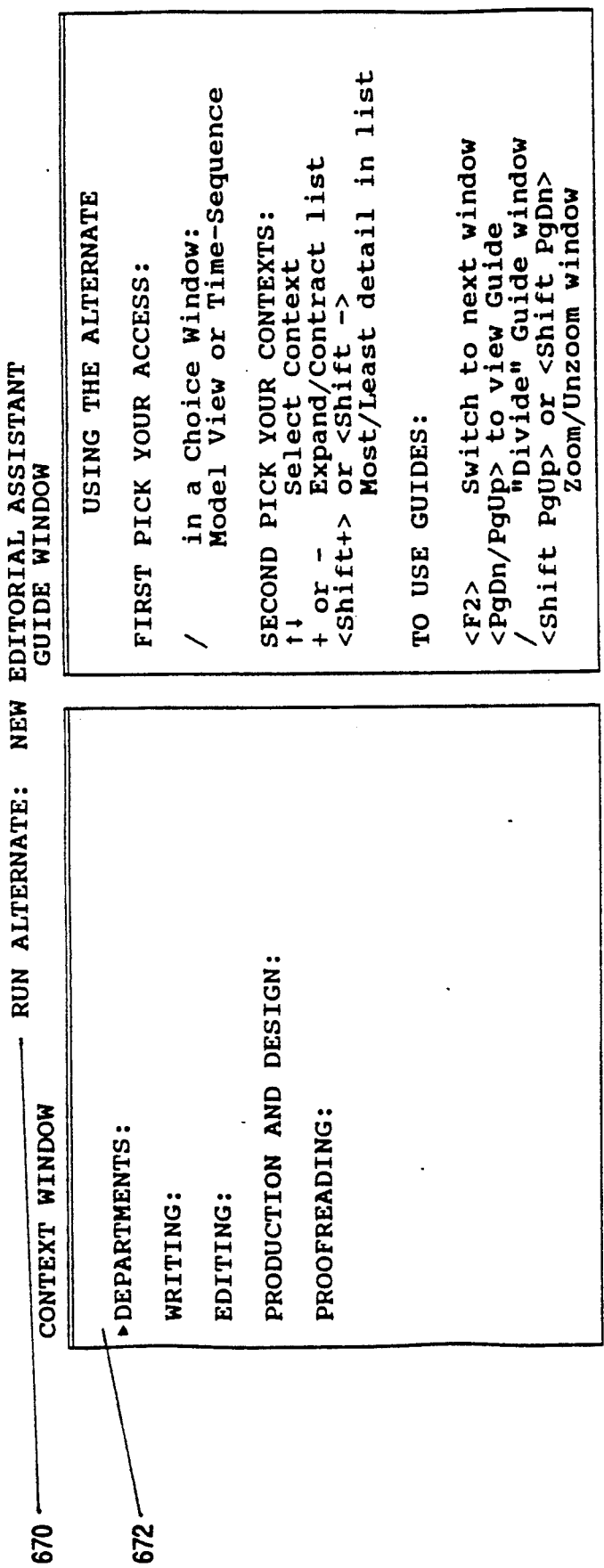
Figure 53B:
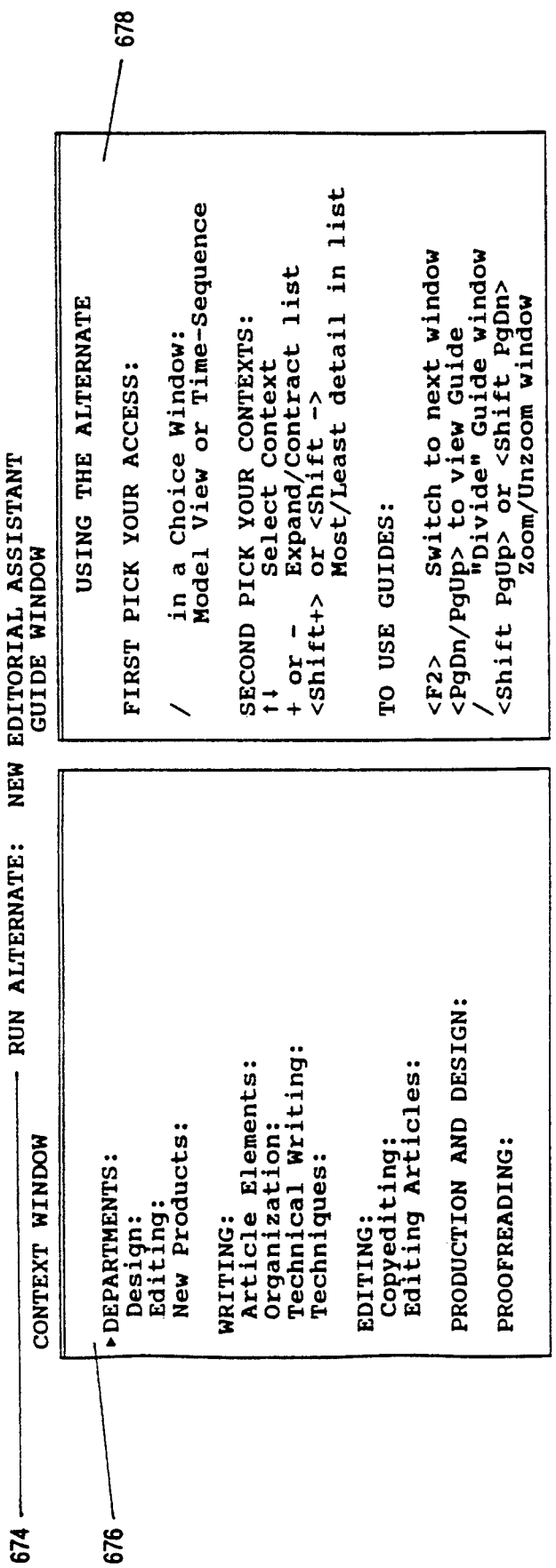

Turn now to FIG. 53. When the new Editorial Assistant's Alternate is opened it starts at its top-level list of Contexts 672 (9002 in FIG. 137), as seen in the top screen 670. The top line on the screen 670 shows that an Alternate is running. It also shows the name of the Alternate that is being run 670, though this is not a requirement of the software.

The bottom screen 674 in FIG. 53 shows the Alternate expanded (in the left Context Window 676) to its next greater level of detail. The (right) Guide Window 678 (9003 in FIG. 137) shows that when the highlighted cursor is not on an individual Context, this window shows information on how to use the Alternate 9016, 9017 (FIG. 138).

Figure 118:
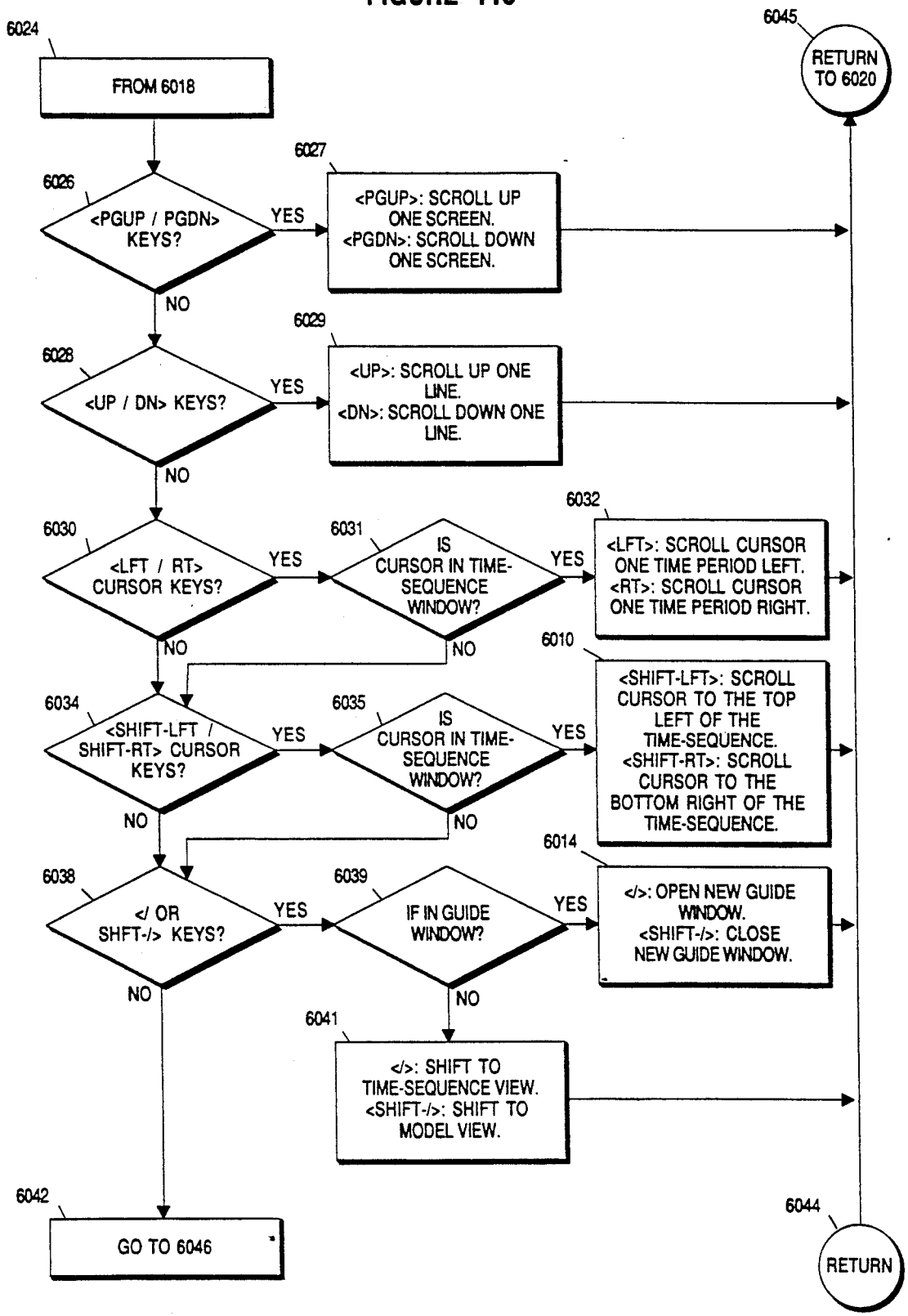

The first function is the mode of access. There are two choices. First is the Outline Model view. Second is the Time-Sequence Model view. In FIG. 53, the user begins with the Outline Model view 672, 676. FIG. 118 illustrates the method of shifting between the two choices 6038–6041.

Figure 117:
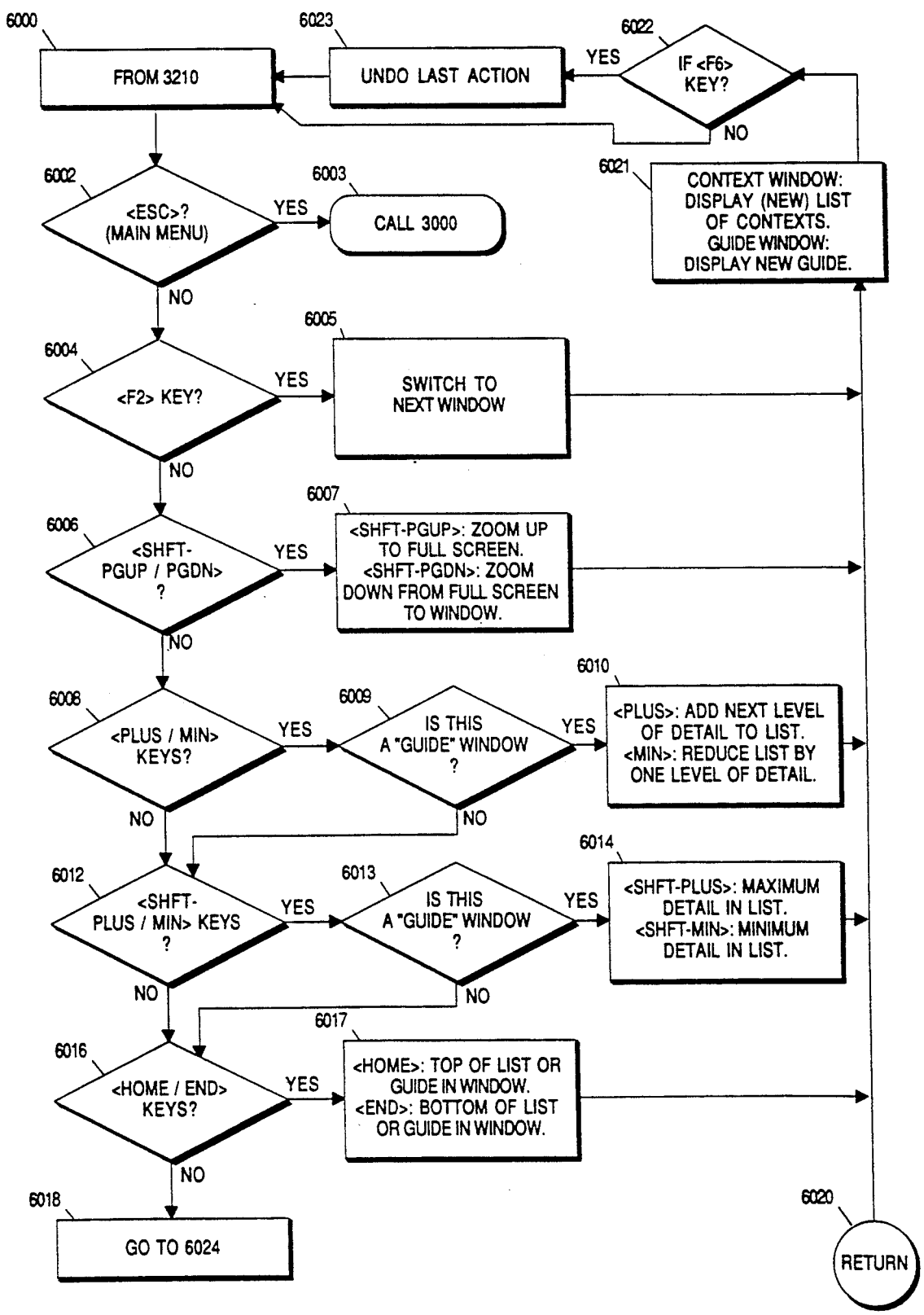

Next, the user accesses Contexts. The user may rapidly access any part of the Alternate by contracting the Outline Model or Time Sequence Model, moving to the relevant section, then expanding it. Referring to FIGS. 117 and 118, various keys may be used to jump to the top or the bottom of the Alternate, to scroll to the next or previous screen of Contexts, to select individual Contexts, or to expand or contract the list of Contexts 6008–6032.

Figure 119:
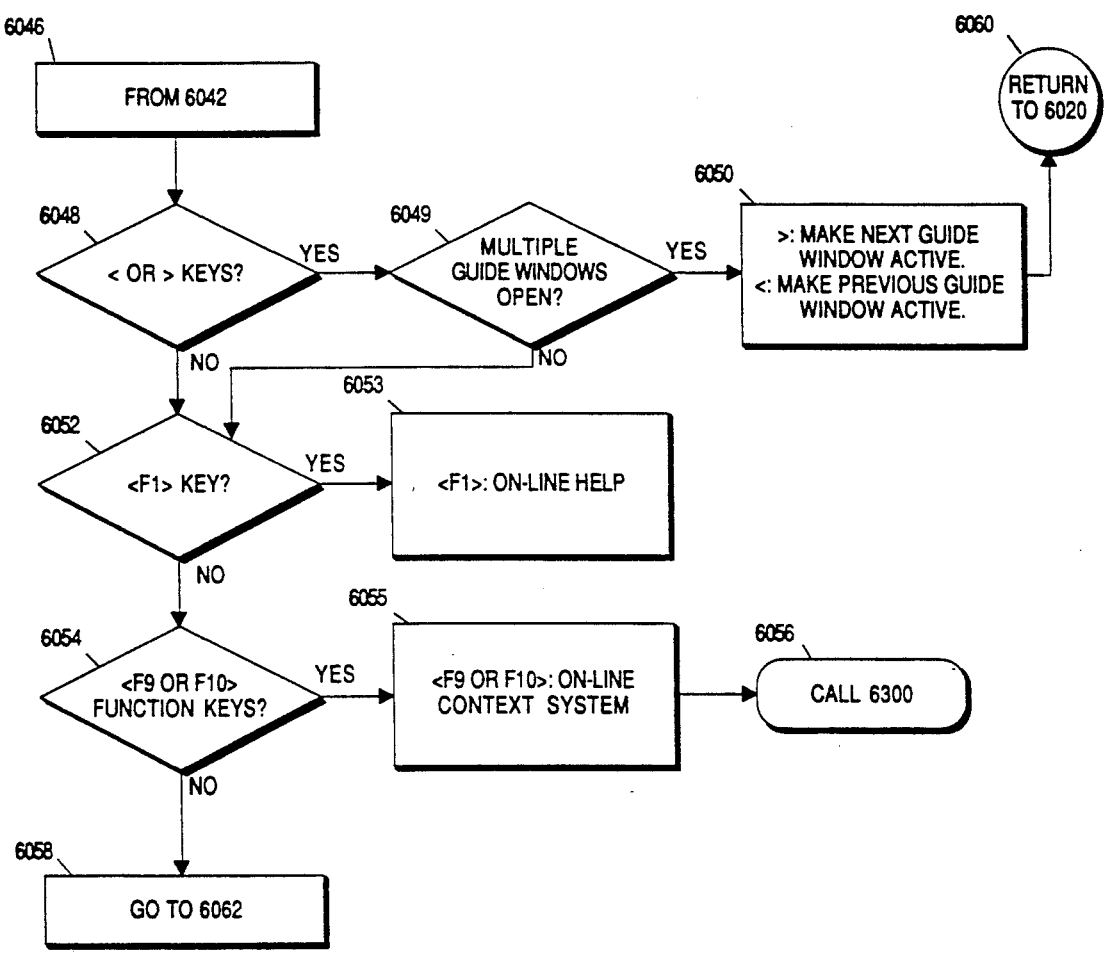

As the user locates one or more Contexts that provide immediately useful information, the user may switch to the Guide Window 6004, 6005 (FIG. 117). The user may view the Guide in that window by using <PgDn> or <PgUp>, <End> or <Home>, or zoom the Guide Window to fill the entire screen 6006–6032 (FIGS. 117, and 118). Or, the user may press the "Divide" key (/) to split the Guide Window into more than one window and make various guides active 6038–6050 (FIGS. 118 and 119). A different Context may be displayed in each Guide Window, and the user may shift between the windows as needed. Referring to FIG. 118, even when multiple Guide Windows are active, the user may zoom any Guide Window up to the size of the full screen 6006, 6007. This places more information on the screen from that Context to improve accessibility to that Guide.

Figure 54A:
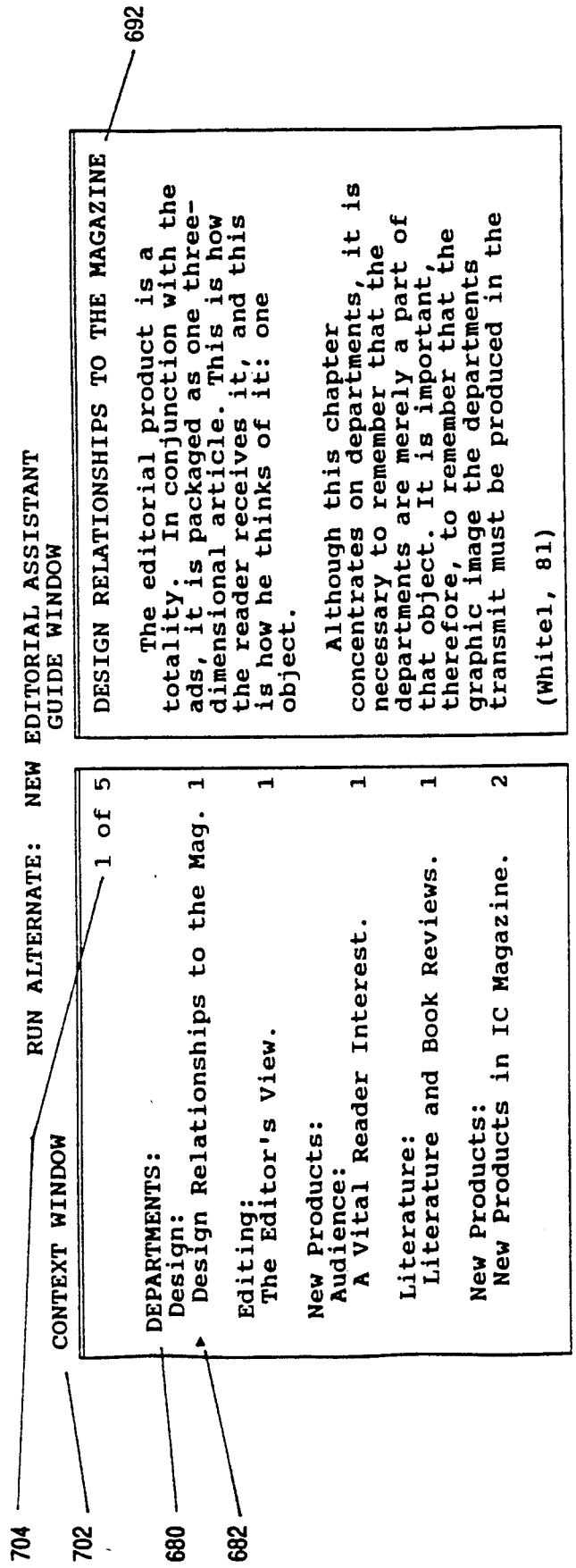
Figure 54B:
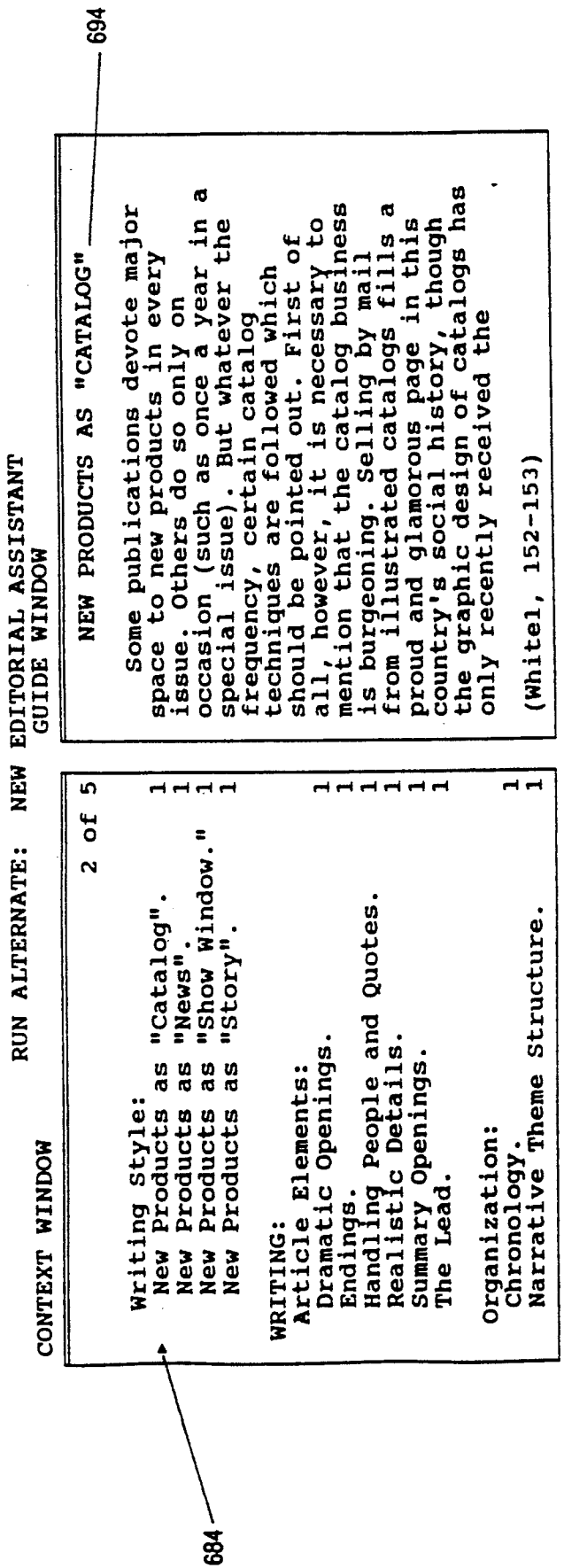
Figure 54C:
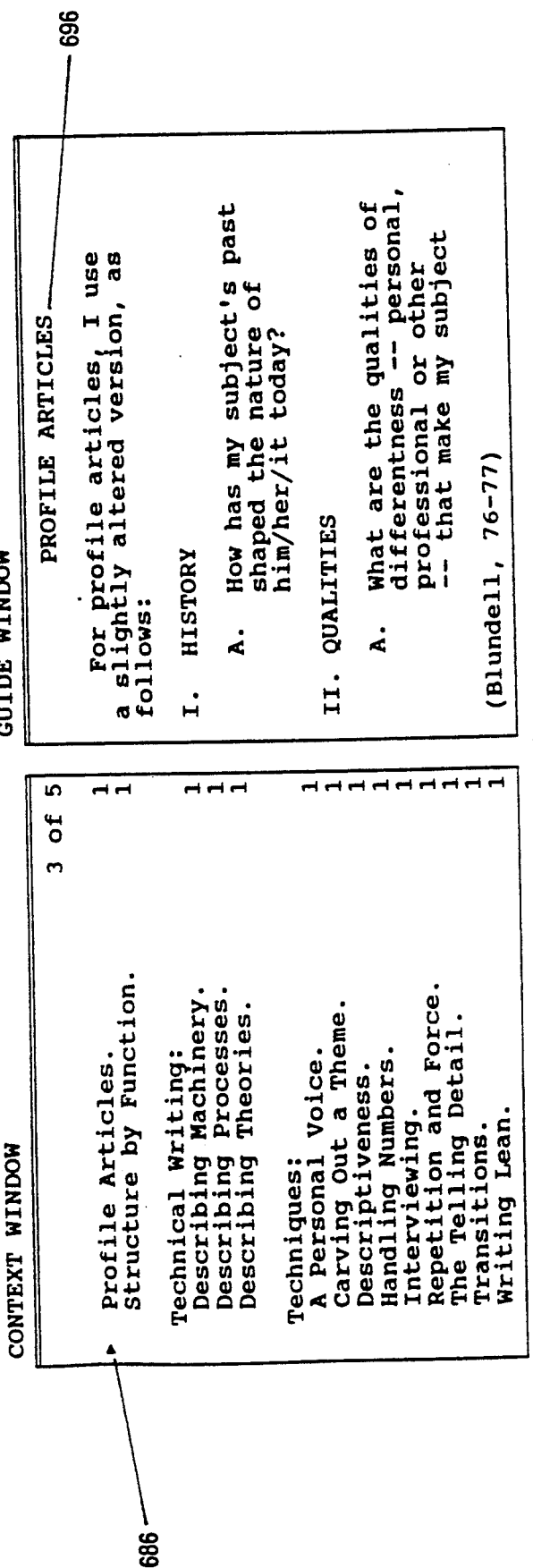
Figure 55A:
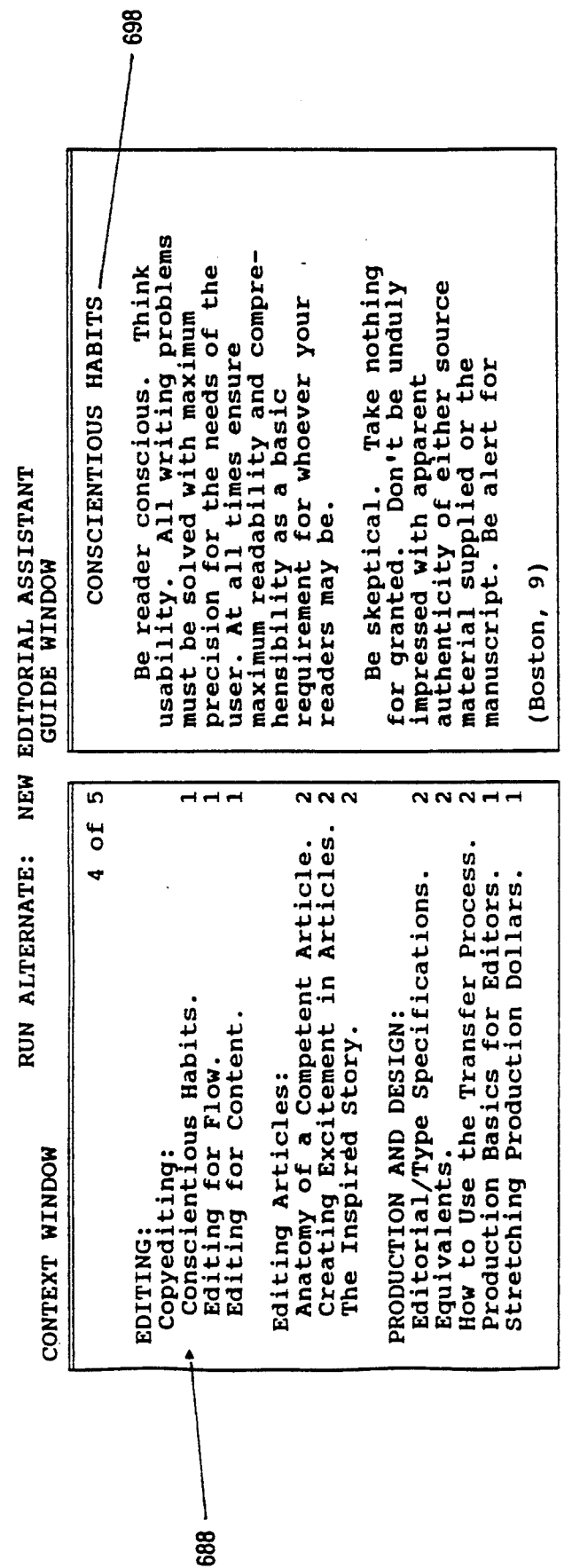
Figure 55B:
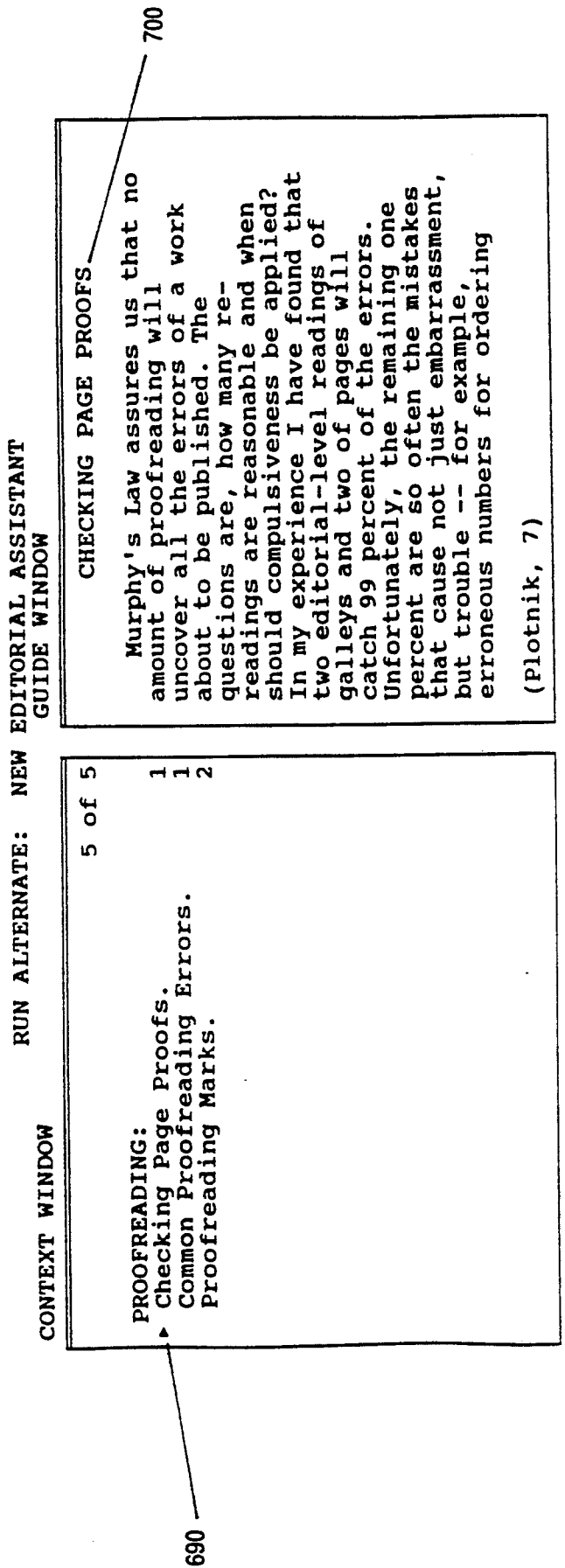

Turning to FIGS. 54 and 55 and also to FIG. 117, when the <Plus> key is pressed one more time, the Alternate is expanded to the next larger stage of detail 680, 6008–6010. At this level, the individual Contexts 682 are rapidly accessible.

FIGS. 54 and 55 show five screens of Contexts included in the new Editorial Assistant's Alternate (i.e., this prototype). Since <PgDn> 6026, 6027 (FIG. 118) is being used to display these successive screens, the cursor highlight stays at the top Context on each screen 682, 684, 686, 688, 690. Therefore, the right Guide Window shows the top Context in each of the (left) Context Windows 692, 694, 696, 698, 700.

When the user expands the Alternate to its maximum level of detail 6012–6014 (FIG. 117), the (left) Context Window 702 in FIG. 54 indicates where the user is in the Alternate. It does this in the Context Window's upper right corner 704. There it indicates how many screens are in the Alternate (at that size window) and which screen the user is in. If the size of the Context Window is changed 9004 (FIG. 139), the number of windows in the Alternate is recalculated for the new size window.

Figure 56A:
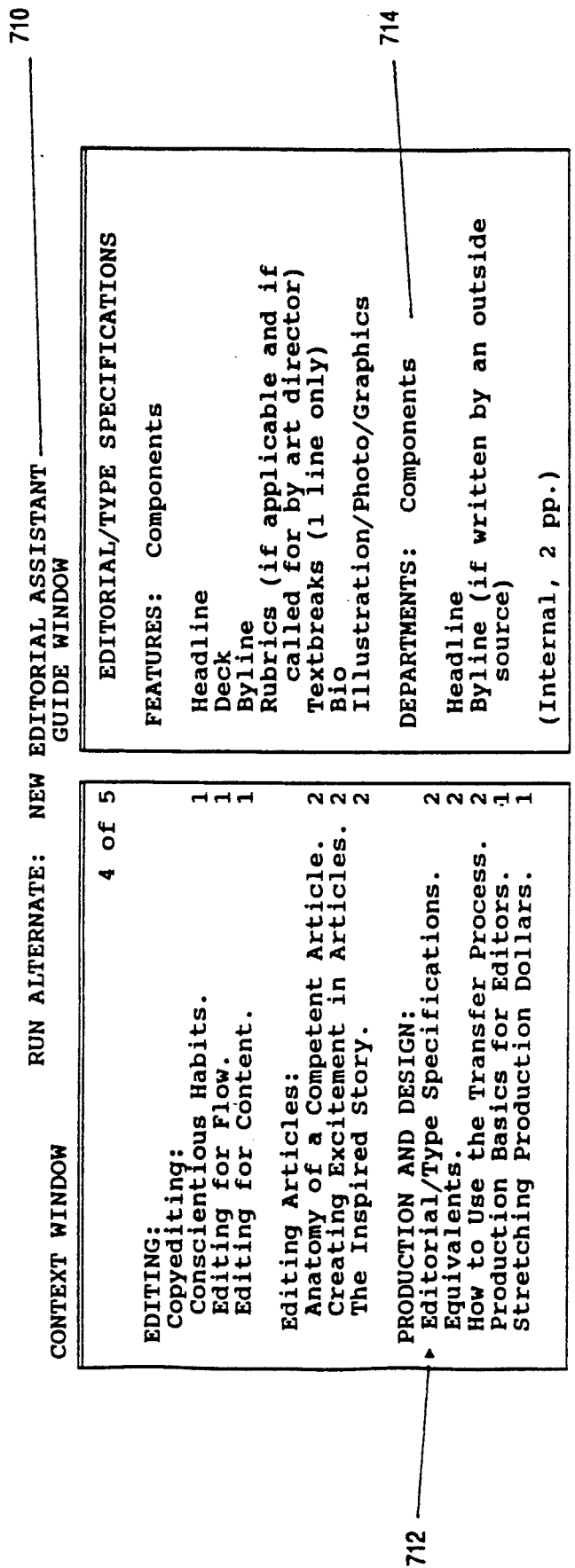
Figure 56C:
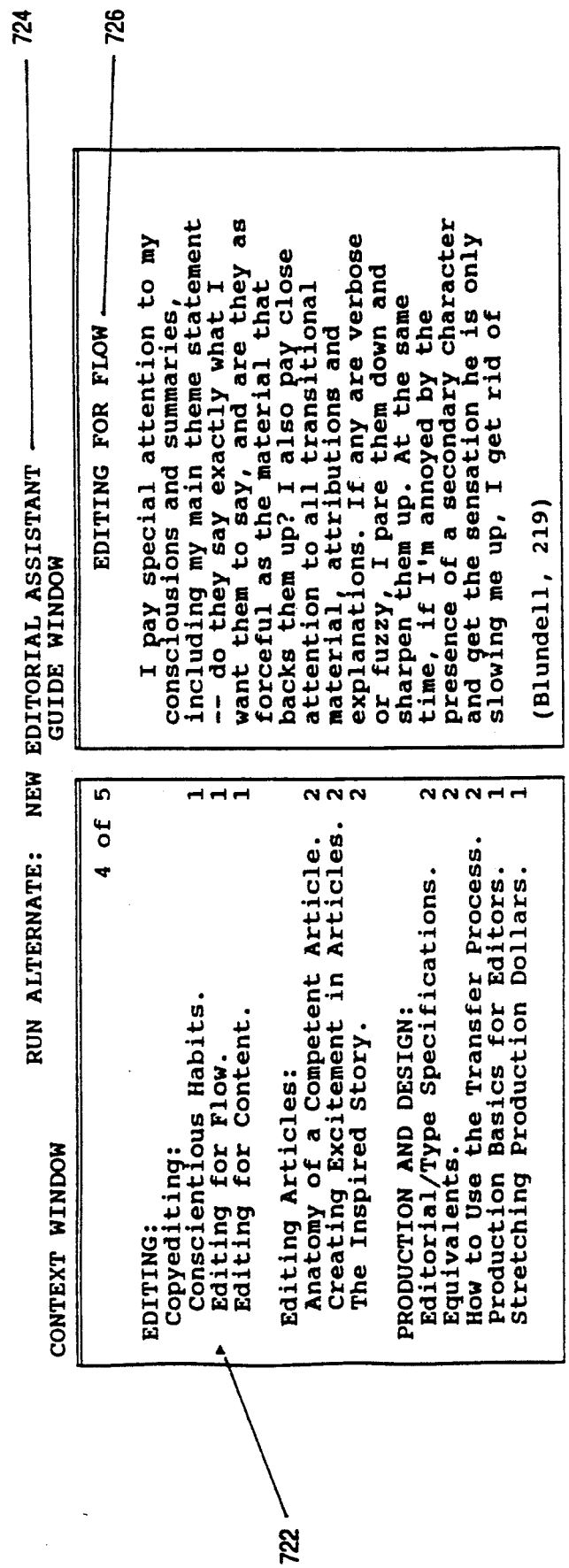
Figure 57A:
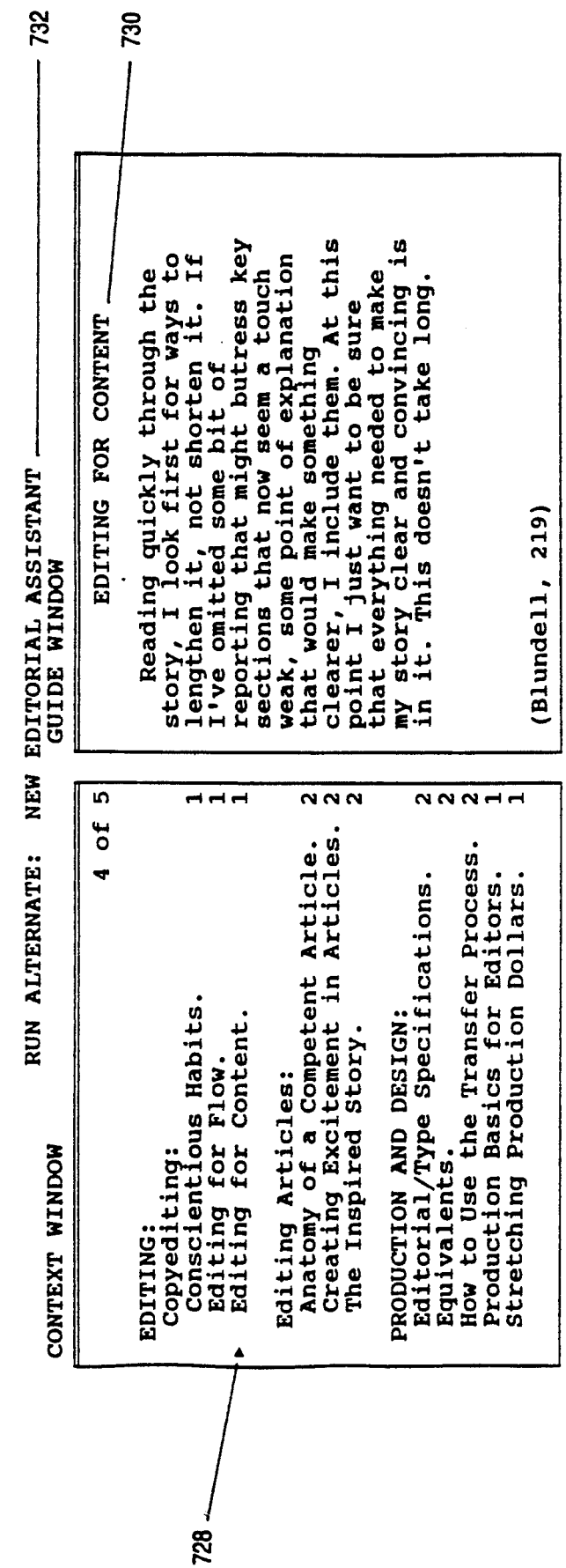
Figure 57B:
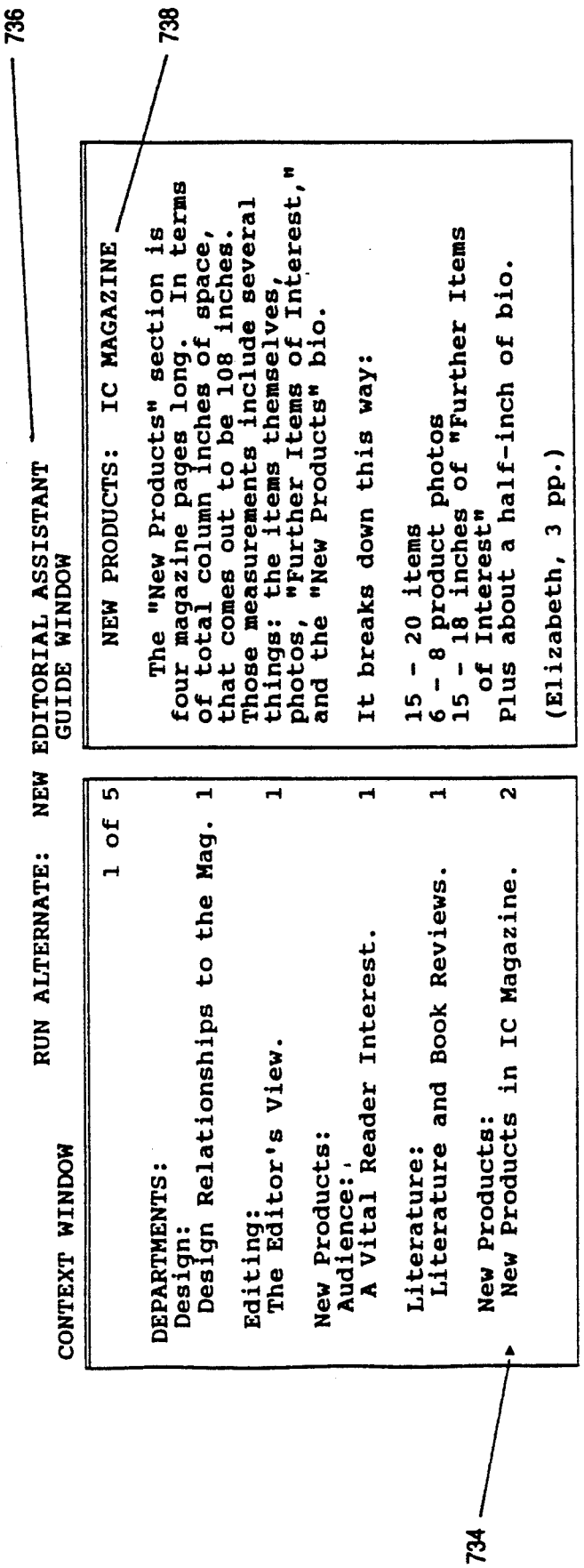

FIGS. 56 and 57 illustrate how the new Editorial Assistant could use her Alternate the first day in her new job. She may access the Guides sequentially or use the "Divide" key to open more Guide windows at one time 6038–6040 (FIG. 118). In either method, multiple Contexts from different sources may support a single situation because work often requires two or three kinds of information at once.

Suppose during her first day the new Editorial Assistant is manually proofreading the New Products Department which has just been returned by Production to Editorial.

She may keep open the Context "Editorial/Type Specifications" (the top screen 710 in FIG. 56). This is an internal company policy that specifies the components required to be included in Departments of the magazine 714, and the publisher's formatting codes, so she can check the type styles and type sizes used to typeset the piece.

At the same time, she might open the Context "New Products as News" 716 (the middle screen 718 in FIG. 56), to check the handling of the lead product in the department 720. This is a job skill Context that helps her understand and improve the quality of the writing as she proofreads the piece.

As she proofreads she opens and reviews two Contexts that look helpful, "Editing for Flow" 722, 726 (the bottom screen 724 in FIG. 56) and "Editing for Content" 728, 730 (the top screen 732 in FIG. 57). She wants to make sure that she learns the best possible writing techniques for this Department.

Finally, she discovers a Context called "New Products in IC Magazine," 734 and opens it (the bottom screen 736 in FIG. 57). Here she discovers the Editorial Department's guidelines 738 for selecting new products for this department. While she doesn't need this Context today, understanding it will help her select next month s new products so she glances through it to see how the products were selected in the piece she is proofreading. The value of an Alternate is that people often need several different types of understanding while operating in a single situation. Accessing and applying multiple shifting Contexts may be one way to simplify or control rapid change, whether one is changing jobs and companies, changing responsibilities inside a company, or facing new external changes imposed by competitors or the economy.

Since rapid change is normal for many companies, jobs, and professions, an Alternate may assist as either a pro-active or a reactive way to adapt rapidly: In a pro active sense, a user (an individual, a department, or a company) might imagine how an improved situation should be, and then create an Alternate (or a sequence of Alternates) that includes the Contexts and time sequence to create the Preferred Situation. In a reactive sense, a user (an individual, a department, or a company) might modify his Alternate(s) to collect the new Contexts needed, and Model the best possible reaction to the situation.

In either approach, the situation is tackled with customized information environments that include rapid and personalized access to more of the knowledge wanted or needed. In either case, this tool enables managers to shift their computing paradigm to imagining a preferred situation, then creating Alternates that help them implement it via their company's computing infrastructure.

Figure 58A:
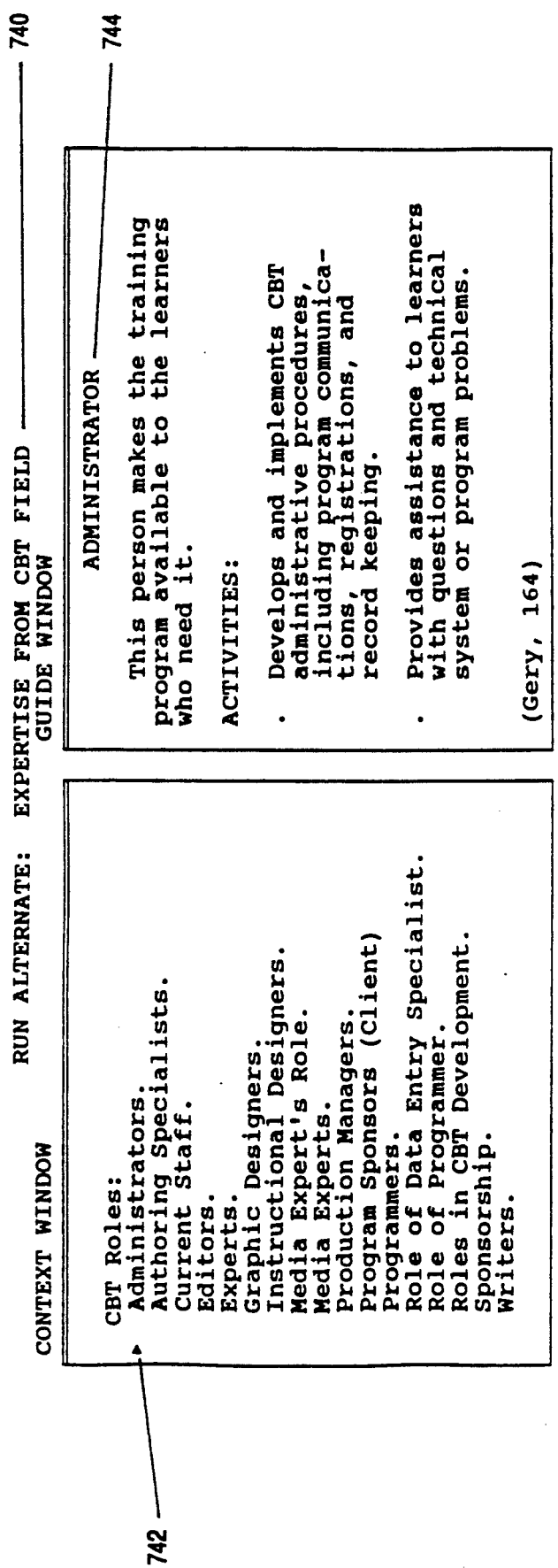
Figure 58B:
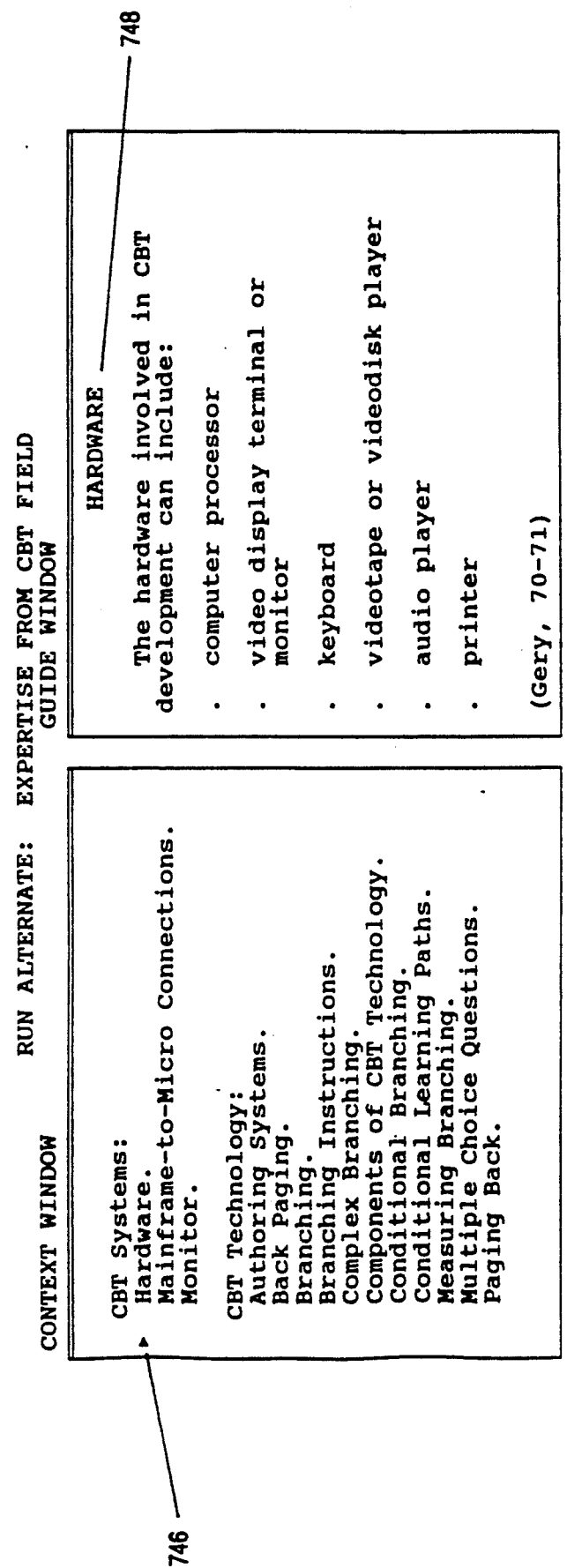
Figure 58C:
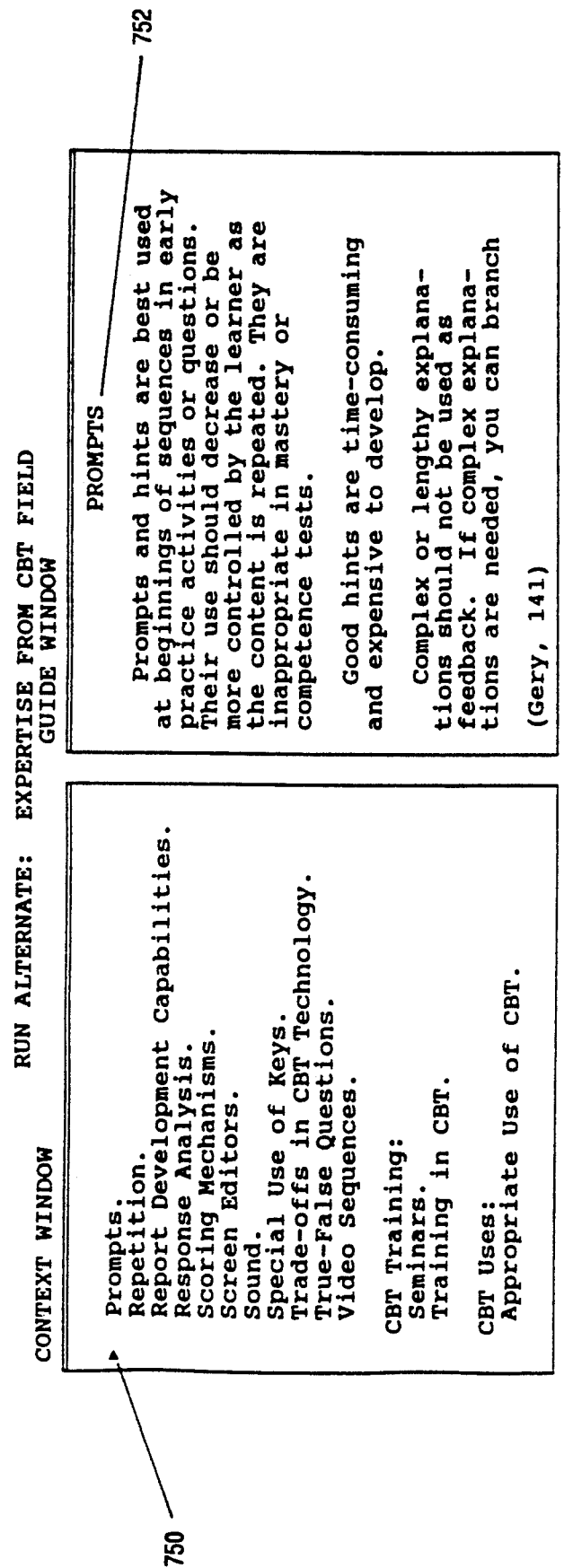
Figure 120:
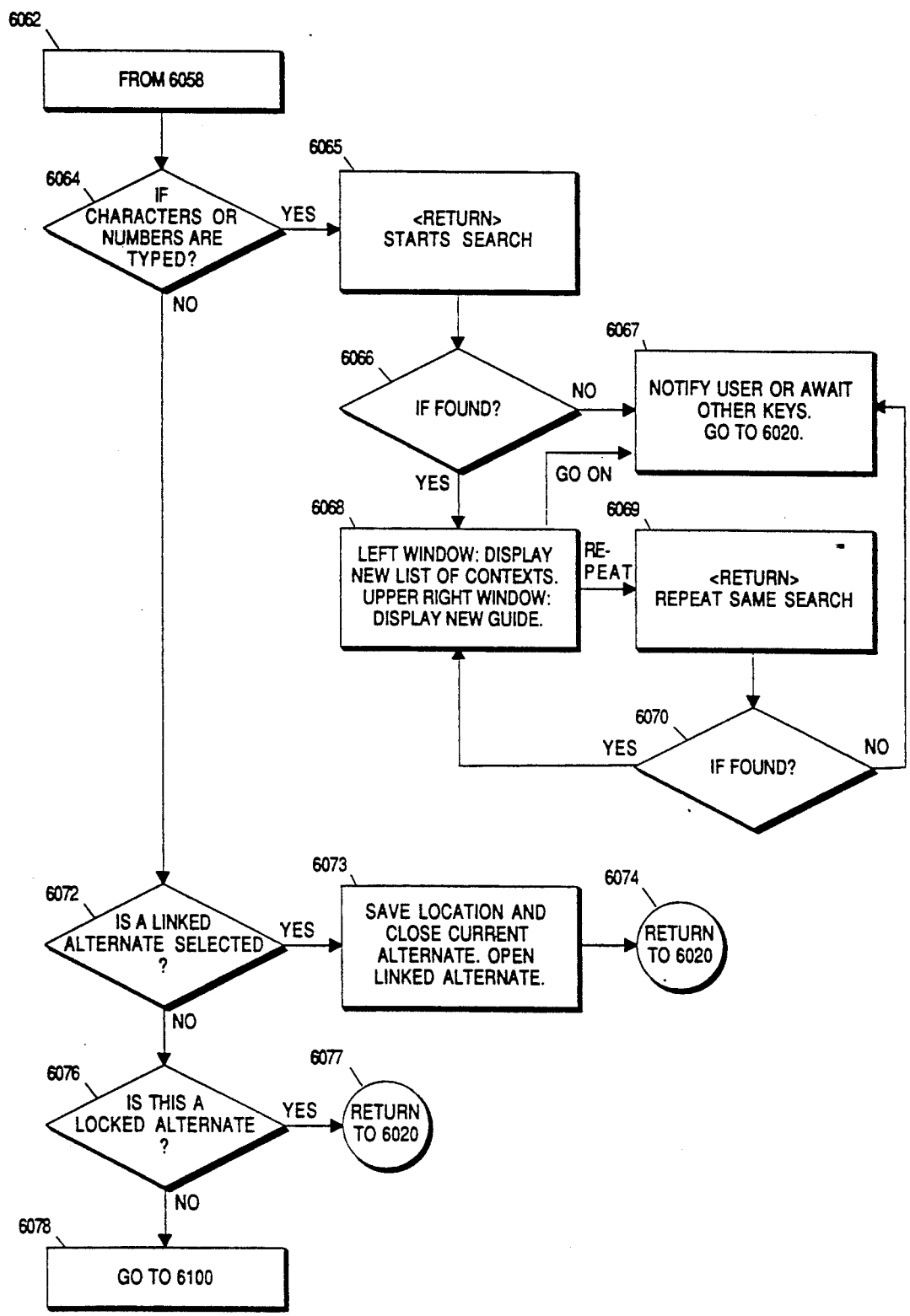

Turning now to FIGS. 58 and 120, the new Editorial Assistant uses a function key to access the linked Alternate 740, 6072-6074 when specialized expert knowledge is needed about CBT (Computer Based Training) 742, 744, 746, 748, 750, 752. The linked Alternate works identically as this Alternate, except it is specific to the domain of CBT expertise. In the Alternate that contains CBT expertise, however, it was fine to keep the Outline Model view and the Time Sequence Model view the same. These views are in the identical order in this linked Alternate.

Even though the linked Alternate operates in the same manner as this Alternate, it is a separate stand alone Alternate. Access to it is provided by means of using a function key to jump into that Alternate and return from it. When the user presses the Function Key to switch Alternates, it returns to the same point from which it was last exited 6073 (FIG. 120).

If, however, the original creator had wanted to merge the Alternates, that could have been done. This is what was done with the Contexts collected from the first and second Context Bases.

Figure 59A:
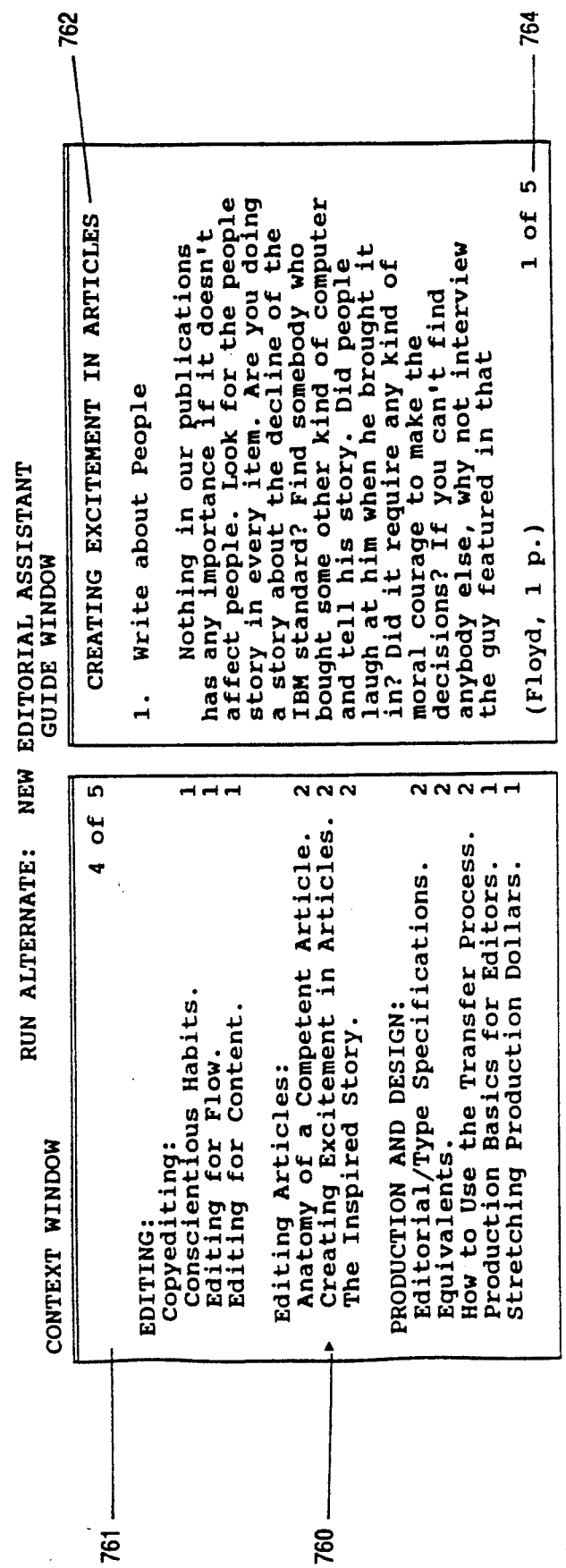
Figure 60A:
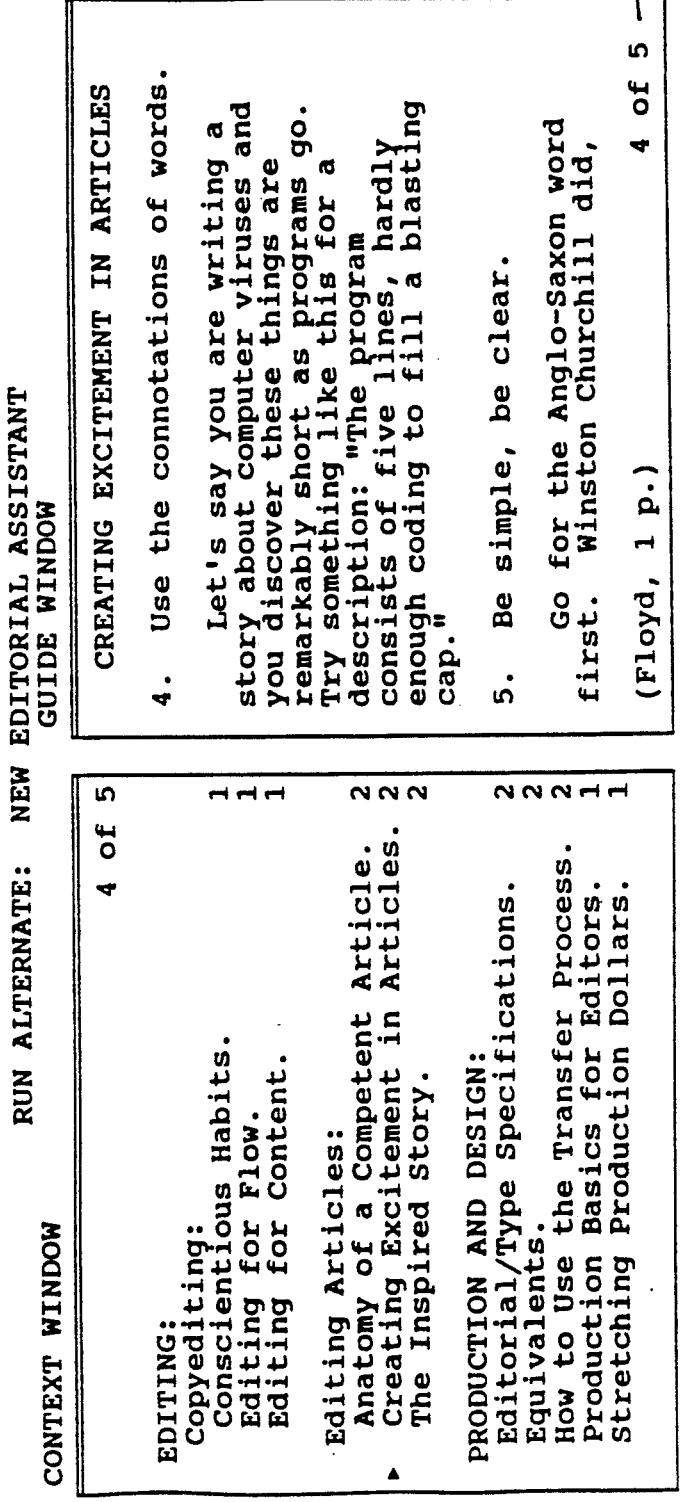

Turning to FIGS. 59 and 60, an individual Context's Guide is examined. This shows the usefulness of the Alternate for transforming a new employee's work product. The user rapidly discovers a Context that comes from the company's internal Contexts, which include the writing procedures and goals the Editorial Department Manager wants employees to follow. The Context selected is how the department manager believes the writers might be "Creating Excitement in Articles" 760. ( The user presses <F2> (the switch window function key) 6004, 6005 (FIG. 117) to move from the left Context Window 761 to the right Guide Window 762. The screens in FIGS. 59 and 60 show how the Guide Window, which displays the screen number (e.g., "1 of 5" in the lower right corner) may be scrolled down using the <PgDn> key to display the 2nd 766, 3rd 768, 4th 770, and 5th 772 screens of this Guide. The user may directly access the top 764 and bottom 772 of the guide, or any screen in the guide, by using keys such as <Home> or <End> and <PgDn> or <PgUp>. These function keys 6016–6032 are described in FIGS. 117 and 118.

Figure 61A:
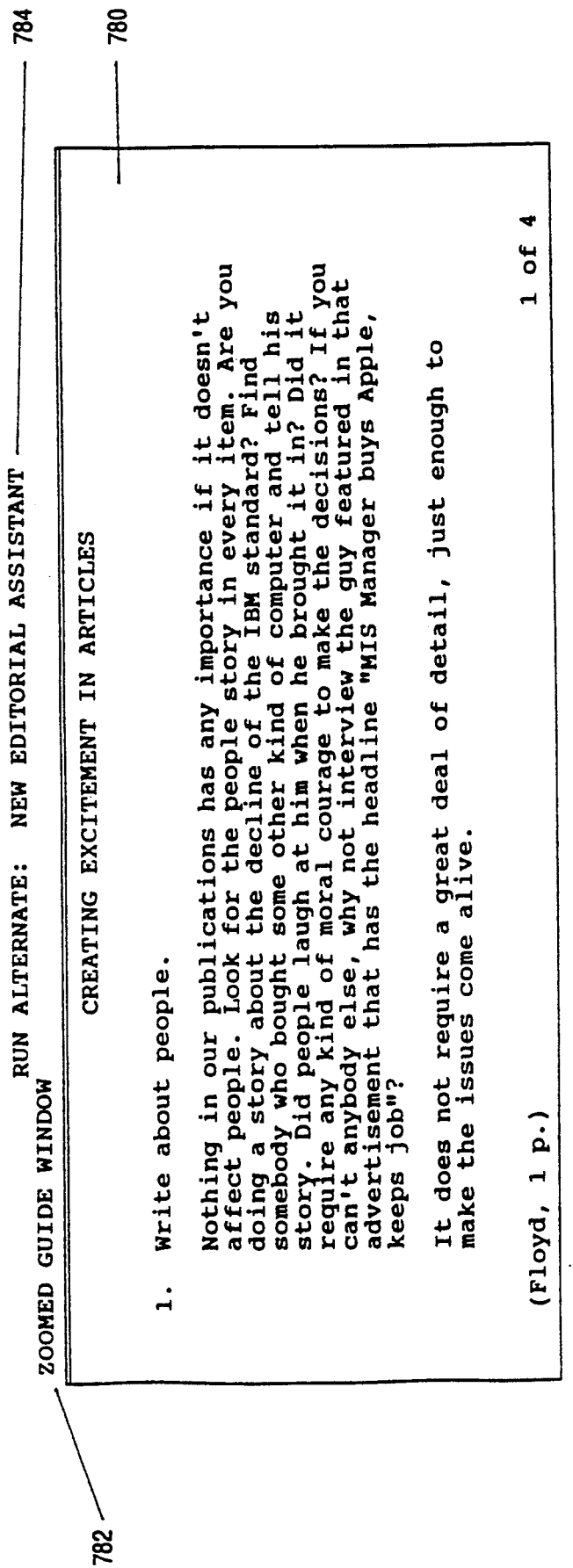

Turning now to FIG. 61, the user of the Alternate has pressed the "zoom" key and expanded the right Guide window 780 to fill the entire screen 6006, 6007 (FIG. 117). This is indicated in the upper left corner, above the window, where it clearly states "Zoomed Guide Window" 782. This view puts more information from that Context on the screen. This Figure shows the first three screens 784, 786, 788 displayed in the Guide Window. The contents of the zoomed Guide window may also be manipulated by using keys like <Home> or <End> as well as <PgDn> or <PgUp> 6016–6032 (FIGS. 117 and 118).

Figure 62A:
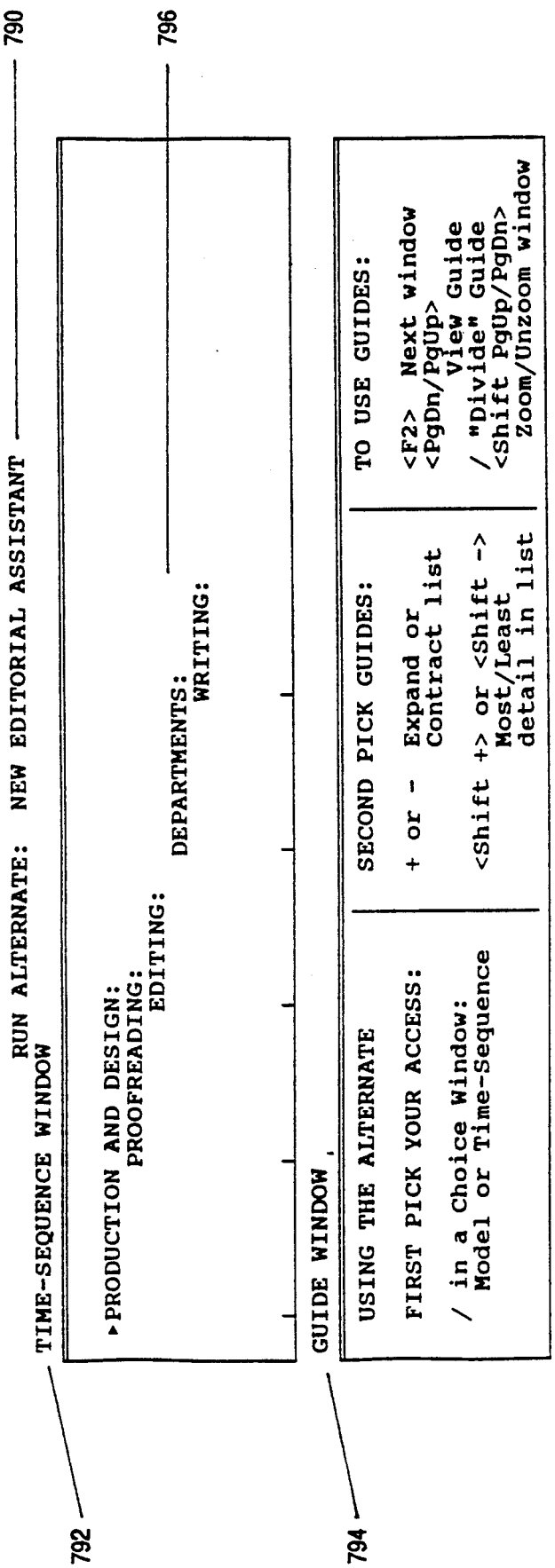
Figure 115:
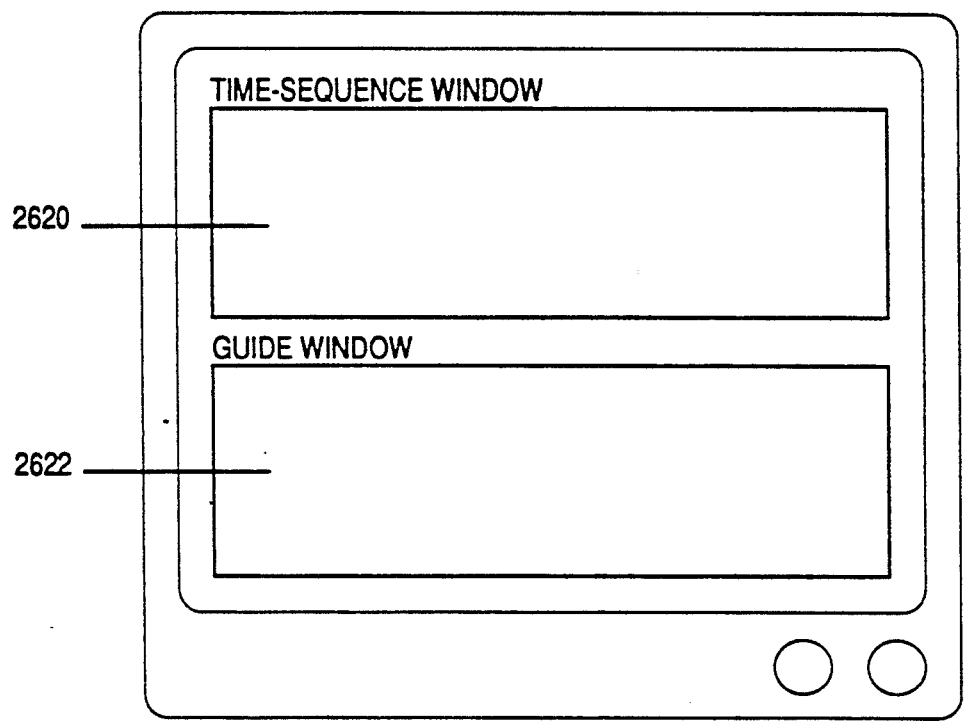
Figure 116:
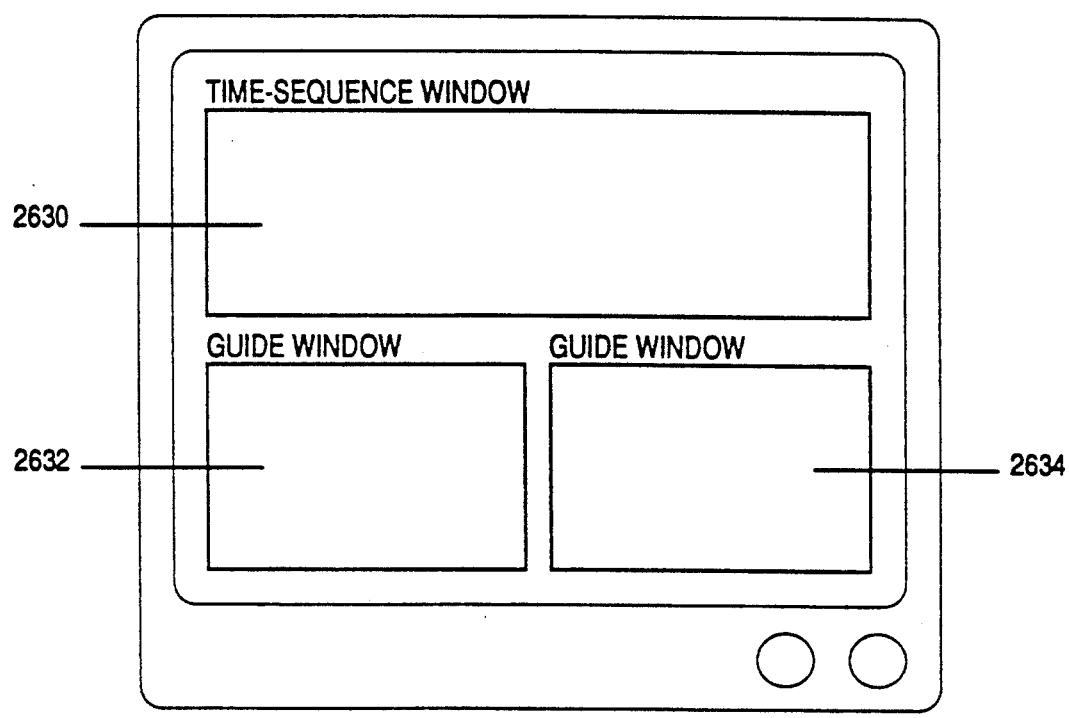

Referring to FIGS. 62 and 115, the screen 790, 2620 begins the operation of the Alternate from the Time Sequence Model view 6038, 6039, 6041 (FIG. 118). Again, at the top of the screen, the user sees that an Alternate is running, and the name of the Alternate 790. The upper window 792 is the Time Sequence Model window 9002 (FIG. 137) and the bottom window 794 is the Guide window 9003, 9016, 9017 (FIG. 137 and 138). The Time Sequence Modelwindow shows the major categories in the Alternate 796.

In the bottom screen 798 in FIG. 62, the user sees the results of pressing the <Plus> key to expand the Alternate 800 to its next level of detail 6008-6010 (FIG. 117).

Figure 63A:
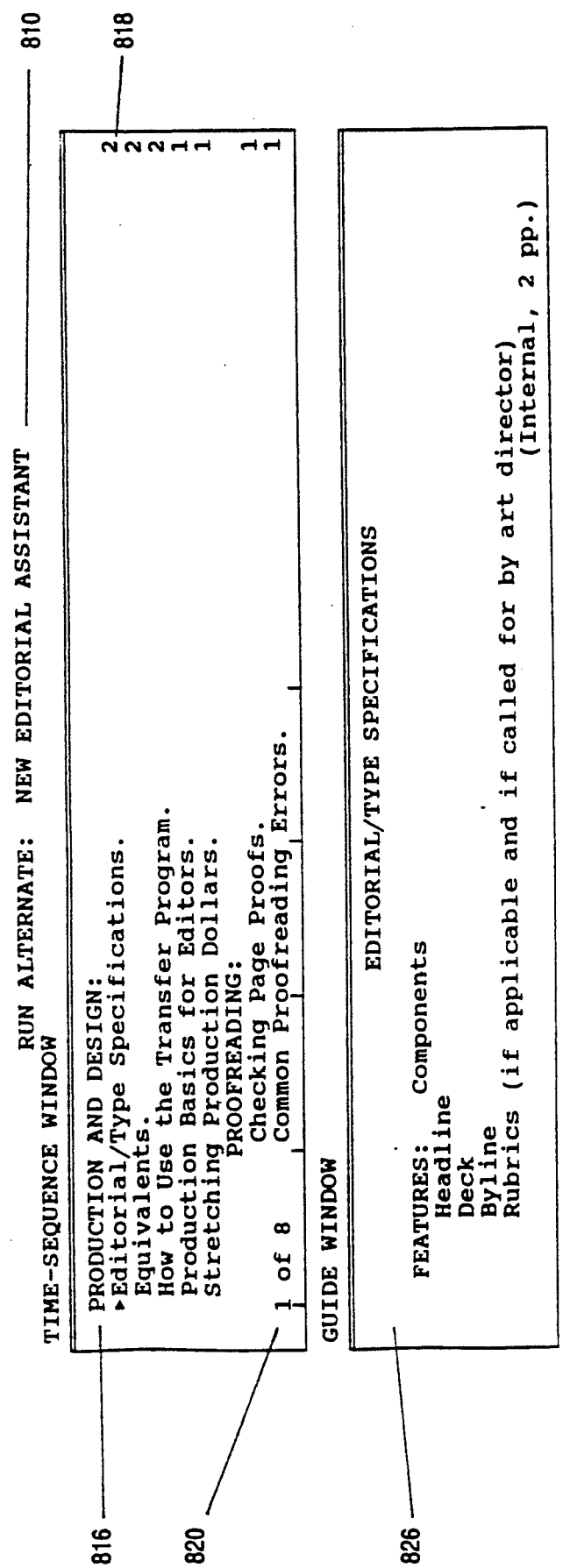
Figure 63B:
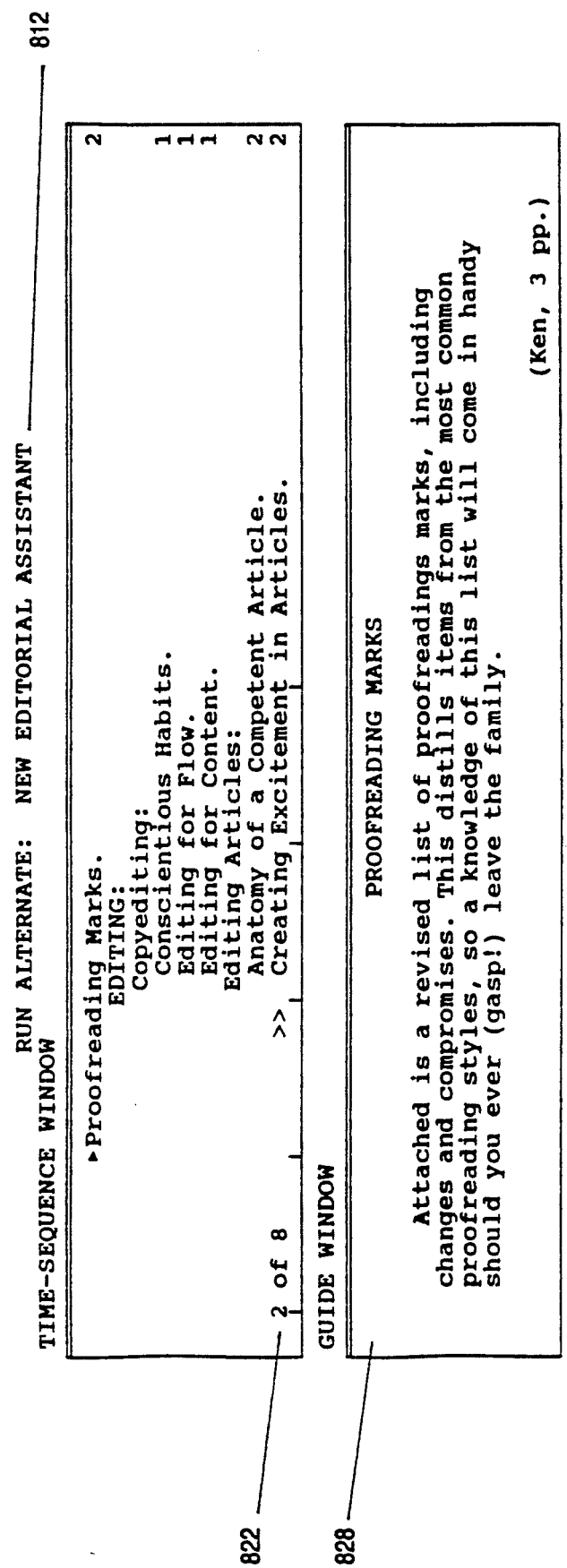
Figure 63C:
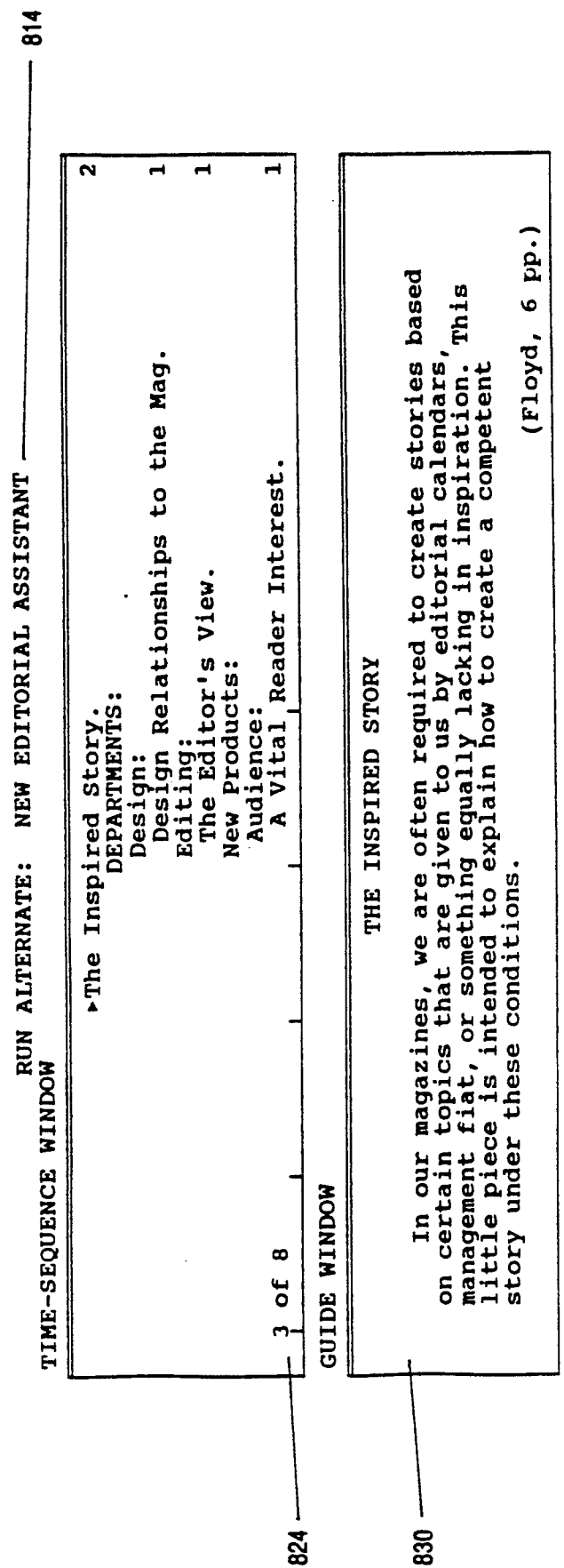

Turning now to the top of each screen 810, 812, 814 printed in FIG. 63, the Time Sequence Model view 816 has been expanded to show the Contexts. The right-hand column 818 of the (top) Time Sequence Model window 9002 (FIG. 137) shows the number of the Context Base from which each Context was taken. As a result, the end-user is able to tell whether the information came from job skill knowledge (Context Base #1) or internal company policies and procedures (Context Base #2).

The lower left corner 820 of each (top) Time-Sequence Model Window displays the location within the Alternate. The three screens in this Figure are screen "1 of 8" 820, screen "2 of 8" 822, and screen "3 of 8" 824.

Turning to the bottom of each screen printed in FIG. 63, the user sees the relevant Guides displayed in the lower Guide Window 826, 828, 830. As in the previously reviewed Outline Model View of the Alternate, the user may switch to the Guide Window by using the "switch window Function Key" 6004–6005 (FIG. 117). The user may zoom any Guide to fill the entire screen 6006–6007 (FIG. 117). Or, the user may remain in the Guide Window at the bottom of the screen. In either case, the contents of the Guide Window may be used by pressing keys such as <PgDn> or <PgUp> as well as <Home> or <End> 6016–6029 (FIGS. 117 and 118).

Figure 64A:
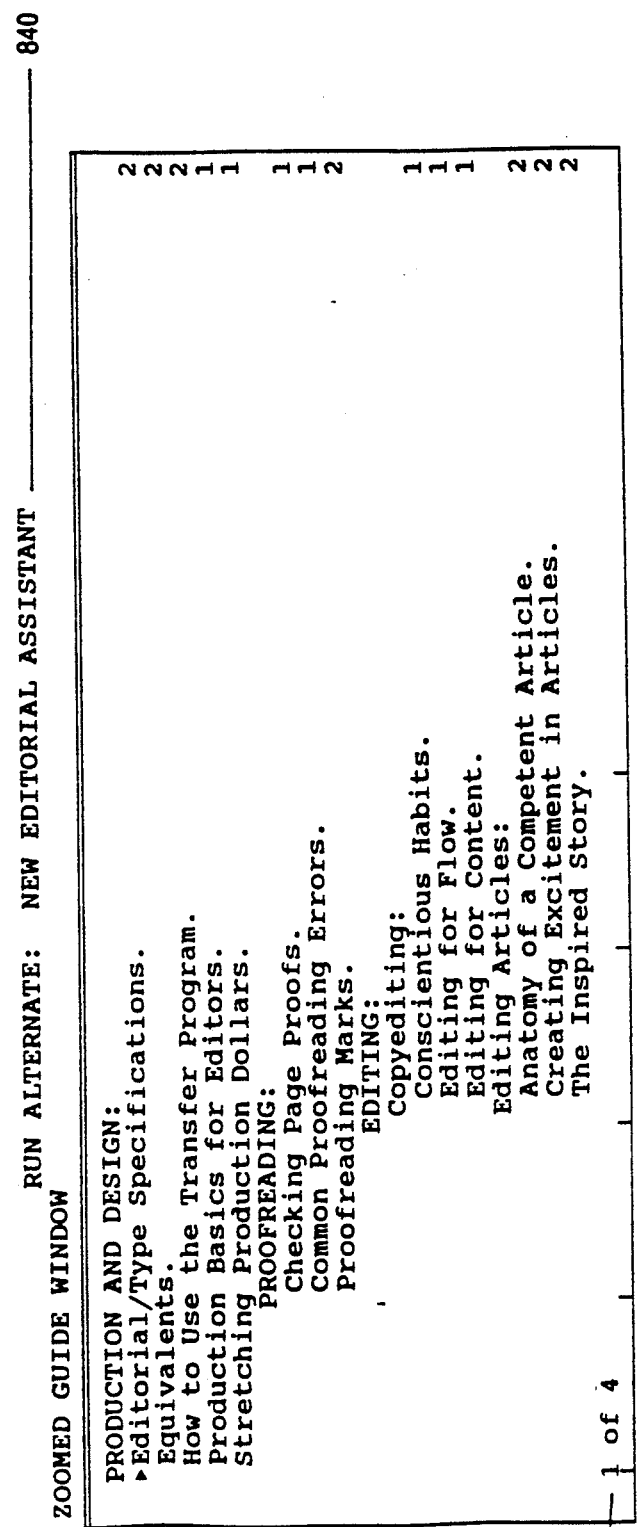

FIG. 64 shows the first two 840, 842 of the four screens 844, 846 in the Alternate as seen with a zoomed Time Sequence Model window. The user may press the "switch window Function Key" 6004–6005 (FIG. 117) to display the zoomed Guide Window from any Context that the cursor is highlighting, or switch from the Guide back to the zoomed Time Sequence Model window.

Figure 65A:
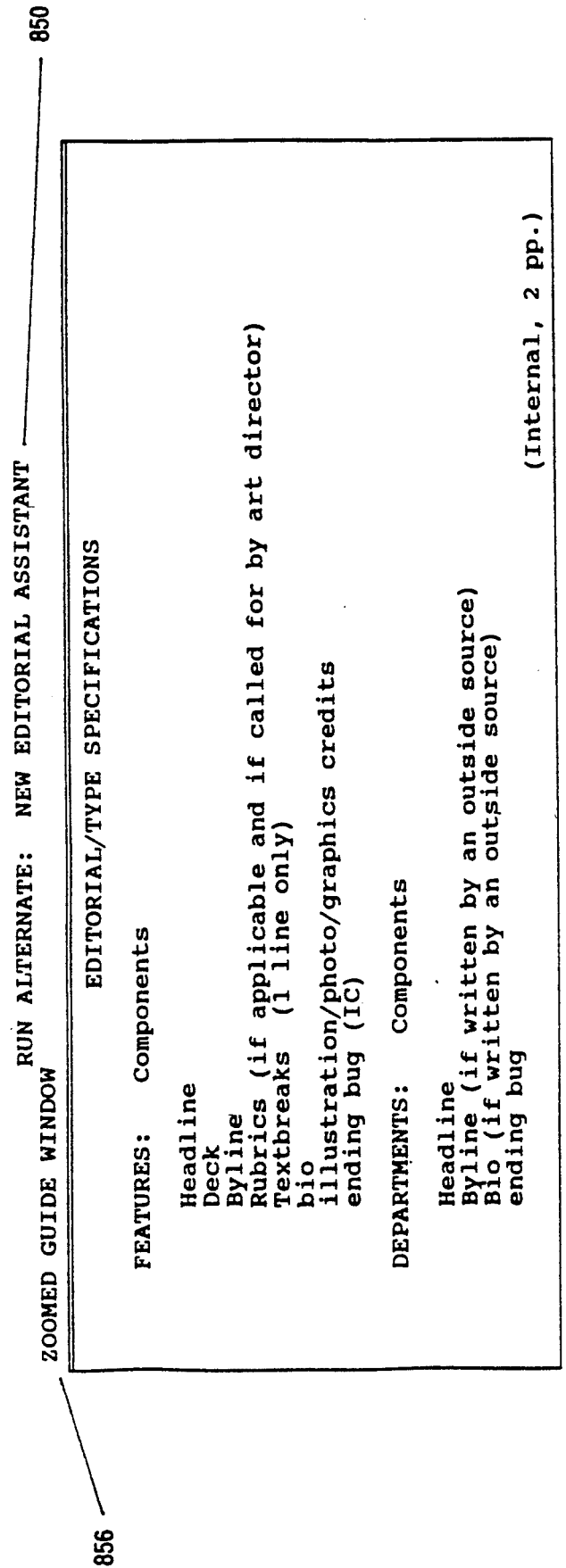

Turning to FIG. 65, there are three example zoomed Guide Windows 850, 852, 854. The user's location is displayed in the upper left, just above the window, where it indicates that each of these screens is a zoomed Guide Window 856.

The first guide 850 is an internal company Context. It indicates how that magazine publisher specifies its editorial layouts and its typesetting. In other words, the employee has immediate access to the specialized and unique ways the company wants the employee to do his or her job.

The lower two Guide Windows 852, 854 provide access to two different types of job skills from the Editorial Department Context Base. Both of these Guides help the new employee get up to speed in those skills by utilizing the type of guidance the company would like the employee to have. The middle screen 852 helps her learn how to describe machinery, while the bottom screen 854 helps her understand how to write in a visual and more interesting style. It is quite possible for the new Editorial Assistant to sit down to write a full-page Departmental Feature about a new piece of machinery, and need to open these three Contexts 850, 852, 854 to create this story properly.

Figure 127:
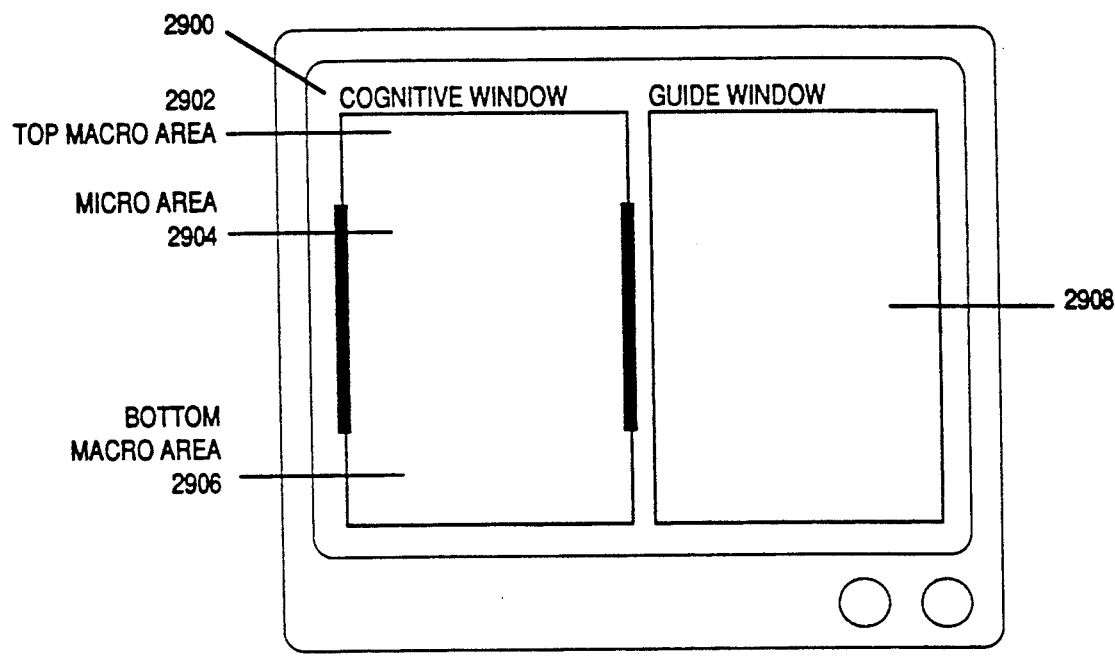
Figure 128:
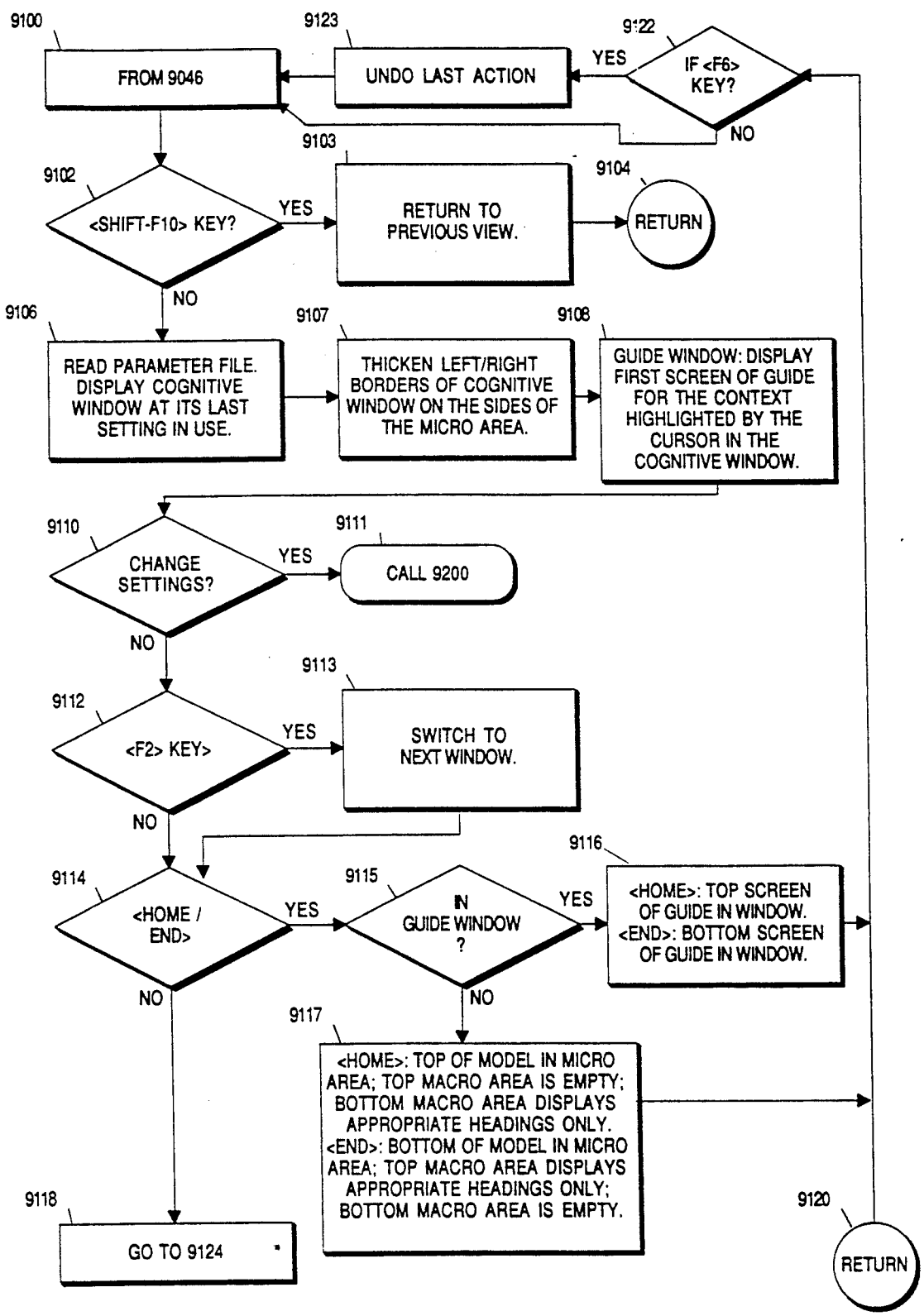
Figure 129:
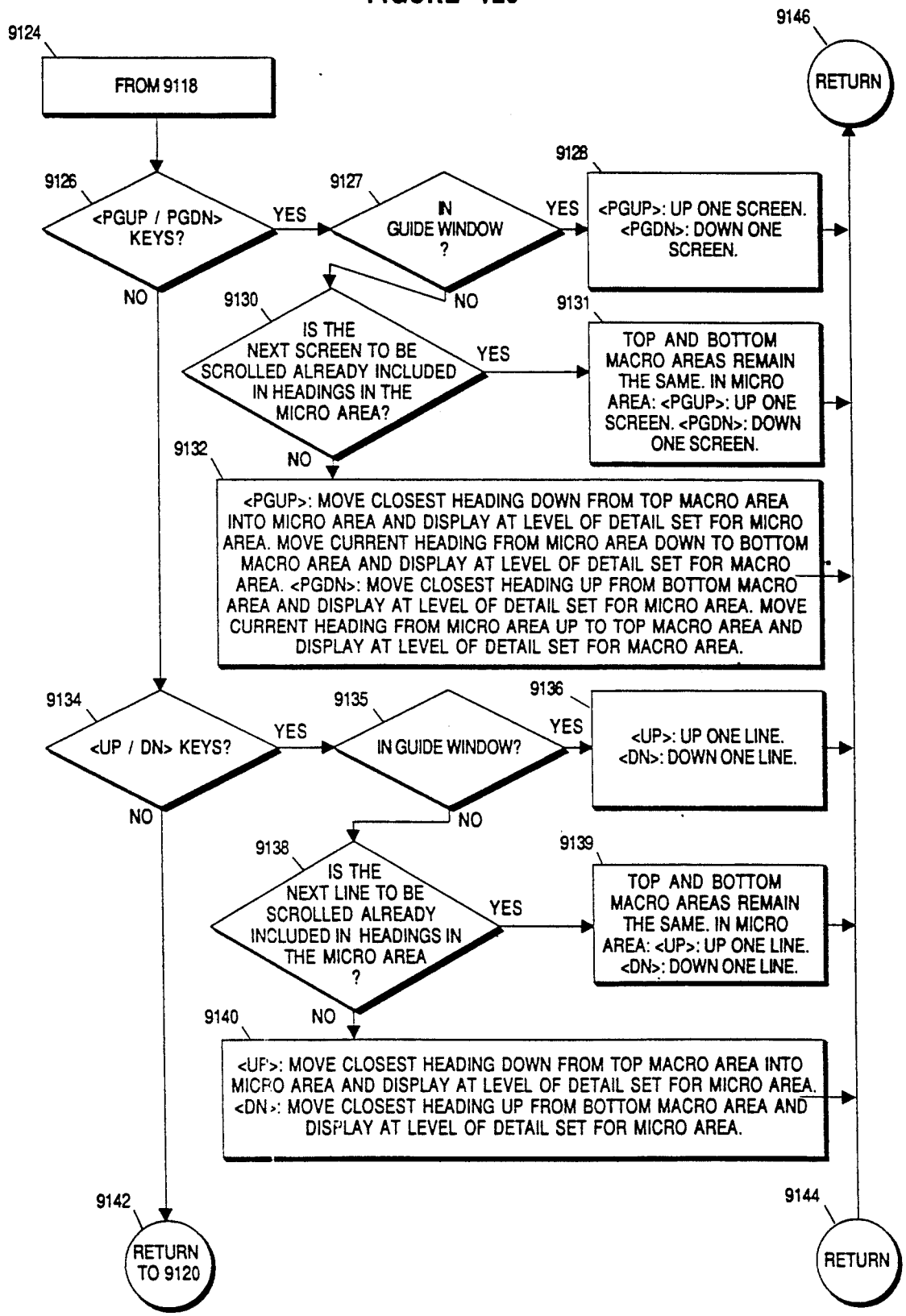

Turning now to FIGS. 66 and 127, the user sees a new way of displaying and viewing information. This is named the "Cognitive Window" 861, 2900. It is based on the fact that the human mind is limited in the number of concepts it can remember at one time, and in the levels of a hierarchy it can access concurrently for depth of information. The user switches to or from this view by pressing a function key (9058–9060 in FIG. 139).

In the top screen in FIG. 66, the focused detail area, which is called the Micro Area is indicated by increasing the thickness of the middle of the left and right sides of the left window's border 862, 863, 2904 (though this is not required for the invention). The surrounding area 864, 866, 2902, 2906 which is called the Macro Area, retains the normal window border.

As a new type of display of an information environment, the Cognitive Window operates like a magnifying glass that displays the level of detail the user wants in its Micro Area 862, 2904, while displaying less detail in the top and bottom Macro Areas 864, 866, 2902, 2906. This view may also be thought of as two accordions: The first that expands the Micro Area in which the user is working 862, 2904, while the second compresses (while still displaying) the surrounding Macro Areas 864, 866, 2902, 2906 around it. The cursor remains in the Micro Area 862, 2904 and does not enter the Macro Areas 864, 866, 2902, 2906.

In the Cognitive Window illustrated in FIG. 127 and shown in the three screens 860, 868, 870 printed in FIG. 66, the same settings are used. They show a main focused area of detail (the Micro Area) 862, 2904 and the surrounding areas (the Macro Areas) 864, 866, 2902, 2906.

As the user scrolls down to the second and third screens 868, 870 in FIG. 66, the entire window is not scrolled; the changes are restricted to the Micro Area's display of details and the larger titles in the Macro Area immediately above and below the details. In this example, when the user presses <PgUp> 9126–9132 (FIG. 129) the entire window does not switch to a different part of the list. Instead, the focused Micro Area moves up to the next topic, "Writing:" 872. It then expands the area around the cursor's new location to show its detail 874. The former detailed area "Editing:" 862, 876 condenses and moves down to become a heading in the Macro Area below the Micro Area. Similarly, when the user presses any key that moves the cursor into the areas above or below the current focus 9114–9117, 9134–9140 (FIGS. 128 and 129), the level of detail follows the cursor while the current details are condensed and "put away" in the Macro Areas at the top or the bottom of the Cognitive Window.

Turning now to FIG. 67, this is the screen 880 where the parameters of the Cognitive Window are set. While this screen may be modified, its interactive principles are apparent. As the user changes the settings in the left window 882, the right window 884 alters its appearance to display the current settings. Every user may set the Cognitive Window to match his or her cognitive style, and change the settings 886, 888 when a more or less focused cognitive approach is desired. The Micro Area 888 can be set to match the level of detail preferred by the user, and the Macro Areas 886 above and below can be set to display the main points at the levels of detail that permit the larger picture of information to be accessed with the speed and flexibility the user desires.

Figure 130:
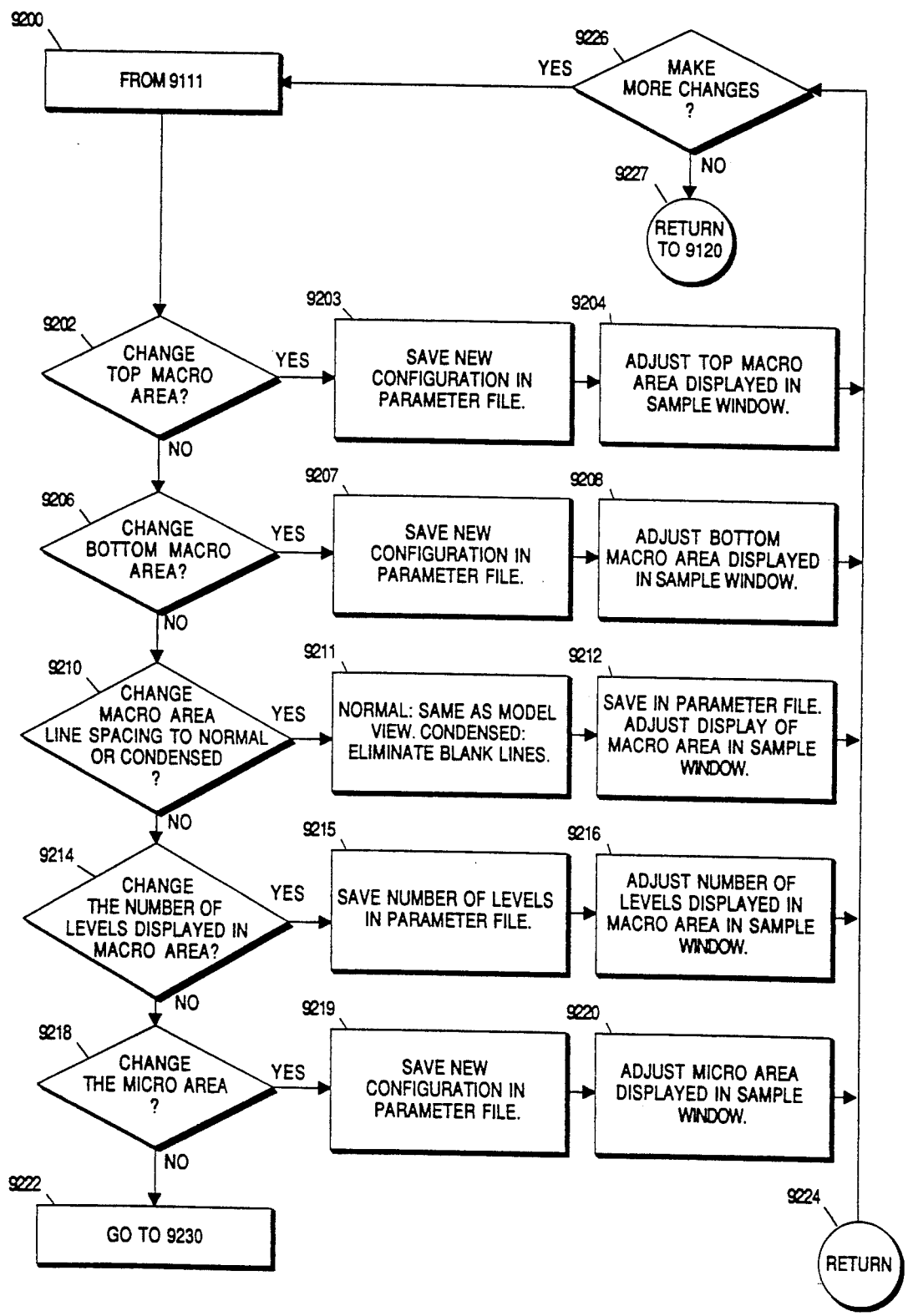
Figure 131:
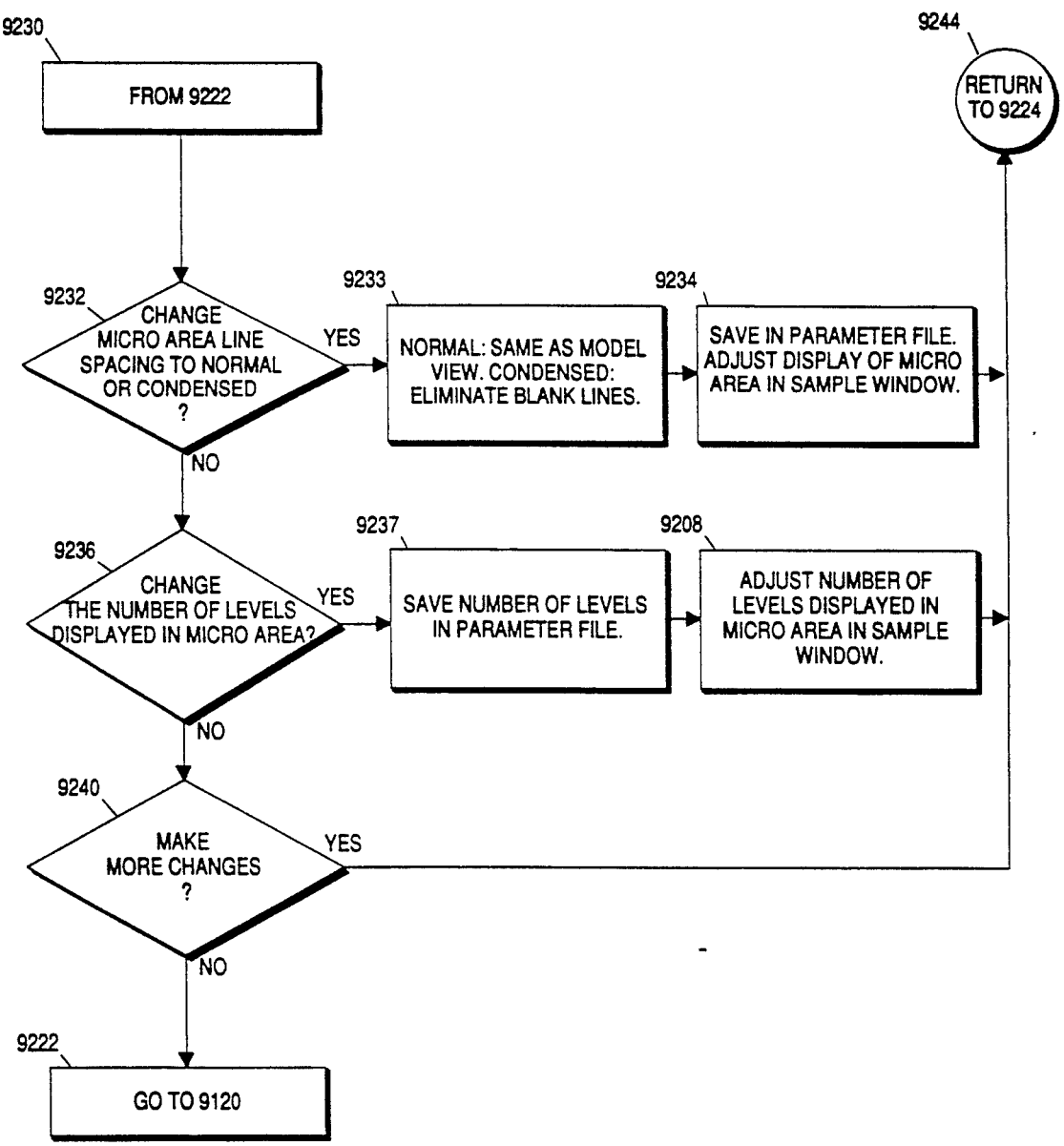

For example, the Cognitive Window in FIGS. 66 and 67 are set to the following cognitive approach according to the methods illustrated in FIGS. 130 and 131.

(1) The Macro Areas 886 (above and below the Micro Area):

Up to 3 points are listed above the Micro Area 9202–9204

Up to 3 points are listed below the Micro Area 9206–9208

Line spacing is condensed (blank lines are eliminated) 9210–9212

The top level of the hierarchy is the level displayed. 9214–9216

The Micro Area (the detail area):

10 main points are included 9218–9220

Line spacing is normal (the same as in other views) 9232–9234

3 horizontal levels are displayed 9236–9238

With the Cognitive Window, the user gains the twin advantages of both Macro 886 and Micro 888 views in the same window, without having to jump around the Model to locate the Guides and Contexts needed next.

While the Cognitive Window is shown only in the Alternate, it may be used in other areas of this invention such as Context Collection and Context Positioning. In addition, its general usefulness for other types of software is apparent.

Using Alternates to Manage Situation Shifting

A system for explicitly managing "Situation Shifting" is part of the present invention. This part of the invention may prove increasingly valuable as innovation, new technology, and the speed with which these are commercialized grow as part of global economic competition. In organizations that might use Situation Shifting, many types of change occur. To fit the often professional but varied supervisory environment, a set of flexible management tools have been developed to explicitly control this process.

The management of Situation Shifting is the process of using the Contextualizer and Alternates systematically to improve the Current Situation or to move into an imagination-driven Preferred Situation. This spectrum may range from trivial changes to profound transformations.

The management of Situation Shifts includes four component systems in the present invention, though they may be used in any order. They will be explained here in the following sequence: First, Alternates are Modeled. Second, the Alternates in the Outline Model are Time-Sequenced into clear Situation Shifts. Third, a flexible reporting system rapidly discloses management information about the development of Alternates and the process of Situation Shifting. Fourth, a Copyright Payment System which tracks costs and payments for distributing Alternates.

Figure 68A:
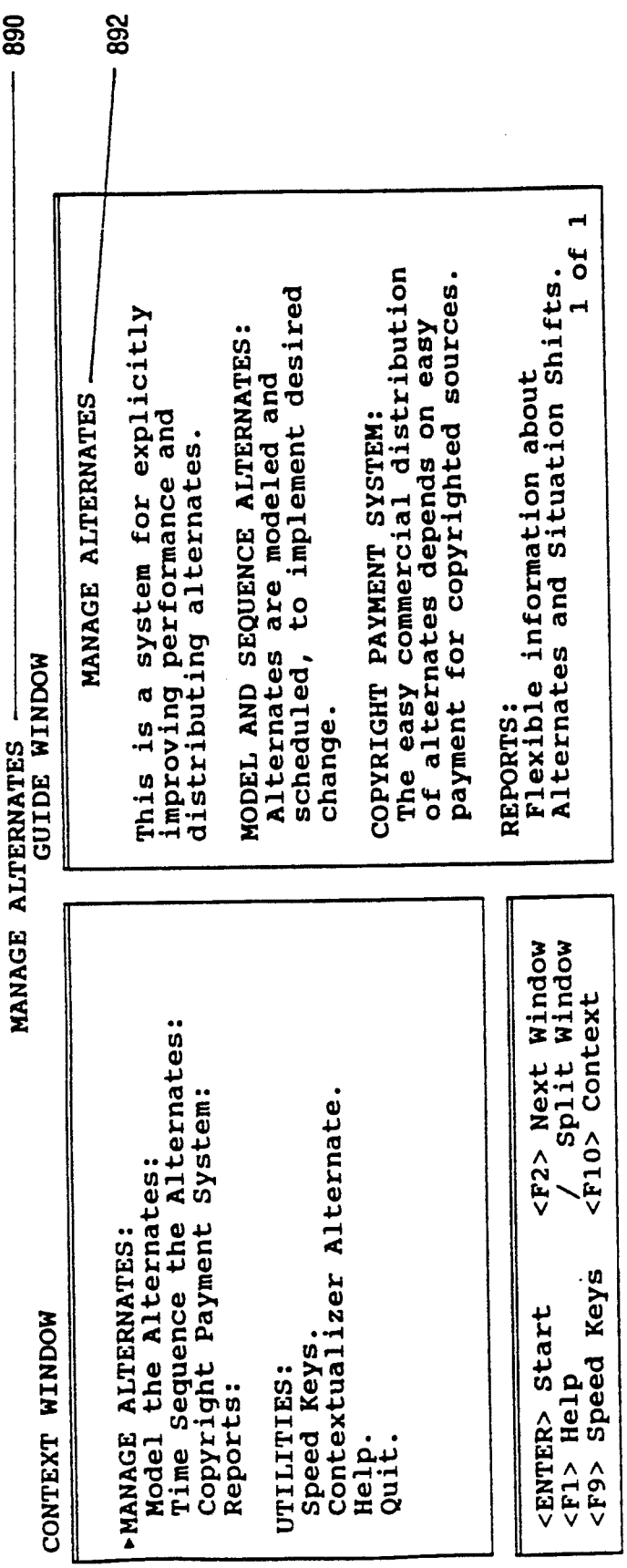
Figure 68B:
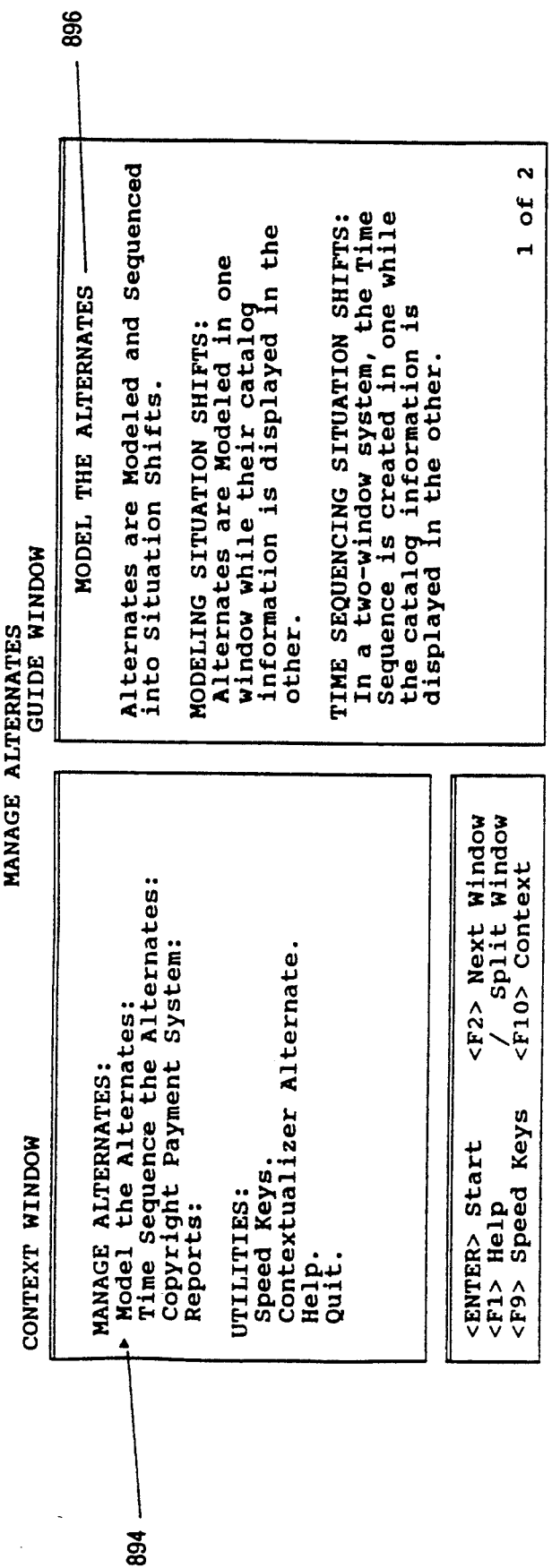
Figure 68C:
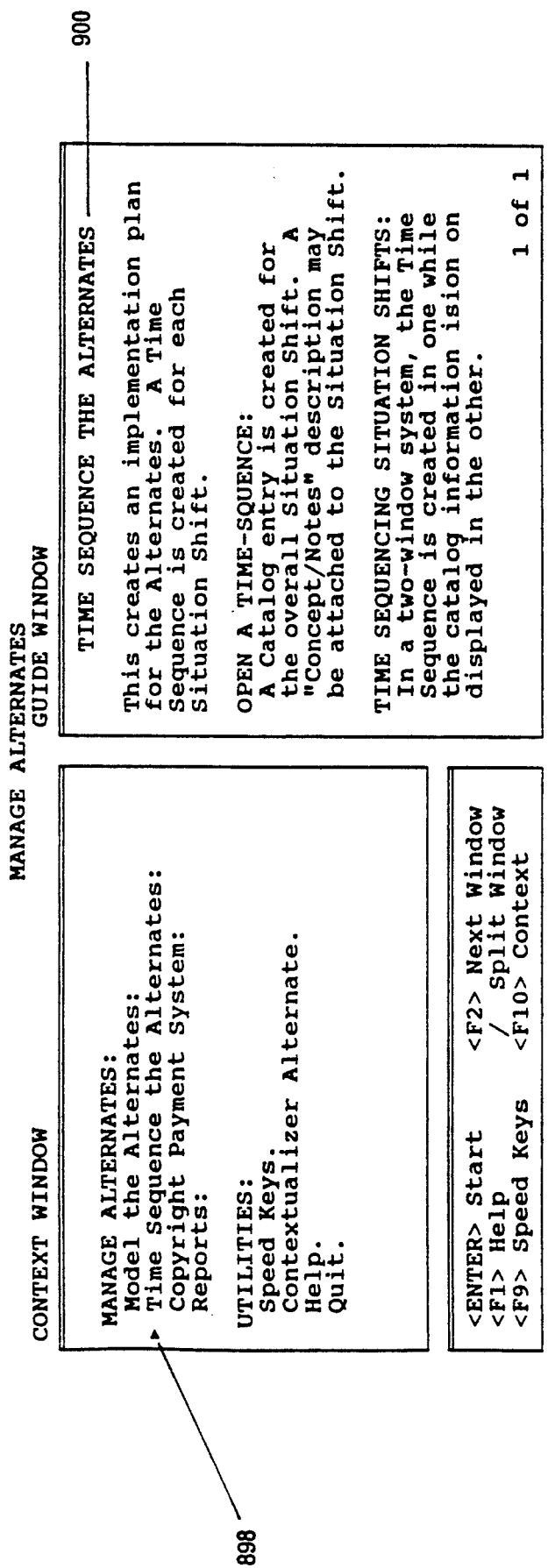

The top screen 890 in FIG. 68 shows the menu for this option. The Guide window 892, 896 includes the main areas of Outline Modeling and Time Sequence Modelling the Alternates, providing a copyright payment system, and running reports. The last two screens in this Figure show the Contexts and Guides for Outline Modeling the Alternates 894, 892, 896, and Time-Sequence Modelling the Alternates 898, 900. Those texts explain the activities.

Figure 69:
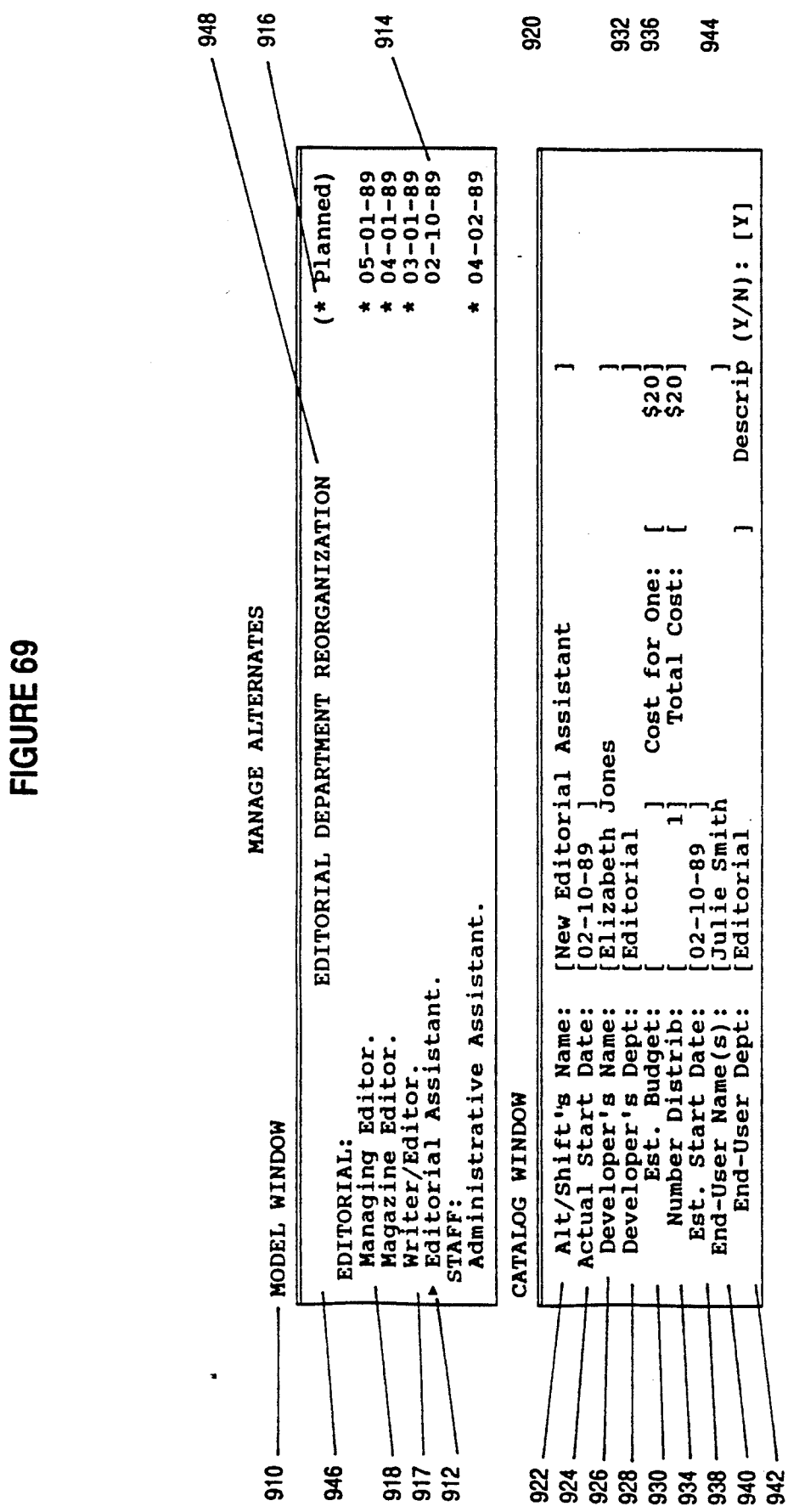
Figure 126A:
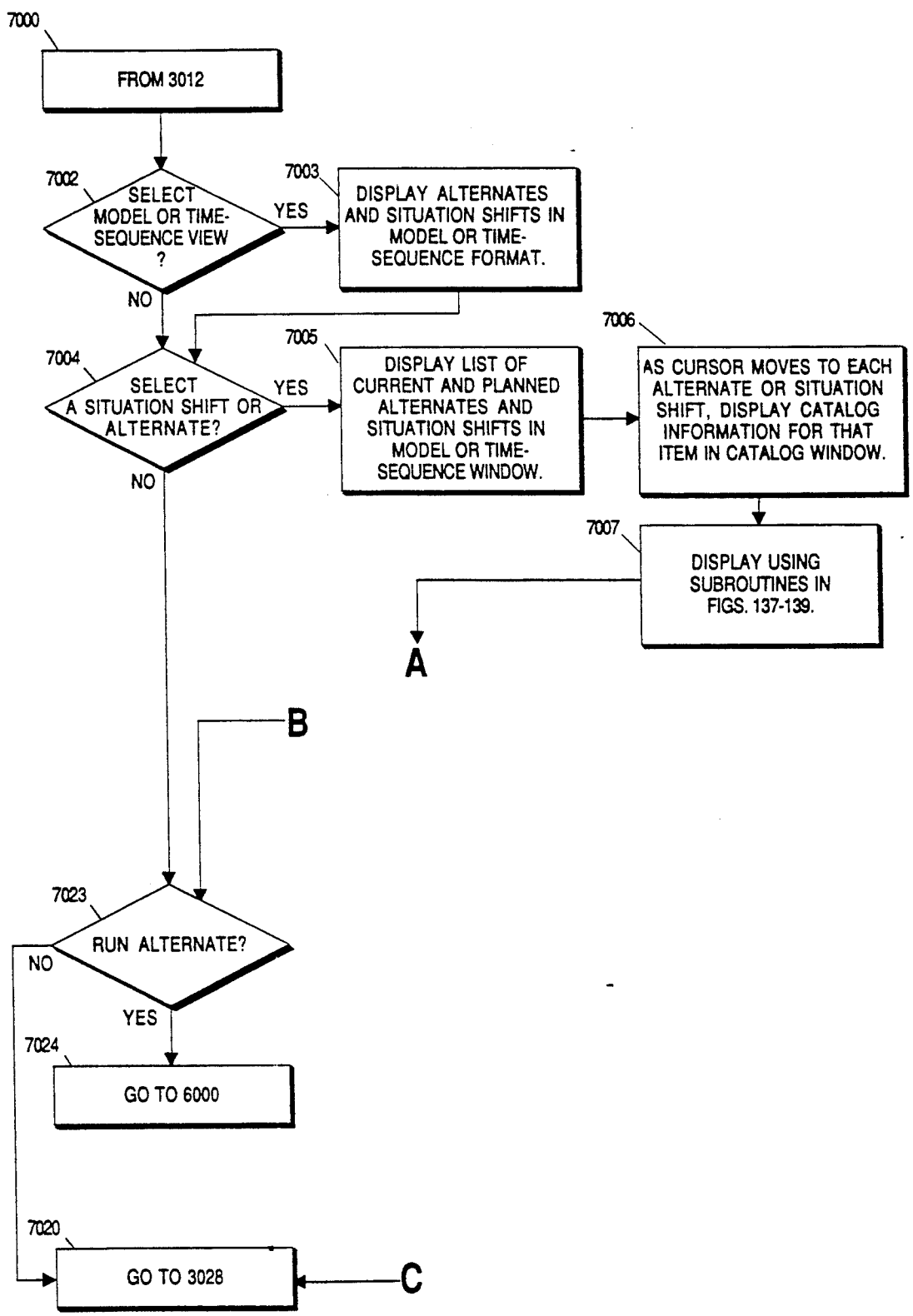
Figure 126B:
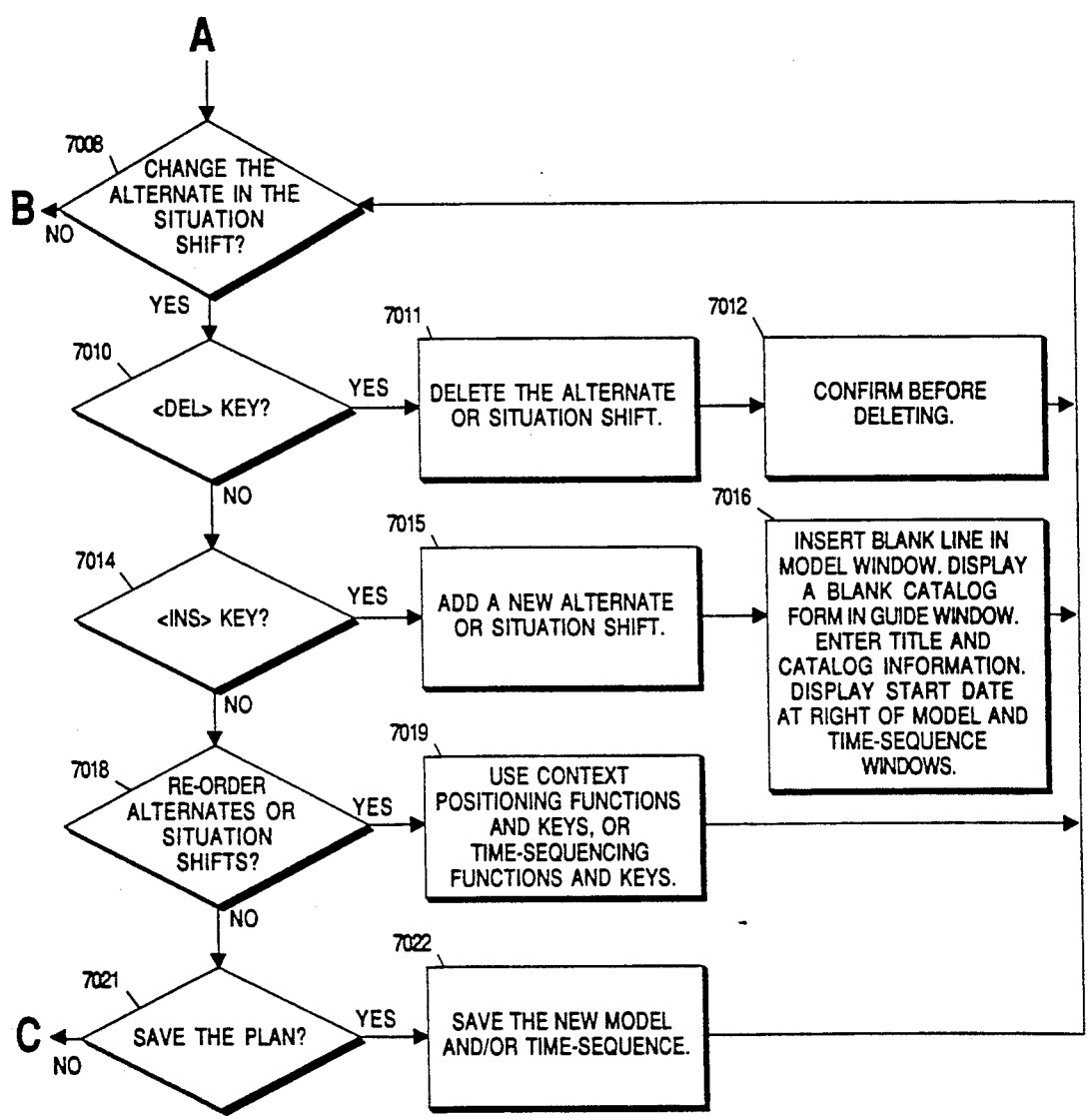

Turn now to FIGS. 69 and 142 for the Outline Model of Editorial Department Alternates. As can be seen in the Outline Model Window 910, 2700, only the new Editorial Assistant's Alternate 912 has been completed while other Alternates have been planned 916 for 914 while other Alternates have been planned 916 for positions like Writer/Editor 917 and Managing Editor 918. Future Alternates are indicated by asterisks 916 placed before their planned start dates. If the user would like to run a completed Alternate 912, the user highlights it with the cursor and presses the "Run Alternate" function key 7023, 7024 (FIG. 126).

When the new Editorial Assistant's Alternate was started a Catalog screen was created for it 204 (FIG. 18). The Catalog information 920 (7002-7007 in FIG. 126) is attached to the Alternate to help manage its use, and it is displayed at the bottom 920 in FIG. 69 (2702 in FIG. 142). The items may be changed as needed; they are categories used to track the development, use, cost, and progress of each Alternate.

Alternate's Name 922: This is required. It is the basis for Outline Modeling Alternates and Time-Sequence Modelling them for Situation Shifting.

Date 924: Required and initially entered by reading the current system date when the Alternate is compiled. The date can be changed by the user.

Developer's Name 926: This is optional, but if it is entered the Alternates can be tracked by their developers. If this is not entered, developer tracking is disabled for this Alternate.

Developer's Department 928: This is optional, but if it is entered the Alternates can be tracked by the originating departments. If this is not entered, departmental tracking is disabled for this Alternate.

Estimated Budget 930: This is optional, but if it is entered the Alternate's cost may be compared to this budgeted figure. If this is not entered, cost tracking is still kept for the Alternate but budget comparisons are not available.

Cost for one Alternate 932: This is the amount calculated by the Copyright Payment System. See below.

Number Distributed 934: This is the quantity of this Alternate that has been compiled, duplicated, and distributed (whether internally in a company, or sold outside of it).

Total Cost for Alternates 936: This is the cost per Alternate multiplied by the number distributed.

Estimated Start Date 938: This is required. It is the basis for adding the Alternate to Outline Models and Time-Sequence Models.

End User Names 940: This is optional.

End User Department, Product, Business Unit, Etc. 942: This is optional.

Alternate's Description 944: This is optional, but if it is entered a "Concept/Notes" window is opened (212 in FIG. 19). In it, a description of the Alternate can be entered and this description is attached to the Alternate's Catalog information. This description may be included in printed reports. If "N" is entered, notes window displays and printing the description are disabled.

As shown in FIG. 69, the Outline Model is a two-window 910, 920 display (7002-7007 in FIG. 126). The same type of keys work with these windows as with other systems in the invention; The cursor is a reverse-highlight light bar, and this is indicated by an arrowhead in the left column of the top window 912. As the cursor is moved to highlight an Alternate, its Catalog information is displayed in the bottom Guide window 920. The user switches between the windows with the <F2> function key and moves around both windows with the <Home> or <End>, <PgUp> or <PgDn>, and <Up> or <Dn> cursor keys 9010-9034 (FIGS. 137 and 138). In the bottom window, items can be updated at any time. If the Alternate's name or date(s) are changed in any window at any time, these changes are reflected in the Outline Model, the Catalog information, and the Time-Sequence Model(s). Flexible reports to track combinations of Alternates, or report on an individual Alternate, are available (see below).

The same sequencing, indentation, and titling tools operate in Modeling as in Context Positioning (FIGS. 102-106 and 7002-7019 in FIG. 126). The user reorders the Alternates into a Model 946 of a Situation Shift. This Model 946 reflects the user's view of the area covered by the Shift, regardless of whether this is a department, a business unit, or a complex organization-wide program like creating a new technology and marketing new products from it.

In FIG. 69, the Situation Shift 948 is a reorganization of the Editorial Department that is part of the publishing company's launching a major new magazine. During the year-long start up period, staff are being given added responsibilities through Alternates that describe how they ought to do their expanded jobs 912, 917, 918. After the new magazine becomes established, new staff will be hired for it. Until then, however, the current staff will create and publish the new magazine's first issues. Alternates are being created and implemented systematically throughout the year 916 to increase the staff's output, to support a faster pace of change, to learn added responsibilities, and to provide specific new skills and expert information needed to create the new magazine in its specific field.

Figure 70:
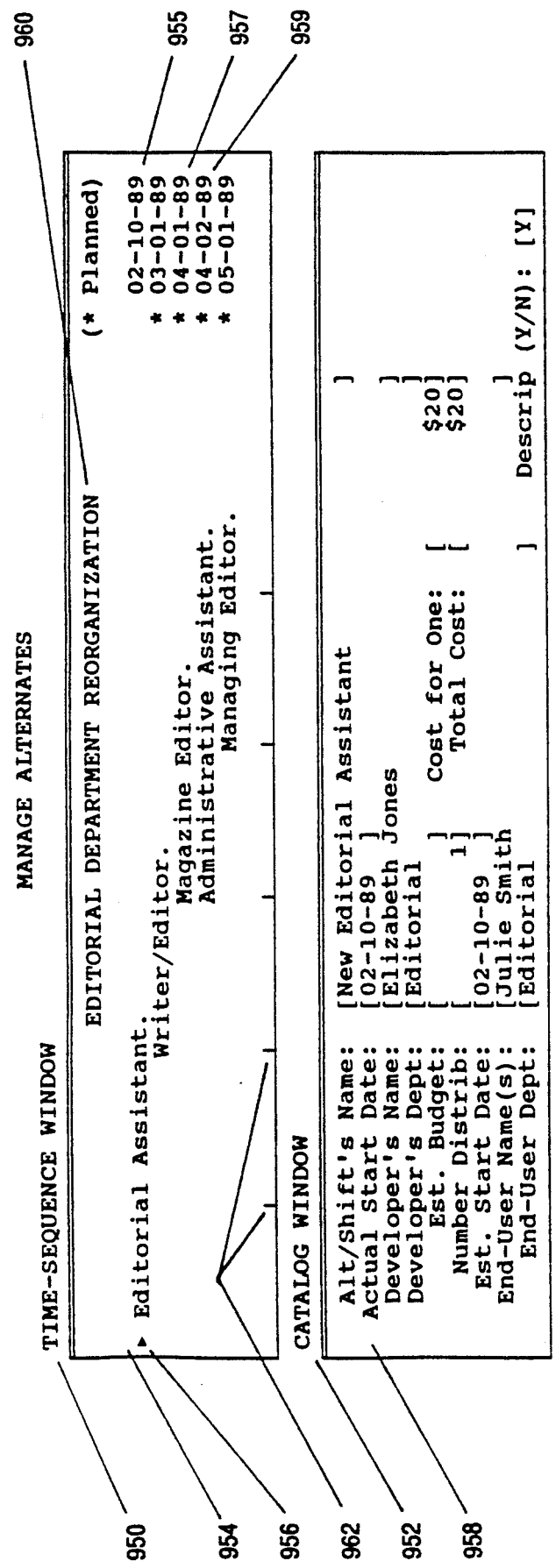

Turning to FIGS. 70 and 124, the top window 950 2710 shows the Time-Sequence Model for the Editorial Department's Alternates 954. The bottom window 952, 2712 provides the Catalog information 958 about each Alternate 956, so the user has the relevant details immediately available.

The actual process of Situation Shifting involves implementing sequence(s) of appropriate Alternates over time 955. The same editing tools for sequencing apply to moving the order of the Alternates, as described above in Time Sequence Modelling. In brief, (FIGS. 107–111) and 7002–7019 in FIG. 126) the process of Time-Sequencing Alternates parallels Time-Sequencing of Contexts (see above).

By moving the Alternates in the Time-Sequence, their projected implementation can be moved forward or backward to evolve a situation 960 toward the Preferred Situation, or to modify a Situation Shift 960 in the middle of its evolution. The resulting Time-Sequence 954 shows the top-down picture of the Alternates included in that Situation Shift 960, so any gaps or conflicts may be identified and corrected.

This method is flexible. In a different company, for example, a corporate planner might build and save a complete Alternate covering a Situation Shift for one department of a business unit. The planner might then call it up for each type of job in the department, extract three Alternates for each job, and sequence the three Alternates by the initial, transition, and final new skills and relationships needed in each job. Then, each job's three Alternates would be compiled and saved into a separate directory on the computer's hard disk. These directories can rapidly be copied to floppy disks and distributed to be run on the computers used by the employees who work in each job.

A new Time-Sequence Model 954 may be created for each Situation Shift 960. When Time-Sequencing Alternates is selected from the Managing Alternates menu (898 in FIG. 68), either a new Situation Shift is started or an existing Situation Shift is selected from a list of ongoing Shifts. If this is a new Situation Shift, a "Concepts/Notes" window may be opened for it and the developer's ideas can be attached (if desired). When the new Time-Sequence window opens, the relevant Alternates are listed in it, displayed by their start dates. Other Alternates or even entire Situation Shifts may be added or linked to this Situation Shift. This window's time spacing 962 is by month and all the Alternates that start in any one month are listed together under that month in the order of their start dates 957 (so the user can rearrange their order by moving their start dates forward or backward by a few days 959). Using the same editing as in Time Sequencing, the user can quickly re-order the appropriate Alternates 954 to create each Situation Shift 960, 7018, 7019 (FIG. 126).

The essential process of Managing Alternates is a scaffold of larger and larger structures that parallel each other; at the lowest level, an Alternate is built with Contexts from many Context Bases (see above); at the next level, a Situation Shift is built with multiple Alternates (see above); now, the top-down senior management perspective is constructed by Outline Modeling and Time Sequencing multiple Situation Shifts to plan and implement Preferred Situations. If the entire structure is built on one computer system, the designer(s) can move from the largest perspective down to individual alternates by pressing the <Plus> key and revealing greater levels of detail and vice-versa with the <Minus> key 9018, 9019 (FIG. 138).

Figure 71B:
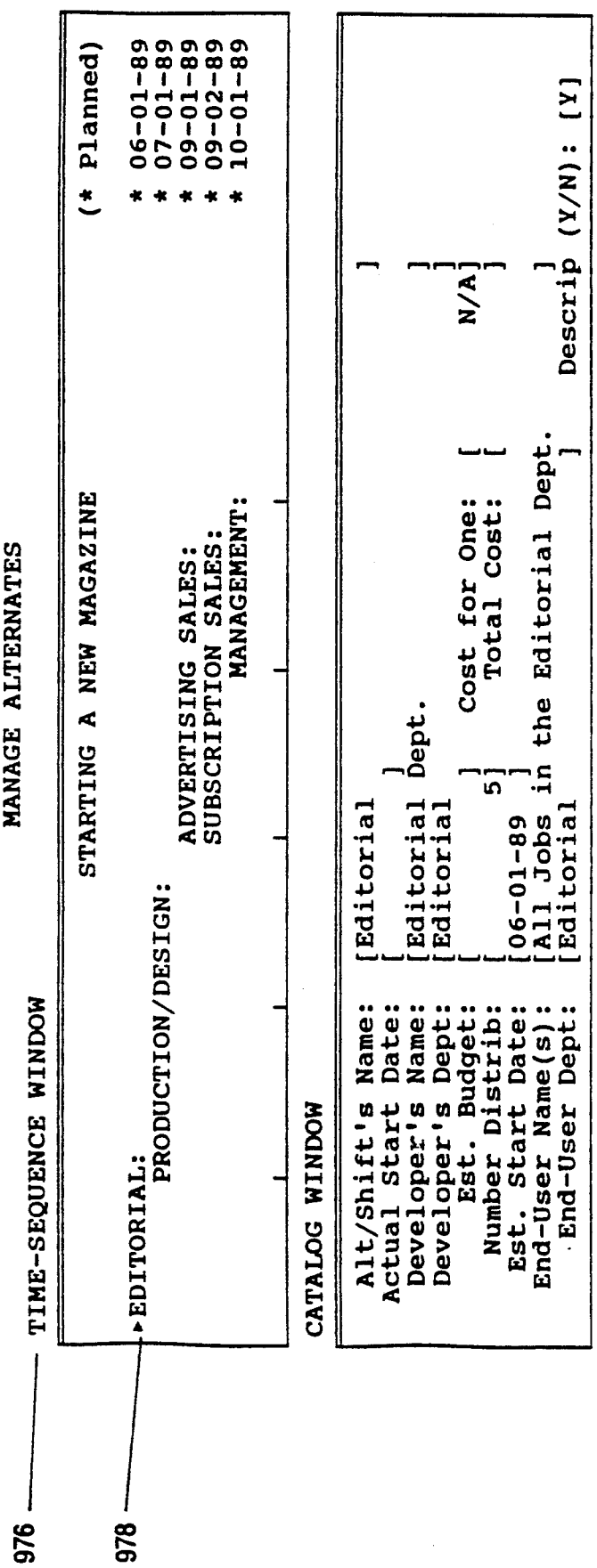

Turning to FIG. 71, the user constructs an implementation plan on the level of the company's entire Situation Shift 970 (7002–7019 in FIG. 126). This includes interactive access to the Situation Shifts 972, 978 in the related Departments of the publishing company. Together, their Preferred Situation is a rapid and ambitious reorganization to launch a new magazine. As a practical program that is Outline Modeled 974 and Time Sequenced 976 in FIG. 71, this is the major goal for this company for this year.

The invention for managing larger Situation Shifts operates the same as creating and running Alternates, but it encompasses larger information environments. The point is that Situation Shifting is just as imagination-driven as creating Alternates. Even though a Situation Shift may be constructed rationally and implemented by professional managers, the process still reflects its users' ideas and imaginations.

Organizational Situation Shifts 970 are constructed by Outline Modeling 974 and Time-Sequencing 976 local Situation Shifts. They are treated as malleable and portable Contextual environments (i.e., imaginative Preferred Situations) that may be designed on the computer by means of the invention, and implemented both in parallel and in sequence.

The Model of Situation Shifts 974 mirrors the structure that the user(s) decide should be given to the organizational Situation Shift 970. As their activities evolve, as they learn more, and as their goals change, the users may modify their Models appropriately.

This same imaginative openness exists when users are Time-Sequencing local Situation Shifts 960 into organizational Situation Shifts 976, 978. Like the Outline Models, the Time-Sequenced Situation Shifts may be modified at any time to match rapidly changing situations. By definition, Alternates that will be implemented in the future are being created for Preferred Situations that do not yet exist, so they may be expected to be modified during future stages of Situation Shifting.

The tools for Managing Alternates may be applied to small as well as large Situation Shifts. On the smaller end of the spectrum, a user might simply want to redefine jobs in a department that has a few employees, to increase the quality of their work and the speed of learning of new responsibilities. On the larger end of the spectrum, the centralized management of a multinational corporation might be struggling to keep up with rapidly changing business units, technologies, global competitors, and regional markets by attempting to shift dozens of situations toward their Preferred Situations. One or more of these varied management challenges might be helped by this new type of computing.

For example, a Time-Sequenced Situation Shift may contain a new Contextual environment that goes considerably beyond this publisher's reorganizing jobs and launching a new publication. Consider a Situation Shift to introduce new technologies into a factory: converting from an assembly line to computer-controlled flexible manufacturing. In this type of Situation Shift, three sequencing principles might be used: First, some new skills will need to be mastered before others are started. Second, as changing machinery alters the ways people see their jobs and their departments, the user might want to schedule the individual Situation Shifts in a particular order (such as putting the smaller and easier ones before the larger and more difficult ones, or putting consensus-building first followed by the highest priority goals). Third, when individuals or work groups must rely on new or unproven technologies, it may be preferable to complete the known conversions first, in ways that build relationships and mutual support for the riskier leaps.

Another user may plan a Situation Shift from an assembly line to flexible manufacturing but consider simplicity critical, so that all employees and managers may understand the implementation plan. This planner may believe that too many new types of Contexts at each step may confuse or frustrate people, because too many smaller steps could obscure or confuse the larger goals. To provide simplicity, the user may restrict the published structure of the Situation Shift to one view. The only published view might be the Time-Sequence for implementation, but the Outline Model each person follows in his job (on his computer) would be unique to provide rapid access to the Contexts he needs as an individual.

Figure 72:
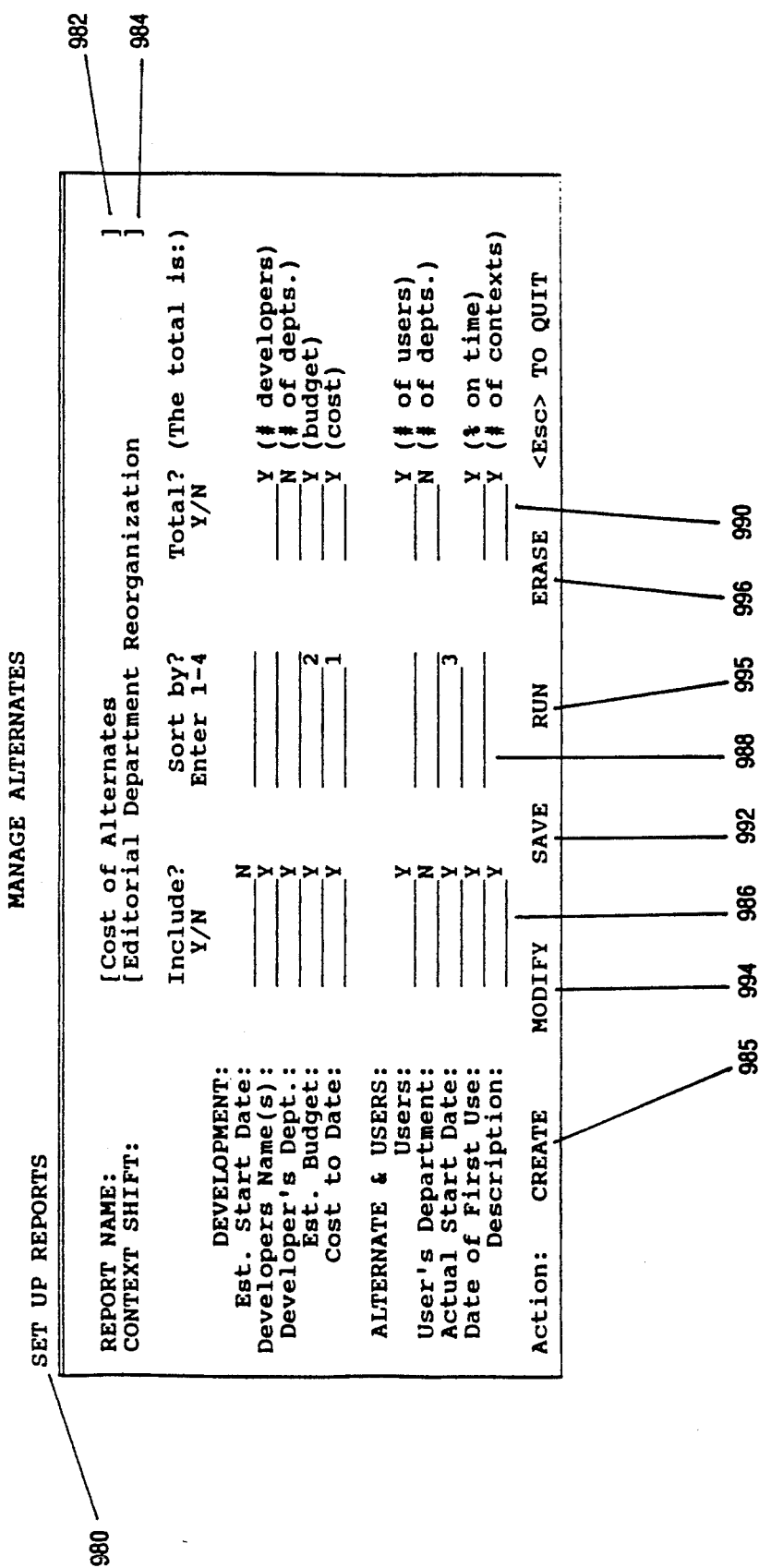

The third tool for Managing Alternates is a flexible reporting system 980, as shown in FIG. 72. This permits a wide range of reports to be designed 985, run 995, and saved 992 for rapid re-use. Some potential reports include:

(1) Who created the Alternates, listed by developer; for each developer, list the Alternates by the end-user department; within each department list the Alternates by their start date.

(2) Who created the Alternates, listed by the developers' departments; for each department, list the cost of each Alternate and the total cost of all the Alternates it developed.

(3) How closely does the actual cost of finished Alternates match their projected budget; run this separately for the three mos expensive Situation Shifts.

(4) What Alternates have been developed for the XYZ Business Unit (or department), listed by start date, including both budgeted and actual cost of each Alternate?

These and other reports are created using the screen shown in FIG. 72. The user simply enters the Report Name 982 and the Situation Shift 984 (or an individual Alternate's) name to specify which Alternates are included in the report. The <Down> and <Up> cursor keys are used to move within columns 986, 988, 990 and the <Left> and <Right> cursor keys move between the columns 986, 988, 990. The left column 986 shows the available information and anything wanted in the report can be included by entering a "Y." The middle column 988 is used to organize (sort) the information listed in the report. This is done by numbering up to four items in this column, with the most important item numbered "1." The right column 990 is used to indicate the totals that are wanted at the end of the report (subtotals are generated automatically); the units of measure are next to each total to the right of that column 990. The output is chosen when the report is run. The output can be sent to the screen or the printer, or saved to a file for use in word processing.

This reporting system allows each user to create 985 as many custom reports as needed, and to save 992 the reports that provide the management information wanted in each situation and by each company. When reports are saved 992 they can be run 995 repeatedly without re-entering their parameters. When saved, a notes window may be opened to add a description of the report. Any report can also be called up and modified 994, or erased 996. When a saved 992 report is useful for multiple Situation Shifts or Alternates, it can be run 995 for any of them simply by changing the name 984 at the top of the Report Screen (or a separate report can be saved 992 for each of them, with its name 982 already specified).

The reporting screen 980 is also a rapid interactive tool that answers detailed questions quickly. The user simply skims the list of saved reports 995, picks the one closest to the current question, and calls it up on the report screen. The cursor keys are used to modify the report 986, 988, 990 to produce the exact information needed 986 and the order of presentation 988; the questions are answered right away on the screen or on paper. If that report is useful, it can be permanently saved 992 and re-run 995 immediately (from the list of saved reports) any time those questions need to be answered.

Figure 73:
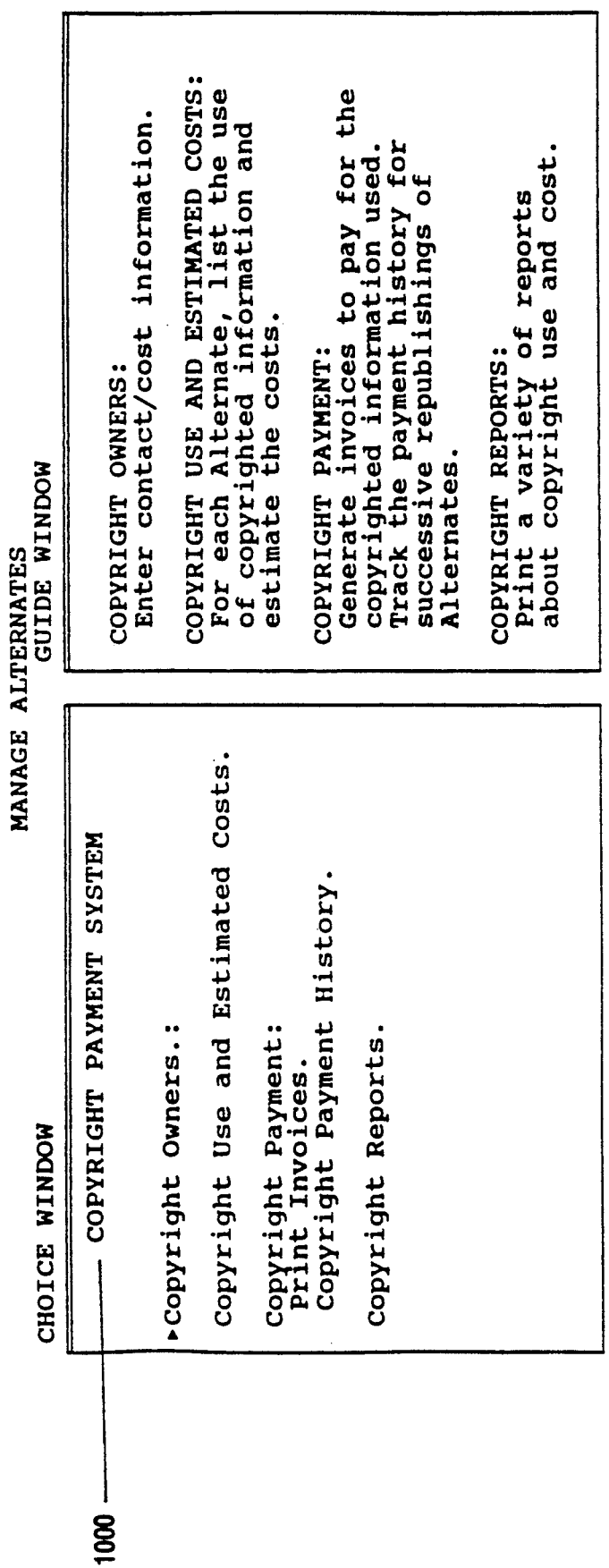

The final function in Managing Alternates is the Copyright Payment System, and the menu for this is in FIG. 73. This was developed so that users may take advantage of many valuable Copyrighted Materials to create alternates and Context Bases, and by protecting intellectual property rights, stimulate publishers to make more Context Bases available for potential Contextualizer applications.

This Copyright Payment System 1000 (1) links users of the Contextualizer with information vendors so the re-publishing of copyrighted information may result in fair payments, and (2) permits the present invention to provide a revenue source to publishers. In brief, this system helps the Contextualizer's users make rapid and simplified payment to the multiple vendors whose property they might re-publish in Contextual formats and distribute as Alternates.

Modern societies produce vast amounts of new "how to" and Contextual information every year. In addition, enormous stores of previously produced information are readily available. The vast majority of this information is copyrighted or proprietary to an individual or an organization, which means it is the property of others and payment must be made to re-publish all or parts of any specific work.

The present invention may serve as a technology for rapidly accessing, extracting, reorganizing, and distributing large amounts of useful information, both within organizations and for re-sale. The responsibility to pay for copyrighted information accompanies this extraction and distribution of information from copyrighted and or proprietary sources.

Creating a Copyright Payment System is a practical decision since it supports attempts to persuade some publishers to permit appropriate publications to be turned into Context Bases that can be used in the Contextualizer. If publishers believe a re-publishing market may develop for their properties, they can evaluate the costs and benefits of developing Context Base information products to stimulate this market and establish a leadership position in this new technology.

If the Contextualizer's users become re-publishers who use copyrighted materials and pay for them, revenue sources may emerge and it might become profitable to develop additional Context Bases as products for the specific market niches in which these users are active. For example, some potential Context Bases are "how to" information that may be immediately used to improve job and business performance, profitable commerce, and daily life. This may lead to the emergence of successful new information products (Alternates) based on these Context Bases. A related business could be the emergence of on-line Context Bases, whose information sources are database publishers. In about a decade, Lockheed (a company from outside the traditional publishing industry) developed the Dialog Information Service with access from many parts of the globe. On line information vendors, some database publishers, and others are currently helping develop the CD-ROM market (whose growth rate currently exceeds 100% per year).

Two of the uses of copyrighted information in the present invention are first, for creating Alternates; the use second is for re-publishing and distributing Alternates that contain copyrighted information owned by others. Each of these involves a different form of payment.

The first use is for creating Alternates. This use parallels a business office that buys a reference book, puts it on a shelf, and all the employees use it when needed. Any use of the materials in a reference book is permitted without additional charges, except: (1) making copies of substantial portions of it and distributing them, or (2) re-selling all or part of the book (in the latter two cases, re-publishing all or part of the property). Therefore, the Contextualizer is designed so that users can buy and then access copyrighted Context Bases and use the information to develop Alternates without needing to consider additional payments to copyright owners—equivalent to accessing a reference book from a shelf. Alternates must be compiled to be distributed as stand-alone programs, however, which is re-publishing. The invention then calculates the copyright fees and prepares both summary information and invoices that simplify payment 9320–9350 (FIG. 140). While the invention does not police the purchaser for the vendor, the Copyright Payment System permits honest customers to pay for copyrighted materials that belong to others, and it encourages the rest to be honest by its presence and its functions.

Figure 74B:
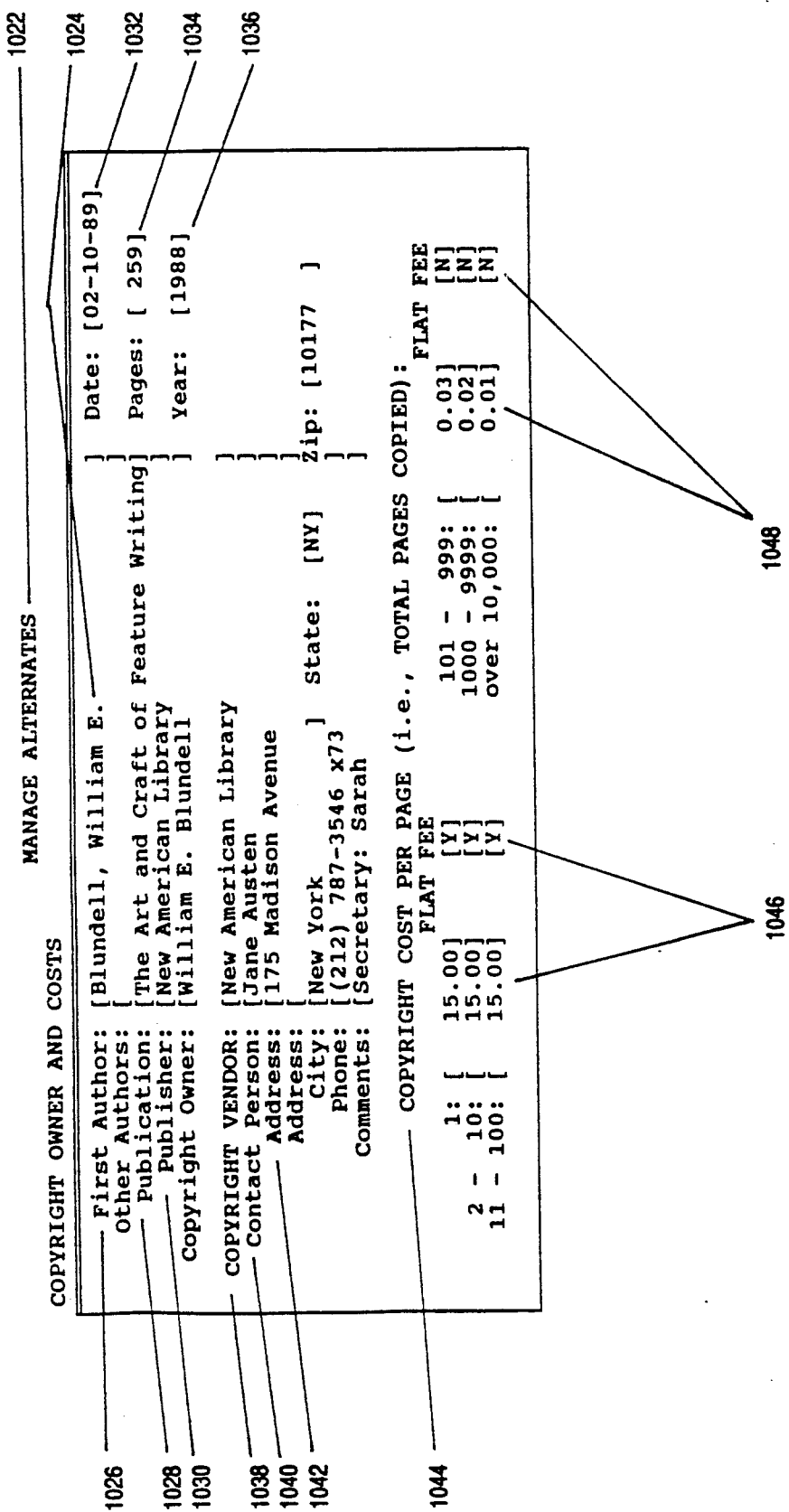

Turning now to the top screen 1010 in FIG. 74 and to FIG. 140, after the Copyright Payment System is selected the user chooses a Context Base 1014, 1016, 1018. Selecting the option for the copyright vendor produces an alphabetized list 1012 from which the user may look up the information about copyrighted Context Bases that have been used in creating an Alternate.

The top screen 1010 of FIG. 74 lists these sources by author 1014, by the title of the Context Base 1016, and by the owner/vendor of the copyright 1018. In the prototype, the cursor is a reverse highlight bar similar to that used in the invention (indicated by an arrow in the left column of the window) 1020. An item is selected by putting the cursor on it 1020 and pressing <Enter>.

The bottom screen 1022 in FIG. 74 shows the detailed copyright information 1024 from one information source and its costs. In detail, it shows the work's author 1026, title 1028, and publisher 1030. It also shows the most recent date 1032 on which the Alternate extracted material from this Context Base, the number of pages 1034 in the source that was copyrighted, and the year 1036 it was copyrighted. The middle section shows the copyright vendor 1038 and the contact person 1040 and contact information 1042. Since many publishers have several lines of books or magazine titles, and the publishing industry is increasingly concentrated, some subsidiary rights offices manage the rights for many valuable information sources.

Since the copyright vendor information and costs are not (at this point in time) built into most Context Bases for re-publishing, they must be entered manually 9310–9312 (FIG. 140).

The copyright fees are entered at the bottom 1044 of the second screen, based on contacting that copyright vendor. The main choice is whether or not there is a flat fee for the copyright cost. As can be seen in the left column 1046 in this fictional example, until a developer uses more than 100 pages, there is a one time fee of $15.00. Above 100 pages 1048, the fee goes to 3-cents per page; over 1,000 pages it goes to 2-cents per page; and over 10,000 pages used it falls to 1-cent per page.

Figure 75:
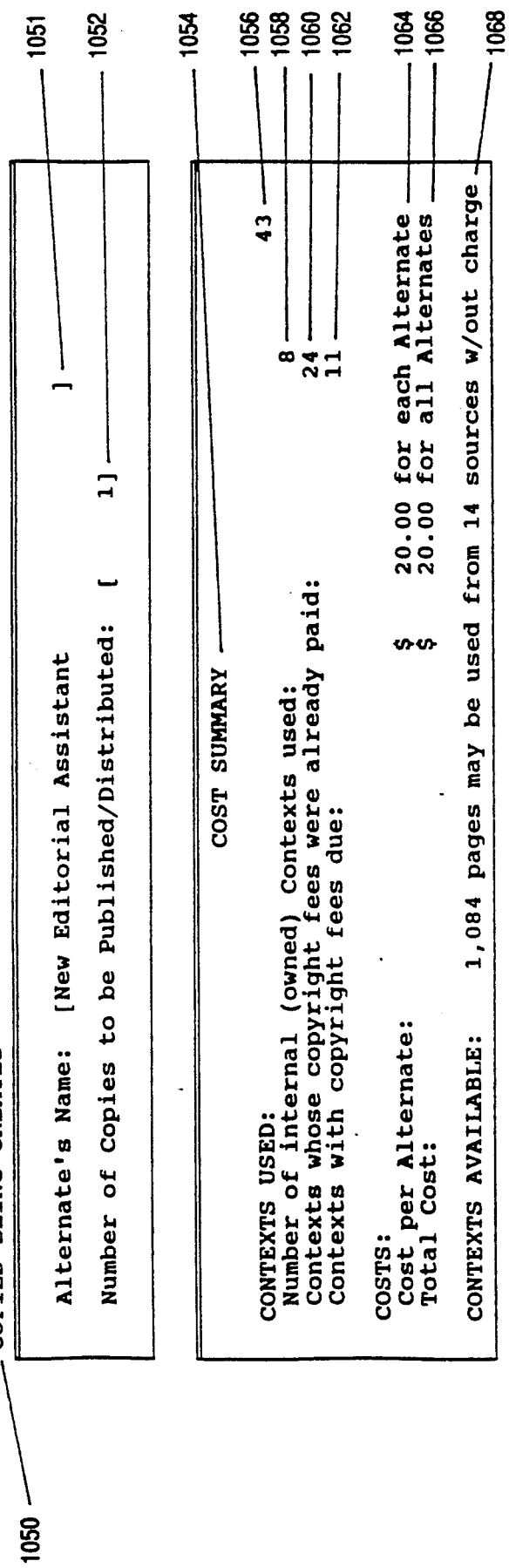

Turning now to FIG. 75, the user enters in the top window 1050 the name of the alternate 1051, 9320 and the number of copies of the Alternate 1052, 9330 that are being published and distributed. This shows that for the New Editorial Assistant only one copy will be distributed and used at any one time.

The information input by the user 1051, 9320, 1052, 9330 is used to compile a list of sources with total number of pages used 9321 and calculates the cost summary 9331 that is in the bottom window 1054 of the screen 9320–9332 (FIG. 140). It shows that 43 Contexts 1056 were used to create this Alternate. Eight were internal 1058 to the corporation and already owned. Copyright fees were already paid for 24 Contexts 1060 used in the Alternate. There are 11 Contexts with copyright fees due.

The cost, based on the copyright costs entered into the detailed copyright information on each Context Base external to FIG. 74, is a total of $20.00 1064 for each Alternate. Since there is only one Alternate being distributed, the cost for all the Alternates is also $20.00 1066.

The last line at the bottom 1068 shows that there are 14 sources for which copyright fees have already been paid. In these sources, 1,084 pages remain to be used without any additional charge. This is because flat fees may permit use of more information than is accessed to create and distribute one or more Alternates.

These three systems (the Outline Model of Alternates, Time-Sequenced Model Alternates, and Management Reporting), together with the Copyright Payment System, yield a flexible approach to managing imagination-driven change, achieving many benefits.

Centralized senior management can design, control, track, and modify individual or simultaneous Situation Shifts throughout an organization. When a variety of different Alternates are implemented at one time, a spectrum of different imagination-driven goals might be targeted: the transfer of technology between certain business units, quality improvements from current employees, increased output from various departments, additional responsiveness to customers in a business unit, etc.

Local decentralized executives can create and manage Situation Shifts that produce single or multiple changes in their area of an organization, including their internal operations, their ability to adapt to new local or market conditions, and improving their external relationships with a parent company, suppliers, or customers.

A large component of the costs are tracked and reported through the Copyright system.

The combined Outline Models, Time-Sequencing Situation Shifts, and Reporting system may be used to manage the overall, top-down pattern of Situation Shifts throughout an organization, including one of the most difficult challenges facing modern multi-industry global organizations: using multiple Situation Shifts to improve the management of simultaneous multinational projects and businesses that include multiple alliances with corporations, vendors, and major customers around the world.

Create Context Bases

Figure 76:
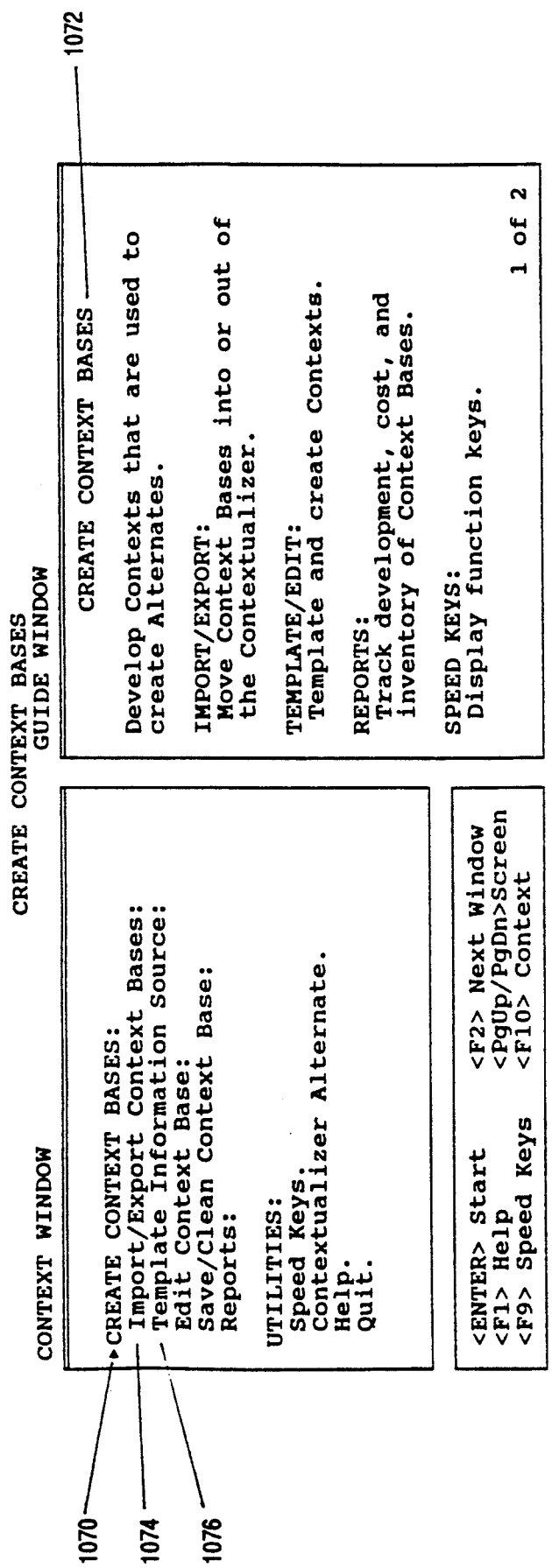

FIG. 76 shows the main menu 1070 of Creating Context Bases, and the Guide 1072 that explains the main choices in that area.

Creating Context Bases has two primary functions. The first is importing 1074 and templating 1076 information into Contexts that can be used to create Alternates. The second is a sub-set of the first, doing on the fly extracts from an information source to import one to a few Contexts. Because speed of creating useful Contexts is a primary goal, part of the templating process has been automated.

This portion of the invention creates Context Bases, which are sets of Contexts that can be Collected and Positioned to create Alternates. These products could be bought by users of Contextualizer software and by developers who are creating Alternates for re-sale. A "Context Base Editor" (a fictional title for a new kind of job at a publisher or an independent Context Base product developer) might transform selected publications into Context Bases for these purchasers. A corporate user of the Contextualizer might also use this to transform selected corporate manuals, reports, and other types of data into Context Bases that may be Collected and Positioned to create Alternates.

The range of digital information sources that can be turned into Context Bases is already large and growing in a variety of media, including sizable on-line and optical disc (CD-ROM) sources. In many corporations, computerized information resources are enormous and growing rapidly. The publishing and database industries are thriving and produce most of their new publications via word processing and/or computerized typesetting, so they are also in digital form. Any of these sources might re-package portions of their information as Context Bases and put them on the market as products, or sell the right to do this to others (the same way publishers of hardcover books sell certain rights to paperback publishers, movie makers, audio cassette publishers, etc.).

Figure 77:
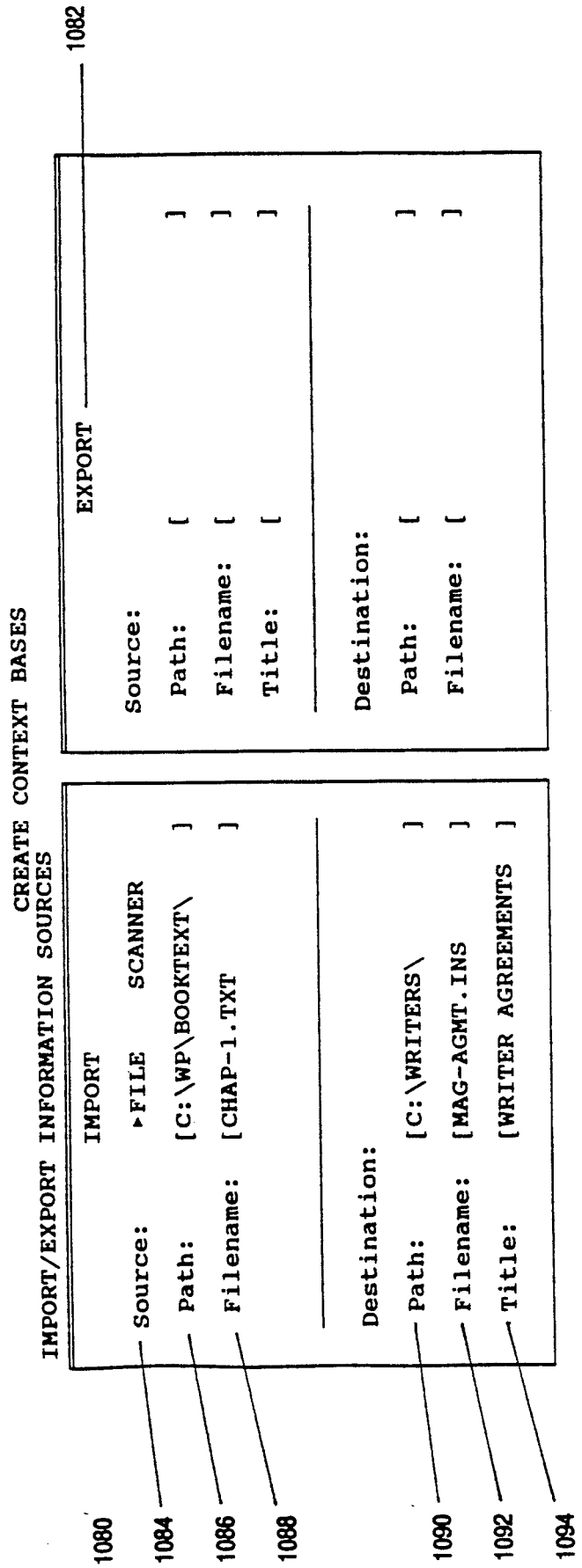
Figure 135:
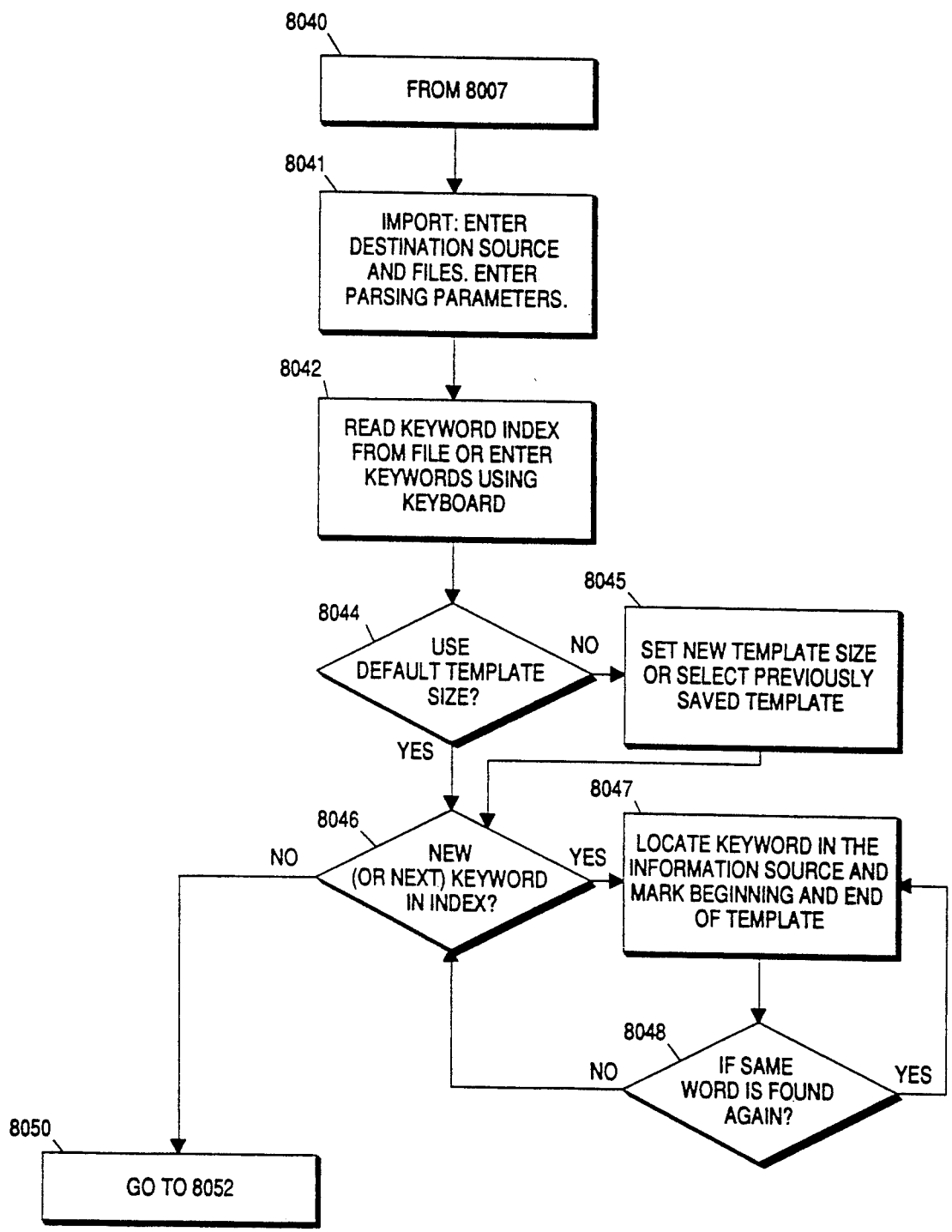

Turning to FIG. 77, it shows the two-window 1080, 1082 system used for both importing and exporting these sources of Contexts from the Contextualizer. FIG. 135 describes the importing function 8041. This FIG. 77 is filled in for importing an information source that will be a helpful Context Base for creating Alternates in the Editorial Department of a magazine publisher. It shows that a text file for the first chapter of a book was acquired or scanned from the book, How to Understand and Negotiate a Book Contract or Magazine Agreement, by Richard Balkin (Cincinnati, Ohio: Writer's Digest Books, 1985).

As shown in FIG. 77, the source of the information is a file 1084 that is located in the directory WP BOOKTEXT 1086 and has the filename CHAP-1.TXT 1088. (The reverse highlight does not print but the source of the document is a FILE, which is marked by an arrow.) This file 1088 will be imported into the WRITERS directory 1090 and put into the file "magazine agreement instructions" which is abbreviated into the filename MAG-AGMT.INS 1092. The title of this Context Base is going to be WRITER AGREEMENTS 1094.

Figure 133:
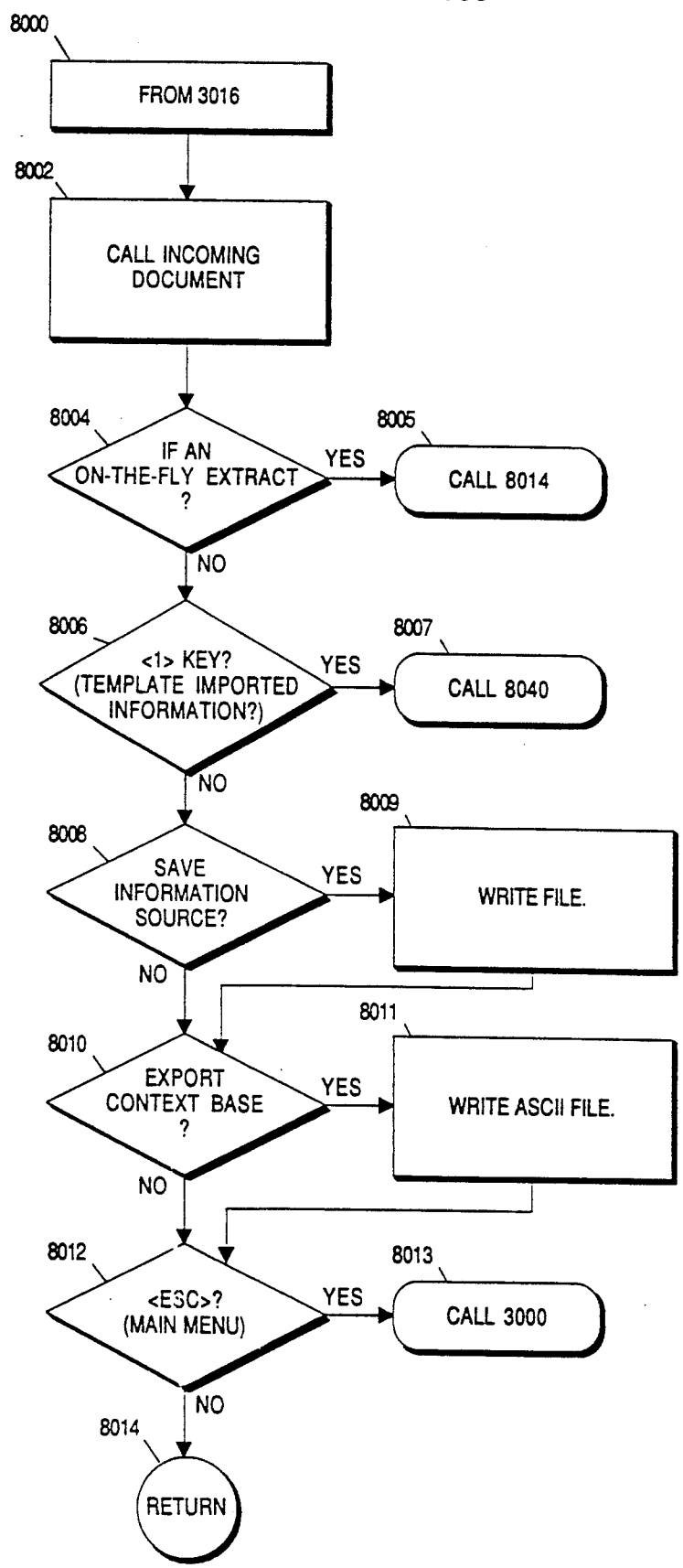

The exporting function 1082 is included so Contexts and Guides can be exported from an information source into an ASCII file. In FIG. 133, the exporting function is shown in flowchart form 8010, 8011. This permits Contexts to be imported into other software (such as word processing), which allows Contexts to be updated and modified to make sure they are accurate and applicable. For example, this is likely to be helpful for updating Contexts that include information on the current needs of key customers, instructions for operating machinery that has been modified, and changing the working relationship with another company department.

A "notes" window (that parallels what may be added to Alternates) may be opened to add a user-written description to the Context Base. This description is attached to the information source and it can be displayed (and modified if desired) while the Context Base is selected by pressing a function key. The description can also be included in printed reports. If this notes window is not used it can be added later; until it is added, its printing and display are disabled.

Figure 78:
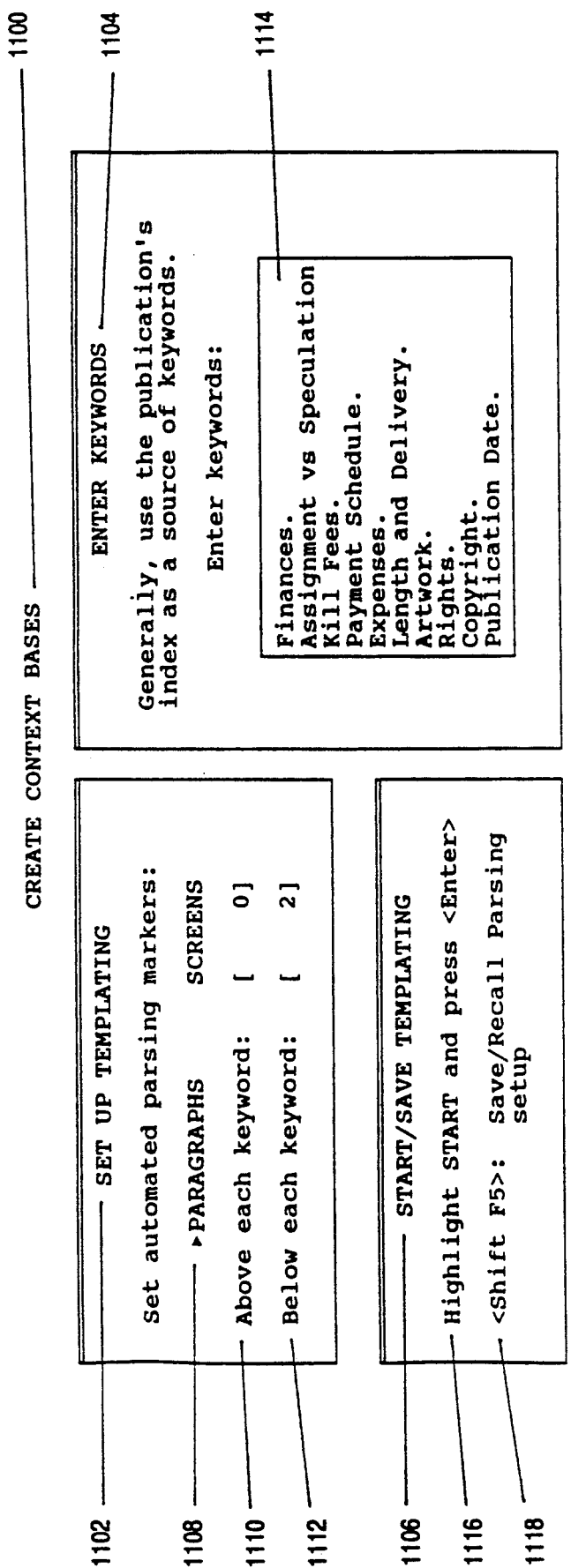

Turning now to FIG. 78, this screen 1100 comes up with the upper left window 1102 active. The user changes windows in the same manner as in the rest of the software, by using the <F2> function key 9010, 9011 (FIG. 137) and moving through the windows 1104, 1106, 1102 in a clock-wise direction.

The invention semi-automates the process of templating the information source into a Context Base. The general procedure is to import a computer-readable document 1080 such as in FIG. 77 (or to scan a document into the computer). Referring to FIGS. 78 and 135 and using this screen 1100, the user sets the template markers 1102, 1108, 1110, 1112 and enters keywords 1104, 1114, 8041, 8042. These set up the automated beginning and ending markers for each Context in the file, which are then adjusted manually by the user.

In the upper left window 1102 of FIG. 78, the reverse highlight does not print but an arrow is used to highlight PARAGRAPHS 1108. Because chapter 1 of this book is organized by brief headings, the templating marker to begin each section will be those headings. Therefore, the "BEGIN" templating marker for each section is zero above each keyword 1110; i.e., when the software finds each keyword, it sets the beginning marker just before that keyword.

Below each keyword 1112 the templating is configured to go down two paragraphs and place the ending marker there; i.e., the number two is entered after "Below each keyword:". If, however, another keyword is encountered, the ending marker for that section will be placed just before the next keyword. As a result, each Context will be automatically templated for a length of two paragraphs or less 8044-8048.

By pressing <F2> 9010, 9011 (FIG. 137), the user switches windows in a clockwise direction and moves to the right window 1104. The keywords are entered here 1114, 8042. They are typed in a list with one keyword per line. Since the headings in the text are exact, capitalized, and end in a period, it is possible to enter the headings exactly as the keywords that the software should locate. This permits very precise location of unique keywords.

After those keywords are filled in 1114, 8042, the user presses <F2> to switch from the right window 1104 to the lower left window 1106. When the user selects the lower left window, the START 1116 of templating is automatically highlighted, which is marked by an arrow. The user may press <Enter> to start the templating, or <Shift-F5> 1118 to produce a list of previously saved templating set-ups (including the keywords for each one saved) 8045 (FIG. 135). This option allows the user to save the current templating set-up and list of keywords. The user could make modifications in a single set-up to template an information source several times, thereby template it for several lengths on sets of keywords, each time extracting the appropriate sections to turn them into Contexts.

Figure 79:
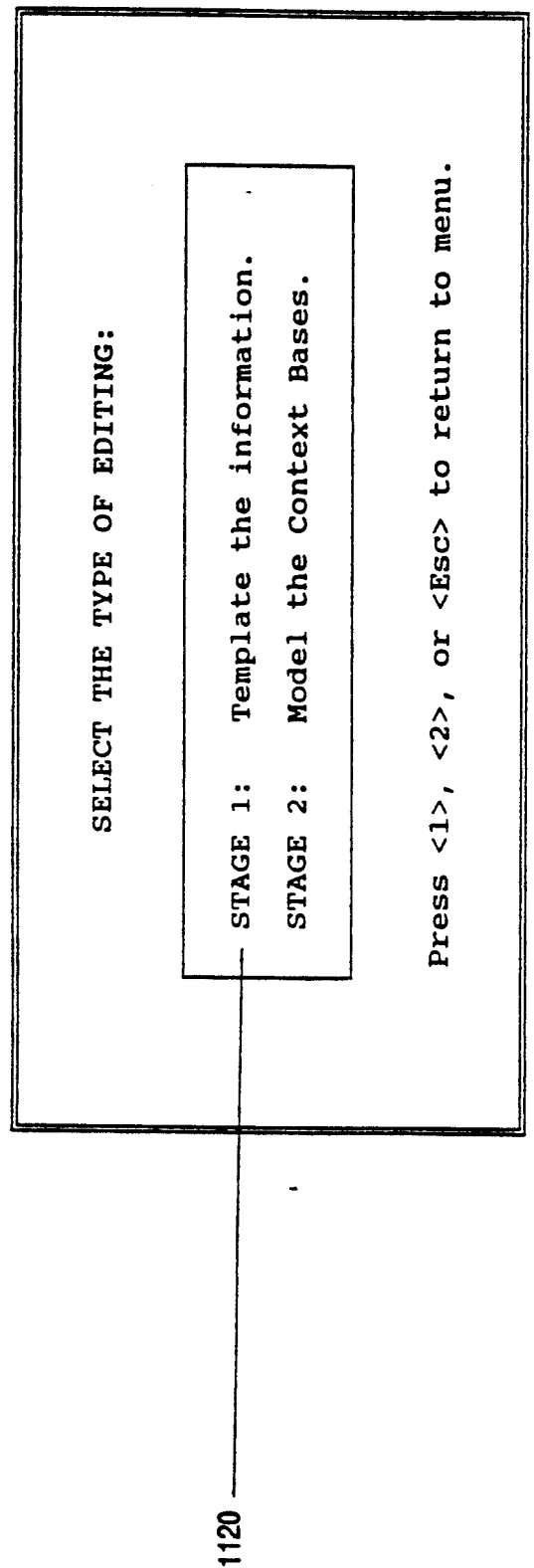

Turning to FIG. 79, the user selects the type of action. The first step 1120 is to "Template the imported text." This adds beginning and ending markers to the text according to the criteria set up in the template screen. According to FIGS. 133 and 135, to select this the user simply presses "1", which templates the information to start creating Contexts 8006, 8007, 8046-8048.

Figure 80A:
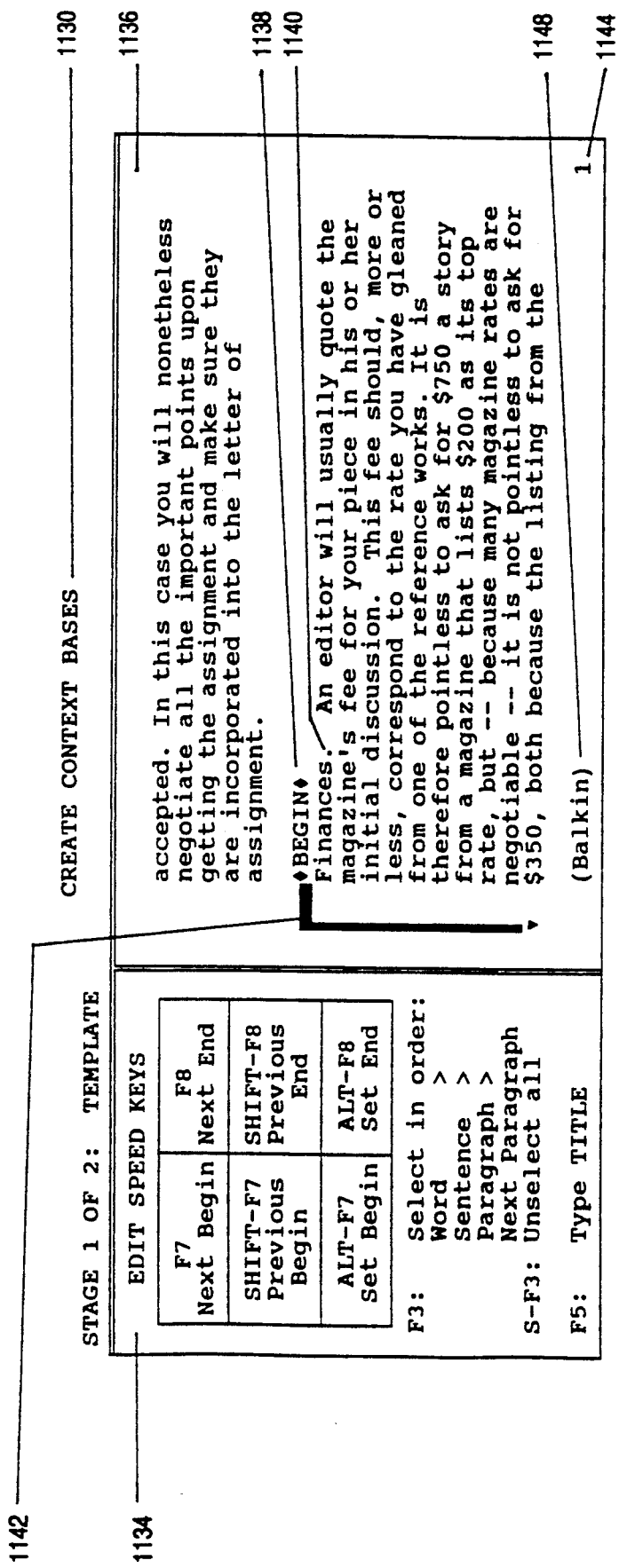
Figure 80B:
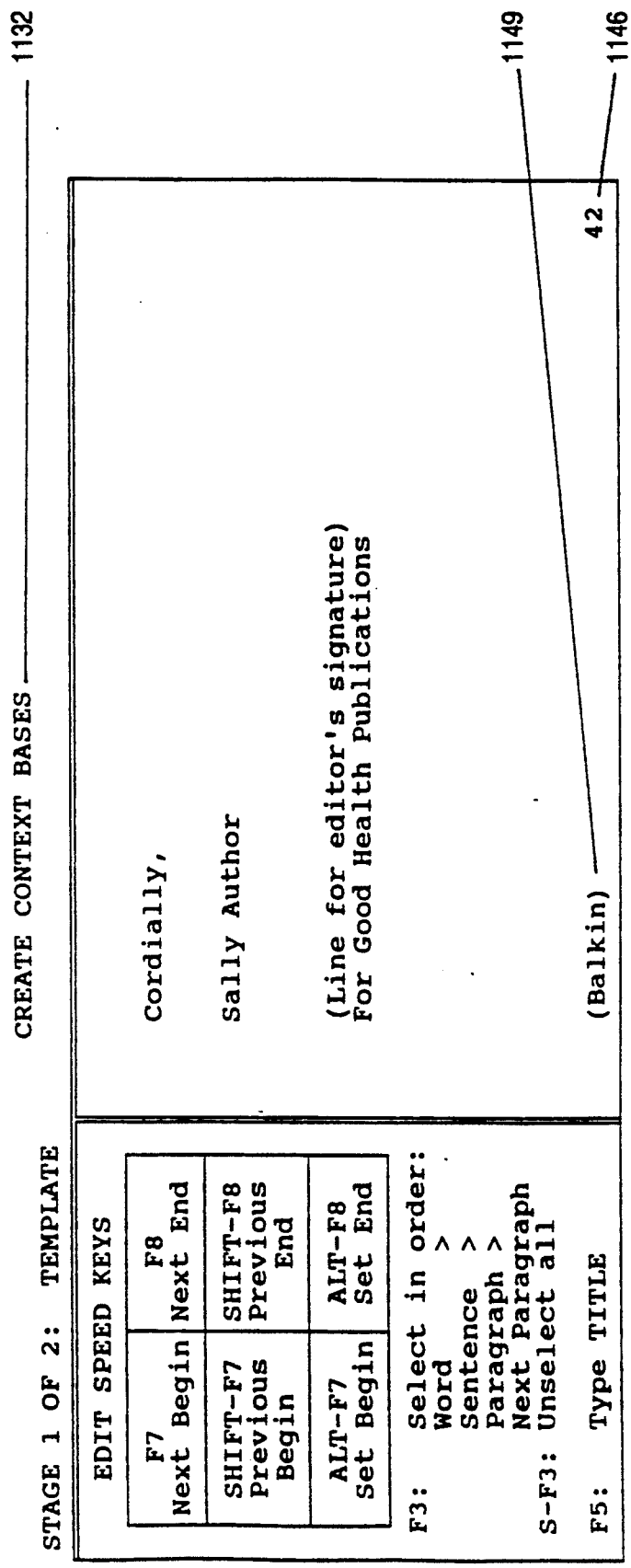

The results of templating the text are indicated beginning with FIG. 80, which shows the first 1130 and the last 1132 screens of this templated chapter.

Figure 132:
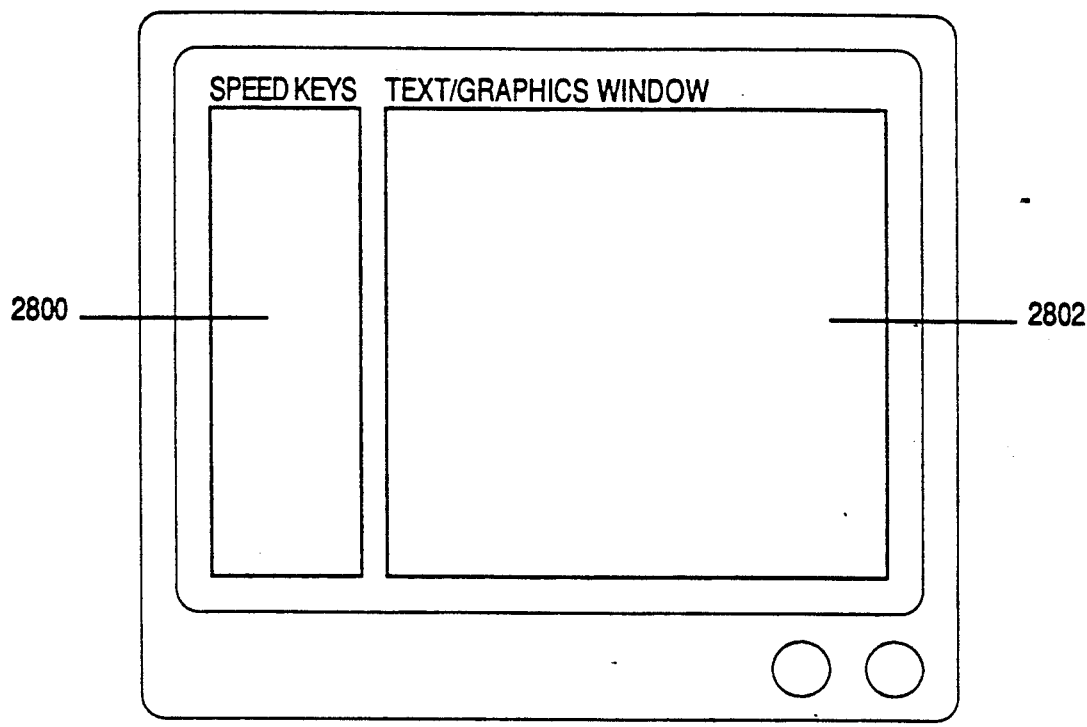

Also referring to FIG. 132, templated text is displayed in a two window system. The left window 1134, 2800 is fixed and does not change. It shows the speed keys used to edit the templated text, or it may serve as a menu to select functions if a mouse is used. The right window 1136, 2802 shows the text that has been templated. The top screen in FIG. 80 shows the "BEGIN" marker 1138 that is set at the first keyword found, which is "Finances" 1140. In the left margin is a reversed bar 1142, both horizontal and vertical, showing the information within the template, i.e., what is included in that Context.

The screen number 1144 is displayed in the lower right corner of the right window. In this case, the top screen 1144 is the first screen and the bottom screen 1146, which is the end of the imported text, is screen 42. In both cases, the first author's name is Balkin and this is displayed on the same line as the screen number at the bottom of the window 1148, 1149 but directly under the text.

The first screen 1136 does not start at the beginning of the imported text. It starts with the first keyword 1140 located, which is "Finances." That is where the "BEGIN" marker 1138 is placed, along with the start of the highlight 1142 in the left margin.

Figure 81A:
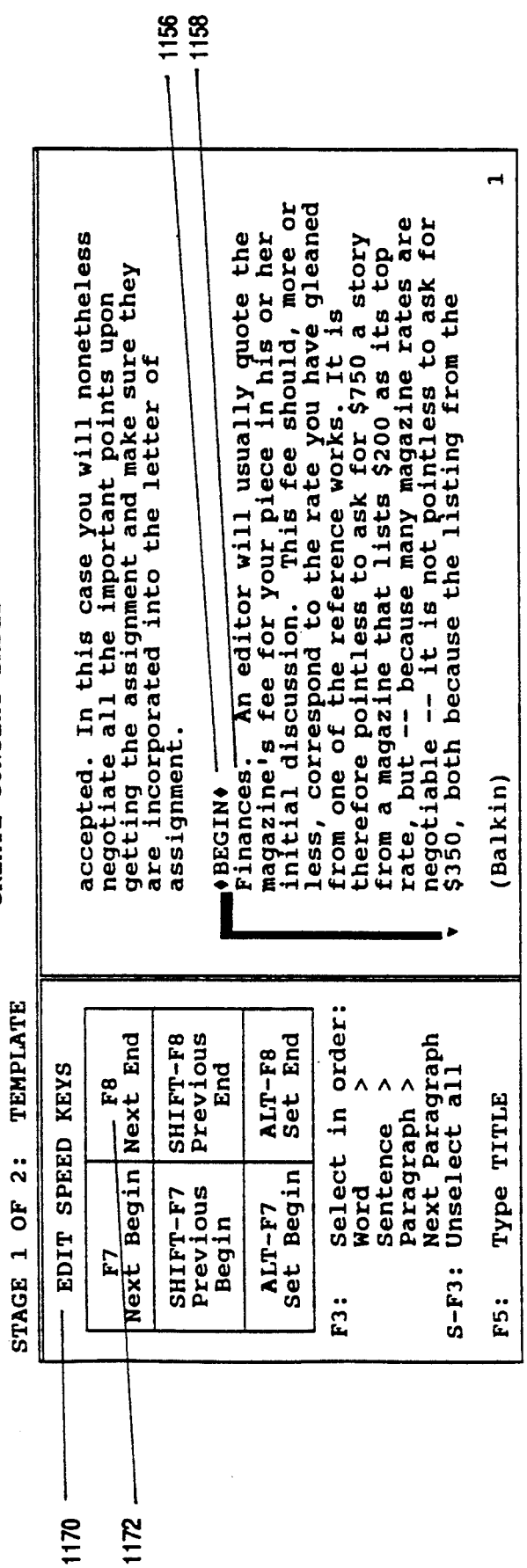
Figure 81B:
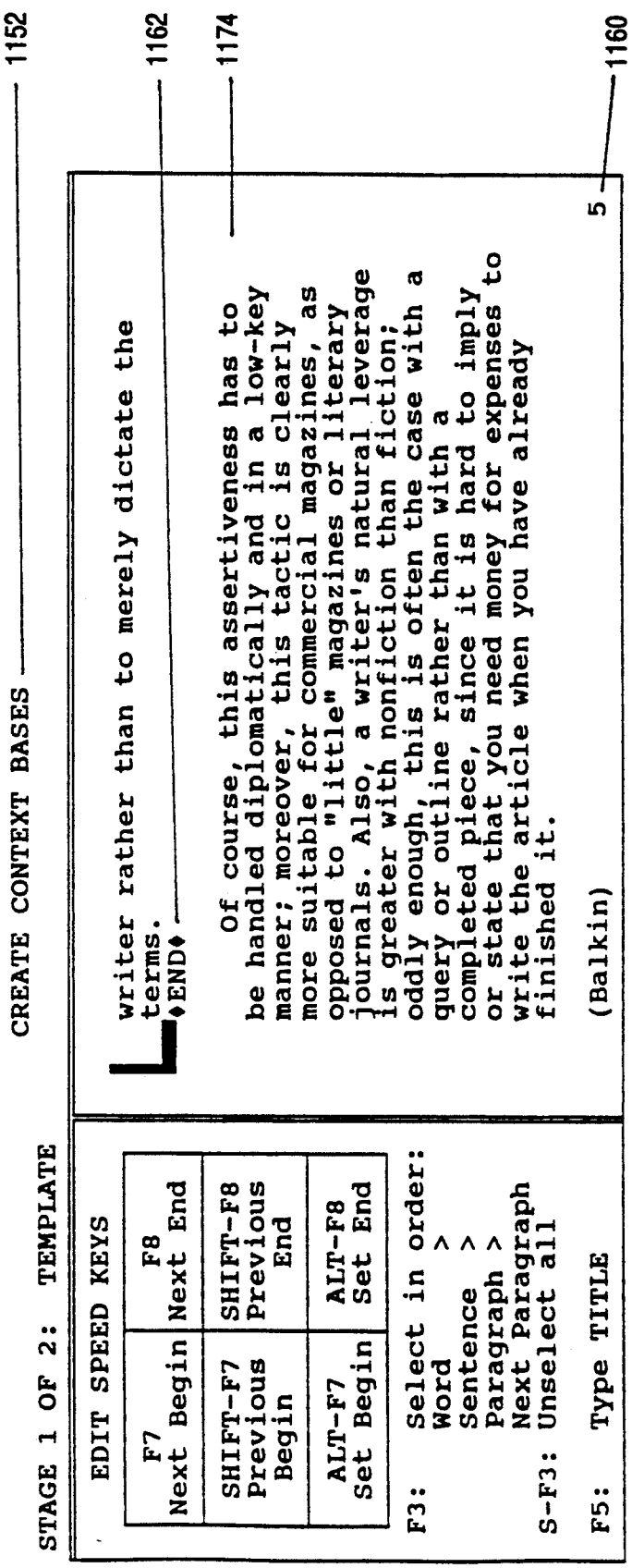
Figure 81C:
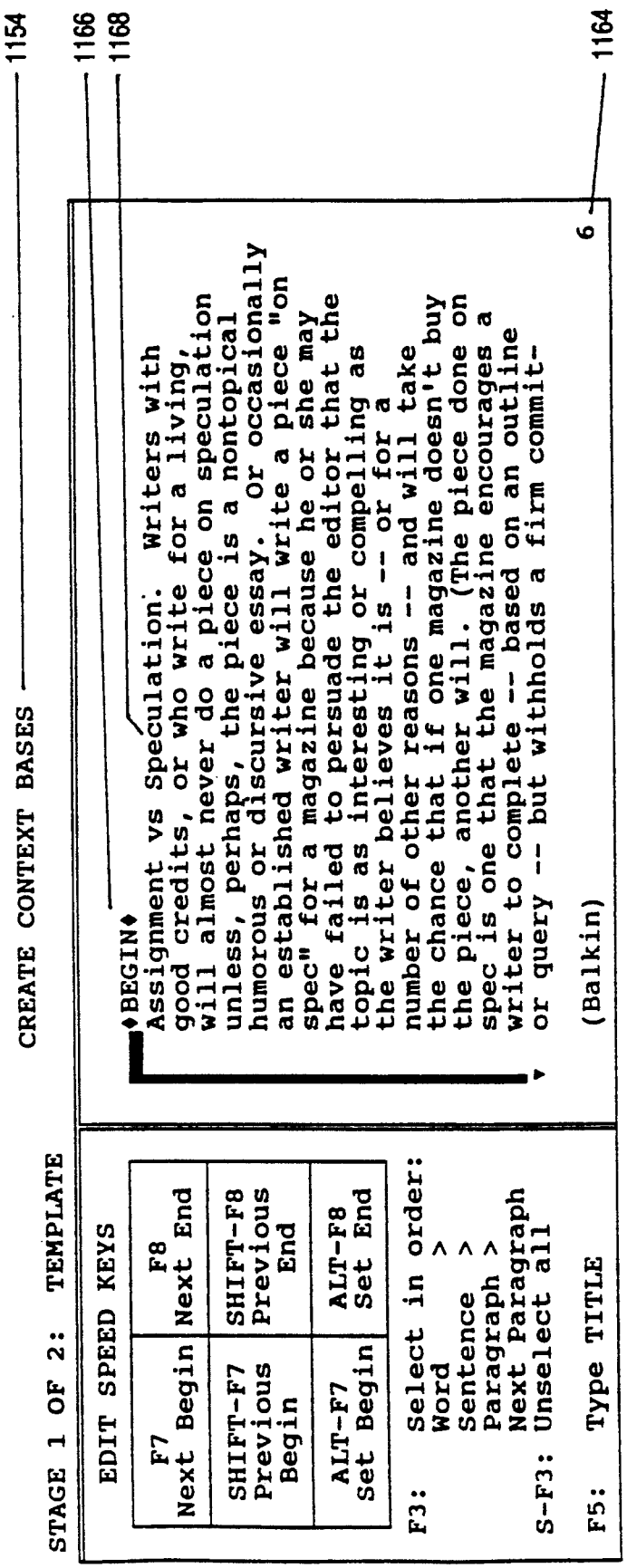
Figure 136:
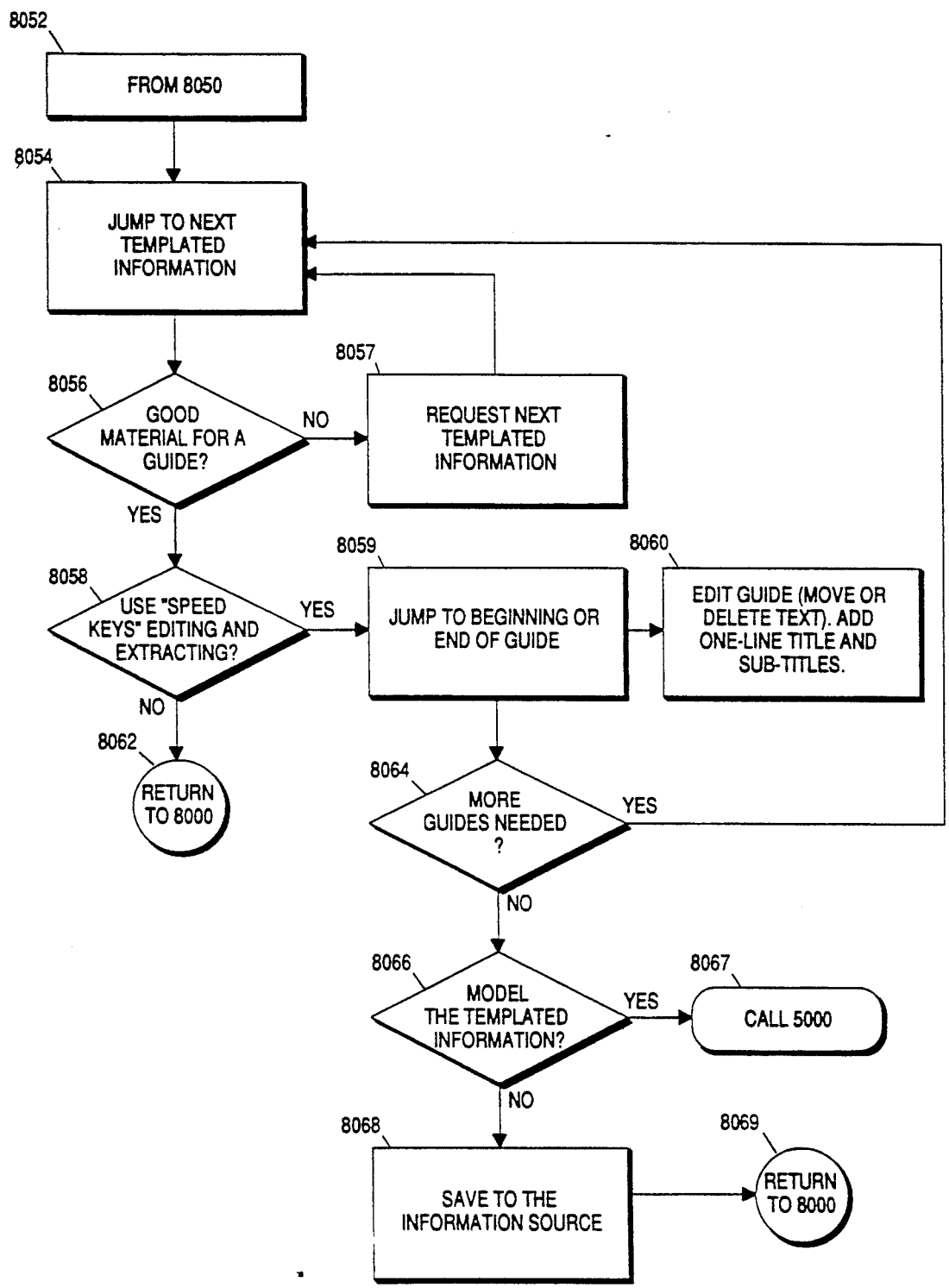

FIG. 136 describes the method for manipulating templated information 8054-8060 and should be referred to in the following discussion of FIGS. 81-84. Turning now to FIG. 81, three computer screens 1150, 1152, 1154 are printed in it. The first screen 1150 shows the "BEGIN" marker 1156 for the "Finances" 1158 template. The second screen 1152 (which is screen 5 1160) shows the "END" marker 1162 for the "Finances" template. The "END" marker is two paragraphs after the keyword "Finances" 1158. The third screen 1154 (which is screen 6 1164) shows the "BEGIN" marker 1166 of the next potential Context; this was located by its keyword "Assignment vs Speculation" 1168.

The user jumps from screen one at the "BEGIN" marker 1156 to the "END" marker 1162 on screen five 1160 by looking at the keys in the left window 1170 and pressing the <F8> Function Key 1172. This jumps to the ending marker of the current templated Context 1162.

By glancing through the text, the user sees that there is a paragraph 1174 between the first "END" marker 1162 and the second "BEGIN" marker 1166. This is located in the middle screen 1152 and it starts with the words, "Of course, this assertiveness . . . "

The user determines that this paragraph 1174 should be included in the first Context rather than in the following one, or rather than being omitted.

Figure 82:
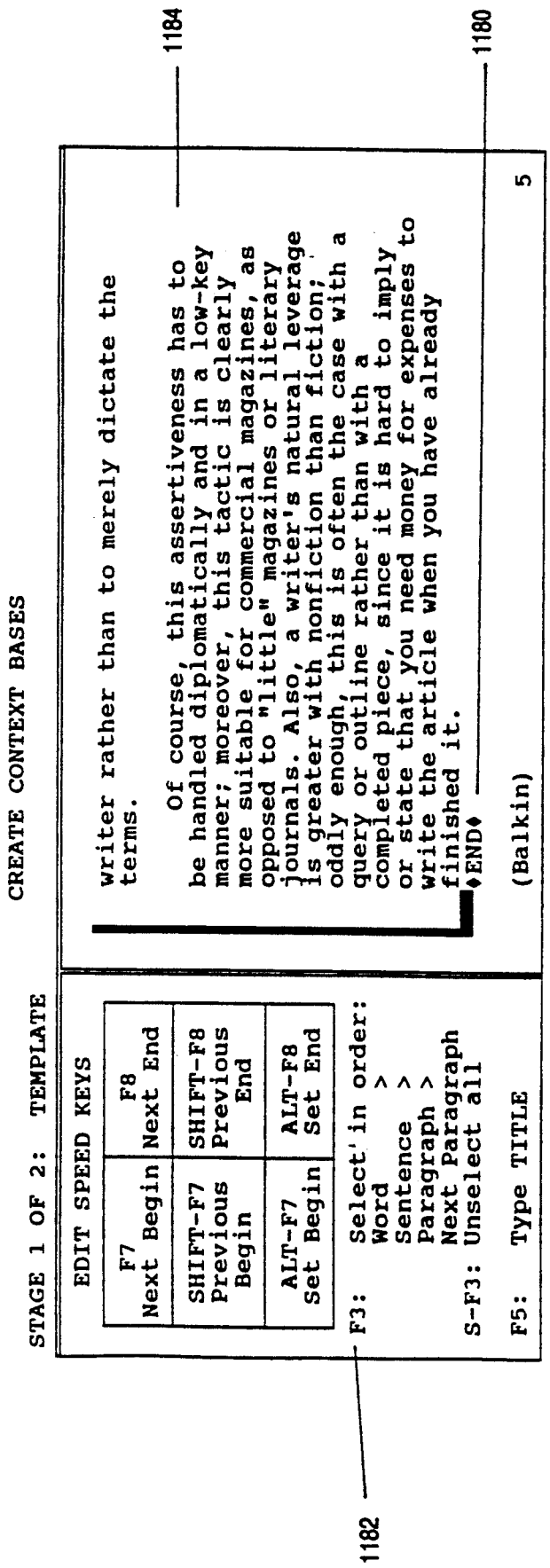

Turning to FIG. 82, the "END" marker 1162 is moved down to the end of the paragraph 1180 by extending the highlight. The <F3> Function Key 1182 is used (as indicated in the left window): The cursor keys are used to put the cursor on the first letter of paragraph 1184 that starts, "Of course . . . " Pressing <F3> 1182 selects the word "Of" and reverse highlights it. Pressing <F3> 1182 again selects that sentence, and pressing it 1182 a third time selects the entire paragraph. By pressing <Enter> this brings the "END" marker 1180 down to the end of the highlighted section.

If the user wanted to move the next "BEGIN" in an upward direction, the user would have started the <F3> highlighting from the last letter of the paragraph and selected upward. Then pressing <Enter> would move the "BEGIN" marker upward.

Figure 83A:
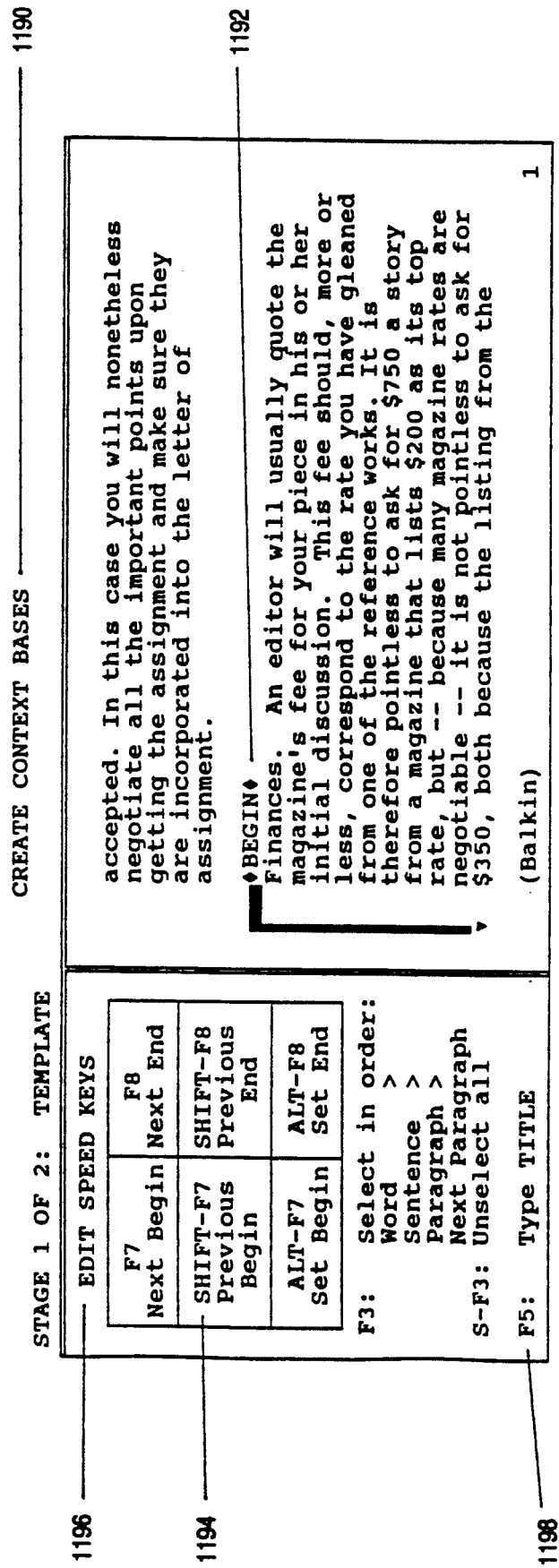

Turning to the top screen 1190 in FIG. 83, the user has jumped back to the "BEGIN" marker 1192 by pressing the <Shift-F7> key 1194, as indicated in the left window 1196. At that point the user presses the <F5> Function Key 1198 and types in the title 1200.

The title desired for this Context is "Quoting a Fee" 1200. This is automatically centered on the line, as indicated in the bottom screen 1202 in this Figure. Since there is a limited space for the title after the "BEGIN" marker 1204, this also provides for a one-line title that fits the Context Collection window.

Figure 84A:
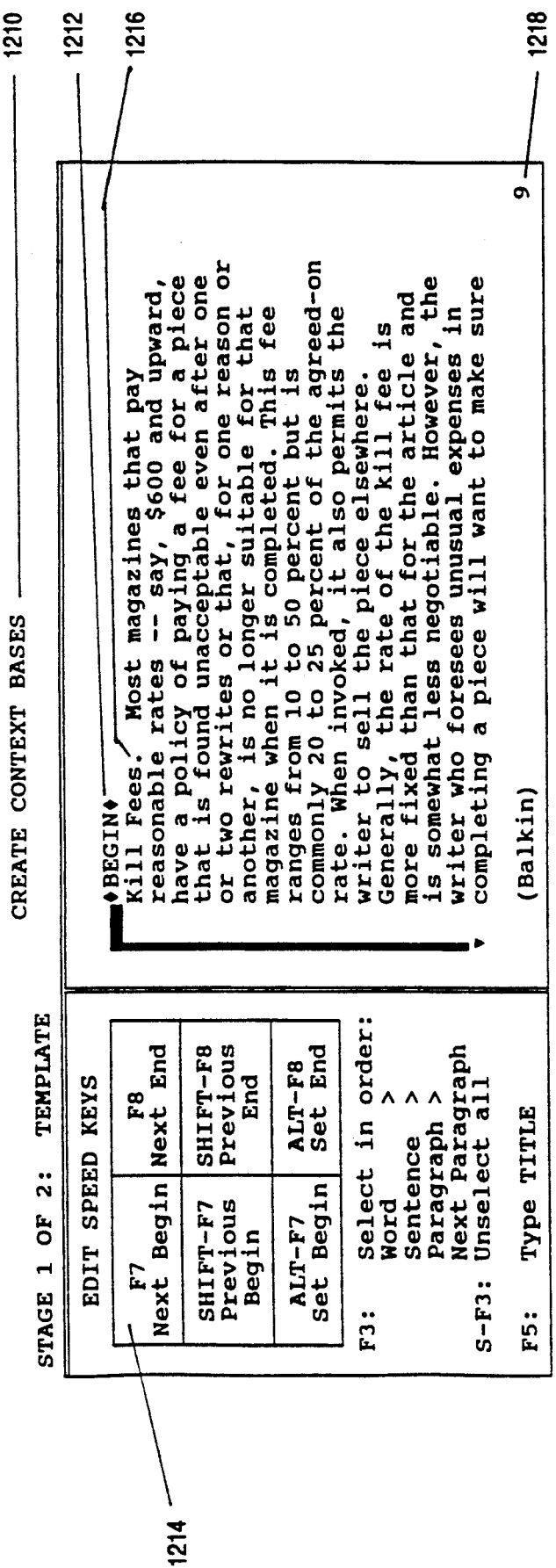
Figure 84B:
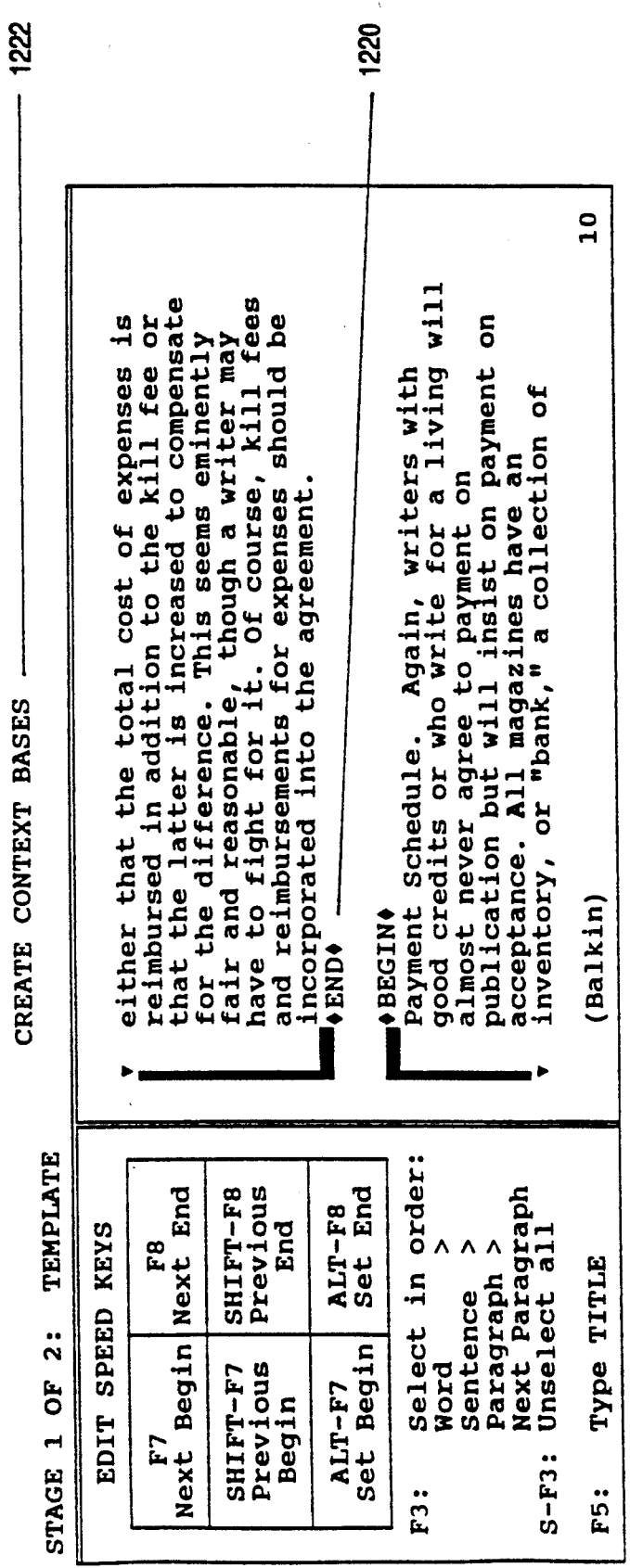
Figure 84C:
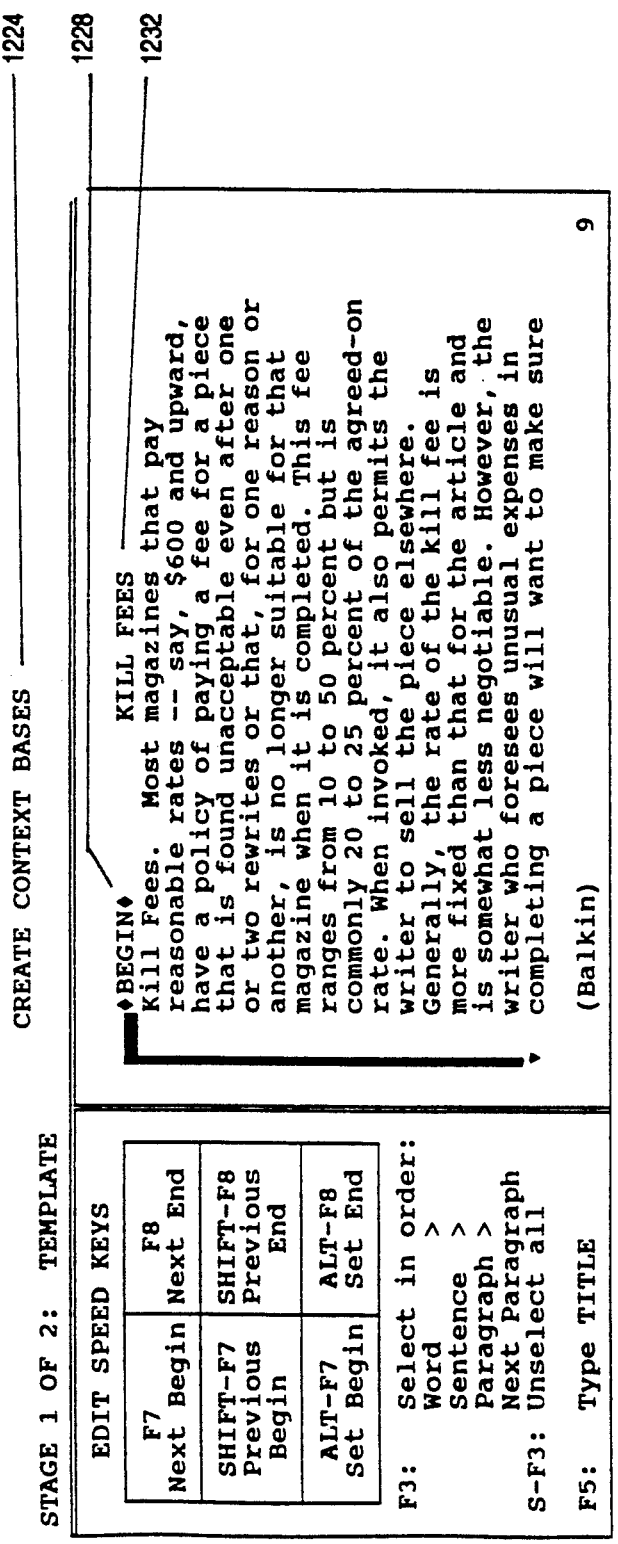

FIG. 84 illustrates how quickly a user can finalize an appropriately templated Context. In the top screen (1210), the user jumps to the "BEGIN" marker 1212 by pressing the <F7> key 1214. In the Figure, this lands the user at the beginning of the section on "Kill Fees" 1216 on screen number 9 1218. The user then skims the screen, presses either page-down 9028, 9029 (FIG. 138) or <F8> to get to the next "END" marker 1220 (the middle screen 1222 in this Figure) and sees that this is properly templated. In the third screen 1224 of this Figure, the user presses <Shift-F7> 1226 to go back to the "BEGIN" marker 1228, presses the <F5> key 1230 and types the title 1232, then presses <Enter> to complete that Context. If needed, the user could have moved either the "BEGIN" 1212 or "END" 1220 markers. If the user needs to delete words, sentences, or paragraphs the user selects them with the <F3> key 1234 then presses the <Delete> key.

Figure 85:
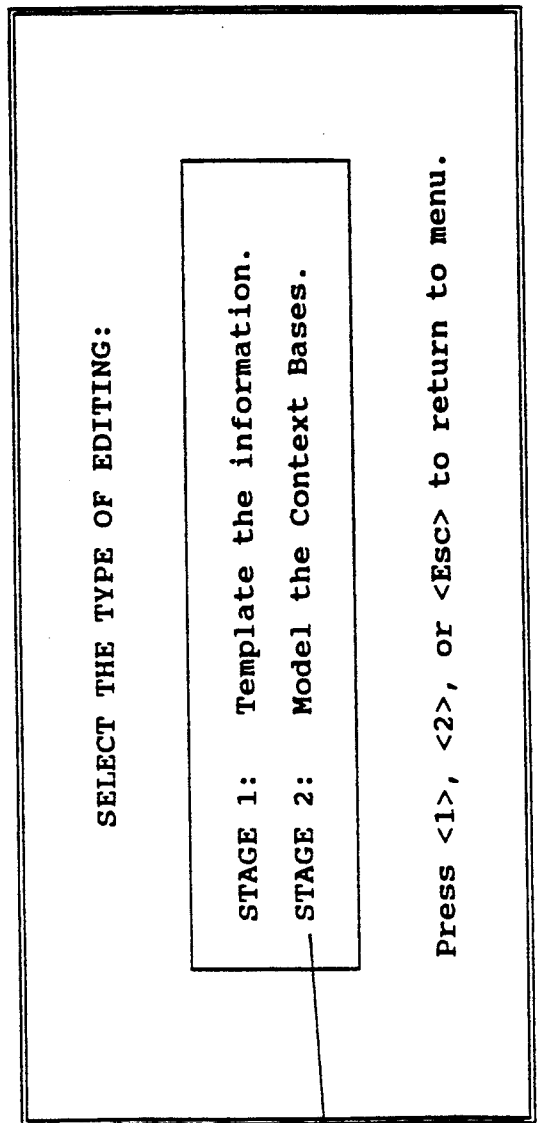

Turning to FIG. 85, the user selects option 2, "Model the Context Base 1240, 8066, 8067 (FIG. 136).

Figure 86A:
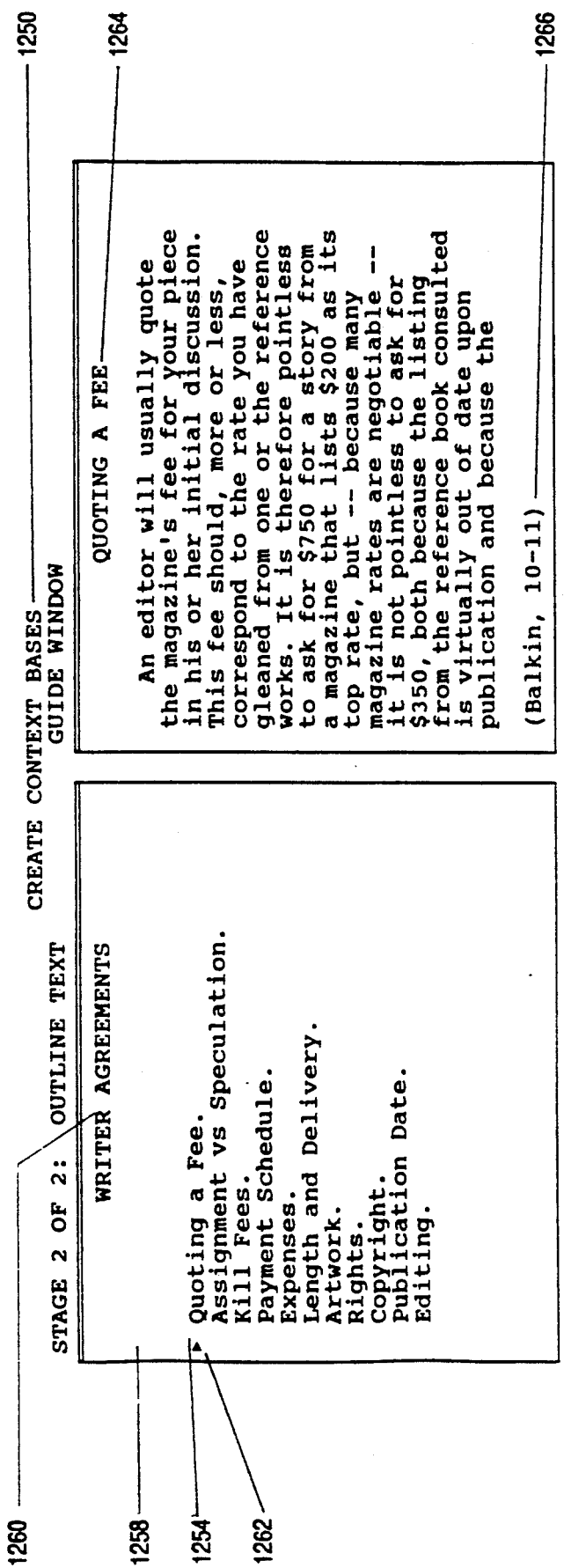
Figure 86B:
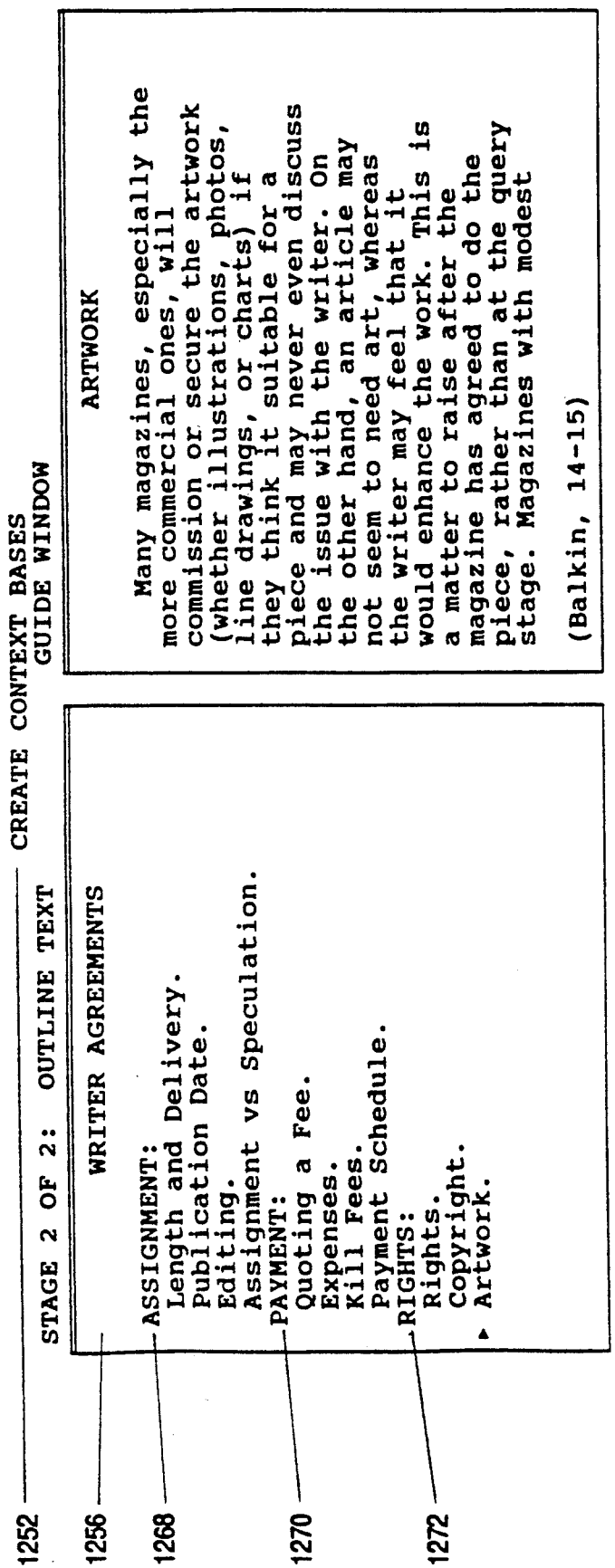

FIG. 86 displays the starting 1250 and ending 1252 screens from a series of screens during which the newly created Context Base 1254 is rearranged into the Context Base 1256 that will prove useful in a magazine publisher's Editorial Department.

As can be seen, the first screen resembles Context Positioning (FIGS. 102–106); in fact, it functions identically to that. In the left window 1258, 9002 (FIG. 137), the title of the Context Base is centered at the top: "Writer Agreements." The cursor is a reverse highlight bar (shown in the printout as an arrow in the window's left margin) on "Quoting a Fee" 1262. The Guide for this Context is displayed in the right window 1264, 9003 (FIG. 137). The source of the information is at the bottom of the right window 1266, showing both the author and the page numbers. That number of pages and source information are automatically linked to the Copyright Payment System.

The user operates in the left window 1258 and uses the same tools as in Context Collection and Positioning 5000–5117 (FIGS. 102–106), as in the creation of an Alternate. Individual Contexts 1262 are moved around. Headlines are inserted and/or changed by overtyping the existing headlines 5102–5111 (FIG. 106).

The result of the rearranging process is shown in the bottom screen 1252 printed in FIG. 86. The "Writer Agreements" source 1260 has been rearranged into three sections: first is the Assignment 1268; second is the Payment to the writer 1270; and the third is the Rights to the finished piece 1272.

Each of these new headlines, which were inserted 5102–5111 (FIG. 106), includes the appropriate Contexts that were templated from Chapter 1 of the Balkin book.

After the original information source has had the appropriate Contexts templated from it, and it has been Modeled into a useful source of Contexts, it is time to save the file as a Context Base (i.e., an information source that contains only Contexts) 8008, 8009 (FIG. 133). After being saved this will no longer be a text file; it will be a rapidly accessible collection of Contexts with all extraneous text removed.

Figure 87A:
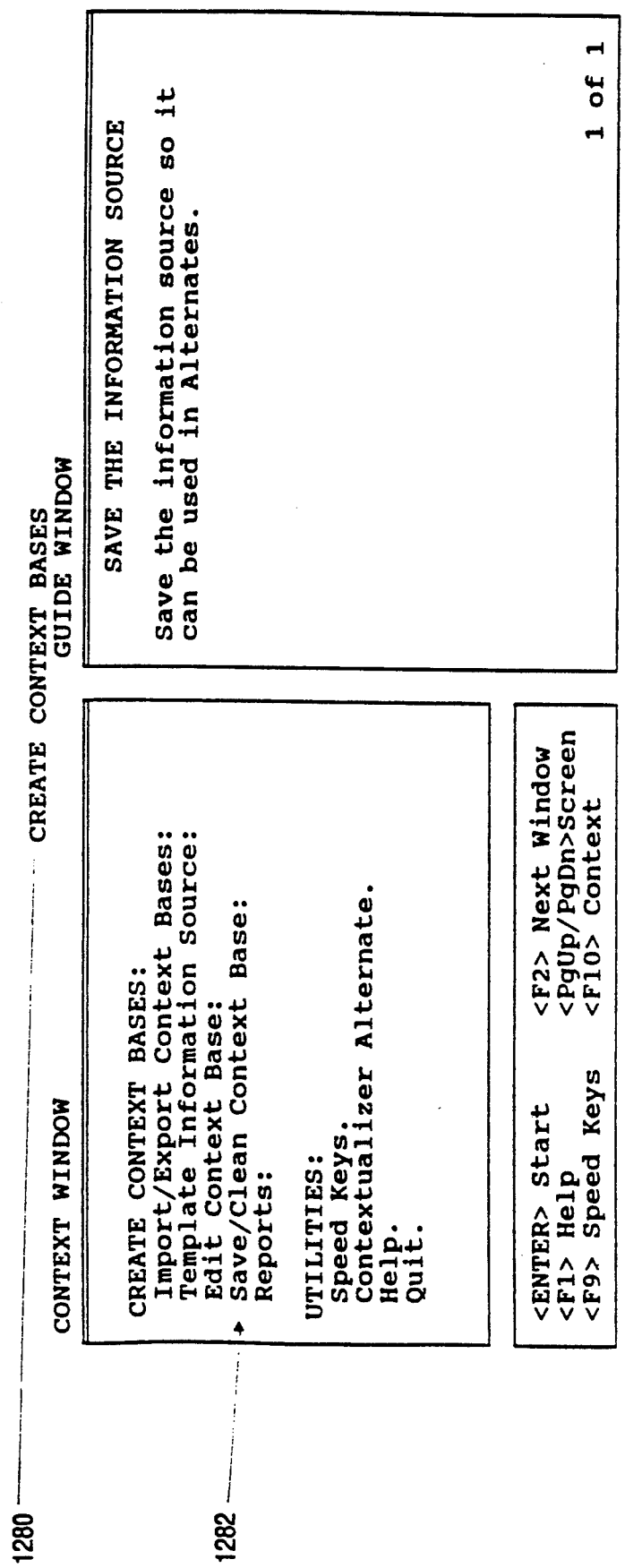
Figure 87B:
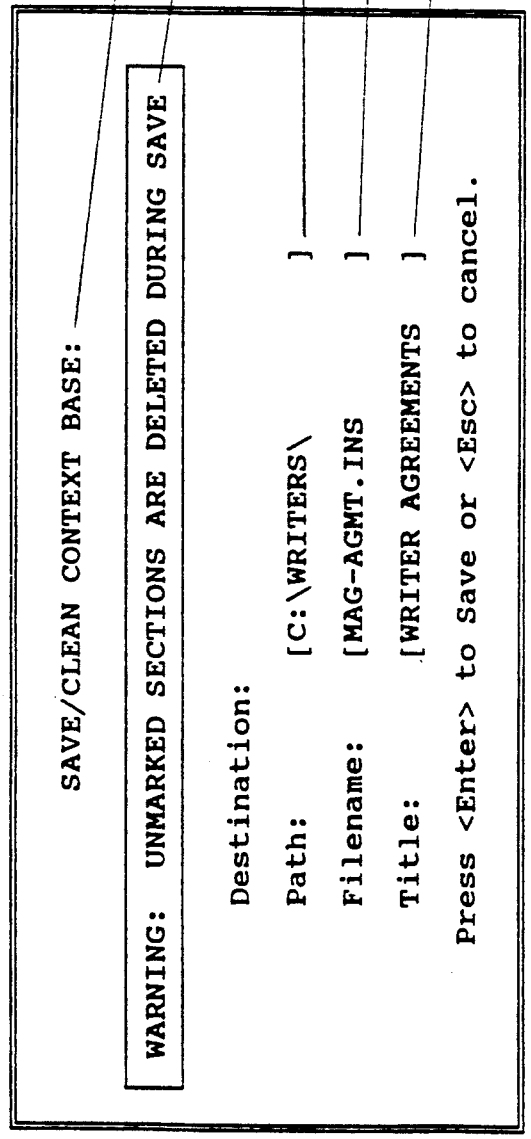
Figure 87C:
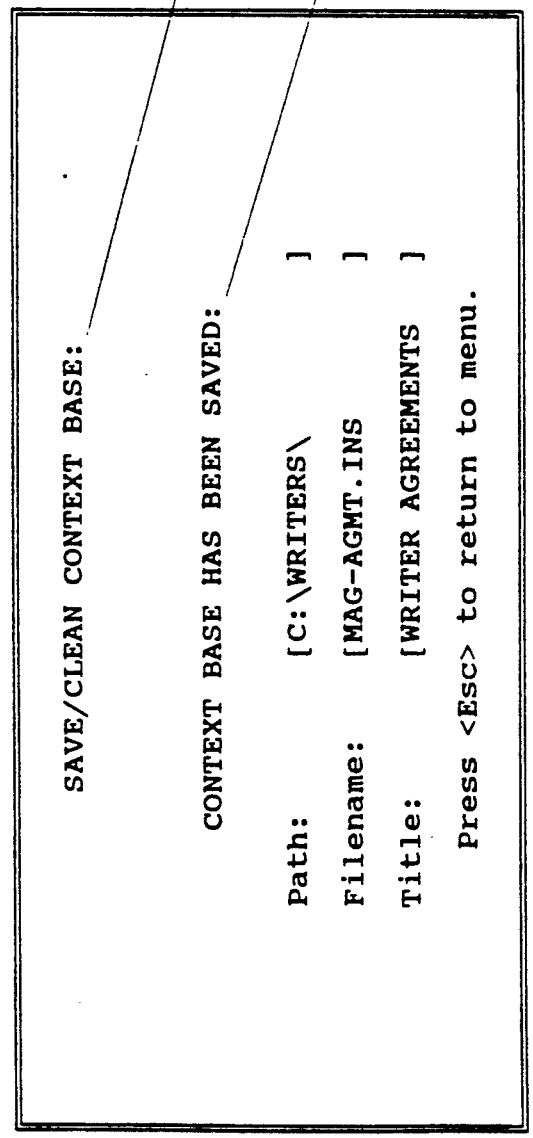

Turning now to the top screen 1280 in FIG. 87, this screen shows selecting "Save/Clean Context Base" 1282 from the menu for Creating Context Bases. FIG. 133 also illustrates saving an information source to a written file 8008, 8009. The second screen 1284 of FIG. 87 shows the warning 1286 to the user, that this will delete all unmarked text. It also displays the destination file location 1288, file name 1290, and title 1292 that were entered when the file was imported into the Contextualizer (see FIG. 77). The user may change any of these, if desired. The user then presses Enter> to save and clean the Context Base. After this is finished, the bottom screen 1284 is displayed, indicating that the Context Base is ready to be used to create Alternates 1296.

Figure 134A:
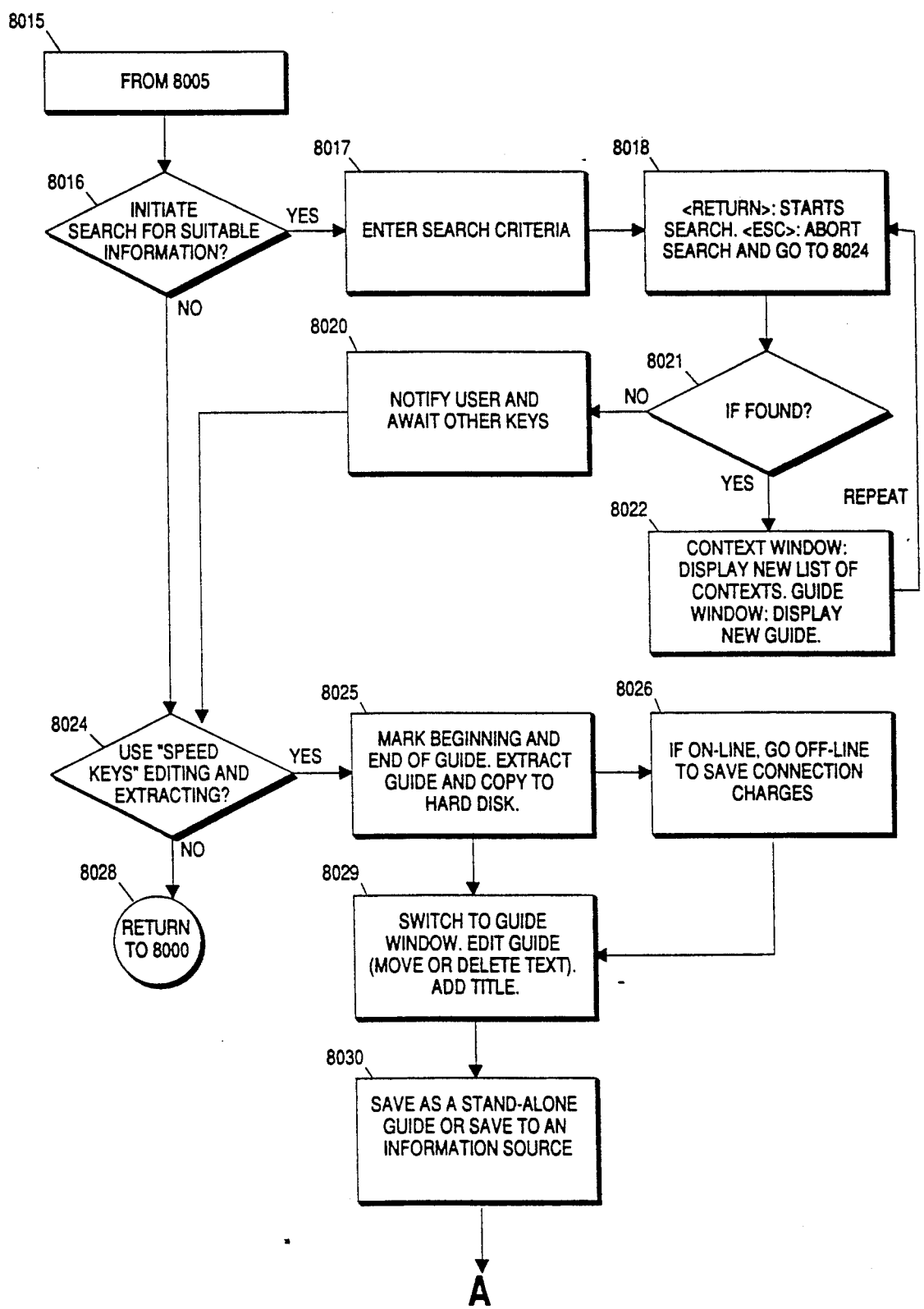
Figure 134B:
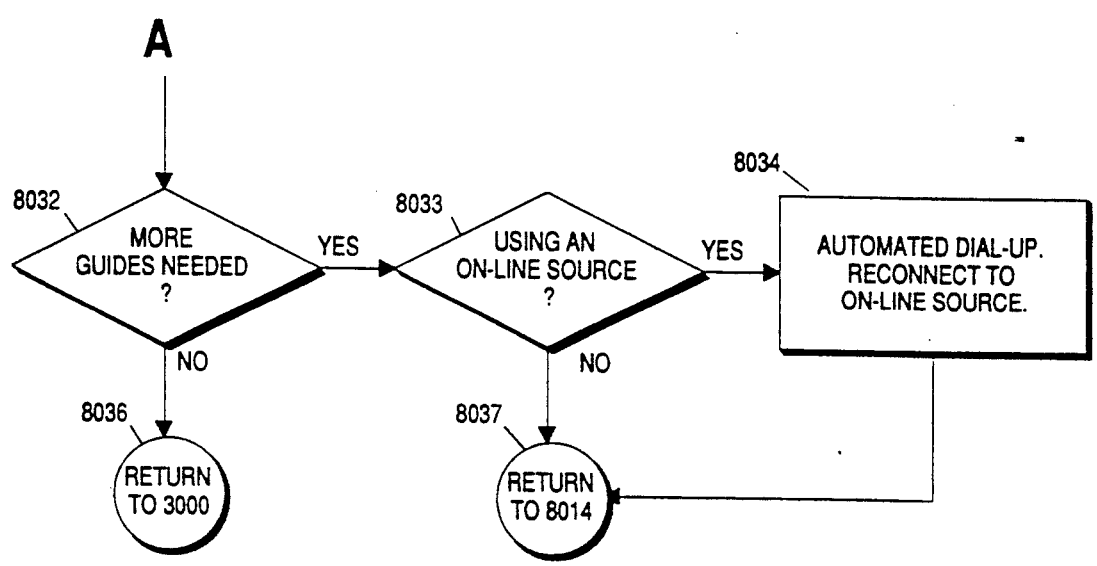

The same steps are used to extract a quick, on-the-fly Context 8016–8037 (FIG. 134). The difference is only one (or a few) keywords are entered so the templating produces a minimum number of templates and these can be extracted rapidly. In some cases, the Context needed is a single computer file. For example, "Creating Excitement in Articles" was a single Context in the Alternate for the new Editorial Assistant (see FIGS. 59 and 60). This was a single computer file that was developed using word processing by the publisher's Managing Editor, at his desk.

Environments

The following describes the environments in which the Contextualizer and Alternates may be run.

First, both the Contextualizer and Alternates may be run from the Main Menu on the computer that developed it. This might include a microcomputer or a workstation at a user's desk, or it can be accessed over a Local Area Network (LAN), on a departmental minicomputer, or on a mainframe computer at a corporate data center. Storage may include one or more CD-ROM or read/write optical disc drives. The system may or may not have video display capability, including video or optical disc(s) and appropriate video imaging on TV monitors or in a window(s) on the computer screen(s).

Second, an Alternate may be distributed (or sold) on disk(s) to be run on other computers. (For example, the new Editorial Assistant might run her Alternate on the microcomputer at her desk.)

With an Alternate, the type of access should vary based on the type of need. For example, the new Editorial Assistant only requires access to her own customized Alternate at her own desk. If this had been the Alternate created for all the Writer/Editors in the Editorial Department, and there was a network in place (whether a LAN or a departmental minicomputer), the Writer/Editors might access a shared Alternate over their network.

The key variable is whether the media in the Contexts match the communication system and the display capabilities of the computer systems at each person's desk. The above approaches work if all the systems handle digital text and computer graphics, and the Alternate's Contexts and Guides do not contain any more than that. If the Guides display still or moving video images, then optical disc or video tape players would be needed to provide access to video media, and the local systems at each user's desk need the ability to display video images.

As technology evolves, the means of access to this invention may potentially become more varied:

DIAL-IN VIDEOTEX SOURCES. These are dial-in services available to subscribers. The Contextualizer and Alternates would run on the Videotex service and be operated remotely by the user who is dialing in.

POINTER ENVIRONMENTS: Basically, a computer system and a user with a pointer input device would run this software interactively, including both the Contextualizer and the Alternates. The main types of pointer devices are a touch screen, mouse, lightpen, digitizing tablet, and joystick. The location could be, for example, a Kiosk with touch screen input located on a factory floor between several flexible manufacturing cells.

NEW STORAGE TECHNOLOGIES: Emerging optical disc technologies, such as CD-I (Compact Disc-Interactive), and DVI (Digital Video Interactive), or similar mass storage media may also provide platforms for running or storing parts of the Contextualizer, Alternates, and/or their Context Bases. The same is true for existing CD-ROM and laser disc technologies. In general, mass storage technologies are attached to a computer as interactive storage devices and they are operated under the control of the computer.

NEW TECHNOLOGIES: Planners and users of the Contextualizer could use a large, high-definition computer monitor (like a large color TV), developing or using the information environment either alone or together, controlling it with one or more pointer devices such as hand-held remotes. The CPU might have a (high capacity) mini-floppy disk and writable optical discs for importing/exporting finished Alternates and Context Bases. In this environment, the users' efforts would go into thought and discussion, not into operating the computer.

The ultimate design goal is software that is as easy and fast to use as an Automatic Teller Machine (ATM), so that this invention might evolve toward simplicity rather than complexity. A prototype of this new information environment runs with only the cursor keys block on the right side of the keyboard, with about 20 operations programmed into the Function Keys on the keyboard. The rest of the keyboard is used only occasionally, such as when typing in a file name changing a title. With these few keys, complex Alternates and Situation Shifts can be created; existing ones modified, linked, or merged; and even fewer keys are needed for the final users to access the Alternates interactively.

EMERGING DIAL-IN SERVICES: The technology of dialing into and accessing an information source is continually advancing in fields such as computers, videotex, kiosks, and digital optical players/recorders. For example, France's Minitel system is installed in over a million homes. It is possible that new types of dial-in services may become available in American businesses and homes. If so, it may be possible to offer the Contextualizer and/or Alternates on-line for broad audiences of users.

COMBINED TECHNOLOGIES: It is possible to combine the current and emerging technologies. A centrally developed set of manufacturing Alternates might be run from a kiosk on a factory floor that is operated by a touch screen and displays full motion video in some of its Guides. The Contextualizer with an extremely large set of on-line Context Bases might be offered on one or more phone-in vidotex services; its users could construct business related Alternates from their offices during the day an personal Alternates from their homes at night.

With these types of environments possible either today or in the future, the target population may become broad and significant: users who have major goals, are chronically short of time, and must perform at the highest quality global standards using the best information and expertise available.

The process of constructing, distributing, and using Alternates may have wide applications. As computer desktop systems use optical discs to store and access large volumes of information and move into greater use of electronic text retrieval and multi-media, the invention may provide the ability to and to access, extract, and manipulate information in many forms. Alternates may be useful for creating flexible information environments that match varied situations, needs, or desires. We consider three examples.

The first example is use by groups as well as by individuals. When a Outline Model or a Time-Sequence Model is built by a group, such as the Purchasing Department of a hospital, they would create a mirror of their shared understanding. A group Model might include areas such as what the group knows, its desires or goals, the problems it has, the questions it wants to answer, and the information they know how to access to create their answers. Since each person views a common situation differently, a shared Model are moved around. Headlines are inserted and/or changed by overtyping the existing headlines 5102-5111 (FIG. 106).

The result of the rearranging process is shown in the bottom screen 1252 printed in FIG. 86. The "Writer Agreements" source 1260 has been rearranged into three sections: first is the Assignment 1268; second is the Payment to the writer 1270; and the third is the Rights to the finished piece 1272.

Each of these new headlines, which were inserted 5102-5111 (FIG. 106), includes the appropriate Contexts that were templated from Chapter 1 of the Balkin book.

After the original information source has had the appropriate Contexts templated from it, and it has been Modeled into a useful source of Contexts, it is time to save the file as a Context Base (i.e., an information source that contains only Contexts) 8008, 8009 (FIG. 133). After being saved this will no longer be a text file; it will be a rapidly accessible collection of Contexts with all extraneous text removed.

Turning now to the top screen 1280 in FIG. 87, this screen shows selecting "Save/Clean Context Base" 1282 from the menu for Creating Context Bases. FIG. 133 also illustrates saving an information source to a written file 8008, 8009. The second screen 1284 of FIG. 87 shows the warning 1286 to the user, that this will delete all unmarked text. It also displays the destination file location 1288, file name 1290, and title 1292 that were entered when the file was imported into the Contextualizer (see FIG. 77). The user may change any of these, if desired. The user then presses <Enter> to save and clean the Context Base. After this is finished, the bottom screen 1284 is displayed, indicating that the Context Base is ready to be used to create Alternates 1296.

The same steps are used to extract a quick, on-the-fly Context 8016-8037 (FIG. 134). The difference is only one (or a few) keywords are entered so the templating produces a minimum number of templates and these can be extracted rapidly. In some cases, the Context needed is a single computer file. For example, "Creating Excitement in Articles" was a single Context in the Alternate for the new Editorial Assistant (see FIGS. 59 and 60). This was a single computer file that was developed using word processing by the publisher's Managing Editor, at his desk.

Environments

The following describes the environments in which the Contextualizer and Alternates may be run.

First, both the Contextualizer and Alternates may be run from the Main Menu on the computer that developed it. This might include a microcomputer or a workstation at a user's desk, or it can be accessed over a Local Area Network (LAN), on a departmental minicomputer, or on a mainframe computer at a corporate data center. Storage may include one or more CD-ROM or read/write optical disc drives. The system may or may not have video display capability, including video or optical disc(s) and appropriate video imaging on TV monitors or in a window(s) on the computer screen(s).

Second, an Alternate may be distributed (or sold) on disk(s) to be run on other computers. (For example, the new Editorial Assistant might run her Alternate on the microcomputer at her desk.)

With an Alternate, the type of access should vary based on the type of need. For example, the new Editorial Assistant only requires access to her own customized Alternate at her own desk. If this had been the Alternate created for all the Writer/Editors in the Editorial Department, and there was a network in place (whether a LAN or a departmental minicomputer), the Writer/Editors might access a shared Alternate over their network.

The key variable is whether the media in the Contexts match the communication system and the display capabilities of the computer systems at each person's desk. The above approaches work if all the systems handle digital text and computer graphics, and the Alternate's Contexts and Guides do not contain any more than that. If the Guides display still or moving video images, then optical disc or video tape players would be needed to provide access to video media, and the local systems at each user's desk need the ability to display video images.

As technology evolves, the means of access to this invention may potentially become more varied:

DIAL-IN VIDEOTEX SOURCES. These are dial in services available to subscribers. The Contextualizer and Alternates would run on the Videotex service and be operated remotely by the user who is dialing in.

POINTER ENVIRONMENTS: Basically, a computer system and a user with a pointer input device would run this software interactively, including both the Contextualizer and the Alternates. The main types of pointer devices are a touch screen, mouse, lightpen, digitizing tablet, and joystick. The location could be, for example, a Kiosk with touch screen input located on a factory floor between several flexible manufacturing cells.

NEW STORAGE TECHNOLOGIES: Emerging optical disc technologies, such as CD-I (Compact Disc Interactive), and DVI (Digital Video Interactive), or similar mass storage media may also provide platforms for running or storing parts of the Contextualizer, Alternates, and/or their Context Bases. The same is true for existing CD-ROM and laser disc technologies. In general, mass storage technologies are attached to a computer as interactive storage devices and they are operated under the control of the computer.

NEW TECHNOLOGIES: Planners and users of the Contextualizer could use a large, high-definition computer monitor (like a large color TV), developing or using the information environment either alone or together, controlling it with one or more pointer devices such as hand-held remotes. The CPU might have a (high capacity) mini-floppy disk and writable optical discs for importing/exporting finished Alternates and Context Bases. In this environment, the users' efforts would go into thought and discussion, not into operating the computer.

The ultimate design goal is software that is as easy and fast to use as an Automatic Teller Machine (ATM), so that this invention might evolve toward simplicity rather than complexity. A prototype of this new information environment runs with only the cursor keys block on the right side of the keyboard, with about 20 operations programmed into the Function Keys on the keyboard. The rest of the keyboard is used only occasionally, such as when typing in a file name changing a title. With these few keys, complex Alternates and Situation Shifts can be created; existing ones modified, linked, or merged; and even fewer keys are needed for the final users to access the Alternates interactively.

EMERGING DIAL-IN SERVICES: The technology of dialing into and accessing an information source is continually advancing in fields such as computers, videotex, kiosks, and digital optical players/recorders. For example, France's Minitel system is installed in over a million homes. It is possible that new types of dial in services may become available in American businesses and homes. If so, it may be possible to offer the Contextualizer and/or Alternates on-line for broad audiences of users.

COMBINED TECHNOLOGIES: It is possible to combine the current and emerging technologies. A centrally developed set of manufacturing Alternates might be run from a kiosk on a factory floor that is operated by a touch screen and displays full motion video in some of its Guides. The Contextualizer with an extremely large set of on-line Context Bases might be offered on one or more phone-in vidotex services; its users could construct business-related Alternates from their offices during the day and personal Alternates from their homes at night.

With these types of environments possible either today or in the future, the target population may become broad and significant: users who have major goals, are chronically short of time, and must perform at the highest quality global standards using the best information and expertise available.

The process of constructing, distributing, and using Alternates may have wide applications. As computer desktop systems use optical discs to store and access large volumes of information and move into greater use of electronic text retrieval and multi-media, the invention may provide the ability and to access, extract, and manipulate information in many forms. Alternates may be useful for creating flexible information environments that match varied situations, needs, or desires. We consider three examples.

The first example is use by groups as well as by individuals. When a Outline Model or a Time-Sequence Model is built by a group, such as the Purchasing Department of a hospital, they would create a mirror of their shared understanding. A group Model might include areas such as what the group knows, its desires or goals, the problems it has, the questions it wants to answer, and the information they know how to access to create their answers. Since each person views a common situation differently, a shared Model expresses a different level of understanding: the grasp of the Purchasing Department and the ideas many people can offer for solving the current problems or growing beyond the short-term obstacles. In addition, the activity of involving many members in picking goals, planning how to achieve them, and implementing them may create a dynamic involvement. The Purchasing Department may evaluate themselves and improve their performance based on making visible the "how to" and "why" and other criteria they understand and believe in together.

A second example is that unlocked Alternates may be a new type of distribution method and product for publishers of books and magazines. Publishers (such as a publisher of engineering handbooks) may have useful "how-to" information sources that they may want to sell as Context Bases. If users could purchase engineering handbooks in the form of unlocked Alternates, they could add their own Outline Models and Time-Sequence Models to apply the Context Bases to their evolving situations and needs. This would permit engineers to store a set of handbooks on their computers and rearrange its Contexts into Outline Models and Time-Sequence Models that support their current projects. Since the Guides remain locked and cannot be expanded or deleted, this permits book and magazine publishers to package their information products in ways that might be appropriate for interactive computer users.

A third example is a potential new method for re-publishing copyrighted information originally published in books and magazines. By developing the types of Context Base products described in the second example, such as on line engineering handbooks, publishers also create Context Bases independent developers might access to create Alternates. These provide Contexts that might be copied to construct new Alternates. If independent developers create Alternates for re-sale or internal corporate distribution, such as product design guides for engineers, or structural materials selection guides for architects, the downstream sales potential might be substantial. These Alternates could reflect the experience and judgment of experts, such as how to do site selection for small retail businesses, how a small manufacturer may profitably introduce CAD/CAM, or how a farmer might grow his crops while using a minimum of pesticides. Just as desktop publishing produced a growing volume of specialized newsletters, the Contextualizer might produce new types of useful information in the form of Alternates that are sold as stand alone products. Many types of copyrighted information sources might be re-published as Context Bases to create these new information products that are sold as Alternates. By including copyrighted Contexts in their Alternates, developers of Alternates become "re-publishers" of materials that are the property of others. These re-publishers would pay copyright use fees for the copyrighted material they include and re-sell. (See the Copyright Payment System above.) Publishers of some types of books and magazines, such as handbooks and other "how-to" publications, may have a financial incentive to develop Context Bases as products to stimulate or supply this type of potential market, since the publication of Alternates could produce additional copyright royalty revenues with relatively little additional investment.

Group creation of Alternates (the first example) indicates how the shared visions of organizations, industries, and public or professional associations might be developed. Digital publication of books and magazines as unlocked Alternates (the second example) implies that some of modern society's prodigious output of know-how, expertise, and conceptual insight might be published as rapidly accessible Context Bases; using the Contextualizer, developers would then be able to collect Contexts rapidly and create custom Alternates. The re-sale of useful Alternates (the third example) suggests the flexible focusing and re-publishing of knowledge resources into useful forms that increase the performance of individuals, business units, and organizations throughout society and the world.

Figure 122:
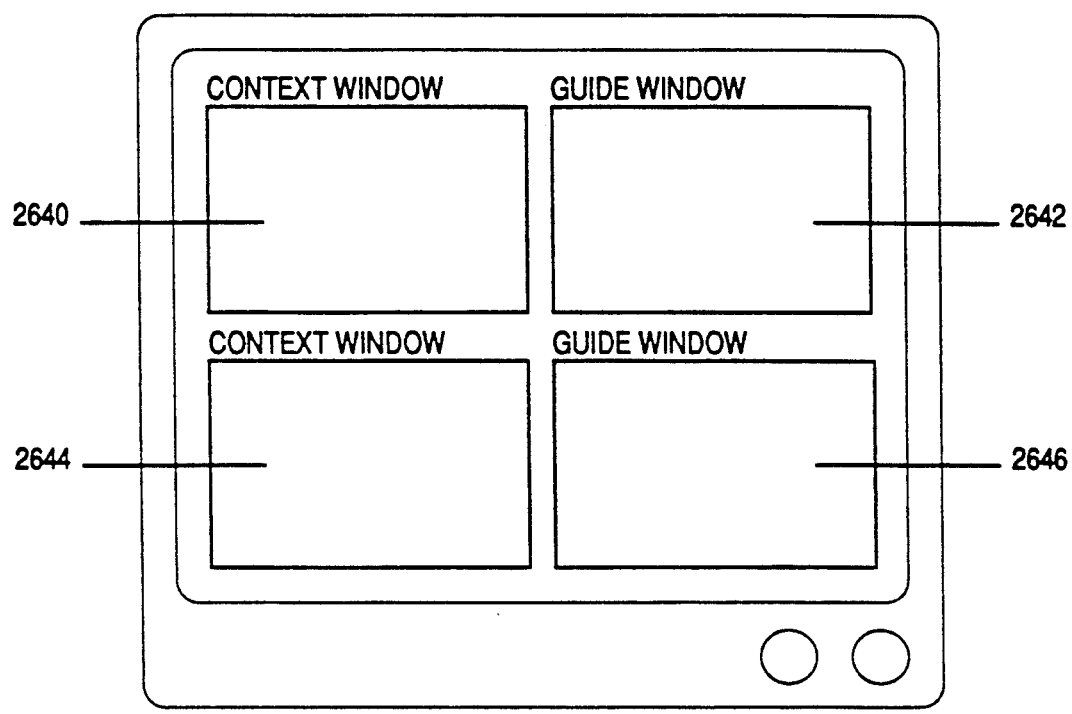
Figure 123:
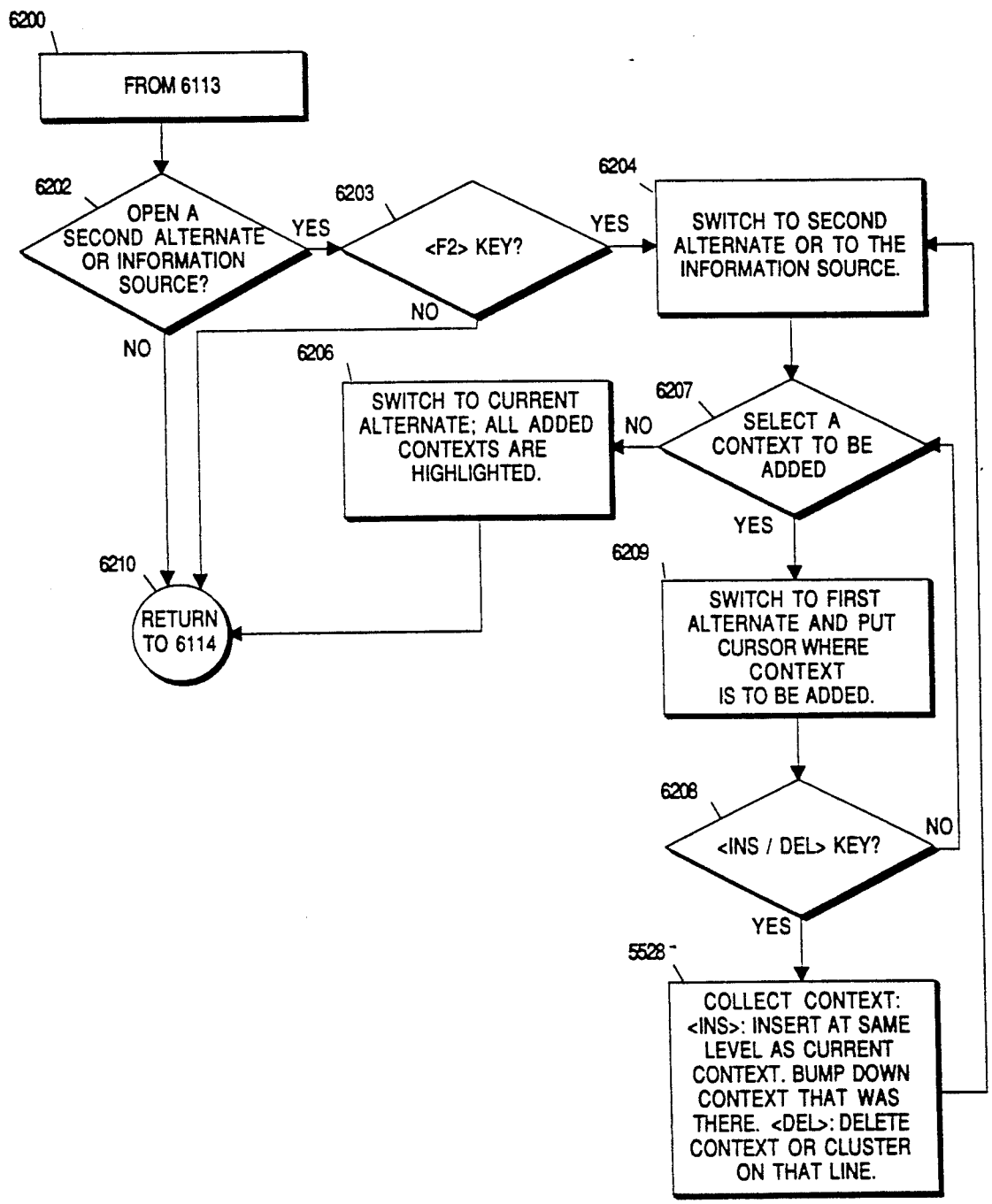

This could become a self-perpetuating process because Alternates may be used as Context Bases to develop successive generations of Alternates. As a result, both Context Bases and Alternates become resources for further imagination-driven computing development 6240–6246, 6202–6209 (FIGS. 122 and 123). In a corporation, the more Alternates that are in use, the easier it is to create the next Alternate since so many useful Contexts might be immediately available.

While the Preferred Embodiment may make it appear as if a user collects Contexts first, fabricates an Alternate, and then schedules the use of Contexts over time, users may follow any order of Collecting Contexts and Positioning them that is appropriate for their purposes. For example, the user may start by typing in Cluster Titles then re-order them by subject, priority, or time-sequence even though no Contexts have been collected. Concepts or notes can be attached to the Cluster Titles for explanation of the imaginative conception. Once an ideal structure has been projected, the user may then use Context Collection to find Contexts for the project. Thus, users may take advantage of the flexible tools in the invention to develop imaginative or wholly novel ideas first, followed by the actual new information environments.

This may contribute new opportunities to create idealized transformations. The structure of an Alternate is based on its Outline Model. The process of Context Positioning permits various types of Models to be built quickly. Each user sets up each Model according to a pattern (and an order within that pattern) that is meaningful for him or her.

Models reflect many ways of "seeing" a situation, such as: subjects, goals, responsibilities, the ultimate manager for each responsibility (if different), different clients, customer groups, products, co workers, employee names, project names, business departments, job titles, job functions, processes, or different fields of science or knowledge.

The Alternates each have a unique meaning to their users. The way a user approaches a situation determines the Model(s) they create, and the Models are the users' access to the Alternates. (This also applies to the development of the Time Sequences.) Each Model's pattern reflects its developer's understanding of a Preferred Situation. The flexible Context manipulation tools in the Contextualizer help developers and users keep their overall concepts clear and accessible. (If the developer and the users are not the same, the Model could be field tested with users.)

An example may clarify how a user may see a situation and create two Models of it. Here, the user is a (fictional) executive who is unexpectedly asked to figure out how to make the company's large and busy Customer Service Department (CSD) a more important and central part of the corporation's competitive strategy. This use of the Contextualizer illustrates how a user may need one solution, yet rapidly discover both conventional and innovative alternatives. From the start, imaginative new learning may enter the process, and the new learning is immediately captured in a Model from which implementation can be planned.

Without the Contextualizer, this executive might only be able to muster several meetings with the manager of CSD before making recommendations. With the Contextualizer, he may prepare for his first meeting by rapidly constructing researched alternatives for action. As the executive uses the Contextualizer to explore a number of Context Bases, he makes both traditional and innovative discoveries from other companies and countries, from management systems, from managing personnel relationships, and even from business forms design, evaluation methods, and negotiation strategies.

Since the executive is a traditional line manager, he devotes most of this session to developing the standard approach (FIG. 88). Due to the ease of accessing and manipulating information, however, it turns out to be easy to discover new ideas and construct a potentially more rewarding approach from them (FIG. 89).

Turning now to FIG. 88, the executive's first Model mirrors a traditional management approach 1300 that includes a variety of methods, internal reports, and other information from a diverse variety of sources. For example, internal corporate sources are Customer Service Department (CSD) reports 1302 that include numbers, graphs, and text. External Contexts include sources from business publications 1304, and both internal and external sources offer statistics 1306 for comparison and the methods 1307 needed to handle several of the steps in the project. Other external Contexts are customer service examples 1304 from the company's industry and from other industries, and these were located in Context Bases from both books and magazines.

While he was exploring the available Context Bases, the executive stumbled into developing a second Model 1320 (in FIG. 89) to achieve the same goal. He titled this, "II. A Voice for the Customer Throughout the Company?"

Turning now to FIG. 89, in this second CSD Model 1320 suggested how the customer could have a voice throughout many areas of the company including manufacturing, distribution, quality assurance, and product development. Satisfying the customer became the second priority of the Customer Service Department. With this new invention, its first goal could be to push the customer's information rapidly to the point in the company where it could be used best: to improve product quality, to lower defects, to focus distribution on market needs, to capitalize on new product ideas, or any other valuable information that might be discovered.

Since every customer service operator already worked at a terminal, customer comments were already automatically entered into the computer and flagged by type. It was not unreasonable to sort them and import the best suggestions into the Contextualizer. There, a unique "Customer Alternate" would be created and updated periodically. Appropriate sections of this Model would be extracted for each of the operating divisions of the company 1322. These "Customer Alternates" would be compiled and rapidly distributed to the appropriate decision makers in key operating areas of the company.

This second Model would increase the strategic value of the Customer Service Department. Their mission would be to constantly help the company answer how it could serve its customers better. Part of how CSD could be judged might include the percentage of their ideas that the company started using. This could expand how they were evaluated from how well they worked with the customer to include how well they assisted the rest of the company in achieving its strategic business goals.

As the executive reviewed the second model (FIG. 89) he discovered he had found an opportunity based on undeniable proof from many companies 1323, 1324, 1325: higher quality costs less, reduces waste, and improves operations. If the customer's voice could speak from every appropriate computer screen throughout the corporation, and it was immediately accessible when decisions were being made, it might make a real difference.

Continuing this fictional example, this executive went on to work with the manager of CSD. Together they built a better second model and firmed up a time-sequenced implementation schedule. They quickly added the first model's tracking system 1310 to the second, so results would be documented 6202-6209 (FIG. 123). Thus, a rapid learning curve could emerge from using the Contextualizer—not only in building the model, but throughout the company. CSD operations fed the Contextualizer, which built "Customer Alternates" as a delivery system for the new information.

At their desks, decision makers in many departments could merge the "Customer Contexts" they needed from the Customer Alternates into their own Department's Alternates 6202-6209 (FIG. 123) which they built to reach their operating goals. This rapidly transferred their customers' needs and desires into their planning and implementation schedules. As a result, this new information environment turned out to be one way to improve the competitiveness of many parts of the company.

Thus, the processes of Context Exploration, Context Positioning, and Time Sequencing may be generalized. The examples cited showed a variety of uses, but the invention is not meant to be limited to them or to the specific keys identified in the description or the Figures. The invention is a set of flexible Context manipulation tools which enhance the ability to explore and develop new ideas, arrangements, Contexts, and situations, move the information to new users as Alternates, and allow them to extract the Contexts to create or modify their own Alternates. Such tools allow components of reality to be manipulated through "Contexts" and "Context Clusters" that can be constructed and rearranged as if they were concrete objects that can be moved and changed at will. Thus, computers are used to bridge imagination and reality on multiple levels throughout organizations and society, and produce "imagination-driven computing."

This injects additional creativity, learning, and potential performance improvements into everyday work and goals. On a broad scale, people could gain the ability to imagine Preferred Situations and utilize rapidly increasing ranges of knowledge to Outline Model finer goals and rapidly construct the Time Sequenced plans to achieve them.

FIG. 90 provides a brief summary by illustrating the processes of the invention in column 1 1330, the steps in the invention in column 2 1332, and the difference produced by the invention in column 3 1334. It is a novel use of computing to transform rapidly expanding knowledge resources 1333 into Contexts and Context Bases 1335, and manipulate them with these new tools of imagination-driven computing 1336, 1337, 1338, 1339.

FIG. 91 illustrates the new information environment 1340 that may be created by means of the invention, from today's expanding information resources 1342. Users may envision Preferred Situations 1344 and construct Context Bases 1346 and Alternates 1348 that Outline Model them and include Time Sequences for implementing Situation Shifts 1350. These may be distributed internally in an organization 1352, or sold by a variety of sources as products such as Context Bases and Alternates 1354 to a wide variety of customers 1358. Groups of Alternates may be managed by Outline Modeling and Time Sequencing them to direct large or complex Situation Shifts 1356. Since the Alternates created by one user (or group) may also be used as Context Bases by other users, the best Alternates imagined in one situation may be an immediately accessible foundation for others to build related or similar information environments 1358. The Contextualizer describes a new type of information environment that expands the impact of the imagination in computing 1360. By providing an information technology to express our imaginations, and access the imaginative creations of each other, the Contextualizer offers potential new opportunities to manage what might become real and how to introduce it 1360.

As a global transformation is already developing, a growing number of companies and industries face new needs to leapfrog their current operating limits and become effective competitors on a global level, reshaping their performance, productivity, adaptation and innovation capabilities. Ultimately, this invention's goal is to help stimulate a potential Situation Shift to greater imagination-driven learning, responsiveness, and creativity, and help fill critical needs for economic growth, humanitarian progress, rapid performance, and survival. Continuous learning may be fostered at the point when better situations are imagined or even desired, with the best ideas captured in information systems, then spread rapidly to others in useful forms so they can, in turn, rapidly improve and produce and then spread their new capabilities to others.

With this invention, new and productive uses for the emerging infrastructure of information systems may be developed. This is not only a new paradigm for computing, it is potentially a systematic new way to help organizations, groups, and individuals manage and develop the increasingly complex world in which we live.

I claim:

1. A computer-based method for aiding a user in assembling a customized body of information from a larger body of available information segments, the method comprising
   displaying a set of labels, each label providing an abbreviated indication of information content of a corresponding one of said available information segments in said larger body,
   enabling a user to point to individual labels in said set using an electronic pointing technique,
   for each label to which said user points, displaying to the user, for previewing, information content of the corresponding segment,
   enabling a user to choose to include in the customized body of information, selected ones of said available information segments, while excluding from the customized body of information other available information segments, and
   assembling said customized body of information in response to choices of information segments made by said user.

2. A computer-based method for aiding a user in assembling a customized body of information from a larger body of available information segments, the method comprising
   displaying a set of labels, each label providing an abbreviated indication of information content of a corresponding one of said available information segments in said larger body,
   enabling a user to point to individual labels in said set using an electronic pointing technique,
   for each label to which said user points, displaying to the user, for previewing, information content of the corresponding segment,
   simultaneously while displaying said information content of a segment corresponding to a label to which the user is pointing, displaying information content for a segment corresponding to a label to which the user had previously pointed.

3. The method of claim 1 or 2 further comprising
   simultaneously while displaying said set of labels, displaying a second set comprising an accumulation of labels to which said user has previously pointed.

4. The method of claim 3 wherein there are a plurality of available said larger bodies of information, said method further comprising
   simultaneously while displaying identities of sources of said larger bodies of information, displaying for one or more of said large bodies, an associated said set of labels, said second set comprising an accumulation of said labels to which said user has previously pointed with respect to all of said larger bodies.

5. The method of claim 4 wherein one of said available bodies of information is available on-line from a remote location.

6. The method of claim 3 wherein said second set is organized in accordance with a model.

7. The method of claim 6 wherein said model comprises a hierarchy of at least two levels.

8. The method of claim 7 wherein said hierarchy comprises an outline.

9. The method of claim 6 wherein said model comprises a time sequence.

10. The method of claim 9 further comprising
    displaying said second set by placing each said label in a visual position which reflects its position in said time sequence relative to the visual positions of other said labels.

11. The method of claim 10 wherein said visual position comprises an indentation relative to a margin of said display.

12. The method of claim 6 further comprising,
    in response to a user's commands, revising the organization of said labels to modify said model.

13. The method of claim 6 further comprising compiling only the segments corresponding to the labels in said second set into said customized body of information.

14. The method of claim 6 further comprising
    in response to commands of a user, eliminating one of said labels and its associated contents from said model.

15. The method of claim 6 further comprising
    establishing multiple said models of said second set, and
    displaying said models selectively to said user.

16. The method of claim 3 further comprising, in response to commands of a user, culling or reordering said labels in said second set.

17. The method of claim 3 further comprising in response to commands of a user, making either of said set and said second set selectively active to said user.

18. The method of claim 3 further comprising displaying said set, said second set, and said contents associated with said label in windows when invoked by a user.

19. The method of claim 18 further comprising
    altering the proportions of the display occupied respectively by said windows.

20. The method of claims 1 or 2 wherein said labels comprise textual phrases.

21. The method of claim 1 further comprising
assembling multiple said customized bodies of information, each body being assembled by selecting segments from a larger available body of information segments,
assigning a name to each said customized body of information, and
displaying said names in an organized model.

22. A computer-based method for producing an annotated body of stored information comprising
specifying keys each of which may appear within said body of stored information,
searching said body of stored information for instances of each of said keys,
defining boundaries of segments of said stored information, each said segment including at least one of said instances,
assigning to each segment a label based on a key found within said segment,
displaying each segment to a user,
in response to commands from said user, adjusting the boundaries of at least one of said segments.

23. The method of claim 22 further comprising
defining said boundaries on the basis of criteria specified by said user.

24. The method of claim 22 wherein said keys comprise textual phrases.

25. The method of claim 22 wherein said stored information comprises text.

26. The method of claim 22 wherein said boundaries comprise beginnings and ends of paragraphs.

27. The method of claim 22 further comprising
in response to user commands, compiling selected said segments and corresponding labels, each label indicating the content of the corresponding said segment.

28. A computer-based method for aiding a user in accessing a body of stored information which includes segments of related information, the method comprising
displaying a set of labels, each label providing an abbreviated indication of information content of a corresponding one of said segments,
said labels being displayed in an organized model reflecting relationships among information contents of said corresponding segments,
enabling a user to point to individual labels in said model using an electronic pointing technique, and
for each label to which said user points, displaying to the user, for previewing, the information content of the corresponding segment.

29. The method of claim 28 wherein said model comprises a hierarchy of at least two levels.

30. The method of claim 29 wherein said hierarchy comprises an outline.

31. The method of claim 29 further comprising,
in response to commands of a user, eliminating one of said labels at a higher level of the hierarchy.

32. The method of claim 29 further comprising displaying said set selectively at different levels of detail in said hierarchy.

33. The method of claim 32 further comprising
simultaneously displaying one portion of said set at a higher level of detail in said hierarchy, while
displaying another portion of said set at a lower level of detail in said hierarchy.

34. The method of claim 28 wherein said model comprises a time sequence.

35. The method of claim 28 further comprising, in response to a user's commands, revising the organization of said labels in said set to modify said model.

36. The method of claim 28 further comprising, in response to commands of a user, changing the content of said labels in said second set.

37. The method of claim 28 wherein said body of stored information is available on-line from a remote location.

38. The method of claim 28 further comprising displaying said set by placing each said label of said set in a visual position which reflects its position in said time sequence relative to the visual positions of other said labels.

39. The method of claim 38 wherein said visual position comprises an indentation relative to a margin of said display.

40. The method of claim 28 further comprising
displaying said set and said segments in windows.

41. The method of claim 40 further comprising
altering the proportions of the display occupied respectively by said windows.

42. The method of claim 28 further comprising
establishing multiple said models of said set, and
displaying said models selectively to said user.

43. The method of claim 28 wherein said labels comprise textual phrases.

44. The method of claim 28 wherein said set comprises a list.

45. The method of claim 28 further comprising preventing a user from changing the order or content of said set.

46. The method of claim 28 further comprising preventing a user from changing the content of said segments.

47. The method of claim 28 further comprising altering the order or content of said set in response to user interaction.

48. The method of claim 28 further comprising altering the content of said segments.

49. The method of claim 28 wherein one of said segments comprises another said set of labels which itself corresponds to other segments of stored information.

50. The method of claim 49 wherein said set and said second set comprise lists.

51. The method of claim 28 further comprising, in response to a user's commands, revising the organization of said labels in said set to modify said model.

52. The method of claim 28 further comprising,
in response to commands of a user, changing the content of said labels in said second set.

53. The method of claim 28 further comprising,
in response to commands of a user, eliminating one of said labels at a higher level of the hierarchy.

54. The method of claim 28 further comprising displaying said set by placing each said label of said set in a visual position which reflects its position in said time sequence relative to the visual positions of other said labels.

55. The method of claim 28 wherein said labels comprise textual phrases.

56. The method of claim 28 further comprising providing a marker within said range which indicates a user selection of a label in said set.

57. The method of claim 28 wherein one of said segments comprises another said set of labels which itself corresponds to other segments of stored information.

58. A system comprising storage containing a body of information comprising segments,
said storage also containing
a set of labels, each label indicating the content of a corresponding one of said segments, said labels being arranged in an organized model reflecting relationships among corresponding said segments, and
software for displaying said model and for enabling a user to access a selected said segment by invoking a corresponding label in said model.

59. A computer-based method for providing assistance to a user of an application program comprising
in response to a user requesting assistance in the course of using said program, displaying a set of labels, each label indicating the content of a corresponding segment of assistance information, said labels being displayed in an organized model, and
simultaneously while displaying said set of labels, displaying a segment of assistance information corresponding to one of said labels selected by said user.

60. The method of claim 59 wherein said model comprises a hierarchy of at least two levels.

61. The method of claim 60 wherein said hierarchy comprises an outline.

62. The method of claim 59 wherein said model comprises a time sequence.

63. The method of claim 59 wherein said tokens comprise textual phrases.

64. A computer-based method for aiding a user to scan a set of displayed data items,
portions of said set being expressable at two levels of detail, some of said items being included at one level of detail and excluded at the other level of detail,
said method comprising displaying selected portions of said set at said different levels of detail in response to user commands,
simultaneously displaying other information, and
responding to said user by compressing or expanding the display of each item in said set to an appropriate level of detail in response to the user selecting an item in said set.

65. The method of claim 64 further comprising
varying the proportions of said levels of detail in response to user commands.

66. The method of claim 65 further comprising
displaying a controllable range indicator which indicates a range within said set for which said display is at said higher level of detail, and
adjusting the span of said indicator in response to user commands.

67. The method of claim 66 further comprising providing a marker within said range which indicates a user selection of a label in said set.

68. The method of claim 64 further comprising
displaying a controllable range indicator which indicates a range within said set for which said display is at one said level of detail, and
adjusting the span of said indicator in response to user commands.

69. The method of claim 68 further comprising
providing a marker within said range which indicates a user selection of a data item in said set.

70. A computer-based apparatus for providing assistance to a user of an application program comprising
in response to a user requesting assistance in the course of using said program,
means for displaying a set of labels, each label indicating the content of a corresponding segment of assistance information, said labels being displayed in an organized model, and
means for, simultaneously while displaying said set of labels, displaying a segment of assistance information corresponding to one of said labels selected by said user.

71. A computer-based apparatus for aiding a user to scan a set of displayed data items while simultaneously performing another interactive task using the display, portions of said set being expressable at two levels of detail, some of said items being included at one level of detail and excluded at the other level of detail, said method comprising
means for displaying selected portions of said set at said different levels of detail in response to user commands, while
means for simultaneously displaying other information and responding to said user with respect to said other interactive task.

72. A computer-based apparatus for facilitating the organization, distribution, and use of
digital information of the kind that can be displayed by a computer, comprising
means for dividing said information into discrete segments, various segments being represented respectively by incompatible digital representational schemes,
means for providing said segments to a user in accordance with a unified digital representational scheme, means for associating with each segment a label indicative of the content of the segment,
means for collecting a set of segments that are related by subject matter,
mens for organizing the labels associated with said segments in accordance with a model based on the content of said segments,
means for distributing the collected segments and model to a second user,
means for displaying the collected segments to said second user, and
means for altering the organization of the labels in accordance with a revision of said model in response to said second user.

73. A computer-based method for facilitating the organization, distribution, and use of digital information of the kind that can be displayed by a computer, comprising
dividing said information into discrete segments, various segments being represented respectively by incompatible digital representational schemes,
providing said segments to a user in accordance with a unified digital representational scheme,
associating with each segment a label indicative of the content of the segment,
collecting a set of segments that are related by subject matter,
organizing the labels associated with said segments in accordance with a model based on the content of said segments,
distributing the collected segments and model to a second user,
displaying the collected segments to said second user, and
altering the organization of the labels in accordance with a revision of said model in response to said second user.

74. A computer-based apparatus for aiding a user in assembling a customized body of information from a larger available body of available information segments, comprising
- means for displaying a set of labels, each label providing an abbreviated indication of information content of a corresponding one of said segments in said available information segments in said larger body,
- means for enabling a user to point to individual labels in said set using an electronic pointing technique,
- for each label to which said user points, means for displaying to the user, for previewing, information content of the corresponding segment
- means for enabling a user to choose to include in the customized body of information, selected ones of said available information segments, while excluding from the customized body of information other available information segments, and
- means for assembling said customized body of information in response to choices of information segments made by a user.

75. A computer-based apparatus for aiding a user in assembling a customized body of information from a larger body of available information segments, comprising
- means for displaying a set of labels, each label providing an abbreviated indication of information content of a corresponding one of said available information segments in said larger body,
- means for enabling a user to point to individual labels in said set using an electronic pointing technique,
- means for displaying, for each label to which said user points, to the user, for previewing, information content of the corresponding segment, and
- means for simultaneously while displaying said information content of a segment corresponding to a label to which the user is pointing, displaying information content for a segment corresponding to a label to which the user had previously pointed.

76. A computer-based apparatus for producing an annotated body of stored information comprising
- means for specifying keys each of which may appear within said body of stored information,
- means for searching said body of stored information for instances of each of said keys,
- means for defining boundaries of segments of said stored information, each said segment including at least one of said instances,
- means for assigning to each segment a label based on a key found within said segment,
- means for displaying each segment to a user, in response to commands from said user, and
- means for adjusting the boundaries of at least one of said segments.

77. A computer-based apparatus for aiding a user in accessing a body of stored information which includes segments of related information, comprising
- means for displaying a set of labels, each label providing an abbreviated indication of information content of a corresponding one of said segments, said labels being displayed in an organized model reflecting relationships among information contents of said corresponding segments,
- means for enabling a user to point to individual labels in said model using an electronic pointing technique, and
- for each label to which said user points, means for displaying to the user, for previewing, the information content of the corresponding segment.

78. The method of claim 3 wherein said set and said second set comprise lists.

* * * * *

UNITED STATES PATENT AND TRADEMARK OFFICE
CERTIFICATE OF CORRECTION

PATENT NO. : 5,251,294

DATED : October 5, 1993

INVENTOR(S) : Daniel H. Abelow

It is certified that error appears in the above-identified patent and that said Letters Patent is hereby corrected as shown below:

TITLE PAGE

Under Other Publications

Page 2, column 2, line 6, delete "Albex" and insert therefor -- Ablex --;

Page 2, column 2, line 11, delete "Svoikia" and insert therefor -- Svoikla --;

Page 2, column 2, line 14, delete "An" and insert therefor -- And --;

Page 3, column 1, line 11, delete "17" and insert therefor -- 7 --; and

Page 5, column 2, line 1, before "All" insert -- " --.

In the specification

Column 1, line 16, delete "Jones Irwin" and insert therefor -- Jones-Irwin --;

Column 4, line 20, delete ".";

Column 6, line 46, delete "so called" and insert therefor -- so-called --;

Column 6, line 54, delete "on line" and insert therefor -- on-line --;

Column 6, line 57, delete "so called" and insert therefor -- so-called --;

UNITED STATES PATENT AND TRADEMARK OFFICE
CERTIFICATE OF CORRECTION

PATENT NO. : 5,251,294

DATED : October 5, 1993

INVENTOR(S) : Daniel H. Abelow

It is certified that error appears in the above-identified patent and that said Letters Patent is hereby corrected as shown below:

Column 8, line 21, delete "how to" and insert therefor -- how-to --;

Column 9, lines 33-34, delete "computer readable" and insert therefor -- computer-readable --;

Column 9, line 49, delete "imagination driven" and insert therefor -- imagination-driven --;

Column 14, line 7, delete "Imagination driven" and insert therefor -- Imagination-driven --;

Column 14, line 11, delete "Context based" and insert therefor -- Context-based --;

Column 14, line 21, delete "imagination driven" and insert therefor -- imagination-driven --;

Column 14, line 37, delete "imagination driven" and insert therefor -- imagination-driven --;

Column 16, line 44, delete "on line" and insert therefor -- on-line --;

Column 17, lines 31-32, delete "Shift Minus" and insert therefor -- Shift-Minus --;

Column 17, line 39, delete "10";

Column 18, line 39, delete "Base s" and insert therefor -- Base's --;

UNITED STATES PATENT AND TRADEMARK OFFICE
CERTIFICATE OF CORRECTION

PATENT NO.   : 5,251,294

DATED        : October 5, 1993

INVENTOR(S)  : Daniel H. Abelow

It is certified that error appears in the above-identified patent and that said Letters Patent is hereby corrected as shown below:

Column 19, line 61, delete "responsivenes" and insert therefor -- responsiveness --;

Column 20, line 27, delete "window250" and insert therefor -- window 250 --;

Column 20, line 68, delete "276,9002" and insert therefor -- 276, 9002 --;

Column 21, line 20, delete "Page up" and insert therefor -- Page-up --;

Column 24, lines 59-60, delete "line-by line" and insert therefor -- line-by-line --;

Column 27, line 11, delete "how to" and insert therefor -- how-to --;

Column 28, line 46, delete "Time Sequence" and insert therefor -- Time-Sequence --;

Column 32, lines 48-49, delete "Time Sequence" and insert therefor -- Time-Sequence --;

Column 33, lines 17-18, delete "Time Sequence" and insert therefor -- Time-Sequence --;

Column 33, line 25, delete "Modelby" and insert therefor -- Model by --;

Column 35, lines 27-28, delete "month s" and insert therefor -- month's --;

UNITED STATES PATENT AND TRADEMARK OFFICE
CERTIFICATE OF CORRECTION

PATENT NO. : 5,251,294

DATED : October 5, 1993

INVENTOR(S) : Daniel H. Abelow

It is certified that error appears in the above-identified patent and that said Letters Patent is hereby corrected as shown below:

Column 35, lines 40-41, delete "pro active" and insert therefor -- pro-active --;

Column 36, lines 2-3, delete "stand alone" and insert therefor -- stand-alone --;

Column 36, line 21, delete "(" (first occurrence);

Column 36, line 54, delete "Modelwindow" and insert therefor -- Model window --;

Column 40, line 28, delete "End User" and insert therefor -- End-User --;

Column 40, line 29, delete "End User" and insert therefor -- End-User --;

Column 41, line 4, delete "start up" and insert therefor -- start-up --;

Column 41, line 68, delete "Time Sequencing" and insert therefor -- Time-Sequencing --;

Column 43, line 50, delete "mos" and insert therefor -- most --;

Column 44, line 63, delete "and or" and insert therefor -- and/or --;

Column 45, lines 20-21, delete "On line" and insert therefor -- On-line --;

UNITED STATES PATENT AND TRADEMARK OFFICE
CERTIFICATE OF CORRECTION

PATENT NO.    : 5,251,294

DATED         : October 5, 1993

INVENTOR(S)   : Daniel H. Abelow

It is certified that error appears in the above-identified patent and that said Letters Patent is hereby corrected as shown below:

Column 47, lines 30-31, delete "on the fly" and insert therefor -- on-the-fly --;

Column 48, line 9, delete " WP  BOOKTEXT" and insert therefor -- \WP\BOOKTEXT --;

Column 49, line 40, delete "two window" and insert therefor -- two-window --;

Column 50, line 40, delete "<Shift-F7"" and insert therefor -- <Shift-F7> --;

Column 53, line 40, delete "business related" and insert therefor -- business-related --;

Column 53, line 41, delete "an" and insert therefor -- and --;

Column 55, lines 21-22, delete "dial in" and insert therefor -- dial-in --;

Column 56, line 7, delete "dial in" and insert therefor -- dial-in --; and

Column 60, line 21, delete "Time Sequencing" and insert therefor -- Time-Sequencing --.

In the Claims

Claim 56, column 64, line 62, delete "28" and insert therefor -- 46 --; and

Claim 72, column 66, line 36, delete "mens" and insert therefor -- means --.

Signed and Sealed this

Fifteenth Day of November, 1994

Attest:

BRUCE LEHMAN

Attesting Officer                Commissioner of Patents and Trademarks

UNITED STATES PATENT AND TRADEMARK OFFICE
CERTIFICATE OF CORRECTION

PATENT NO. : 5,251,294
DATED : October 5, 1993
INVENTOR(S) : Daniel H. Abelow

It is certified that error appears in the above-indentified patent and that said Letters Patent is hereby corrected as shown below:

Delete text from Column 52, line 1 through Column 54, line 46, as it is duplicative.

Signed and Sealed this

Sixth Day of June, 1995

*Attest:*

BRUCE LEHMAN

*Attesting Officer*     Commissioner of Patents and Trademarks

(12) EX PARTE REEXAMINATION CERTIFICATE (8579th)
United States Patent
Abelow

(10) Number: US 5,251,294 C1
(45) Certificate Issued: Oct. 4, 2011

(54) ACCESSING, ASSEMBLING, AND USING BODIES OF INFORMATION

(75) Inventor: Daniel H. Abelow, Newton, MA (US)

(73) Assignee: Webvention LLC, Marshall, TX (US)

Reexamination Request:
No. 90/011,229, Sep. 13, 2010
No. 90/011,208, Oct. 29, 2010

Reexamination Certificate for:
Patent No.: 5,251,294
Issued: Oct. 5, 1993
Appl. No.: 07/476,931
Filed: Feb. 7, 1990

Certificate of Correction issued Nov. 15, 1994.

Certificate of Correction issued Jun. 6, 1995.

(51) Int. Cl.
*G06Q 10/00* (2006.01)

(52) U.S. Cl. .................................... 715/236; 715/967
(58) Field of Classification Search ................ None
See application file for complete search history.

(56) References Cited

U.S. PATENT DOCUMENTS 4,772,882 A    9/1988  Mical
4,821,211 A    4/1989  Torres
5,287,448 A    2/1994  Nicol

*Primary Examiner*—Christina Y Leung

(57) ABSTRACT

An interactive information environment for accessing, controlling, and using information. Using a computer, available sources of information are accessed, and components are extracted, labeled, and formed into discrete units called contexts. A user selects and rearranges context labels and their associated contents. Contexts are selected and combined into new information structures called alternates, which are combinable with contexts into preferred situations. The preferred situations in turn are combinable with the foregoing components into meta-situations. All components have labels; labels and their associated contents are interchangeably movable and copyable at the levels of these information structures, whether they are located locally or remotely, and the information structures are combinable. While a label is invoked and manipulated, its contents or description is simultaneously displayed. Each information structure can be rearranged into one or more models which can be displayed by user selection, and models can be displayed at varying levels of detail. With built-in copyright accounting, commercial control remains with information owners, while operational use is centralized in each user.

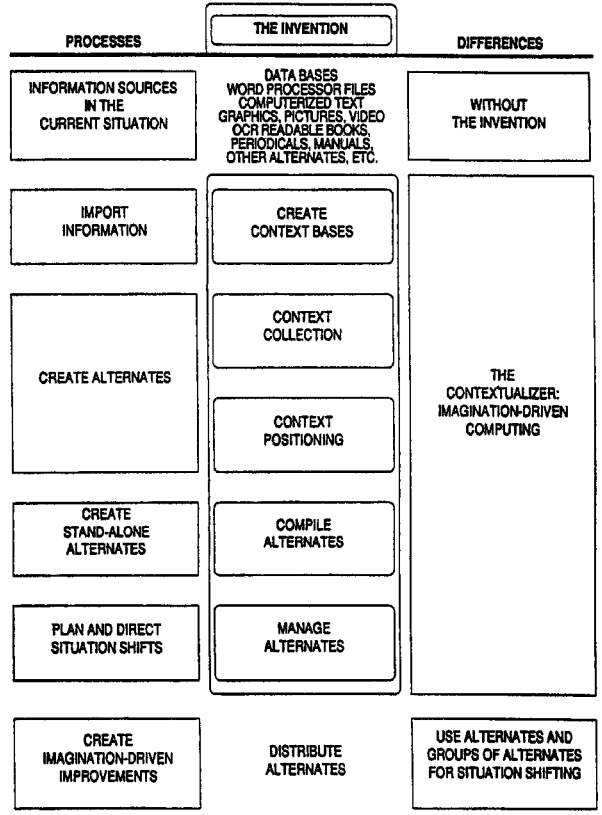

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-8, 12-21, 28-33, 35, 37, 40-44, 47, 48, 51, 53, 55 and 78 is confirmed.

Claims 58 and 64-69 are cancelled.

Claims 9-11, 22-27, 34, 36, 38, 39, 45, 46, 49, 50, 52, 54, 56, 57, 59-63 and 70-77 were not reexamined.

* * * * *

(12) EX PARTE REEXAMINATION CERTIFICATE (10544th)

United States Patent
Abelow

(10) Number: US 5,251,294 C2
(45) Certificate Issued: Mar. 18, 2015

(54) ACCESSING, ASSEMBLING, AND USING BODIES OF INFORMATION

(75) Inventor: Daniel H. Abelow, Newton, MA (US)

(73) Assignee: Webvention Group LLC, Marshall, TX (US)

Reexamination Request:
No. 90/011,948, Oct. 7, 2011
No. 90/012,479, Sep. 7, 2012

Reexamination Certificate for:
Patent No.: 5,251,294
Issued: Oct. 5, 1993
Appl. No.: 07/476,931
Filed: Feb. 7, 1990

Reexamination Certificate C1 5,251,294 issued Oct. 4, 2011

Certificate of Correction issued Nov. 15, 1994
Certificate of Correction issued Jun. 6, 1995

(51) Int. Cl.
G06Q 10/00 (2012.01)
G06Q 10/10 (2012.01)

(52) U.S. Cl.
CPC ............. *G06Q 10/10* (2013.01); *Y10S 715/967* (2013.01)
USPC .......................................... 715/236; 715/967

(58) Field of Classification Search
None
See application file for complete search history.

(56) References Cited

To view the complete listing of prior art documents cited during the proceedings for Reexamination Control Numbers 90/011,948 and 90/012,479, please refer to the USPTO's public Patent Application Information Retrieval (PAIR) system under the Display References tab.

*Primary Examiner* — Jalatee Worjloh

(57) ABSTRACT

An interactive information environment for accessing, controlling, and using information. Using a computer, available sources of information are accessed, and components are extracted, labeled, and formed into discrete units called contexts. A user selects and rearranges context labels and their associated contents. Contexts are selected and combined into new information structures called alternates, which are combinable with contexts into preferred situations. The preferred situations in turn are combinable with the foregoing components into meta-situations. All components have labels; labels and their associated contents are interchangeably movable and copyable at the levels of these information structures, whether they are located locally or remotely, and the information structures are combinable. While a label is invoked and manipulated, its contents or description is simultaneously displayed. Each information structure can be rearranged into one or more models which can be displayed by user selection, and models can be displayed at varying levels of detail. With built-in copyright accounting, commercial control remains with information owners, while operational use is centralized in each user.

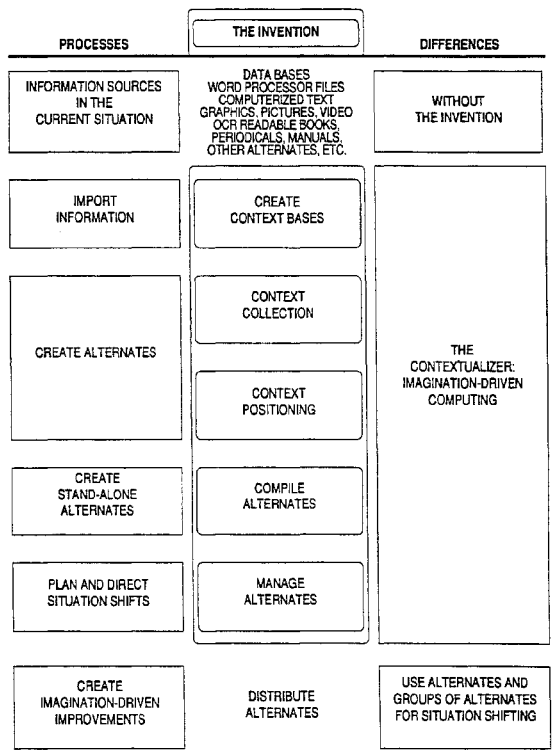

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1 and 20 is confirmed.

Claims 58 and 64-69 were previously cancelled.

Claims 28-33, 35, 37, 40-51, 53, 55, 59, 70, 72-74 and 77 are cancelled.

Claims 2-19, 21-27, 34, 36, 38, 39, 52, 54, 56, 57, 60-63, 71, 75, 76 and 78 were not reexamined.

* * * * *